(12) United States Patent
Weber et al.

(10) Patent No.: US 7,171,281 B2
(45) Date of Patent: Jan. 30, 2007

(54) CONTROL SYSTEM AND METHOD THEREFOR

(75) Inventors: Patrick Weber, Strongsville, OH (US); Suresh Viswanathan, Solon, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 10/365,207

(22) Filed: Feb. 11, 2003

(65) Prior Publication Data
US 2003/0158615 A1    Aug. 21, 2003

Related U.S. Application Data

(63) Continuation of application No. 09/583,222, filed on May 30, 2000, now Pat. No. 6,615,091, which is a continuation-in-part of application No. 09/317,577, filed on May 24, 1999, now Pat. No. 6,325,198.

(60) Provisional application No. 60/090,860, filed on Jun. 26, 1998.

(51) Int. Cl.
*G06F 19/00* (2006.01)
(52) U.S. Cl. ............................ 700/96; 700/20; 709/202
(58) Field of Classification Search ................ 700/20, 700/95–96, 117; 709/202, 217, 220
See application file for complete search history.

(56) References Cited

U.S. PATENT DOCUMENTS 2,551,080 A    5/1951   Allan et al.

(Continued)

FOREIGN PATENT DOCUMENTS

GB    2292926    3/1996

JP    SHO58212516    12/1983

OTHER PUBLICATIONS

Shopfloor Integration and multiagent based supervision—Camarinha-Matos et al. IEEE Xplore, Sep. 1997.*
Modeling manufacturing resources based on agent model—Hiji et. al. IEEE Xplore, Mar. 1999.*

(Continued)

*Primary Examiner*—Leo Picard
*Assistant Examiner*—Alexander Kosowski
(74) *Attorney, Agent, or Firm*—Michael C. Pophal

(57) ABSTRACT

A flexible control system and method of controlling a processing operation. The control system and method may be employed to control a high speed manufacturing system for processing articles of manufacture requiring processes to be performed on the articles at a pre-selected processing rate includes a trunk for simultaneously conveying a plurality of the articles of manufacture at the pre-selected processing rate in a first mode of motion from the beginning of the manufacturing system to the end of the system. At least one branch processing station is positioned intermediate the beginning and the end of the trunk wherein the branch processing station during its operation performs at least one process on articles of manufacture conveyed on the branch processing station and where the articles are conveyed in a second mode of motion. At least one transfer device is positioned intermediate the trunk and the branch processing station to continuously extract articles of manufacture from the trunk and transition the movement of the extracted articles of manufacture from the first mode of motion to the second mode of motion for transfer to the branch processing station. The transfer device also extracts each of the processed articles of manufacture from the branch processing station and transitions the movement of the articles from the second mode of motion to the first mode of motion for transfer to the trunk.

22 Claims, 76 Drawing Sheets

U.S. PATENT DOCUMENTS

| | | | |
|---|---|---|---|
| 2,932,376 A | | 4/1960 | Millington |
| 3,316,127 A | | 4/1967 | Oswald |
| 3,889,797 A | | 6/1975 | Naito et al. |
| 4,164,997 A | | 8/1979 | Mueller |
| 4,530,046 A | | 7/1985 | Munekata et al. |
| 5,231,585 A | | 7/1993 | Kobayashi et al. |
| 5,313,402 A | | 5/1994 | Ito |
| 5,491,637 A | | 2/1996 | Kraemer et al. |
| 5,537,325 A | | 7/1996 | Iwakiri et al. |
| 5,560,194 A | | 10/1996 | Shofner et al. |
| 5,680,746 A | | 10/1997 | Hornisch |
| 5,706,201 A | | 1/1998 | Andrews |
| 5,729,689 A | * | 3/1998 | Allard et al. ............... 709/228 |
| 5,742,511 A | | 4/1998 | Chassé et al. |
| 5,754,451 A | | 5/1998 | Williams |
| 5,757,648 A | | 5/1998 | Nakamura |
| 5,781,703 A | * | 7/1998 | Desai et al. .................. 706/50 |
| 5,787,002 A | | 7/1998 | Iwamoto et al. |
| 5,805,442 A | | 9/1998 | Crater et al. |
| 5,844,802 A | | 12/1998 | Lepper et al. |
| 5,864,480 A | | 1/1999 | Ladd |
| 5,867,388 A | | 2/1999 | Okumura et al. |
| 5,877,961 A | | 3/1999 | Moore |
| 5,883,805 A | | 3/1999 | Sada |
| 5,973,696 A | | 10/1999 | Agranat et al. |
| 6,163,794 A | | 12/2000 | Lange et al. |
| 6,247,038 B1 | * | 6/2001 | Banks et al. ................ 718/100 |
| 6,298,377 B1 | * | 10/2001 | Hartikainen et al. ........ 709/223 |
| 6,339,787 B1 | * | 1/2002 | Yohe et al. .................. 709/217 |
| 6,359,892 B1 | * | 3/2002 | Szlam ........................ 370/401 |
| 6,839,733 B1 | | 1/2005 | Lange et al. |

OTHER PUBLICATIONS

Goldszmidt et al—"Delegated Agents for Network Management"—IEEE Communications Magazine, vol. 36, Issue 3, Mar. 1998—pp. 66-70.*

JetWeb Journal "JetWeb: A Technology is Making Headway," 20 pages.

"Open, Modular Architecture Controls at GM Powertrain," Version 1.0, GM Powertrain Group Manuafcturing Engineering Controls Council, May 14, 1996, 39 pages.

"Shopfloor Integration and Multiagent Based Supervision," Camarinha-Matos et al., IEEE Xplore, Sep. 1997, 7 pages.

"Modeling Manufacturing Resources Based on Agent Model," Hiji et al., IEEE Xplore, Mar. 1999, 9 pages.

"Agent-based Intelligent Control System Design for Real-time Distributed manufacturing Environments," Lihui Wang et al., Division of Manufacturing Engineering, University of Calgary. IN working Notes of Autonomous Agents '98 Workshop on Agent-Based Manufacturing, Minneapolis/St. Paul, MN, May 10, 1998, pp. 152-159.

"Architectural Considerations for Holonic Shop Floor Control," Gilad Langer et al., Proceedings of the International Symposium on Manufacturing Systems (ISMS) at the World Manufacturing Congress (WMC97), Auckland, New Zealand, Nov. 1997.

*Design Patterns*, "Elements of Reusable Object-Oriented Software," Erich Gamma et al., 1995, Addison-Wesley, MA, Chapter 4, pp. 139-150 and pp. 207-217.

V. Vyatkin and H.-M. Hanisch, "A Modeling Approach for Verification of IEC 1499 Function Blocks Using Net Condition/Event Systems," IEEE Conference on Emerging Technologies in Factory Automation Proceedings, Barcelona, Spain, p. 261-270, (Sep. 1999).

V, Vyatkin and H.-M. Hanisch, "Modeling of IEC 61499 Function Blocks a Clue to Their Verification," XI Workshop on Supervising and Diagnostics of Machining Systems Proceedings, Wroclaw, 18 pages, (Mar. 2000).

V. Vyatkin, H.-M. Hanisch, P. Starke and S. Roch, "Formalisms for Verification of Discrete Control Applications on Example of IEC1499 Function Blocks," Conference "Verteilte Automatisierung" (Distributed Automation) Proceedings, Magdeburg, Germany, p. 72-79, (Mar. 2000).

V. Vyatkin and H.-M. Hanisch, "Modelling and Verification of Execution Control of the Function Blocks Following to the Standard IEC 1499 by Means of Net Condition/Event Systems (NCES)," Uni-Magdeburg, IFAT, Technical Report, Berlin, Germany, 34 pages, (Mar. 2000).

V. Vytakin and H.-M. Hanisch, "Practice of Modeling and Verification of Distributed Controllers Using Signal Net Systems," Workshop On Concurrency, Specification and Programming Proceedings, Berlin, Germany, 15 pages, (Oct. 2000).

V. Vytakin and H.-M. Hanisch, "Bringing the Model-Based Verification of Distributed Control Systems into the Engineering Practice," VI IFAC Workshop on Intelligent Manufacturing Systems (IMS '2001), Poznan, 6 pages, (2001).

"Agent Based Manufacturing," Sayyed M. Deen, Jul. 2003, 1 page.

"Modelling Distributed Control Systems Using EIC 61499," R.W. Lewis, Apr. 2001, 3 pages.

"Programming Industrial Control Systems Using IEC 1131-3: Revised Edition," R.W. Lewis, 1998, 2 pages.

"Fieldbuses for Process Control: Engineering, Operation, and Maintenance," Jonas Berge, 2001, 1 page.

"Modelling and Vertification of Execution Control of the Function Blocks Following the Standard IEC 61499 by Means of Net Condition/Event Systems (NCES)," Prof. H.-M. Hanisch, Prof. P. Starke, Dr. Sc. Valeriy Vyatkin, Dr. Louchka Popova-Zeugmann and Dipl.-Infm. Stephan Roch, Feb. 1999, 4 pgs.

"A Timed Automata Model of IEC 61499 Basic Function Blocks Semantic," Marius-Petru Stanica and Hervé Guéguen, Jul. 2003, 5 pages.

"Basic Concepts of IEC 61499," James H. Christensen, Mar. 22, 2000, 29 pages of Presentation, 8 pages of Summary.

"Design Patterns for IEC 61499," James H. Christensen, Mar. 22, 2000, 14 pages of Presentation, 9 pages of Summary.

"The IEC 61499 Standard: Concepts and R&D Resources," James H. Christensen, Aug. 20, 2002, 78 pages.

"IEC 61499 Test System," H. Tsunematsu, Jan. 10, 2002, 50 pages.

Open Architecture Control Workshop, IEC 61499 by Sushil Birla, Feb. 9-10, 2000, 1 page.

NSF Workshop on Logic Control for Manufacturing Systems, General Motors Powertrain Future controls Software Requirements by Sushil Birla and Jerry Yen, Jun. 26-27, 2000, 6 pages.

Business Object Summit, Abstract of Presentation to BOS, Nov. 8, 2000, 2 pages.

"HMS/FB Architecture and its Implementation," James Christensen, 38 pages.

"IEC 61131-3: Programming Industrial Automation Systems," John Karl-Heinz and Michael Tiegelkamp, 2001, 1 page.

http://www.holobloc.com.

http://www.iec.ch/cqi-bin/procqi.pl/www/iecwww.p?wwwlang=E&wwwprog=sea1122.p&class=&refno=&search=publication&header=IEC&pubno=61499&part=&se=&.

"Workshop Report: Implementing Manufacturing Agents," sponsored by the Shop Floor Agents Project of the National Center for Manufacturing Sciences (NCMS) in conjunction with PAAM'96, reported by H. Van Dyke Parunak of the Industrial Technology Institute, Westminster Central Hall, London, United Kingdom, Apr. 25, 1996, © 1996, NCMS, 12 pages.

"Practical and Industrial Applications of Agent-Based Systems," by H. Van Dyke Parunak, Industrial Technology Institute, © 1998, Industrial Technology Institute, 41 pages.

"Multi-Agent Systems"—CS 525M, Spring 2002 Syllabus of Worcester Polytechnic Institute, Chapter 9, Lecture #11 slide presentation by Greg Milette, CS525M, Spring 2002, 23 pages.

"Holonic Manufacturing Systems: Initial Architecture and Standards Directions," by James Christensen, presented at First European Conference on Holonic Mfg. Systems, Germany, Dec. 1, 1994, 20 pages.

"Holonic Control of a Water Cooling System for a Steel Rod Mills," J.R. Agre, G. Elsley, D. McFarlane, J. Cheng and B. Gunn, © 1994 IEEE, pages 134-141.

"Holonic Control for Manufacturing Systems: Functional Design of a Manufacturing Robot Cell," T. Heikkilä, M. Järviluoma and T. Juntunen, Jan. 8, 1996, © 1997 John Wiley & Sons, Inc., pp. 202-218.

"An Agent Architecture for Manufacturing Control: manAge," T. Heikkilä, M. Kollingbaum, P. Valckenaers and Geert-Jan Bluemink, *Computers in Industry*, © 2001 Elsevier Science B.V., pp. 315-331.

"Application of Holonic Methodologies to Problem Diagnosis in a Steel Rod Mill," D. McFarlane, B. Marett, G. Marett, G. Elsley and D. Jarvis, *In Proceedings of IEEE Conference on Systems, Man and Cybernetics*, Vancouver, 1995, pp. 1-6.

"Development of a Robot Holon Using an Open Modular Controller," J. Schnell, S. Andersen, G. Langer and C. Sørensen, *Proceedings of the 1999 IEEE International Conference on Control Applications*, Aug. 22-27, 1999, pp. 1642-1647.

"Holonic Self-Organization of Multi-Agent Systems by Fuzzy Modeling With Application to Intelligent Manufacturing," M. Ulieru, D. Stefanoiu and D. Norrie, IEEE/SMC Oct. 2000, 4 pages.

"Reference Architecture for Holonic Manufacturing Systems Prosa," H. Van Brussel, J. Wyns, P. VAlckenaers, L. Bongaerts and P. Peeters, *Computers in Industry, Special Issue on Intelligent Manufacturing Systems*, vol. 37, No. 3, 1998, pp. 255-276.

"An Agent-Oriented Architecture for Holonic Manufacturing Control," S. Bussmann, First Open Workshop IMS Europe, Lausanne, Switzerland, 1998, pp. 1-12.

"An Open Architecture for Holonic Cooperation and Autonomy," M. Fletcher, E. Garcia-Herreros, J. Christensen, S. Deen and R. Mittmann, *First International Workshop on Industrial Applications of Holonic and Multi-Agent Systems*, Sep. 8, 2000, 9 pages.

The Foundation for Intelligent Physical Agents, IEEE Computer Society, © 2005, 2 pages.

"Integrated Shop Floor Control Using Autonomous Agents," G. Yuh-Jiun Lin and J. Solberg, *IIE Transactions*, vol. 24, No. 3, Jul. 1992, pp. 57-71.

"Multi-Agent Mediator Architecture for Distributed Manufacturing," F. Maturana and D. Norrie, *Journal of Intelligent Manufacturing*, 1996, pp. 257-270.

"Manufacturing Experience With the Contract Net," H. Van Dyke Parunak, *Distributed Artifical Intelligence*, Pitman, London, 1987, pp. 285-310.

"An Operating System for the Intellectual Distributed Processing System—An Object Oriented Approach Based on Broadcast Communication—," T. Seki, T. Hasegawa, Y. Okataku and S. Tamura, *Journal of Information Processing*, vol. 14, No. 4, 1991, pp. 405-413.

"Holons and Holarchies," E. H. van Leeuwen and D. Norrie, IEE: 1997, 2 pages.

"Hybrid FMS Control Architectures Based on Holonic Principles," A. Overmars and D. Toncich, *The International Journal of Flexible Manufacturing Systems*, 8, 1996, pp. 263-278.

"Programming, Scheduling, and Control of Flexible Assembly Systems," P. Valckenaers, H. Van Brussel, L. Bongaers and F. Bonneville, *Computers in Industry* 26, 1995, pp. 209-218.

Flexible Manufacturing Control With PLC, CNC and Software-Agents, R. Schoop, r. Neubert, B. Suessmann, *Fifth International Symposium on Autonomous Decentralized Systems*, Mar. 2001, 7 pages.

"Reference Architecture for Holonic Manufacturing Systems—the key to support evolution and reconfiguration—," Dissertation by Jo Wyns, Katholieke Universiteit Leuven, Belgium, Mar. 1999, 273 pages.

\* cited by examiner

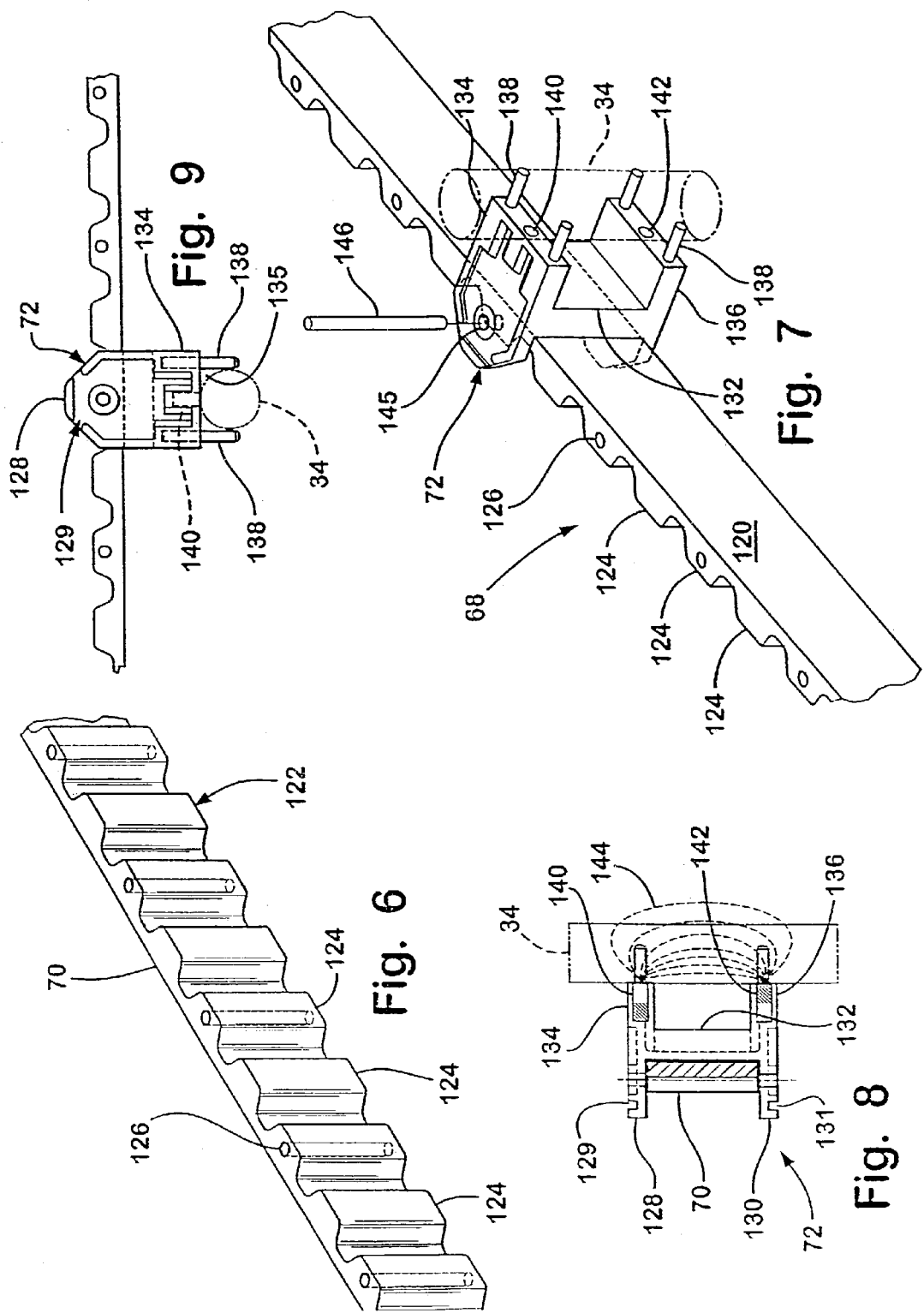

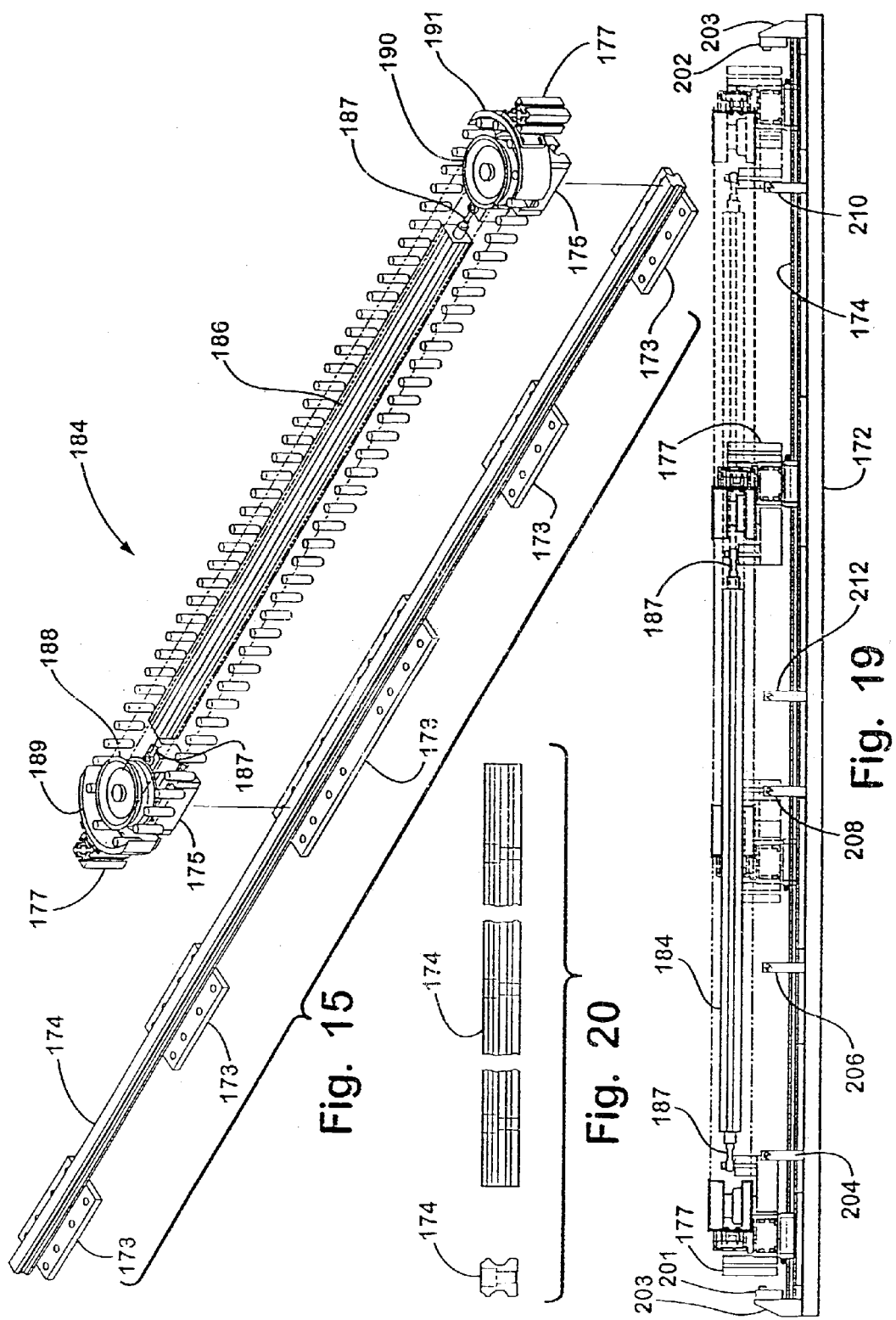

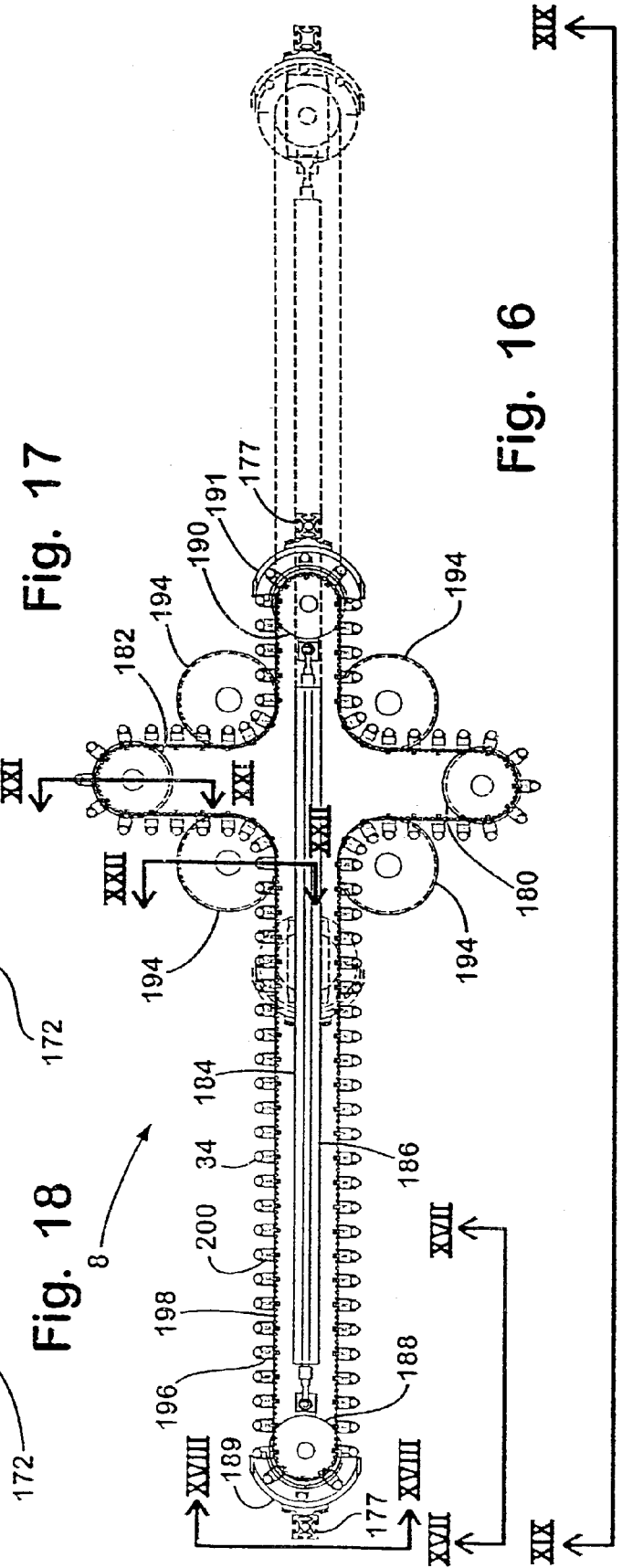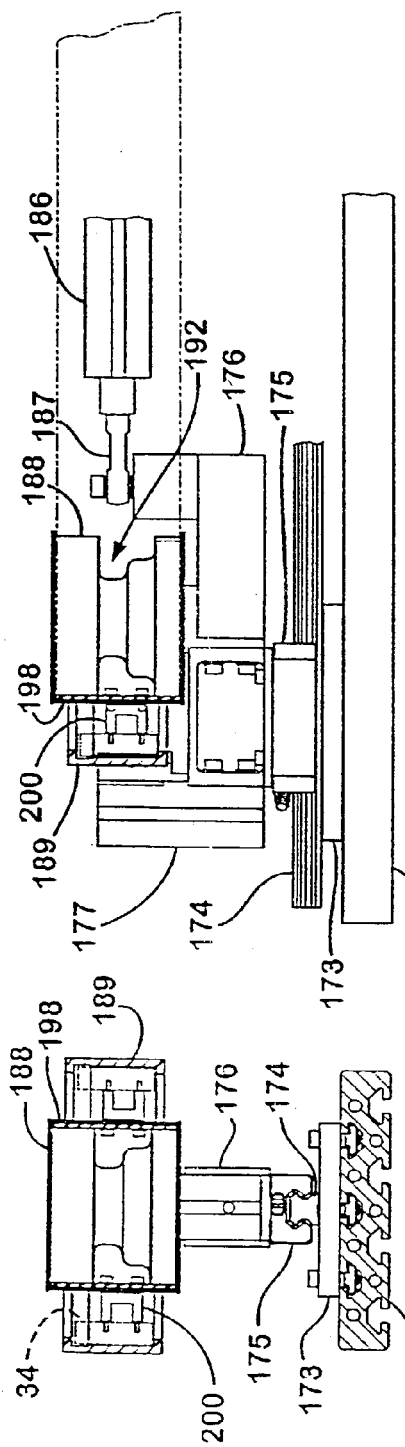

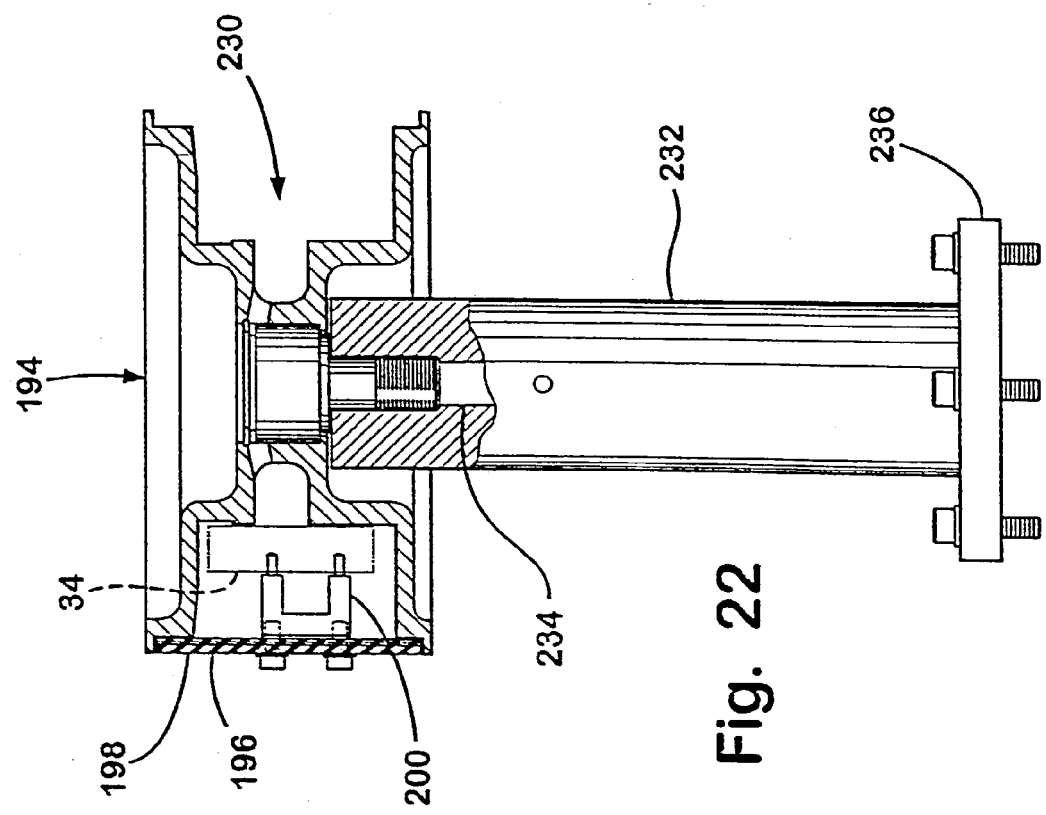
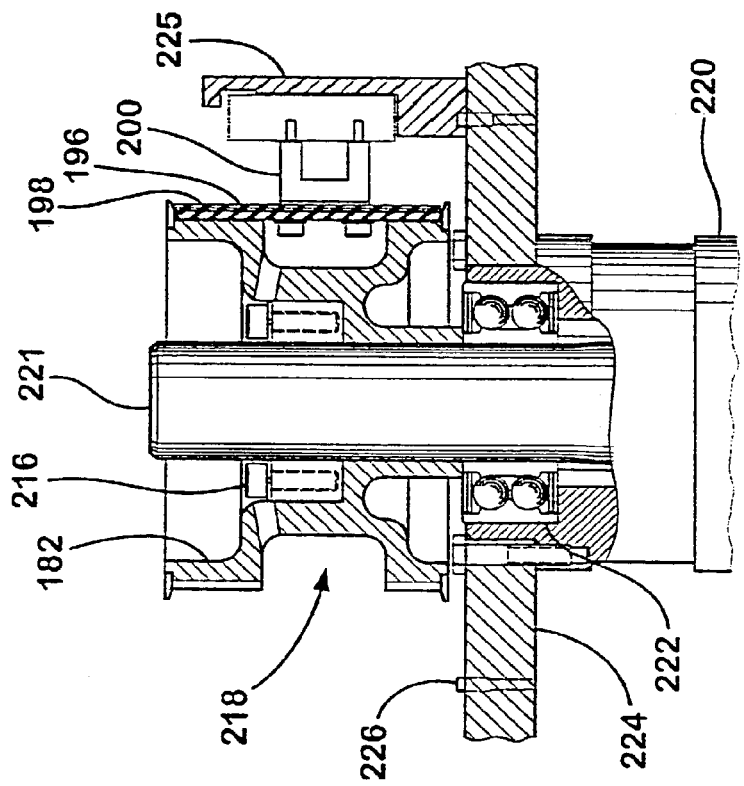
Fig. 22
Fig. 21

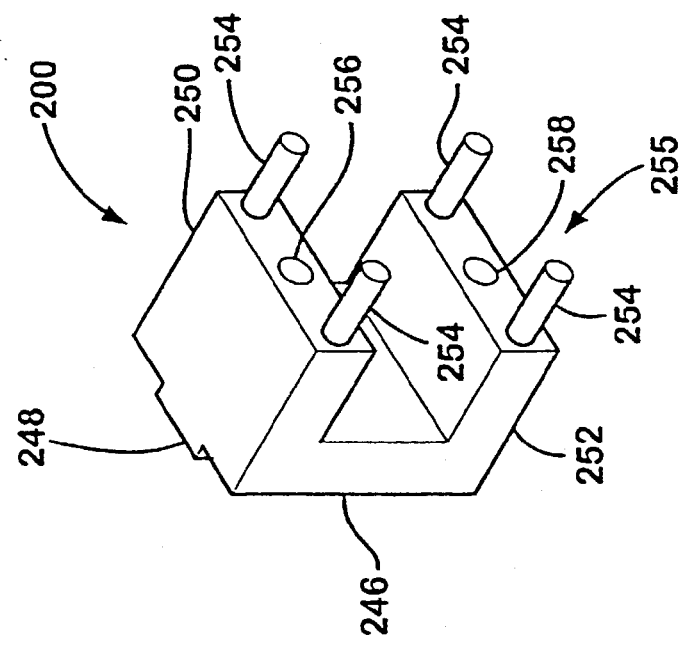
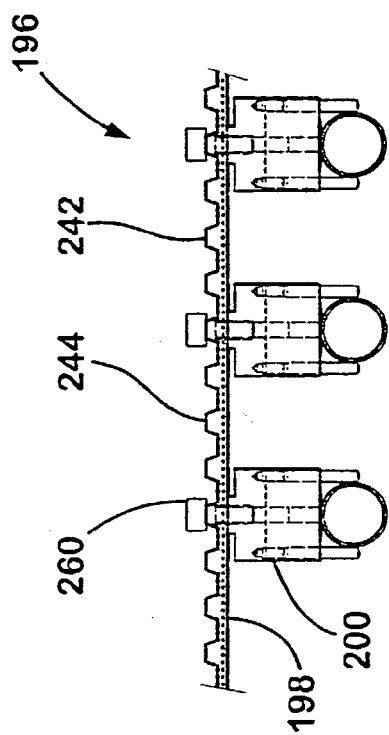
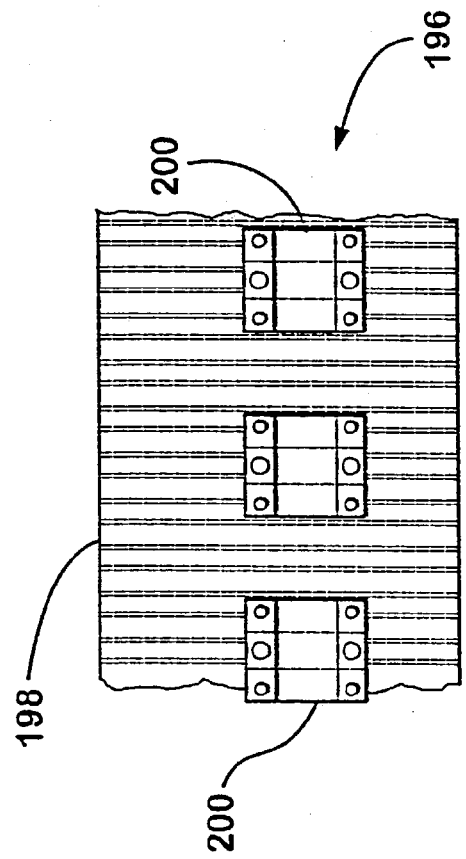
Fig. 25
Fig. 23
Fig. 24

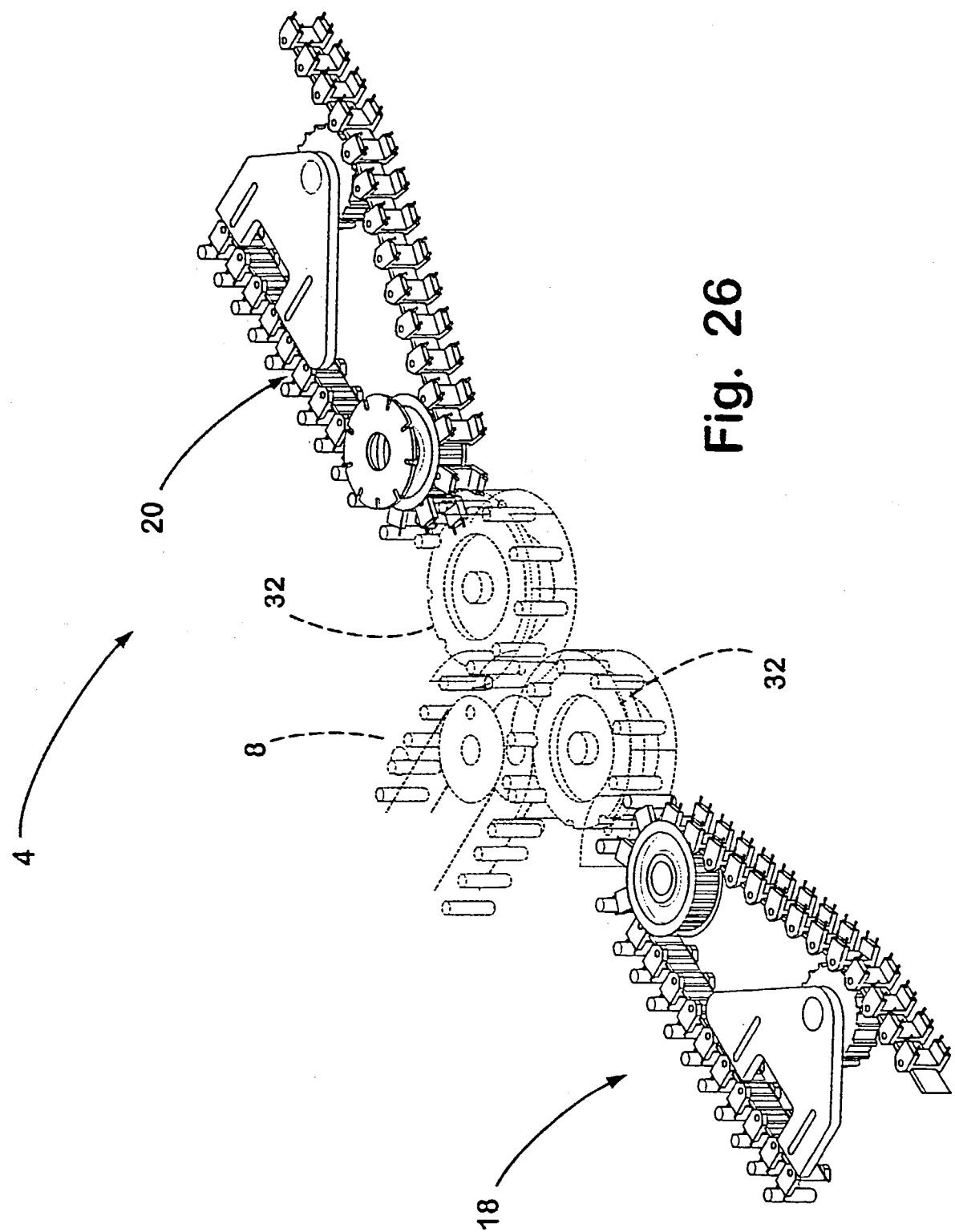

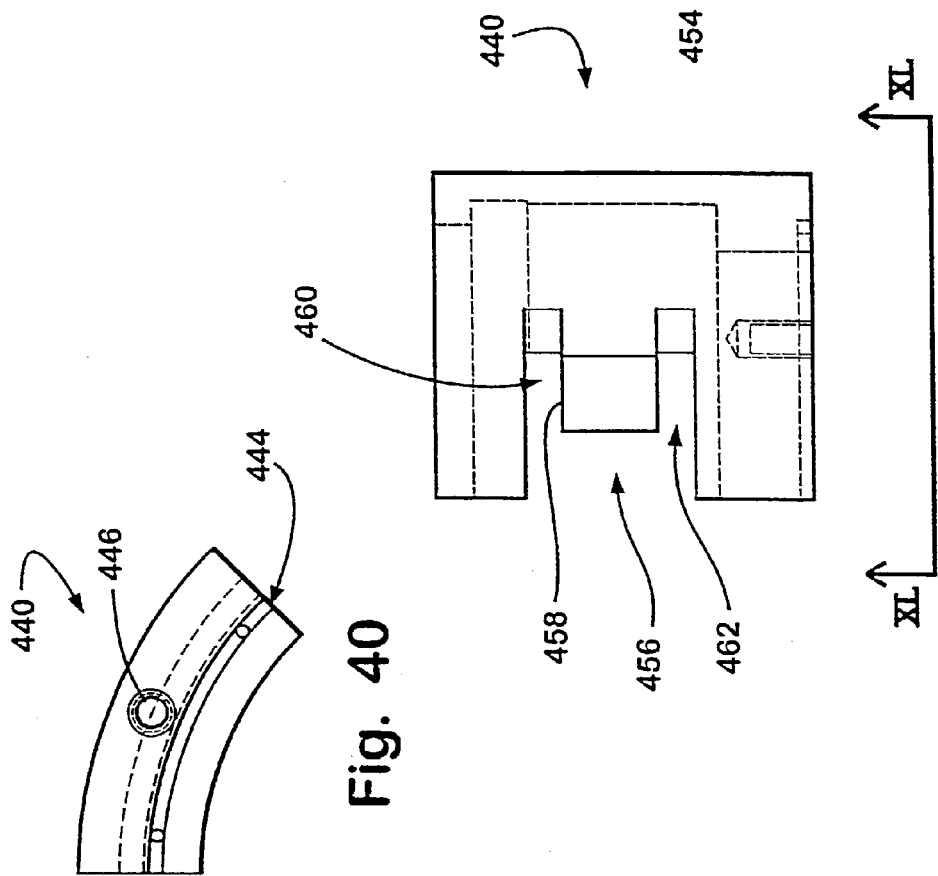
Fig. 39
Fig. 40
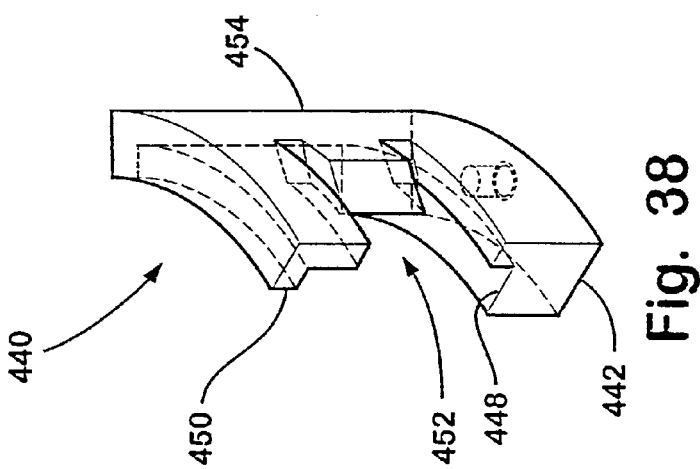
Fig. 38

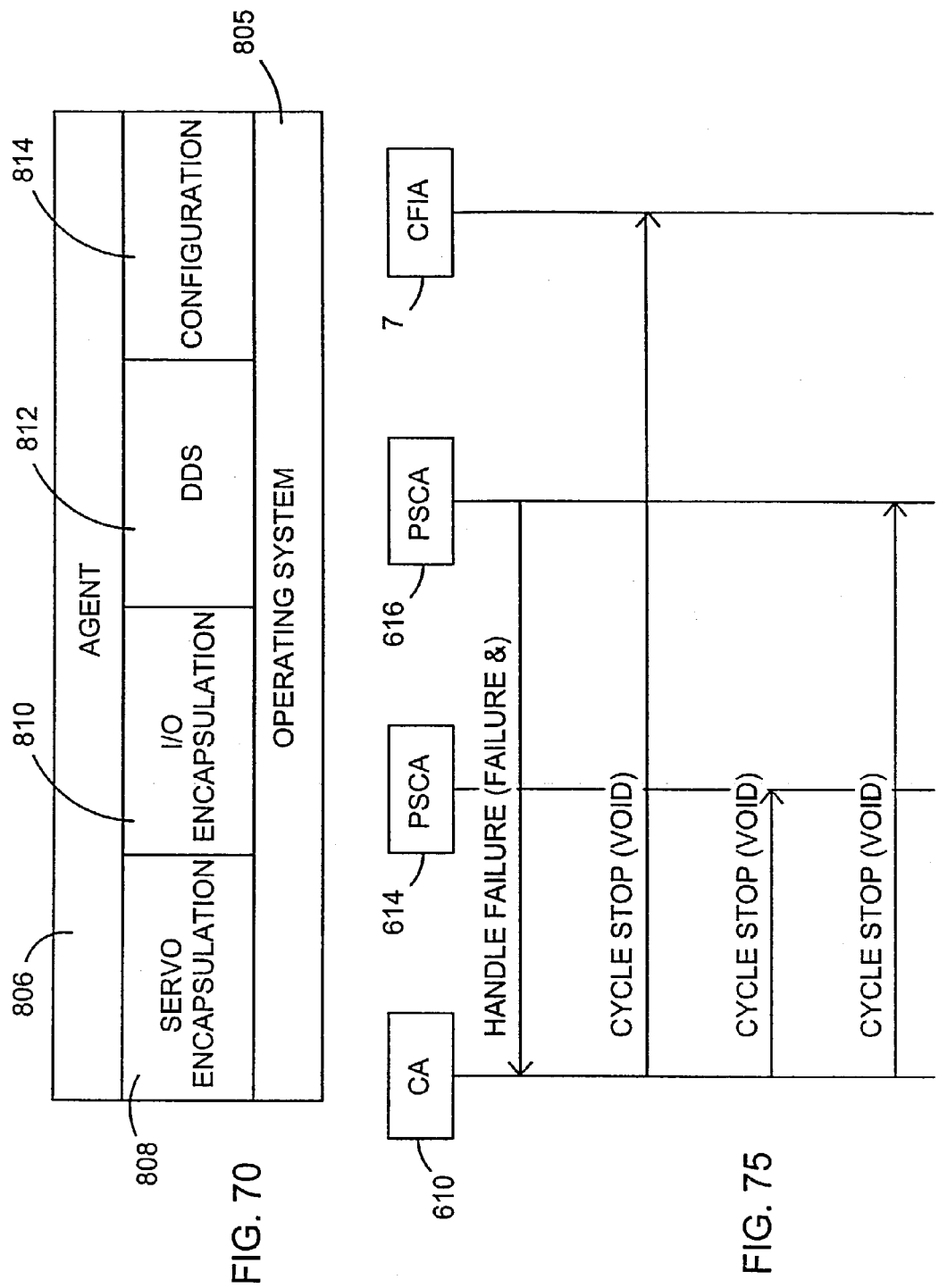

CONTROL SYSTEM AND METHOD THEREFOR

CROSS REFERENCE TO RELATED APPLICATIONS

This application is a continuation of U.S. patent application Ser. No. 09/583,222, filed May 30, 2000, entitled "CONTROL SYSTEM AND METHOD THEREFOR," now U.S. Pat. No. 6,615,091, which is a continuation-in-part of U.S. patent application Ser. No. 09/317,577, filed May 24, 1999, entitled "HIGH SPEED MANUFACTURING SYSTEM," now U.S. Pat. No. 6,325,198, which claims the benefit of U.S. Provisional Application Ser. No. 60/090,860, filed Jun. 26, 1998, entitled "HIGH SPEED MANUFACTURING SYSTEM." The aforementioned related applications are hereby incorporated by reference.

BACKGROUND OF THE INVENTION

The present invention generally relates to a manufacture control system and, more particularly, to a distributed control system and method for controlling the production of small items of manufacture, such as batteries.

Items of manufacture, and, in particular, small items of manufacture requiring multiple processes during their production and which are produced in large quantities, such as dry cell batteries, are completed by passing the articles through a series of individual apparatuses which are specifically designed to perform one or two processes. These processing machines are often stand-alone units which operate on a bulk input/bulk output basis. This type of system is labor intensive, and lacks the capability for adequate quality control, rapid maintenance, or tracking of the manufactured articles.

Current processing equipment which typically operates in an indexed manner has a single main drive motor which drives the indexer as well as driving the application heads performing the specific process. These various operations conducted by the machines are mechanically timed and are controlled by mechanical cams. Such mechanical timing is time-consuming to setup, is not flexible, and may lack precision. Any malfunction of these machines generally requires the entire machine to be pulled off-line for time-consuming repair, thus resulting in undesirable production efficiency.

The bulk-in/bulk-out manner in which these machines operate is such that the battery cans are extracted in random fashion from a bin thereby requiring proper orientation to begin the processing and are then output from the machine into another bin after processing. The processed cans are then transported in bulk to another processing station whereupon the bin extraction and article orientation functions are again repeated thus duplicating unnecessary handling and time consuming operations. Others of these machines operate on a theory of back pressure wherein the battery cans are stacked and urged to a processing station by applying a force to the backed up cans to force the articles through the processing machine. There must always be a supply of battery cans on the input side to maintain sufficient pressure to keep the 'pump primed' thereby facilitating processing throughput. Such methods of input and output preclude the tracking of individual battery cans during processing and between discrete machines. The manufacturer therefore loses information about individual cans between product assembly or processing steps. A consequence of the random input and output is a loss of quality control on individual articles with the result being that there is little to no process data available on the articles, and what data is available is not in alignment with quality control samples taken from the processing line.

At the conclusion of the quality control sampling, the machine is again stopped and again unloaded by hand. This time-consuming but necessary function often results in a significant loss of valuable production time in addition to the excessive labor costs associated therewith. Additionally, repeated starting and stopping of the machine induces variation in the production process which can adversely affect production quality.

The current mechanically controlled machines often include one or more cams to transfer desired time sequenced motion to the processing apparatuses mounted to the machine for a desired synchronized operation. In addition to the single drive motor driving the processing apparatus, the motor also operates and drives a large mass circular dial which transports the battery cans therearound to the individual process stations on the machine. Typically, these large mass dials require a significant percentage of the power consumed by the machine to accelerate and decelerate the dial during the indexing operations. Power thus expended contributes little 'value added' to the finished product. Also, the acceleration and deceleration of large mass dials requires a significant portion of the total time of operation which therefore severely limits the throughput of the processing machines.

The aforementioned current processing equipment employs separately controlled process stations in which battery cans were randomly dumped from one machine to another, thereby eliminating any ability to track a given battery can. Additionally, in order to conduct experimental process operations, conventional manufacturing systems commonly require that the normal system operation first be shutdown, the experimental equipment then be installed, and the experimental process thereafter conducted. Once the experimental operation is finished, the conventional system is reconfigured for normal article manufacturing. Thus, experimental processing required extensive shutdown time and labor to reconfigure the system and conduct the experimental process.

Therefore, there is a desire and need in industry and particularly in dry cell battery processing for a processing system which can operate at increased throughput and which eliminates unnecessary handling and duplicative operations to be performed on the manufactured articles. The needed processing system has the additional characteristics of being flexible, permitting off-line set-up and calibration, the ability to be quickly deployed, and capable of rapidly incorporating product design changes. Such a system is also desired to more efficiently monitor quality control on processes, including the capability of tracking a single item of manufacture through the processing system, and also the ability to test new processes and processing equipment for a comparative analysis of articles of manufacture processed normally with articles of manufacture processed with one or more test processes.

Also, it is desirable to provide for a processing system that allows for battery cans to be tracked and accounted for throughout the entire processing operation. Further, it is desirable to provide for such a processing system that allows for easy experimental processing that does not require excessive system shutdown and labor.

Further, reduced manufacturing cost and increased processing operation efficiencies are desirable to produce a cost-effective product. The added costs associated with conventional production line setup, downtime and maintenance has created the need for creative control strategies that may reduce cost to provide a more cost effective product. Automated manufacturing control systems typically employ software that is dependent on a particular computer operating system and is designed to operate a predefined production line configuration. It is desirable to provide a distributed control system that is not dependent on a particular computer operating system software, provides flexible processing capability, and is able to control multiple production line configurations with minimal reconfiguration. It is also desirable to provide a distributed control system that may continue to control production of material in the event that a process control device, such as a processor fails to perform as configured, so as to reduce processing downtime and incur less added cost. Further, there is a need for control software that is flexible to allow for use with various control systems for controlling different types of production machinery, thereby eliminating the need for dependence on the supplier of a particular hardware or software configuration.

SUMMARY OF THE INVENTION

According to one aspect of the present invention, a control system is provided that is adapted to control process operations for processing individual articles. The control system includes a coordinator controller adapted to control process operations associated with a processing system by communicating work request messages to at least one process module. The system also includes a software coordinator agent executable by the controller and configured to control the processing operation. A software process module agent is included and configured to represent a component of the process module and is executable to perform a process operation. The control system further includes a protocol adapted to allow the software coordinator agent to communicate messages with the software process module agent. Preferably, the control system employs software models such as an input/output model, a communication model, and a data distribution system model.

Another aspect of the present invention is a control system for controlling the processing operations. The control system includes a plurality of controllers adapted to control operations associated with a processing system. Each of the plurality of controllers are configured to communicate with at least another one of the plurality of controllers. A plurality of software agents, each representing a component within the control system, are provided in one or more of the plurality of controllers. The software agents are executable within any one or more of the plurality of controllers. Models for encapsulating structural architecture are preferably included in one or more of the plurality of controllers. The control system further has a protocol adapted to allow each of said software agents to communicate messages with other software agents.

A further object of the present invention is a distributed control system for controlling the manufacturing of one or more articles. The distributed control system includes a coordinating controller and a coordinator agent for monitoring processing of each article of manufacture and for coordinating the processing of each article of manufacture. The coordinating controller is networked with one or more process station controllers and is adapted to communicate with a process station agent. Each process station agent is generally adapted to initiate processing of articles of manufacture associated with a branch processing station. In addition, a process module agent is provided for each process module associated with the processing station for performing a designated process on articles. The process module agent controls the processing operation of the associated process module, while the coordinator agent preferably controls the processing operation of each article of manufacture, initiates control operations, tracks each product through the process operations, and collects information on the processing of each article. The control coordinator, process station controllers and process module agents communicate messages via a protocol.

Yet, another aspect of the present invention is a method of controlling the processing of articles. The method includes the steps of providing a plurality of controllers adapted to control a processing operations and including a coordinator agent and a process agent. Work request messages are transmitted from the coordinator agent to each of the other of the process agents including information on a process operation and designated article. The process agents perform an intended process operation, generate a work report message when the designated operation is complete, and store the work report message in memory.

These and other advantages of the invention will be further understood and appreciated by those skilled in the art by reference to the following written specification, claims, and appended drawings.

BRIEF DESCRIPTION OF THE DRAWINGS

In the drawings:

FIG. 6 is a perspective view of a toothed segment of the endless transport belt from the continuous feed indexer;

FIG. 7 is a perspective view of a toothed segment of the endless transport belt with a battery can transport cleat engaged therewith;

FIG. 8 is a side elevational view of the cleat fastened to the belt and showing magnets embedded therein for retaining the battery can to the cleat;

FIG. 9 is a plan view of a cleat fastened to the endless belt and showing a battery can retained by the cleat;

FIG. 15 is an exploded view of the reciprocating element of the transfer device;

FIG. 16 is a plan view of the transfer device;

FIG. 17 is an enlarged elevational view of one end of the reciprocating element mounted on its guide rail taken along the line XVII—XVII of FIG. 16;

FIG. 18 is an elevational end view taken along the line XVIII—XVIII of FIG. 16;

FIG. 19 is a side elevational view of the transfer device taken along the line XIX—XIX of FIG. 16 showing the optical sensors for generating control signals to the control coordinator;

FIG. 20 is a side elevation and end elevation of the rail upon which the reciprocating element translates;

FIG. 21 is a cross-sectional view of one of the transfer device drive pulleys taken along the line XXI—XXI of FIG. 16;

FIG. 22 is a partial cross-sectional view of a fixed idler for the transfer device taken along the line XXII—XXII of FIG. 16;

FIG. 23 is a plan view of battery can carrying cleats affixed to the smooth surface of an endless toothed transport belt;

FIG. 24 is an elevational view of the battery can carrying cleats affixed to the transport belt;

FIG. 25 is a perspective view of a battery can carrying cleat for the transfer device;

FIG. 26 is a perspective view of ends of two adjacent continuous motion conveyors forming a portion of the trunk;

FIG. 38 is a perspective view of one 45 degree dead plate segment;

FIG. 39 is an elevational view of the dead plate segment shown in FIG. 38;

FIG. 40 is a bottom plan view of the dead plate segments illustrating the dowel receiving groove;

FIG. 70 is a block diagram illustrating a software agent and models configured in a controller;

FIG. 75 is a control interaction diagram illustrating the sequence of communications performed during a cycle stop shutdown in response to a handle failure message;

DETAILED DESCRIPTION OF THE PREFERRED EMBODIMENTS

Figure 2:
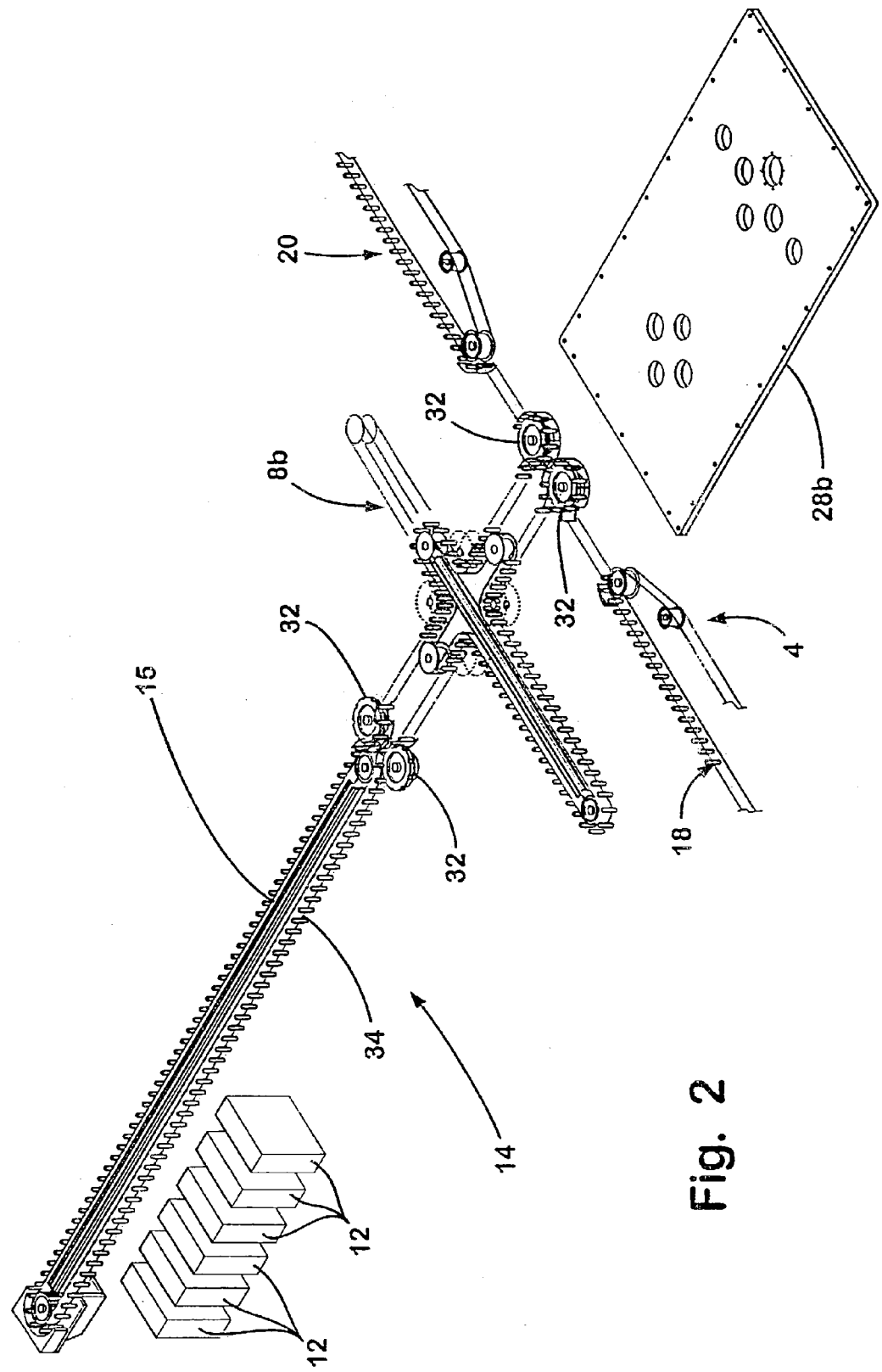
FIG. 2 is an exploded perspective view of a branch processing station and transfer unit interposed between two trunk segments.

For purposes of description herein, the terms "upper," "lower," "right," "left," "rear," "front," "vertical," "horizontal," and derivatives thereof shall relate to the invention as oriented in FIG. 2, with reference to a viewer in front of the trunk, directly facing toward the processing stations. However, it is to be understood that the invention may assume various alternative orientations and step sequences, except where expressly specified to the contrary. It is also to be understood that the specific parts, devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 2 (FIG. 1) generally designates a modular high speed processing system embodying the present invention. Modular high speed processing system 2 is particularly adapted for creating a processing line for the manufacture and processing of articles of manufacture at a pre-selected manufacturing rate and where a manufacturer desires to track and monitor individual articles throughout the processing sequence. As discussed below, modular high speed processing system 2 is comprised of unique discrete functional elements which can be arranged in multiple configurations to create a processing system tailored to a manufacturer's needs. While the embodiment of the modular high speed processing system described herein is directed at the manufacture and processing of battery cells for consumer electronic appliances, it will be understood that the modules and functional elements described are adaptable for the processing of a wide range of other articles of manufacture.

Figure 1:
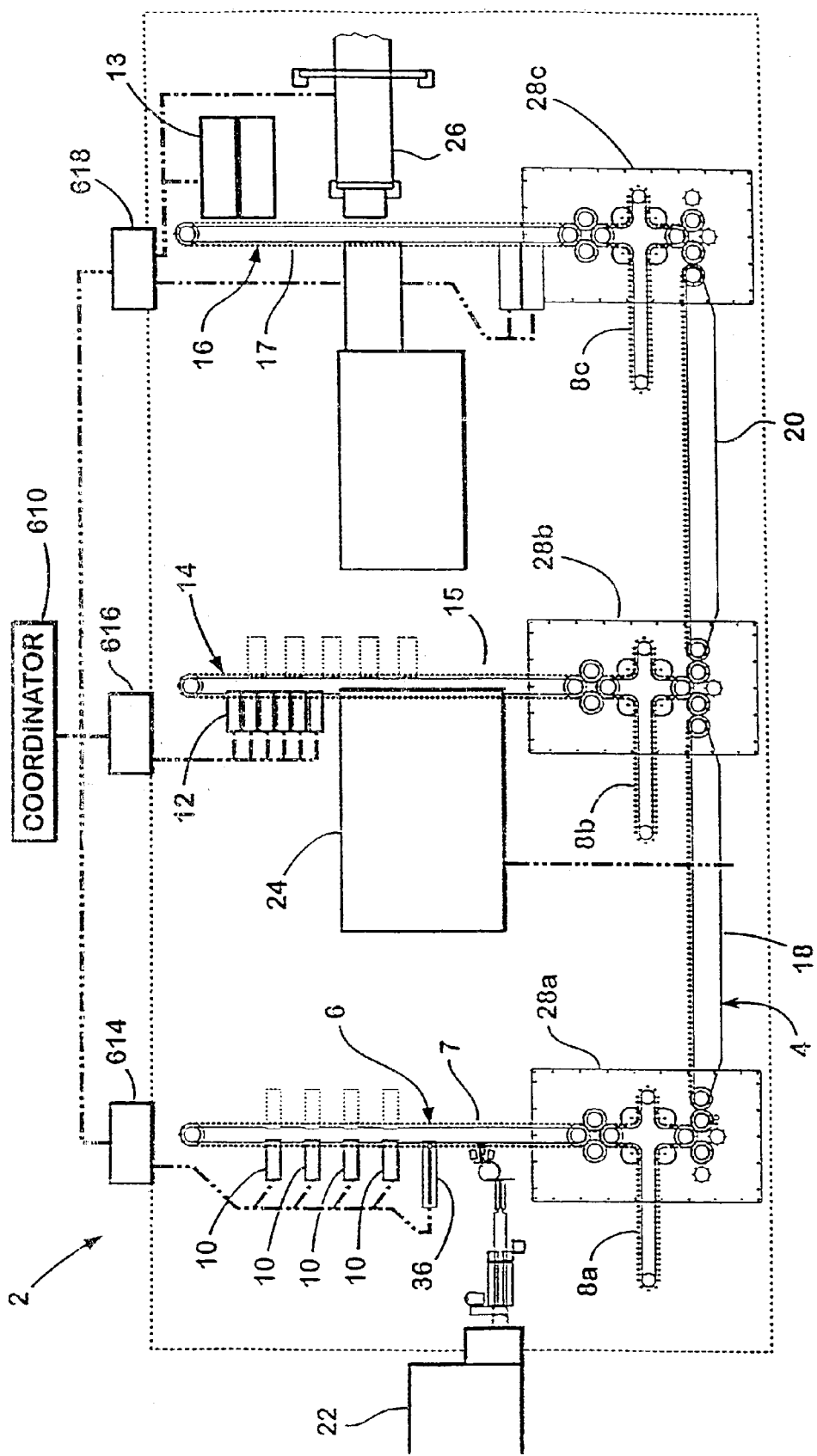
FIG. 1 is a plan view of a modular high speed processing system embodying the present invention shown configured for processing battery cans into completed batteries.

As illustrated in FIGS. 1 and 2, modular high speed processing system 2 includes individual branch processing stations 6, 14, and 16 interconnected by trunk 4 wherein processing stations 6, 14, and 16 perform the desired processing of the articles to be manufactured thereon and trunk 4 transports the articles between processing stations. The sequencing and monitoring of processing system 2 is accomplished with a control system having a control coordinator 610 which communicates with individual process station controllers 614, 616, and 618. Individual process station controllers 614, 616, and 618 provide the control interface for processing stations 6, 14, and 16 respectively, the functioning of which is described more fully below.

The processing system 2 as illustrated in FIGS. 1 and 2 comprises at least one branch processing station such as station 14 having a plurality of processing modules 12 located therealong for processing of individual articles of manufacture such as battery cans 34. As shown in FIG. 2, branch processing station 14 comprises a plurality of individual modular elements to facilitate the transport and processing of the battery cans 34 and is typical of other branch processing stations. A transfer device such as device 8b is located at one end of a continuous motion conveyor 18, or between two ends of continuous motion conveyors 18 and 20. Transfer device 8b extracts battery cans 34 from continuous motion conveyor 18 for delivery to branch processing station 14. After processing, the battery cans are extracted from branch processing station 14 by transfer device 8b and delivered to continuous motion conveyor 20 for transport to the next branch processing station such as station 16.

The continuous motion conveyors 18 and 20 form trunk 4 for conveying the battery cans in a constant speed motion between individual processing stations 6, 14, and 16. A platform 28b or a suitable supporting frame is utilized to support and maintain the ends of continuous motion conveyors 18 and 16, transfer device 8b, and branch processing station 14 in a fixed operating relationship. Couplers 32 are utilized to hand off battery cans 34 between adjacent elements such as between continuous motion conveyor 18 and transfer device 8b and between transfer device 8b and branch processing station 14. Branch processing station 14 comprises a continuous feed indexer 15 which transports battery cans 34 in an indexed manner and process modules 12. The indexed motion of continuous feed indexer 15 transports battery cans 34 in an alternating index-dwell sequence wherein process modules 12 perform their scheduled process on battery cans 34 during the dwell portion of the transport of battery cans 34 about indexer 15. While the preferred embodiment incorporates a trunk 4 operating at a continuous constant speed motion and the branch processing stations 6, 14, and 16 operating at an indexed intermittent motion, the speeds and modes of motion of the trunk and branch processing stations can be continuous, variable or intermittent with transfer device 8 transitioning between the differing motions.

According to processing system 2 as shown in FIG. 1, battery cans 34 are introduced to branch processing station 6 by input module 22. Input module 22 takes battery cans 34 which are input thereto in a bulk random manner and orients cans 34 to a common upright orientation and delivers the cans in an indexed manner to continuous feed indexer 7 where the cans are transported for processing by process modules 10.

An experimental process module 36 can be located at any desired position throughout system 2 to conduct experimental processing in lieu of production processing to test and evaluate new methods and equipment of processing. Because control coordinator 610 monitors each battery can position during transport, the experimental processing can take place in concert with standard production and the experimentally processed battery cans can be identified and extracted for evaluation at the conclusion of the processing cycle.

After completion of processing by process modules 10, battery cans 34 are extracted from continuous feed indexer 7 and have their motion converted from indexed motion to continuous motion by transfer device 8a. Battery cans 34 are then transferred to continuous motion conveyor 18 where they are transported to a subsequent branch processing station 14 for processing by process modules 12 and 24, and then to third branch processing station 16 for further processing by process modules 13. The number of process modules at each branch processing station is determined by the time required for the individual process and providing sufficient quantity of process modules to maintain a desired production throughput. The manner of determining the number of modules is discussed in more detail below. Upon completion of processing, battery cans 34 are removed from system 2 by extraction module 26 for testing, packaging, and delivery of the final product.

A more complete understanding of the components of high speed processing system 2 is gained from a detailed description of each of the modules comprising processing system 2.

Continuous Feed Indexer

Figure 3:
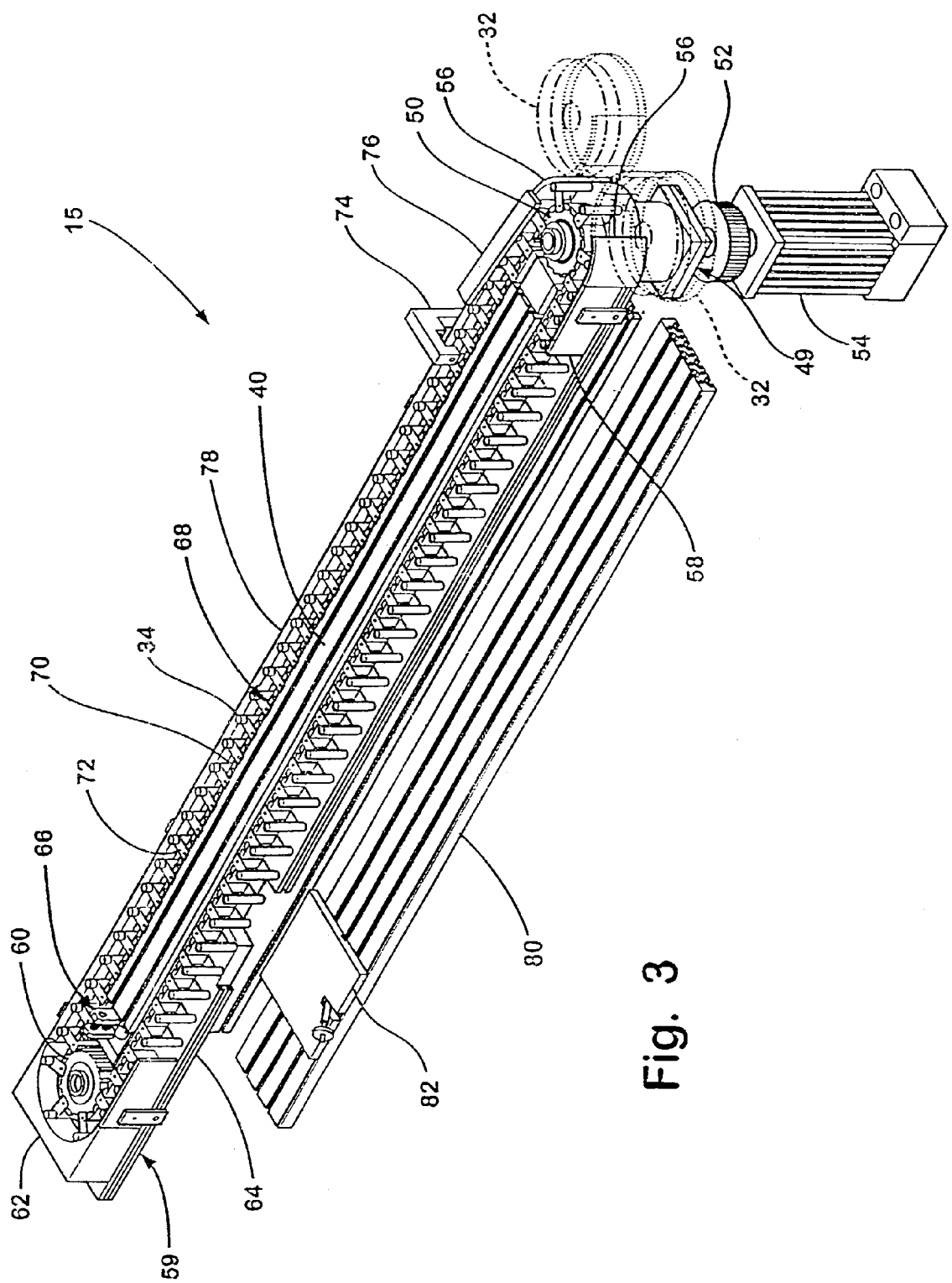
FIG. 3 is a perspective view of a branch processing station.
Figure 4:
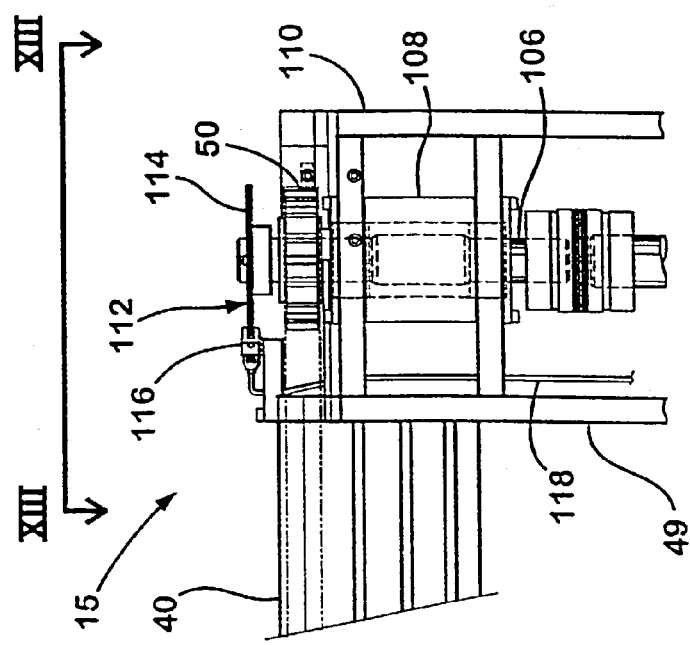
FIG. 4 is an elevational view of the drive end of a continuous feed indexer.
Figure 5:
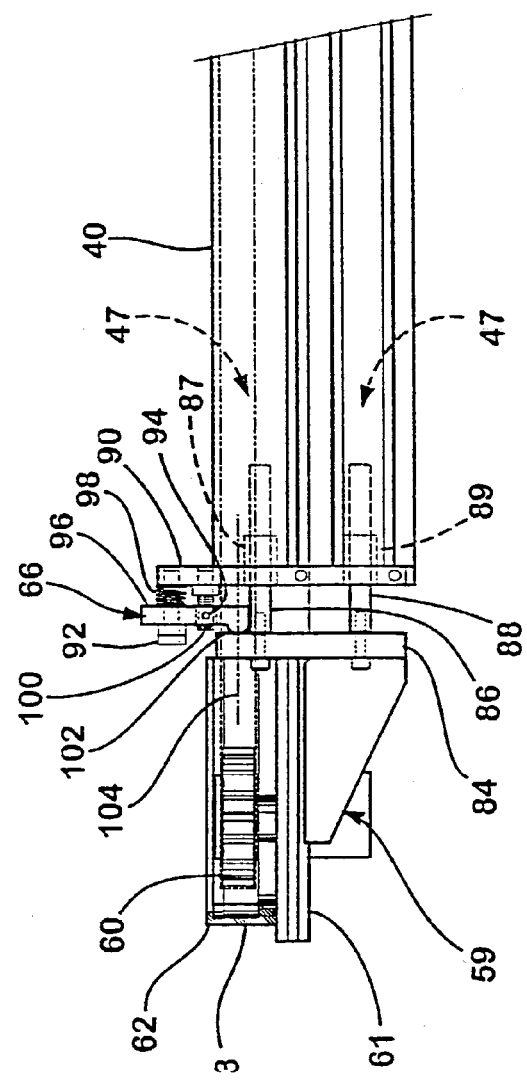
FIG. 5 is an elevational view of the idler end of a continuous feed indexer showing the tensioning mechanism.
Figure 10:
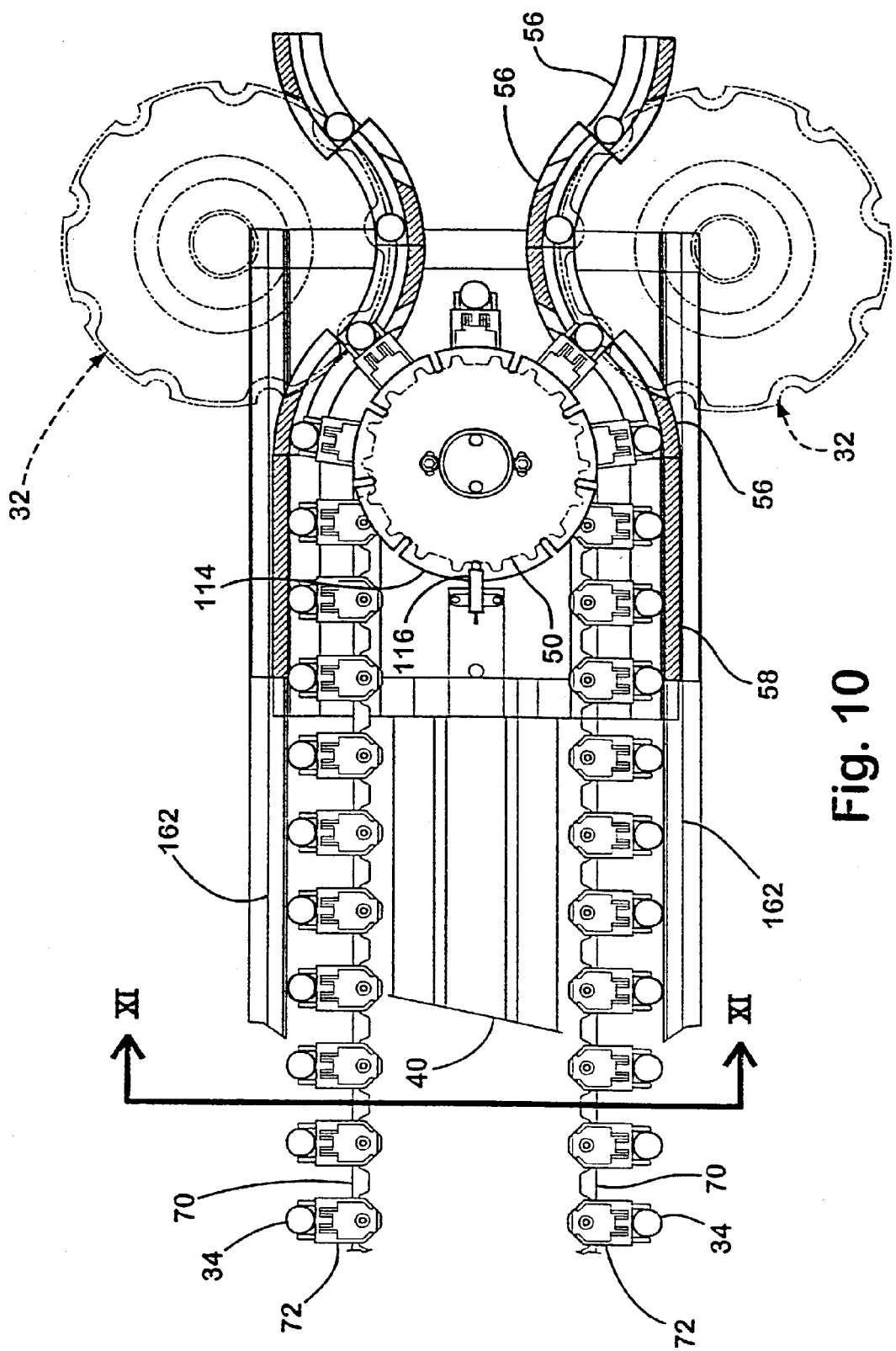
FIG. 10 is a plan view of the drive end of the continuous feed indexer showing dead plates around portions of the drive pulley for the transfer of battery cans to and from the continuous feed indexer.

With reference to FIGS. 3–5 a continuous feed indexer 15 comprises a central frame 40 to which are affixed a drive assembly 49 at one end and an idler assembly 59 at an opposite end with a conveyor assembly extending therearound. In the preferred embodiment the conveyor assembly is an endless transport belt assembly 68 extending between drive assembly 49 and idler assembly 59. A process module support 80 is positioned proximate to at least one side of continuous feed indexer 15 and to which are attached one or more process module mounts 82, the configuration of which is discussed more fully below.

Referring to FIGS. 3 and 4, drive assembly 49 is fastened to one end of frame 40. Drive assembly 49 comprises a drive frame 110 and supports spindle assembly 108 in which is journaled a drive shaft 106. At a top end of drive shaft 106, a cogged drive sprocket 50 is attached to shaft 106 to rotate in a horizontal plane. A home sensor 112 comprising a slotted disk 114 affixed to an upper end of shaft 106 to rotate therewith and an optical sensor 116 fixed to frame 40 is utilized to align the transport belt assembly 68 on the continuous feed indexer 15 in a manner more fully described below. A drive pulley 52 is affixed to a lower portion of shaft 106 below spindle assembly 108, and a servo drive motor 54 is affixed to the bottom of shaft 106 for providing the rotational power to drive pulley 52 and sprocket 50.

Referring to FIGS. 3 and 5, idler assembly 59 and tensioner assembly 66 are located at the opposite end of frame 40. End plate 90 is fastened to the end of frame 40 opposite from drive assembly 49. End plate 90 includes upper and lower bushings 87 and 89 extending into internal channels 47 of frame 40. Idler assembly 59 includes an idler support 61 to which cogged idler sprocket 60 is affixed to rotate in a horizontal plane. An end plate 62 extends around idler sprocket 60 and is spaced a fixed lateral distance from sprocket 60. The fixed distance of end plate 62 from idler sprocket 60 is slightly more than the outermost distance of the outer edge of a battery can as it traverses around sprocket 60 such that battery cans 34, as they traverse around sprocket 60, are at least partially retained by track 63 in end plate 62. A vertical idler end plate 84 is affixed to idler support 61 and has alignment shafts 86 and 88 attached thereto. Shafts 86 and 88 extend horizontally forward from plate 84 and are closely received in bushings 87 and 89 respectively to permit the fore and aft adjustment of idler assembly 59 with respect to frame 40 and drive assembly 49.

The fore and aft adjustment of idler assembly 59 is accomplished by tensioner assembly 66 and provides the proper tensioning to transport belt assembly 68 on continuous feed indexer 15. Tensioner assembly 66 comprises a pivot attach bolt 100 affixed to an upper end of end plate 90 at the idler end of frame 40. A tensioner arm 96 is pivotally affixed to an end of pivot attach bolt 100 and pivots about pivot pin 94 which extends horizontally through tensioner arm 96 and bolt 100. A lower portion of tensioner arm 96 has a nose 102 which bears against idler end plate 84 at a point coincident with the plane of centerline 104 of transport belt assembly 68 and pulley 60. Adjustment bolt 92 extends through an upper end of tensioner arm 96 and engages end plate 90. A coil biasing spring 98 is sleeved over adjustment bolt 92 and bears on the upper end of tensioner arm 96 and on end plate 90 to bias the upper end of tensioner arm 96 against adjustment bolt 92.

Referring now to FIGS. 6–9, transport belt assembly 68 comprises continuous belt 70 and a plurality of cleats 72. A chain could be substituted for belt 70. Belt 70 is a continuous belt of a desired length to extend around drive sprocket 50 and idler sprocket 60 and has a plurality of cogs or teeth 124 on an inner side 122 and a smooth outer side 120. Belt 70 is typically constructed of a metal reinforced polymer; however, alternative combinations of belts and cleats are possible to achieve the purpose of assembly 68. Teeth 124 have holes 126 extending vertically therethrough for the attachment of carriers to carry the articles of manufacture. In the preferred embodiment carriers are cleats 72. The size and desired spacing of cleats 72 will determine which teeth 124 are designated to receive cleats 72.

Each of cleats 72 has an upper flange 128 and a lower flange 130 which are vertically disposed one from the other by a vertical web 132. Vertical web 132 spaces flanges 128 and 130 to closely receive belt 70 therebetween such that smooth surface 120 of belt 70 abuts vertical web 132 of cleat 72. Flanges 128 and 130 each have a hole 145 extending vertically therethrough which is vertically aligned with hole 126 in belt teeth 124 when cleat 72 is abutted to belt 70. Cleat 72 is secured to belt 70 by inserting pin 146 through holes 126 and 145. Holes 126 and 145 closely receive pin 146 thereby preventing the inadvertent dislodgment of pin 146. Belt 70 is compressed slightly to create an interference fit of cleat 72 and pin 146 to belt 70. However, pin 146 can be readily removed to facilitate the replacement of a damaged cleat 72 on belt assembly 68 without requiring the removal of belt assembly 68 from continuous feed indexer 15. Alternatively, teeth 124 can have a pin fixed therein to mate with holes 145 facilitating the installation and removal of cleats 72 in a snap-in fashion. Flanges 128 and 130 also have at a distal end thereof a groove 129 and 131 respectively. Grooves 129 and 131 can receive therein a guide rail fixed along frame 40 to laterally stabilize cleats 72 for counteracting the magnetic force when cans 34 are extracted, thereby maintaining cleats 72 in a desired track around continuous feed indexer 15.

Cleat 72 also has upper flange 134 extending forward from web 132 and is coplanar with flange 128. Likewise, a lower flange 136 extends forward from lower flange 130. Steel dowel pins 138 extend forward from outer edges of flanges 134 and 136 forming recess 135 therebetween. Recess 135 receives therein one of the battery cans 34 for transport along continuous feed indexer 15. Flanges 134 and 135 also have embedded in a central portion thereof magnets 140 and 142 respectively for retaining a battery can 34 in recess 135. Alternatively, cleat 72 can be constructed to retain an engaging portion of a standard sized adapter which, in turn, has a capture portion to hold a desired size battery can. In this manner, the conveyor assembly can accommodate different size articles of manufacture by simply changing adapters.

Figure 11:
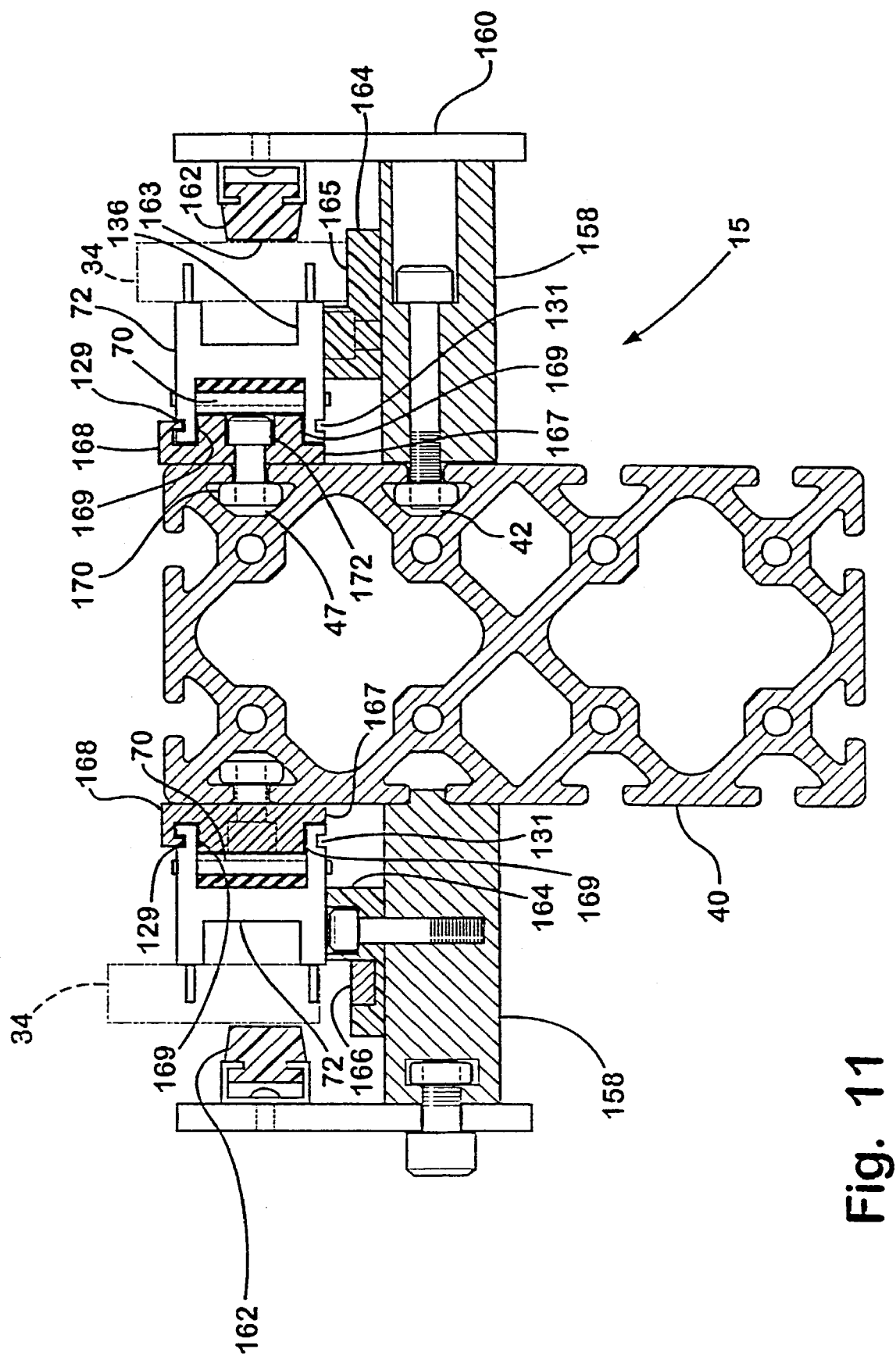
FIG. 11 is an elevational cross-sectional view of the continuous feed indexer taken along the line XI—XI in FIG. 10.

Referring now to FIG. 11, a cleat backup rail 167 is attached to an upper slot 42 of frame 40 with bolt 172 engaging nut 170 which is captive in slot 42. Cleat backup rail 167 runs the length of frame 40 and has upper and lower shoulders 169 for receiving flanges 128 and 130 of cleat 72. Shoulders 169 maintain cleats 72 in a predefined vertical position along indexer 15. Cleat backup rail 167 can also have a guide rail 168 which engages either or both grooves 129 and 131 of cleat 72 to also provide lateral stability for cleat 72 to maintain cleat 72 in a close lateral relationship with backup rail 167. Below backup rail 167, a support 158 is affixed to frame 40. Support 158 is attached to frame 40 in the same manner as cleat backup rail 167, using nuts captive in slots 42 of frame 40 and bolting support 158 thereto. A bottom cell support rail 164 is affixed to an upper surface of support 158. Bottom cell support rail 164 has a shoulder 165 at an outer edge for receiving therealong and supporting thereon the bottom of battery cans 34 as cans 34 are conveyed along indexer 15. Bottom cell support 164 also has an upper surface substantially corresponding to support bottom flange 136 of cleat 72. Side rail supports 160 are affixed to and located at regular intervals along support 158. Side rail supports 160 have attached to an inner side thereof side rails 162 which have an inner surface 163 to guide the outer surface of battery cans 34. In the preferred embodiment, each of side rail 162, bottom cell support rail 164 and cleat backup rail 167 is formed from a self lubricating material such as an oil impregnated nylon or similar material to minimize wear and facilitate the movement of belt assembly 68 around indexer 15. Alternatively, rails 164 and 167 and be formed from any low friction or wear resistant material.

Figure 12:
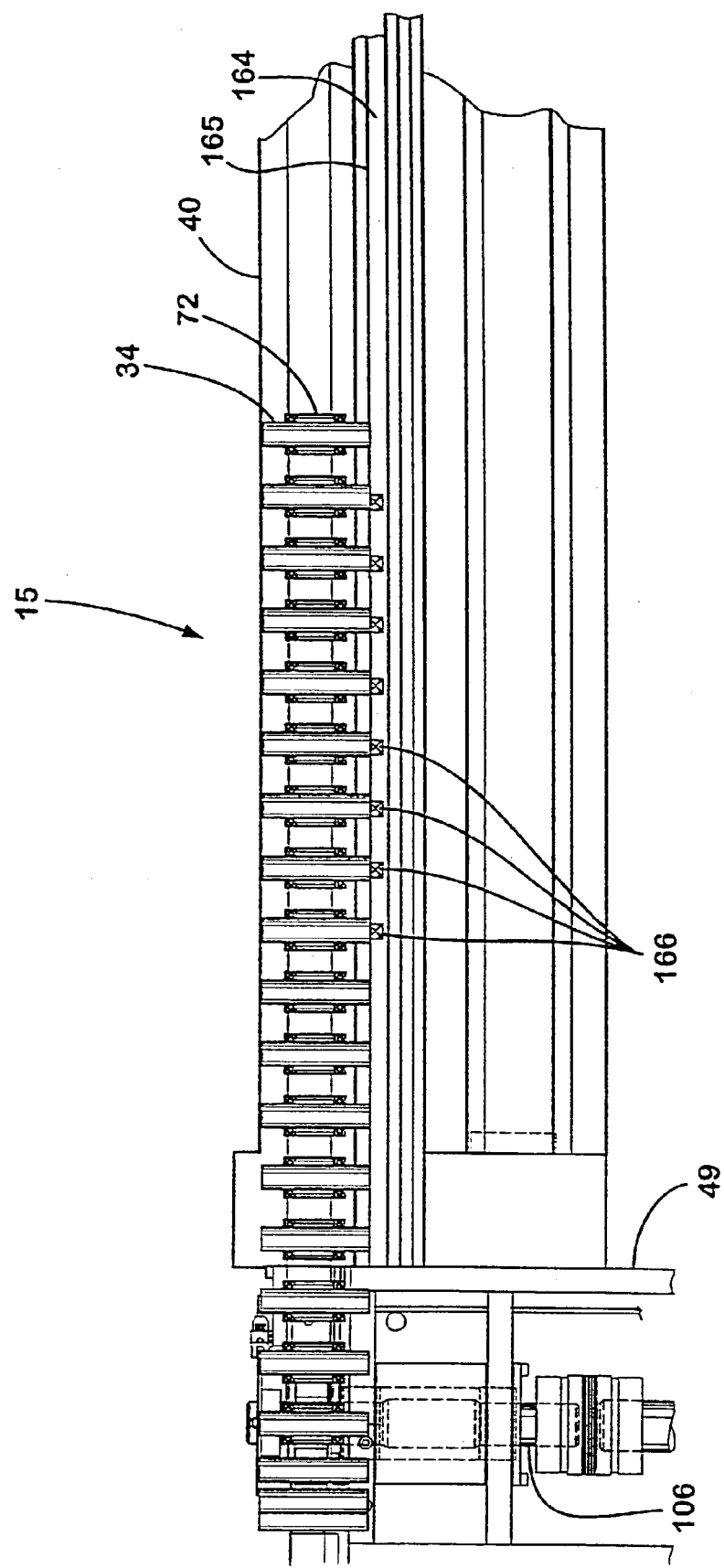
FIG. 12 is a side elevational view of the continuous feed indexer showing the battery cans after processing and illustrating the vertical realignment of the battery cans prior to being extracted from the continuous feed indexer.

Referring to FIG. 12, as the cans are processed on indexer 15, and returned to trunk 4, individual cans 34 may have been vertically shifted with respect to the carrying cleat 72. Therefore, any cans 34 that have become vertically shifted during processing are realigned with cleats 72 prior to extraction of cans 34 from indexer 15. For this purpose, individual hold-down magnets 166 are embedded in the bottom cell support rail 164 at a plurality of locations along rail 164. Because belt assembly 68 indexes about indexer 15 in a motion-dwell manner, cleats 72 pause at consistent predefined positions. Hold-down magnets 166 are positioned at these locations. When cleats 72 stop during the dwell portion of the belt assembly 68 motion about indexer 15, battery cans 34 are directly above magnets 166. The magnetic field of magnets 166 is designed to be sufficient to pull an individual can 34 down to contact the shoulder surface 165 of bottom cell support rail 164.

Figure 13:
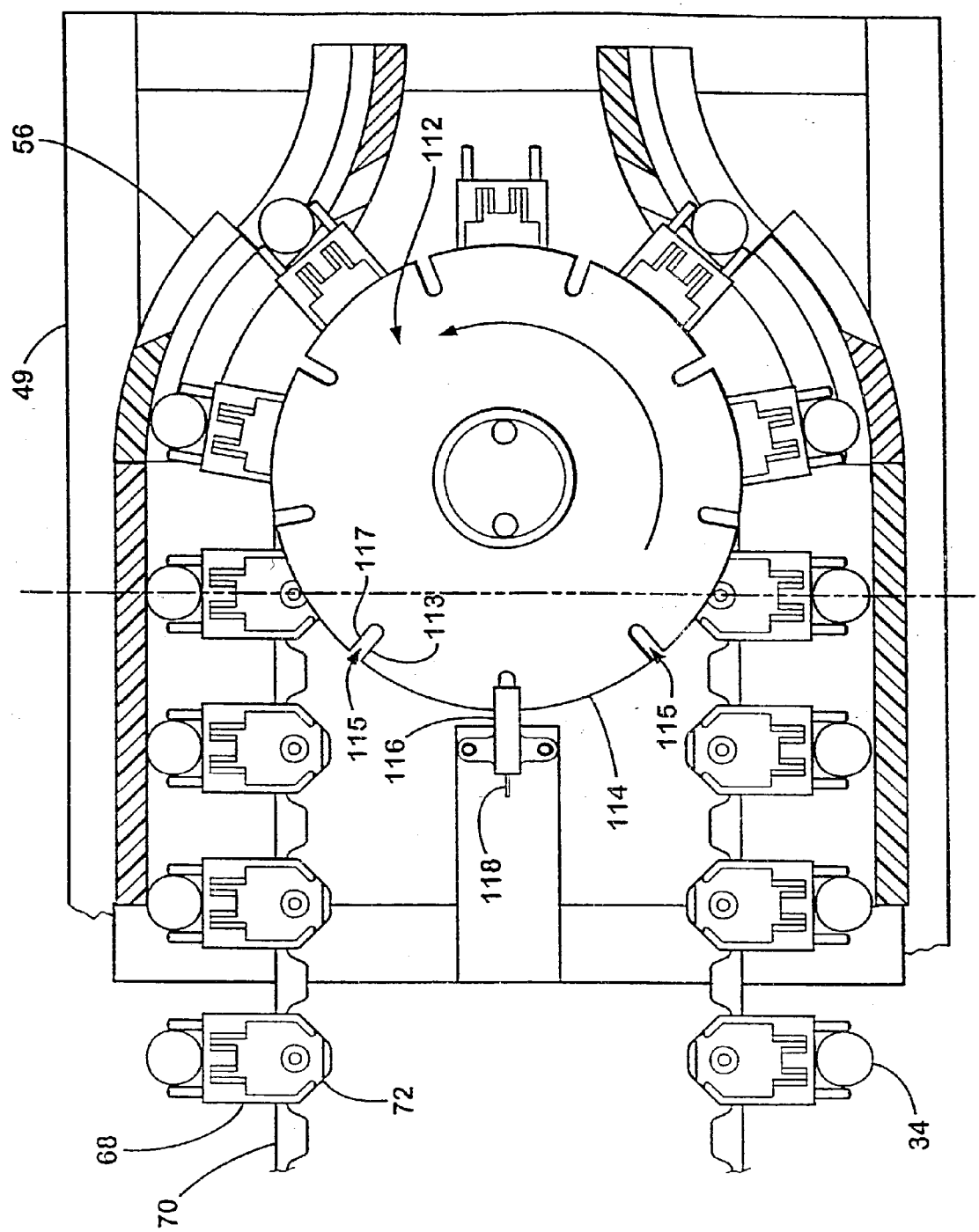
FIG. 13 is a plan view of the home sensor and slotted disk for the continuous feed indexer.

Referring now to FIGS. 4 and 13, a home sensor 112 is mounted above drive sprocket 50 of indexer 15 drive assembly 49. Home sensor 112 comprises a slotted disk 114 which rotates in conjunction with drive sprocket 50. Slotted disk 114 has a plurality of radially oriented slots 115 therearound spaced to correspond to the radial spacing of cleats around sprocket 50. Each of slots 115 has a leading edge 113 and a trailing edge 117. Whenever processing system 2 is restarted from an unknown condition, each element of system 2 is reset to a known 'home' position. The home sensor 112 is utilized for this function by optical sensor 116 sensing the passage of trailing edge 117 of one of slots 115 in disk 114 thereby disrupting the signal condition of the optical signal generated by sensor 116. By sensing and adjusting the position of slotted wheel 114, system 2 can reset indexer 15 to a known condition where cleats 72 are moved to a predefined position about indexer 15. Alternatively, a commercially available rotary transducer could be utilized as a home sensor for the nominal alignment of transport belt 68.

Transfer Device

Figure 14:
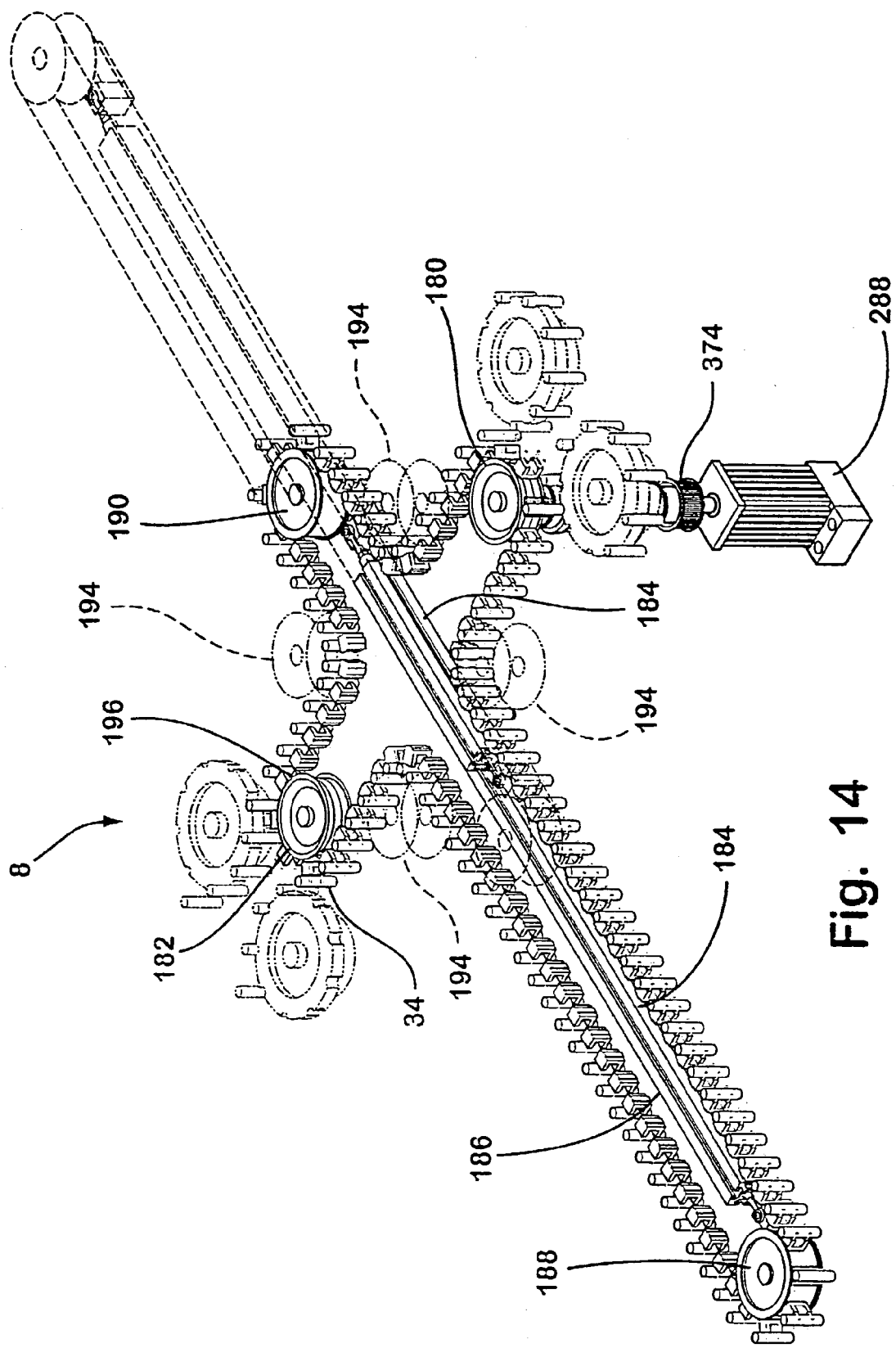
FIG. 14 is a perspective view of a transfer device for transferring battery cans from the continuous motion trunk to the indexed motion continuous feed indexer.
Figure 27:
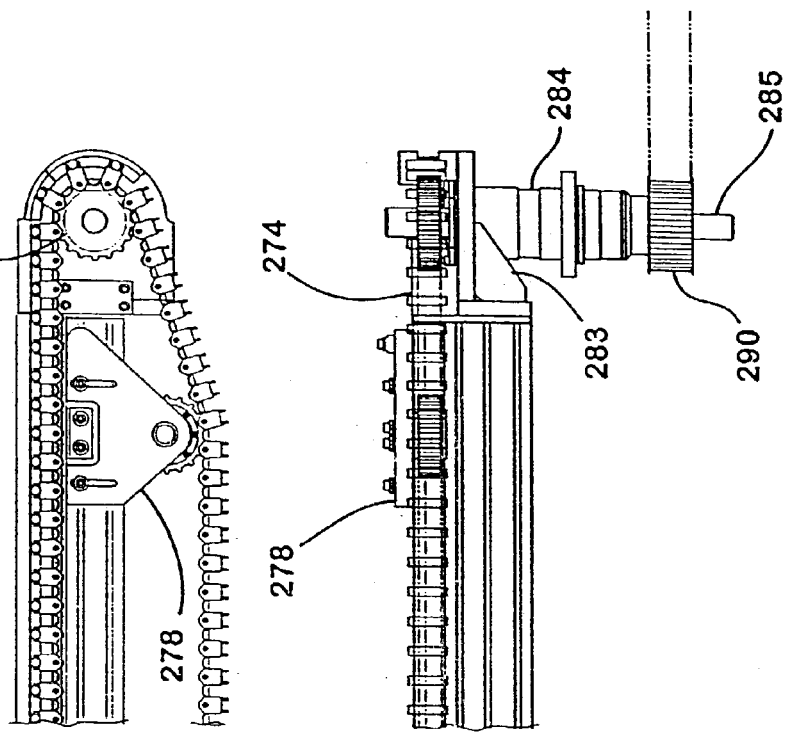
FIG. 27 is a plan view of a continuous motion conveyor.
Figure 28:
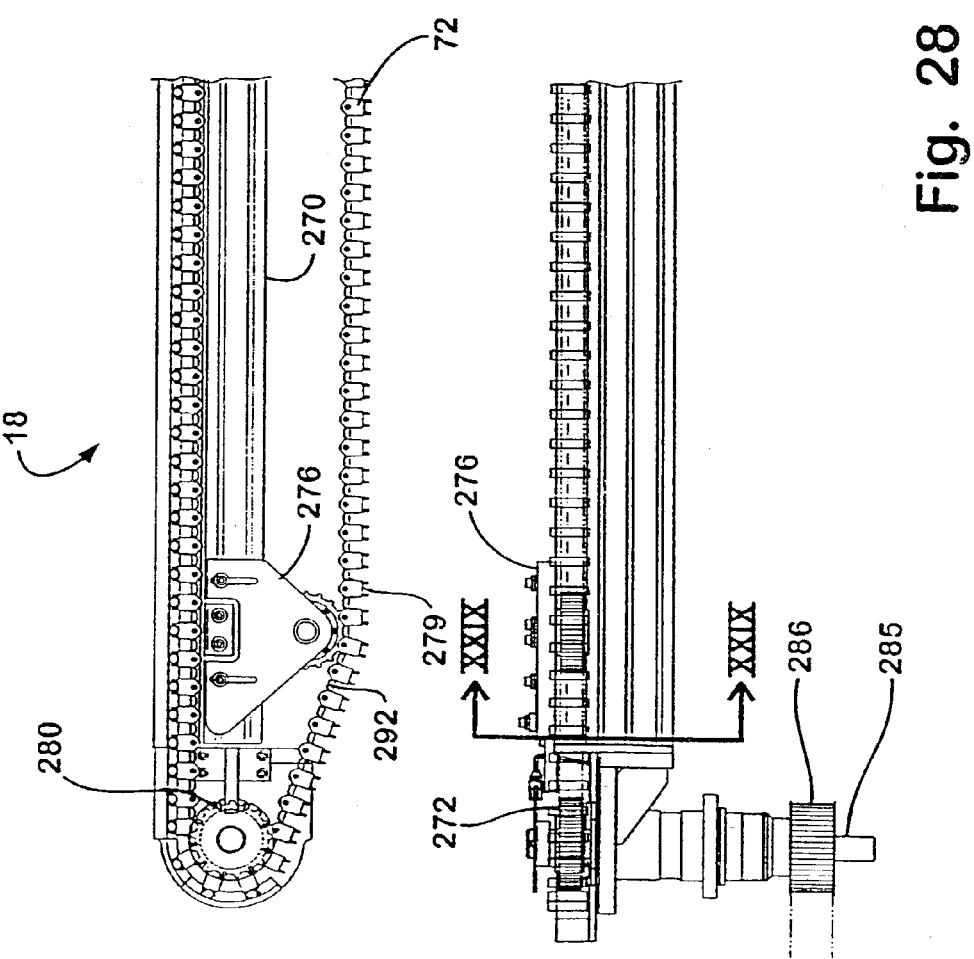
FIG. 28 is an elevational view of a continuous motion conveyor.

Referring now to FIGS. 14 and 16 a transfer device 8 is shown for transferring battery cans 34 from the continuous motion trunk conveyor 4 to a processing station 14 for processing thereon and from processing station 14 returning processed battery cans 34 to continuous motion trunk conveyor 4. Additionally, transfer device 8 transitions the motion of the battery cans from the continuous motion of trunk 4 to the indexed motion of continuous feed indexer 15. Transfer device 8 includes a continuous motion drive sprocket 180 which is rotatingly driven by servomotor 288 and an indexed motion drive sprocket 182 in line with continuous motion drive sprocket 180. Drive sprockets 180 and 182 are toothed or cogged sprockets which engage toothed transport belt assembly 196. A carriage 184 comprising an input flying idler 188 and an output flying idler 190 are laterally disposed one from the other by belt tensioning bar 186 or alternatively pulled apart by a wire rope and pulley arrangement and is positioned midway between sprockets 180 and 182. Belt tensioning bar 186 is oriented perpendicular to a line connecting the centers of sprockets 180 and 182 thereby configuring transfer device 8 in a cruciform configuration. An endless transport belt assembly 196 comprising an endless belt 198 and a plurality of cleats 200 affixed to belt 198 for carrying battery cans 34 extends around the drive sprockets 180 and 182 and around flying idlers 188 and 190. Belt tensioning bar 186 acts on the centerline of belt 198 to reduce loading forces applied to linear rail 174 and carriage block 175 (FIG. 17). Fixed idlers 194 are positioned proximate to the intersection of the two axes of the cruciform wherein belt assembly 196 is routed around the inside of fixed idlers 194 thereby directing belt assembly 196 to follow a perimeter of the cruciform.

Referring to FIGS. 23–25, transport belt assembly 196 comprises a toothed belt 198 to which are attached at regularly spaced intervals a plurality of cleats 200 for carrying battery cans 34 about the periphery of transfer device 8. In the preferred embodiment, belt 198 is significantly wider than belt 70 used on continuous feed indexer 15 and cleats 200 are fastened to belt 198 in a different manner than the cleats 72 of belt assembly 68. Cleat 200 has a vertical web 246 which maintains upper flange 250 and lower flange 252 in a vertically disposed relationship. Flanges 250 and 252 extend horizontally from upper and lower ends of web 246 respectively. Each of flanges 250 and 252 have hardened steel dowel pins extending from the outer edges of the flange to define a recess 255 therebetween for receiving a battery can 34 for transport about transfer device 8. As in cleats 72, cleats 200 also have upper and lower magnets 256 and 258 embedded in a central portion of upper and lower flanges 250 and 252 respectively for attracting and retaining a battery can 34 within recess 255. A vertical rib 248 protrudes from the back of web 246 and extends from the top of web 246 to the bottom of web 246. Rib 248 is the only portion of cleat 200 which abuts belt 198 thereby leaving a small clearance between the remainder of web 246 and belt 198. The clearance at the ends of cleat 200 allows belt assembly 196 to make an inside turn around fixed idlers 194. Cleats 200 are centered on a tooth 244 of belt 198 and are adjacently spaced corresponding to the spacing of cleats 72 on indexer belt assembly 68. In the preferred embodiment, cleats 200 are fastened to belt 198 with threaded fasteners 260, with the threads of fasteners 260 engaging rib 248 and web 246. The use of threaded fasteners permits the rapid replacement of cleats 200 without necessitating the removal of belt assembly 196 from transfer device 8. However, alternative means for clamping cleats 200 to belt 198 are possible and within the scope of belt assembly 196.

Referring now to FIGS. 15, 17, 18 and 20 the dancer carriage 184 comprises a linear rail 174 having base plates 173 attached to a bottom of rail 174 for mounting to a support base 172. Linear rail 174 is an elongate rail having an hourglass profile as shown in FIG. 20. A belt tensioning bar 186 has an idler support 176 attached at each end thereof and forms an accumulating member. Idler support 176 at an input end of carriage 184 supports a rotatable input flying idler 188 and an end plate 189 at an outer end thereof. Similarly, an idler support 176 at an output end of carriage 184 supports a rotatable output flying idler 190 and an end plate 191 at an outer end thereof. Idler supports are mounted to carriage blocks 175. Carriage blocks 175 have an internal linear, recirculating ball bearing for translating along rail 174 with minimal friction. To obtain the proper tension of belt assembly 196, belt tensioning bar 186 is provided with adjustable links 187 at each end thereof for increasing or decreasing the distance between flying idlers 188 and 190. Each of flying idlers 188 and 190 has a recess 192 about its periphery to permit the clearance of heads of fasteners 260 retaining cleats 200 to belt 198. End plates 189 and 191 are positioned at the end of flying idlers 188 and 190 and spaced from the idler's perimeter to permit the passage of belt assembly 196 therearound when belt assembly is transporting battery cans 34. End plates 189 and 191 are sufficiently close to idlers 188 and 190 to prevent centrifugal force from disengaging battery cans 34 from cleats 200 as belt assembly 196 traverses the perimeter of transfer device 8.

FIG. 21 illustrates indexed motion drive sprocket 182 in partial section (continuous motion drive sprocket 180 being similarly constructed and configured). Drive sprocket 182 is toothed to engage the teeth 144 of belt assembly 196. Sprocket 182 has a recess 218 about the central part of its periphery to clear the heads of fasteners 260 mounting cleats 200 to belt 198. Sprocket 182 is mounted to shaft 221 with a compression type sleeve 216 to ensure that sprocket 182 is centered and firmly secured to shaft 221. Any slippage of sprocket 182 on shaft 221 will result in misalignment of processing system 2 requiring shutting the system down to readjust the coordination between battery can 34 carrying elements. Shaft 221 is support by and journaled in spindle assembly 220. Spindle assembly 220 is significantly wider than shaft 221 to provide rigid support of shaft 221 in a vertical orientation. Shaft 221 extends from the bottom of spindle assembly 220 and has a cogged pulley (not shown) attached thereon for driving sprocket 182. A dead plate support 224 is attached to the top of spindle assembly 220 and has dowel pins 226 inserted in hole about its periphery. One or more dead plates 225 are attached to dead plate support 224 and function to guide and retain battery cans 34 in cleats 255 as they traverse about the periphery of drive sprocket 182.

FIG. 22 shows fixed idler 194 connected to shaft 234 which is journaled in idler support 232. Idler support 232 has a mount base 236 at a bottom portion thereof to facilitate mounting the fixed idler to support frame or platform 28. Since the fixed idlers 194 are utilized by belt assembly 196 to make an inside turn about the periphery of transfer device 8, cleat 255 and battery can 34 face the fixed idler. Each fixed idler 194 then has a recess about the central portion of its periphery so that idler 194 does not interfere with cleats 255 or battery cans 34 in a manner that would induce belt assembly 196 not to engage idler 194. The contact of belt assembly 196 on idler 194 guarantees that belt assembly 196 does not change length when one or more cleats 255 do not carry a battery can 34.

Referring now to FIG. 19 transfer device 8 has associated therewith a plurality of sensor and switches to control the operation of processing system 2. An input limit switch 201 and an output limit switch 202 are mounted at the respective input and output ends of rail 174. An end block 177 is affixed to the end of each idler support 176 such that if transfer device 8 was driven to an overly input rich condition (dancer carriage 184 translated to the left with battery cans 34 to be processed) or to an overly output rich condition (dancer carriage 184 translated to the right with processed battery cans 34), end block 177 would actuate the associated limit switch 201 or 202 which would cause system 2 to be shut down and require the realignment of processing system 2 elements. The limit switches 201 and 202 are the last resort shutdown for system 2 to prevent damage to processing system 2. Input and output end of travel sensors are positioned to optically sense the programmed limits of travel of dancer carriage 184, and to disable processing system 2 if the limits were to be breached. The transfer device 8 also has a home sensor to sense the proper resetting of carriage 184 to its home position when initializing processing system 2. Finally, indexing enable sensor 206 and indexing disable sensor 212 are positioned along rail 174 to sense the maximum desired operational travel of carriage 184 and to therefore, in turn, disable the indexing drive when transfer device 8 becomes output rich and to enable the indexing drive when transfer device 8 becomes input rich.

Continuous Motion Conveyor

Referring to FIGS. 26–29, trunk 4 typically comprises one or more continuous motion conveyors 18 and 20 to transport the articles of manufacture such as battery cans 34 from one branch processing station 16 to a subsequent branch processing station 16 and continuing until all desired processing steps have been accomplished.

Each continuous motion conveyor such as conveyor 18 is similar in construction to that of continuous feed indexer 15. Continuous motion conveyor 18 comprises a central frame 270 from the same extruded slotted beam as frame 40 of continuous feed indexer 15. Frame 270 has first idler assembly 272 attached to one end of frame 270 and second idler assembly 274 attached to an opposite end of frame 270. A first tensioner pulley assembly 276 is mounted to the top of frame 270 proximate to first idler assembly 272 and a mirror image second tensioner pulley assembly 278 is mounted to the top of frame 270 proximate to second idler assembly 274. A transport belt assembly 279 comprising endless toothed belt 292 and cleats 72 extends around continuous motion conveyor 18 for transporting of battery cans 34 in one direction only. Transport belt assembly 279 utilizes the same toothed belt construction as belt 70 used in belt assembly 68, and also uses the same cleats 72 attached to belt 292 in the same manner with a pin extending through rear flanges 128 and 130 of cleat 72 and through individual teeth of the belt.

Each of idler assembly 272 and idler assembly 274 comprises a support 283 to which spindle 284 is attached. Spindles 284 are mounted to a frame or platform 28 (FIG. 1) and support continuous motion conveyor 18 therebetween. Spindle 284 has a shaft 285 journaled at a top and bottom of spindle assembly 284 and further extends above and below spindle assembly 284. A first cogged pulley 280 is affixed to the upper end of shaft 285 on first idler assembly 272 and a second cogged pulley 282 is affixed to the upper end of shaft 285 on second idler assembly 274.

Figure 29:
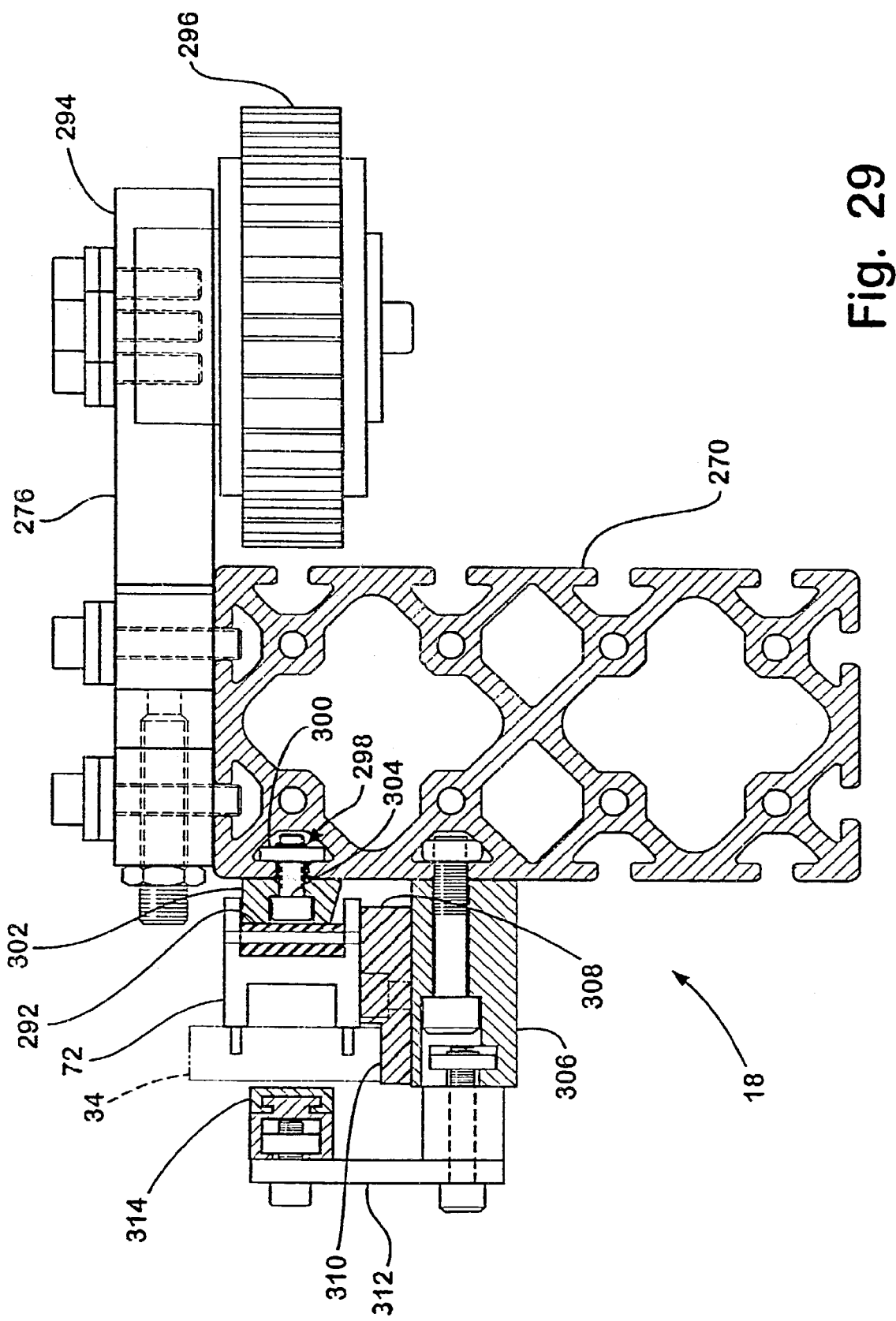
FIG. 29 is a cross-sectional elevation view of the continuous motion conveyor taken along the line XXIX—XXIX of FIG. 28.

Referring to FIG. 29, the continuous motion conveyor 18 is shown in cross section. First tensioner pulley assembly 276 is bolted to the top of frame 270. Tensioner support 294 extends to the right of frame 270 and horizontal tensioner pulley 296 depends therefrom. As shown in FIG. 29, transport belt assembly 279 returns to the idler assembly 274 from the opposite end of conveyor 18 without carrying any battery cans 34. Since the return portion of belt assembly 279 does not carry cans 34 and as a result of its continuous motion does not experience vibrations induced by starting and stopping, belt assembly 279 does not require support beyond tensioner idler pulley assemblies 276 and 278. The left side of conveyor 18 is used to transport battery cans 34 from one processing station to another and thus requires support similar to the support provided on both sides of continuous feed indexers such as indexer 15. A backup rail 302 is affixed to an upper portion of frame 270 at upper slot 298 in frame 270. A captive nut 300 is retained in slot 298 for engagement by bolt 304 to secure cleat backup rail to frame 270. Support block 306 is affixed to frame 270 at a lower slot in a manner similar to backup rail 302. A bottom cell support rail 308 is attached to the upper surface of support block 306. Cleat 72 of belt assembly 279 rides along an upper surface of support rail 308 while battery cans 34 ride along a shoulder 310 at an outer end of support rail 310. A plurality of side rail supports 312 are attached along support block 306 to support side rail 314. Side rail 314 is positioned to maintain battery cans 34 captive in cleats 72 as the battery cans are conveyed from one end of continuous motion conveyor to the other end. As in continuous feed indexer 15, backup rail 302, bottom cell support rail 308, and side rail 314 are fabricated from a self-lubricating material such as oil impregnated nylon or other low friction or wear resistant material.

Coupler

As illustrated in FIG. 2, a coupler is positioned intermediate adjacent ones of continuous motion conveyors 18 and 20, transfer devices 8, and continuous feed indexers 7, 15, and 17. Each coupler 32 performs a transfer function between these adjacent elements. For example, one coupler 32 will extract battery cans from the input side of transfer device 8 and deliver them to the input side of continuous feed indexer 7 for processing. After processing of cans 34 on continuous feed indexer 7, a second coupler 32 extracts the processed cans 34 from the output side of continuous feed indexer 7 and delivers them to the output side of transfer device 8. Couplers 32 are similarly used to transfer cans 34 between continuous motion conveyors 18 and transfer device 8. Couplers 32 are the connecting links between the various transport and processing elements of system 2 permitting these elements to be combined in an infinite number of arrangements while maintaining the capability of a continuous and uninterrupted flow of articles of manufacture throughout system 2.

Figure 30:
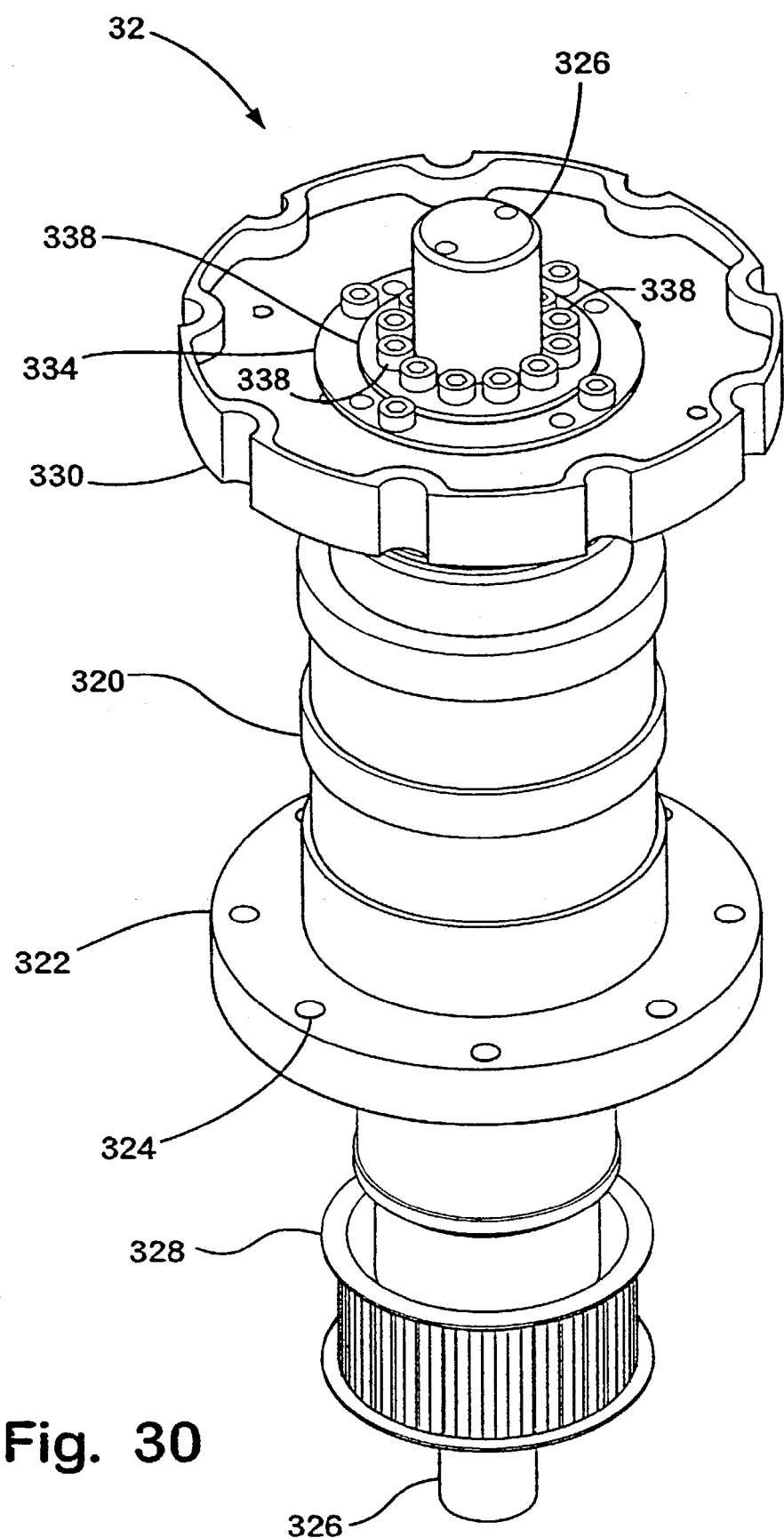
FIG. 30 is a perspective view of a coupler mounted on a spindle.
Figure 31:
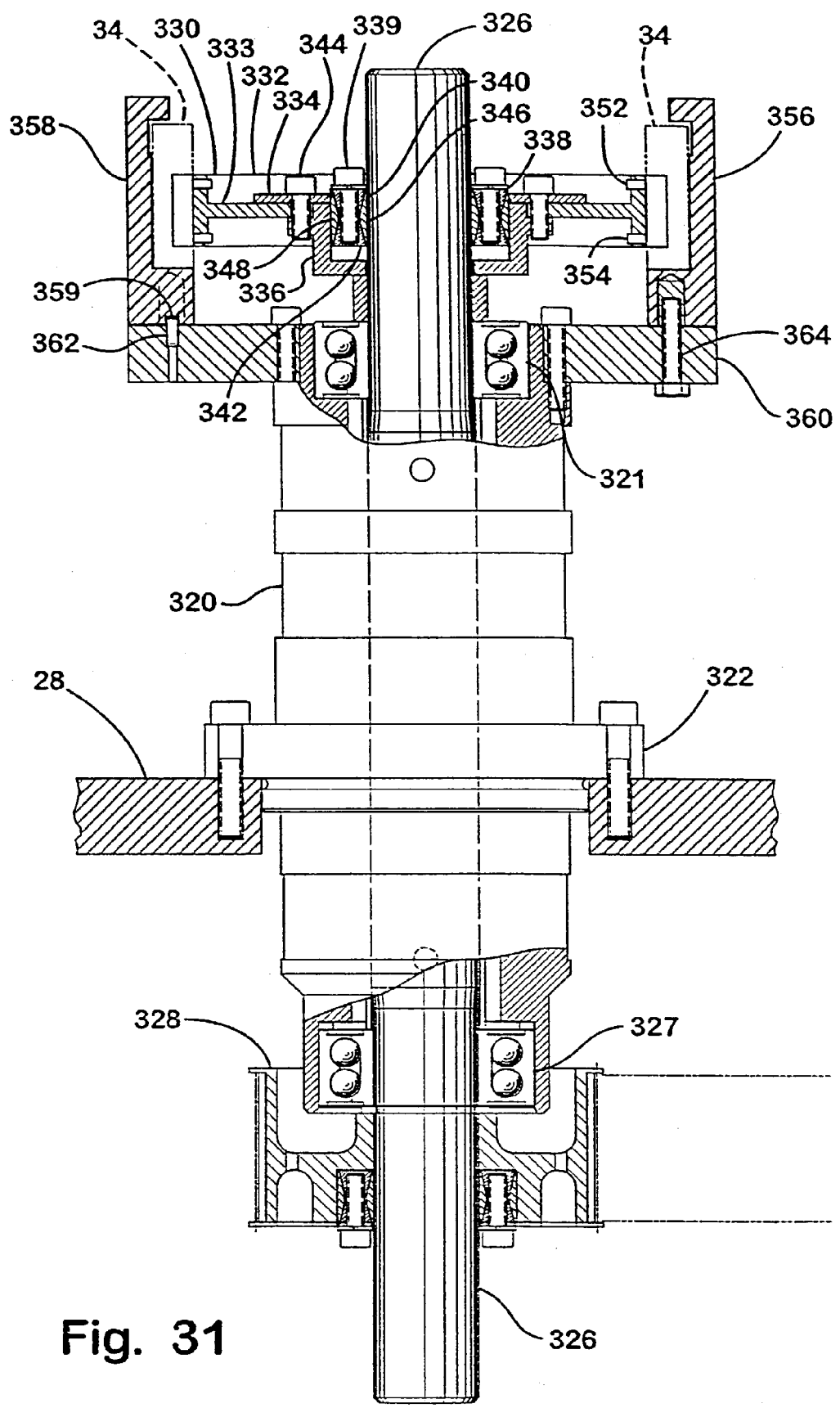
FIG. 31 is a partial cross-sectional view of a coupler illustrating the dial attachment, and further illustrating dead plate supports, and dead plates.
Figure 32:
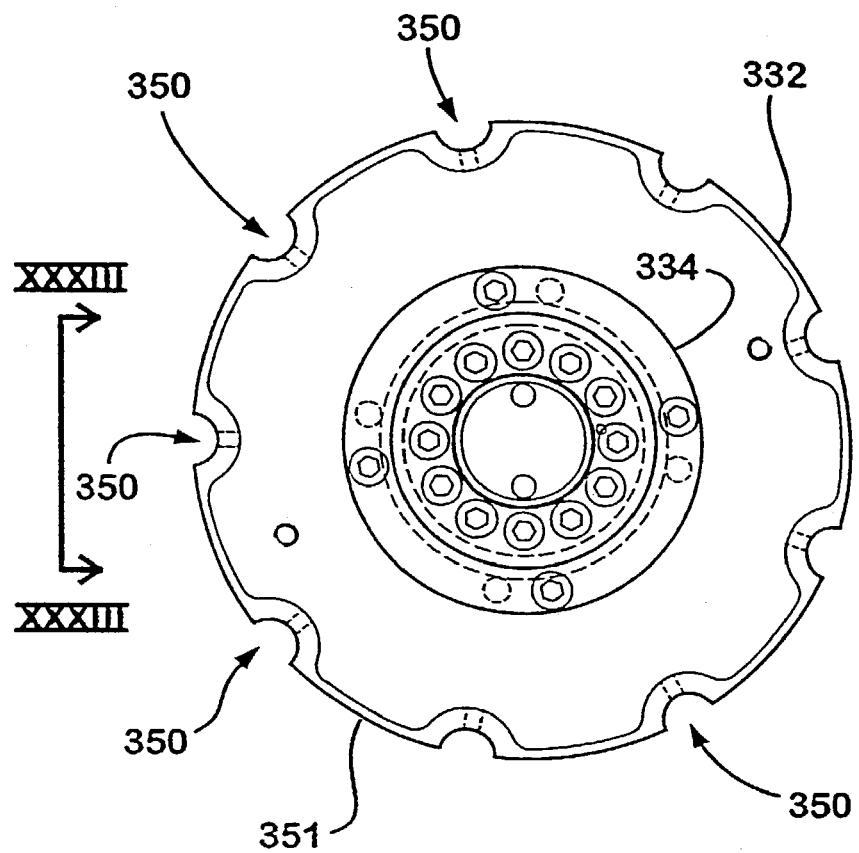
FIG. 32 is a plan view of the coupler dial showing pockets defined around a periphery of the dial.

Referring to FIGS. 30–32, a coupler 32 comprises a spindle assembly 320 having a mounting flange 322 extending outwardly therefrom for mounting to a frame or platform such as platform 28 (FIG. 1). Mounting flange 322 has a plurality of holes 324 therearound to facilitate securing spindle assembly 320 to platform 28. A rotatable shaft 326 extends vertically through spindle assembly 320 and is journaled in upper bearing 321 at an upper end of spindle assembly 320 and in bearing 327 at a lower end of spindle assembly 320. Shaft 326 extends below spindle assembly 320 and has one or two cogged pulleys 328 mounted thereto. Shaft 326 also extends upwardly through spindle assembly 320 and has mounted thereto at its upper end a dial assembly 330. Dial assembly 330 has a dial 332 which can be molded of an injectable resin or machined from plastic metal or ceramic, and is shaped to minimize weight and rotational inertia.

Figure 33:
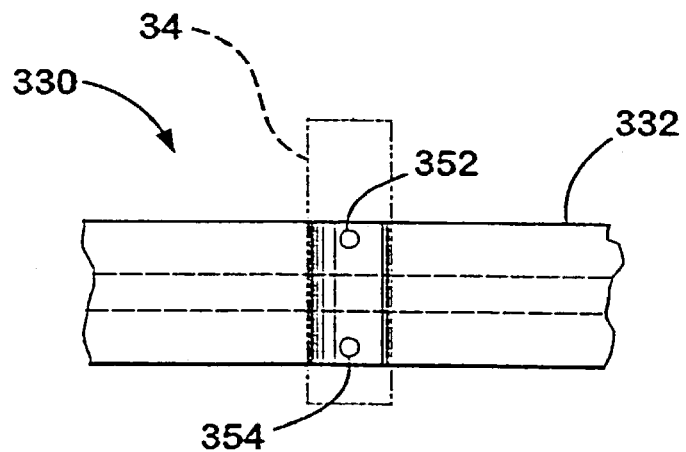
FIG. 33 is an elevational view of one pocket of the coupler dial taken along the line XXXIII—XXXIII of FIG. 32.

As shown in FIGS. 32 and 33, dial assembly 330 is generally circular and has a plurality of pockets 350 defined by a perimeter 351 of dial 332. Each pocket 350 is shaped to receive a portion of a battery can 34 and has an upper magnet 352 and a lower magnet 354 embedded within the portion of dial perimeter 351 defining pocket 350 for capturing and retaining battery can 34 therein.

Referring now to FIG. 31, a central web 333 of dial 332 is captured between washer plate 334 and hub 336 and is fastened to washer plate 334 and hub 336 by bolts 334. Dial assembly 330 is sleeved over shaft 326 as is a taper lock compression fitting 338 which is received by an inner diameter of washer plate 334 and hub 336. Taper lock compression fitting 338 has an upper tapered insert 340 and a lower tapered insert 342 which are received between inner chamfered ring 346 sleeved over shaft 326 and outer chamfered ring 348 bearing against the inner diameter of hub 336. A plurality of closely spaced bolts 339 extend through compression fitting 338 in a manner to draw upper tapered insert 340 and lower tapered insert 342 toward one another. As inserts 340 and 342 are drawn together by bolts 339, the tapered surfaces of inserts 340 and 342 compress inner ring 346 against shaft 326 and expand outer ring 348 against the inner diameter of hub 336 thereby securing dial assembly 330 to shaft 326.

A dead plate support 360 is affixed to a top of spindle assembly 320. Dead plate support 360 has mounted thereon one or more dead plates 356 and 358. As shown in the sectional view of FIG. 31, dead plate 356 is secured to dead plate support 360 by a threaded fastener such as bolt 364. Dead plates 356 and 358 are carefully positioned relative to dial assembly 330 so that battery cans 34 can rotate freely within dead plates 356 and 358 yet be sufficiently close to prevent battery cans 34 from becoming dislodged or disengaged from pockets 350 in dial 332. To this end, dead plates such as dead plate 358 as shown in section has a groove 359 in a bottom surface in which is closely received dowel pins 362 for precise radial positioning of dead plates 358 on dead plate support 360. Dead plate 356 and 358 include upper and lower flanges to maintain each can 34 in a desired vertical position with respect to dial 332.

Drive Arrangement

Figure 34:
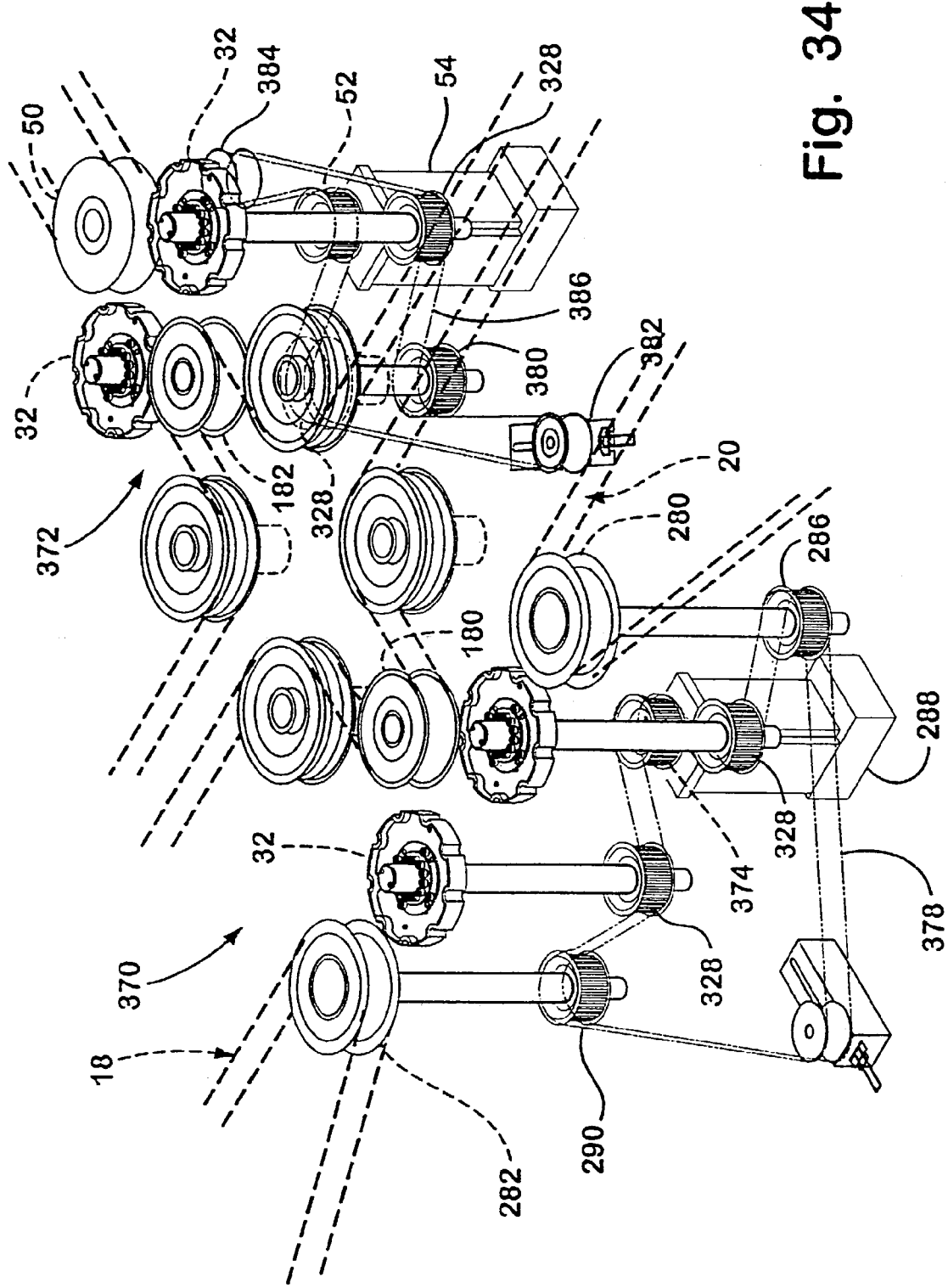
FIG. 34 illustrates the pulleys, idlers, and couplers associated with the conjunction of a branch processing station with the trunk.
Figure 35:
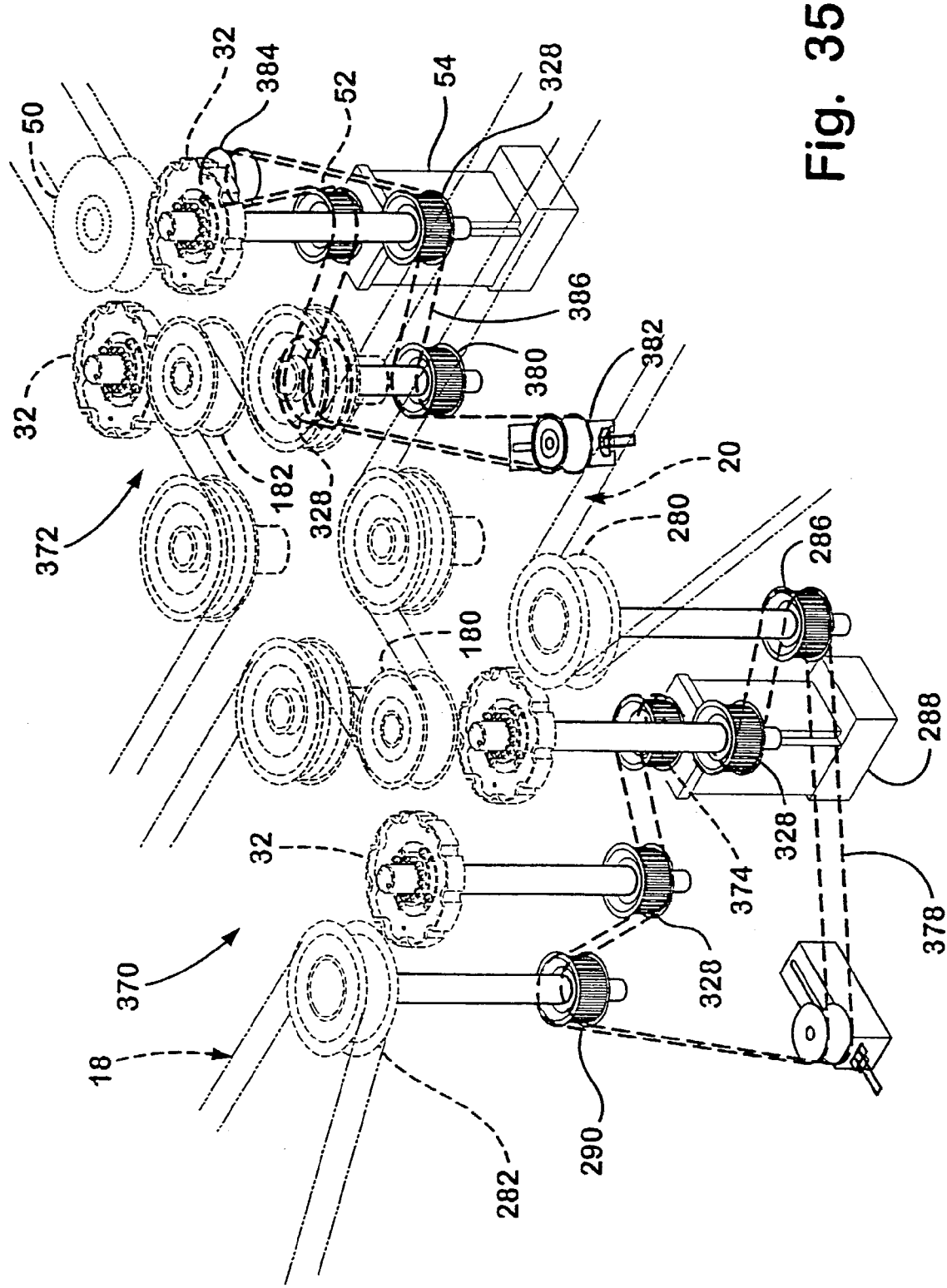
FIG. 35 shows the continuous motion drive belt for powering the adjacent continuous motion conveyors, couplers, and one side of the transfer device, and the indexing motion drive belt for powering the continuous feed indexer, couplers, and the indexing side of the transfer device.

Referring now to FIGS. 34 and 35, the upper pulley and drive sprocket arrangements are illustrated in FIG. 35. A continuous motion group 370 whose motion requires coordinated speed for proper interface and transfer of battery cans 34 in association with trunk 4 includes the first idler sprocket 280 of a receiving continuous motion conveyor 20, the continuous motion drive sprocket 180 of transfer device 8, and a coupler 32 to transfer cans 34 from sprocket 180 to sprocket 280. Likewise, a second coupler 32 is interposed between transfer device continuous motion drive sprocket 180 and second idler sprocket 282 of continuous motion conveyor 18. A second group of couplers and sprockets, indexed motion group 372, also requires a coordinated drive includes a coupler 32 for extracting battery cans 34 from indexed motion drive sprocket 182 of transfer device 8 and transferring cans 34 to the input side of drive sprocket 50 of continuous feed indexer 15. A second coupler 32 extracts battery cans 34 from the output side of drive sprocket 50 and delivers cans 34 to the indexed motion drive sprocket 182 of transfer device 8.

Referring now to FIG. 35, drive group 370 is powered by servomotor 288 from transfer device 8. In the preferred embodiment, a double-sided cogged drive belt 378 engages drive pulley 374 of transfer device 8 to provide the desired rotational motion to couplers 32 via their drive pulleys 328 and the rotational motion for continuous motion cogged pulleys 280 and 282 of continuous motion conveyors 20 and 18, respectively, via their respective idler pulleys 286 and 290. Proper tension to belt 378 is provided by belt tensioner 376. By interconnecting idler pulley 290 of continuous motion conveyor 18 with the idler pulley 286 of continuous motion conveyor 20, the speed of trunk 4 is coordinated and remains substantially constant from one end of processing system 2 to the other end.

The desired rotational motion for the indexed motion group 372 is provided by servomotor 54 which powers drive sprocket 50 and drive pulley 52 of continuous feed indexer 15. Drive pulley 52 is interconnected to pulley 328 of couplers 32 and to indexed motion drive pulley 380 which in turn drives index motion drive sprocket 182 of transfer device 8. In the preferred embodiment a doubled-sided cogged belt 386 is also used in this group in conjunction with idler 384 and tensioner 382 for providing the proper tension to belt 386. However, a drive system of intermeshed gears could also be utilized to impart the desired rotational motion to drive group 370 and indexed motion group 372.

Operation

Figure 36:
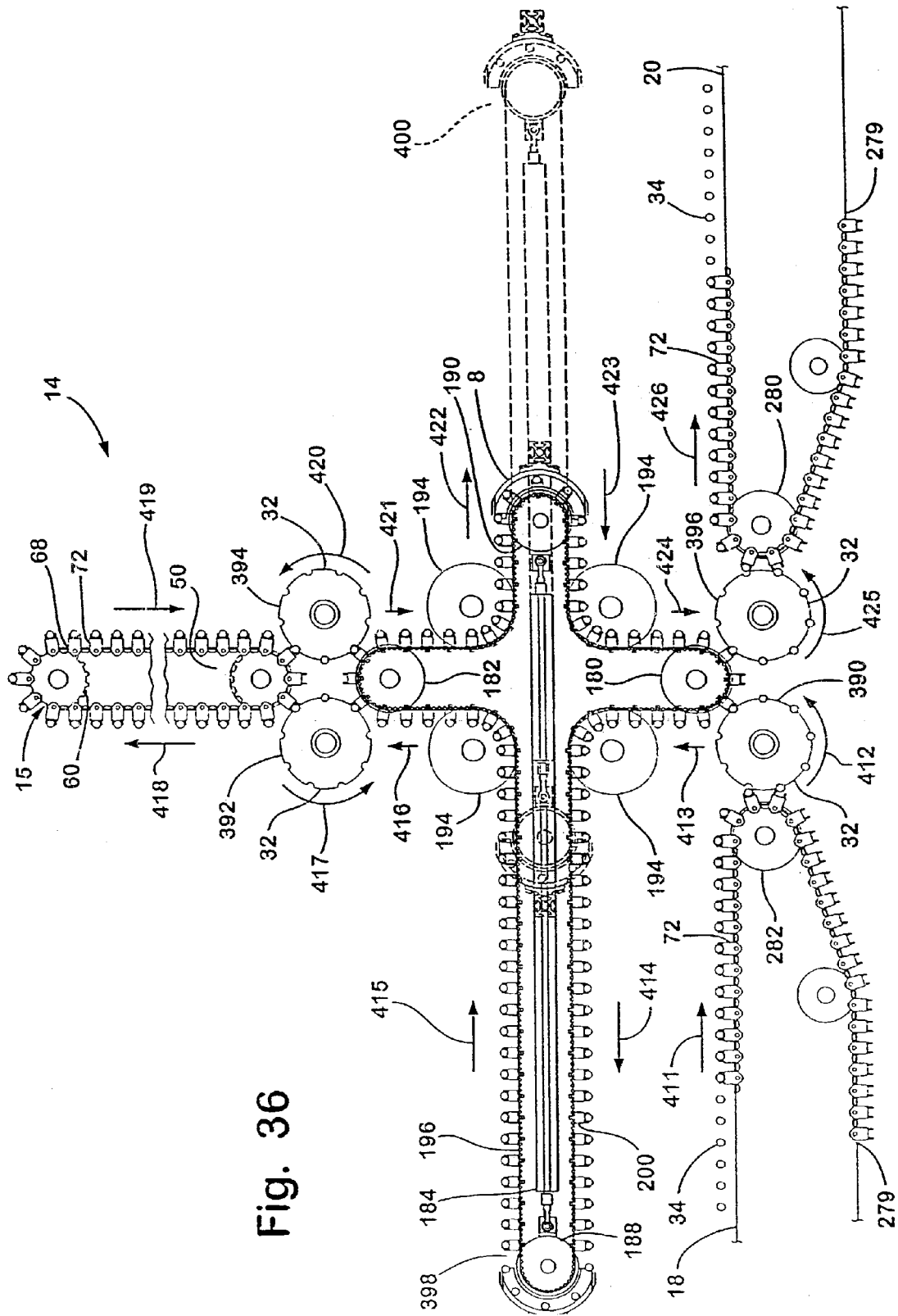
FIG. 36 is a plan view of a processing station, transfer device and adjacent continuous motion conveyors illustrating the path of travel of the battery cans therealong.
Figure 37:
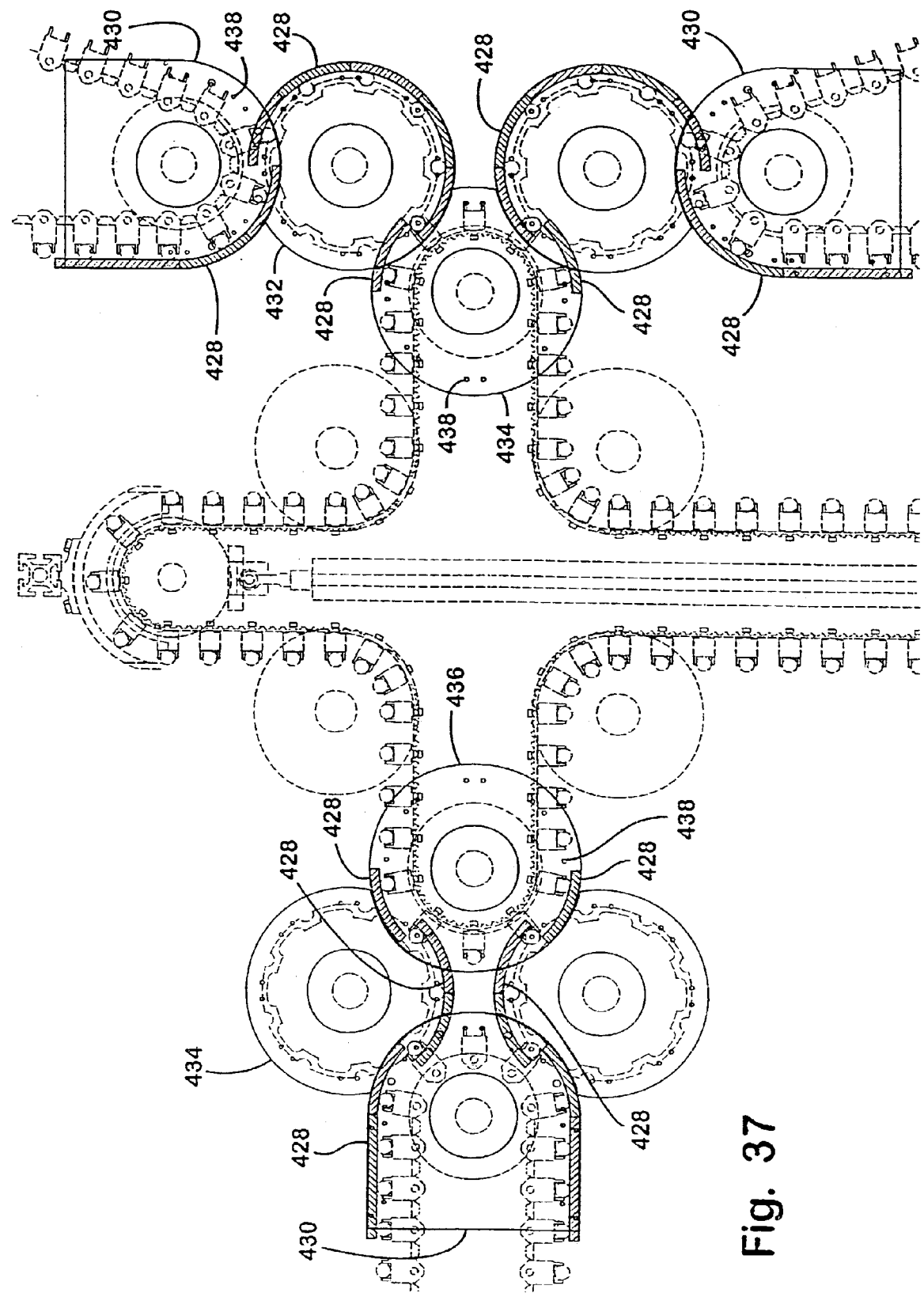
FIG. 37 shows the dead plate supports for the couplers, transfer ends of the continuous motion conveyor, transfer device, and continuous feed indexer.

FIG. 36 illustrates the operation of process station 14 with respect to the transportation of battery cans 34 removed from trunk 4 for processing on process station 14 and returned to trunk 4. As shown in FIG. 1, trunk 4 generally comprises a plurality of continuous motion conveyors arranged in an end-to-end configuration such as conveyors 18 and 20 with process stations positioned at ends of the individual continuous motion conveyors. Process station 14 as shown in FIG. 36 in relative operating position with respect to trunk 4 is typical of the process station to trunk interface and illustrates the preferred embodiment with respect to the processing of battery cans 34. However, an infinite number of arrangements of components are possible.

Belt assemblies such as belt assembly 279 of continuous motion conveyors 18 and 20, belt assembly 196 of transfer device 8, and belt assembly 68 of continuous feed indexer 15 all progress around their respective frames in a clockwise direction. All couplers 32 rotate in a counterclockwise direction. However, the respective directions of travel can be reversed with couplers 32 rotating in a direction opposite the belts.

Transport belt assembly 279 of continuous motion conveyor 18 transports battery cans 34 along directional arrow 411. Each battery can 34 is retained by a cleat 72 of belt assembly 279. As cans 34 progress around idler sprocket 282 they are transferred to first input coupler 390 and proceed therearound in captive fashion in a counterclockwise direction as indicated by directional arrow 412. First input coupler 390 is also adjacent continuous motion drive sprocket 180 of transfer device 8 and cans 34 are transferred from coupler 390 to individual cleats 200 of belt assembly 196 on transfer device 8. The transfer point of cans 34 occurs at the tangent point coupler 390 and sprockets 282 and 180. All can 34 transfers occur in like manner throughout system 2.

As previously discussed, carriage 184 with input flying idler 188 and output flying idler 190 at its respective ends divides transfer device 8 into a continuous motion side adjacent to trunk 4 and an indexed motion side adjacent to continuous feed indexer 15. Cans 34 progress along transfer device 8 in a continuous motion manner according to directional arrows 413 and 414. As cans 34 progress around input flying idler 188, their motion along directional arrows 415 and 416 is transformed into an indexed motion. The indexed motion comprises alternating periods of belt assembly 196 translation having a speed greater than the continuous motion speed of trunk 4 and a periods of dwell in which the motion of cans 34 is stopped.

In the preferred embodiment, the average speed of the indexed motion is slightly greater than the continuous motion speed of trunk 4. The translation component along the indexed side of transfer device 8 is determined by the number of cans simultaneously processed on continuous feed indexer 15. Thus, if six battery cans 34 are simultaneously processed as shown by processing station 14 in FIG. 1, the translation component of indexed motion comprises positionally incrementing belt assembly 196 a distance equivalent to six times the distance between adjacent cleats 200. The dwell component of the indexed motion corresponds to the time required to accomplish the required processing of cans 34 by process modules 12 on continuous feed indexer 15. Thus, the continuous motion of belt assembly 196 along directional arrows 413 and 414 will cause the leftward translation of dancer carriage 184 to an input rich position 398 of transfer device 8.

Concurrently, the indexed motion along directional arrows 415 and 416 causes incremental rightward translations of dancer carriage 184 toward an output rich position 400. The continuous motion along directional arrows 413 and 414 during the dwell component of the indexed motion returns carriage 184 toward input rich position 398. Since the average speed of the indexed motion along directional arrows 415 and 416 is slightly faster than the continuous motion speed of trunk 4, each cycle of indexed motion-dwell causes dancer carriage 184 to slowly migrate to output rich position 400 over a period of indexed motion cycles. Upon dancer carriage 184 reaching output rich position 400 continuous feed indexer 15 is temporarily disabled by process station controller 616 thereby allowing the continuous motion of drive sprocket 180 to reset transfer device 8 to input rich position 398. Upon transfer device 8 being reset to input rich position 398, continuous feed indexer 15 is again enabled to resume indexed processing of cans 34. The oscillating motion of dancer carriage 184 and its resetting from output rich position 400 to input rich position 398 is graphically illustrated in FIG. 67 as a time function and is additionally discussed below with respect to the control system.

As cans 34 progress along directional arrow 416 and around indexed motion drive sprocket 182, each can 34 is captured by second input coupler 392 and progresses in a counterclockwise direction 417 and is then in turn captured by cleats 72 of belt assembly 68 on continuous feed indexer 15. Cans 34 progress along continuous feed indexer 15 as shown by directional arrow 418 and are processed by one or more process modules (not shown) during the dwell period of the index dwell motion of belt assembly 68. After processing, cans 34 proceed around idler sprocket 60 and along directional arrow 419 in the same manner of indexed motion for return to trunk 4. Upon reaching drive sprocket 50, processed cans 34 are handed off to first output coupler 394 and proceed therearound in a counterclockwise direction as indicated by directional arrow 420.

First output coupler 394 transfers cans 34 to individual cleats 200 of belt assembly 196 on transfer device 8 on the right or output side of transfer device 8. Cans 34 continue to proceed in an indexed motion-dwell manner along directional arrows 421 and 422 to output flying idler 190. After rounding output flying idler 190, cans 34 transition to continuous motion and proceed according to directional arrows 423 and 424. Upon reaching continuous motion drive sprocket 180, second output coupler 396 captures individual cans 34 and transports them in a counterclockwise manner according to directional arrow 425 whereupon cans 34 are handed off to individual cleats 72 at drive sprocket 280 of continuous motion conveyor 20. Cans 34 then proceed in a continuous motion manner along directional arrow 426 to be transported to one or more additional process stations. All battery can 34 transfers are accomplished at the tangential points of dials 332 and interfacing belt assemblies.

Referring now to FIGS. 37–41, a plurality of dead plates 428 are arranged about the periphery of those areas where cans 34 are transported in an arcuate manner. Dead plates 428 function to retain cans 34 within the carrying cleats 72 or 200 and within pockets 350 of couplers 32. In this manner, dead plates 428 serve to prevent cans 34 from disengaging from the magnets as a result of the centrifugal force imparted to cans 34 around couplers 32 or end sprockets of continuous motion conveyors 18 and 20, transfer device 8, or continuous feed indexer 15.

Secondarily, dead plates 428 also function to ensure that cans 34 are properly handed off from a cleat 72 or 200 to a coupler 32 or the reverse thereof. To properly position dead plates 428 along the path of cans 34, dead plate supports such as dead plate support 360 are mounted to an upper end of spindle assemblies such as spindle assembly 32 in FIG. 30. Each fixed drive and idler sprocket and coupler involved with the transfer of battery cans 34 have at least one dead plate and a dead plate support associated therewith.

The dead plate supports in the preferred embodiment, have four basic configurations. D-shaped dead plate support 430 is mounted to the top of the spindle assembly associated with the drive and idler sprockets of continuous motion conveyors 18 and 20 and of continuous feed indexer 15. Dead plate support 430 has an arcuate end and a linear end, wherein the linear end is oriented toward the central frame such as frame 40 of continuous feed indexer 15 and the arcuate end is coaxial with the sprocket shaft and is oriented away from the outer end of the sprocket. The remaining dead plate supports can be circular such as dead plate support 436, can have one arcuate cut-out in its periphery such as dead plate support 432 or two arcuate cut-outs in its periphery such as dead plate support 434 wherein the cut-outs are separated by 90 degrees. The arcuate cut-outs permit the nesting of dead plate supports for the proper mounting of dead plates 428.

The differently configured dead plate supports 432–436 also facilitate the ability to position individual elements such as continuous motion conveyors 18 and 20, transfer device 8, and continuous feed indexer 15 at any desired angular relationship one to the other. Dead plate supports 430–436 are coplanar to provide a continuous surface upon which to mount dead plates 428. Each of dead plate supports 430–436 have a plurality of dowel pin holes 438 at regularly spaced predefined intervals near the perimeter of the dead plate supports. Dowel pins are partially received within holes 438 such that a portion of the dowel pin extends about a top surface of the dead plate support for engagement with a groove, such as groove 444 in FIG. 40, in a bottom surface of dead plate 438. A dead plate 428 can bridge adjacent nested dead plates 430–436.

Figure 41:
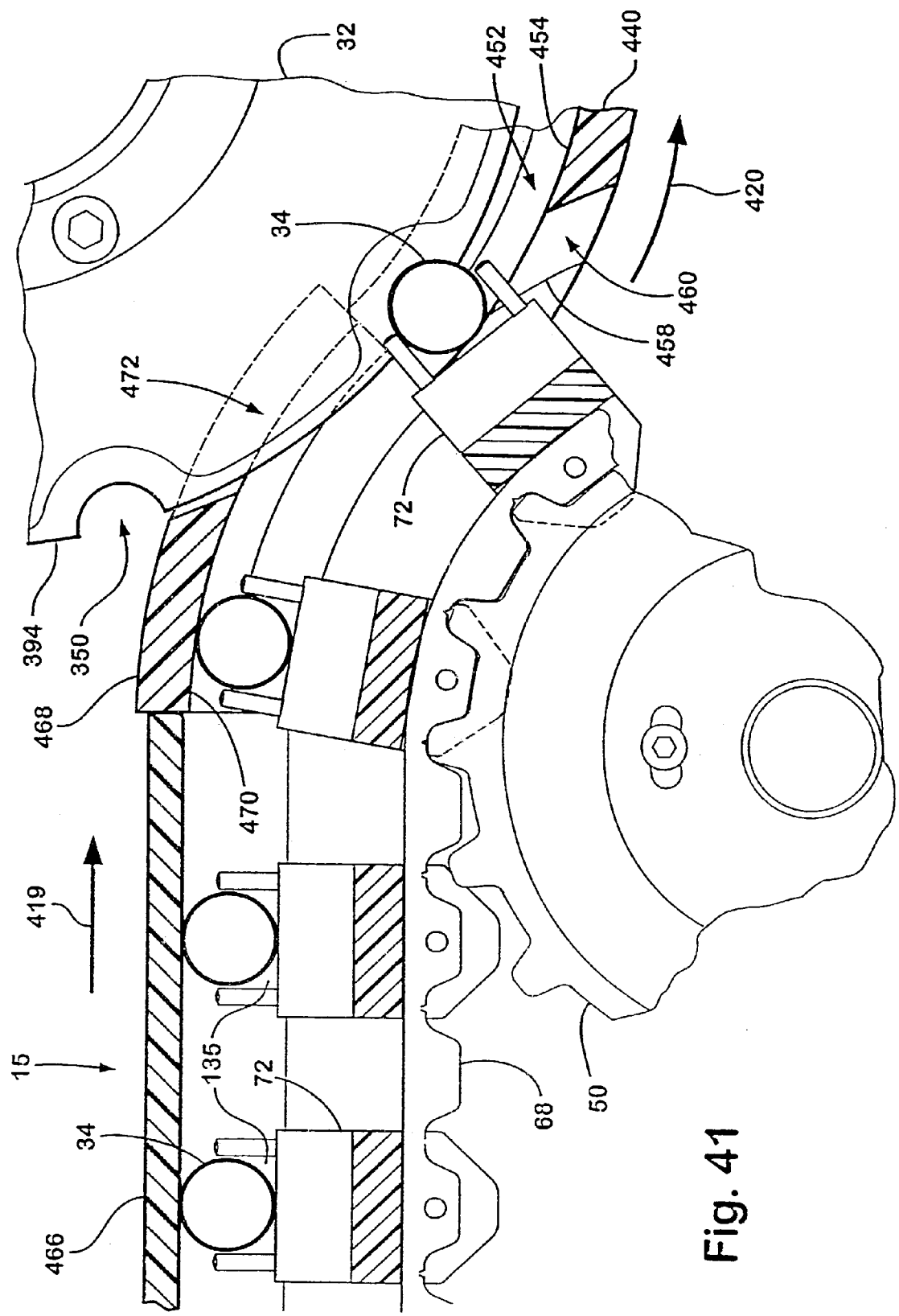
FIG. 41 is a partial cross-sectional view of the battery can transfer from the continuous feed indexer to the adjacent coupler.

A typical dead plate is illustrated in FIGS. 38–40 as dead plate 440. Dead plate 440 corresponds to one of the dead plates positioned between drive sprocket 50 of continuous feed indexer 15 and first output coupler 394 as shown in FIG. 41. Dead plate 440 has a bottom surface 442 which defines a groove 444 having a width to closely receive the locating dowel pins protruding from dead plate supports 430–436. Dead plate 440 also has at least one threaded hole 446 in a bottom portion or other clamping mechanism to facilitate the securing of dead plate 440 to its corresponding dead plate support. The bottom portion of dead plate 440 has a shelf 448 which corresponds to the bottom of a battery can 34 as can 34 is transported around processing system 2. Similarly, a top portion of dead plate 440 has an upper lip 450 which is vertically disposed above shelf 448. Shelf 448 and lip 450 are vertically separated by web 454 and in combination define a channel 452 for the passage of at least a portion of a vertically oriented battery can 34 therealong.

Web 454 is either solid or can have a window 456 defined at one end thereof. Window 456 may be rectilinear or, as shown in FIGS. 38 and 39 have a tongue 458 which further defines at one end of window 456 and in combination with an upper portion of web 454, a slot 460 and in combination with a bottom portion of web 454, a slot 462. The purpose of windows 456 are to permit the passage therethrough of dial 330 of couplers 32 or of cleats 72 or 200 at the point of battery can 34 hand off from a coupler dial 330 to a cleat 72 or 200 or from a cleat 72 or 200 to a coupler dial 330. Slots 460 and 462 permit the unrestricted passage of the upper and lower flanges of cleats 72 and 200 therethrough. The size and configuration of window 456 and slots 460 and 462 correspond to the width of dials 330 and to the vertical dimensions of cleats 72 or 200 such that during the operation of processing system 2, there is no portion of dead plate 440 which interferes with the passage of a dial 330 or cleats 72 or 200 as they pass through window 456 and slots 460 and 462.

Referring to FIG. 41, transport belt assembly 68 is illustrated at drive sprocket 50 of continuous feed indexer 15 wherein battery cans 34 are handed off to first output coupler 394 after processing on continuous feed indexer 15. As cleats 72 carry battery cans 34 toward drive sprocket 50, straight dead plate 466 ensures that battery cans 34 are retained in recesses 135 of cleats 72. As belt assembly 68 engages drive sprocket 50 and begins to turn around an outer periphery of drive sprocket 50, cans 34 encounter a curved dead plate 468 having a web 470 whose inside surface is maintained at a constant radius from the center of drive sprocket 50. Dead plate 468 has a rectilinear window 472 through a central portion thereof to permit first output coupler 394 to rotate therein.

Coupler 394 is synchronized with belt assembly 68 such that as belt assembly 68 progresses around drive sprocket 50, pockets 350 defined by the outer perimeter of coupler 394 engage and receive a portion of a battery can 34. A second dead plate, dead plate 440 is abutted to the opposite end of dead plate 468 and is oriented to radially conform to the outer periphery of coupler 394 such that web 454 and tongue 458 engage the portion of battery can 34 within recess 135 of cleat 72 and opposite from pocket 350 of coupler 394. At the point of transition from dead plate 468 to dead plate 440, battery can 34 is captured by both coupler 394 and cleat 72. As coupler 394 rotates in a counterclockwise direction according to directional arrow 420, web 454 and tongue 458 engage the portion of battery can 34 received by cleat 72. Web 454 and tongue 458 operate to disengage battery can 34 from cleat 72 and to maintain battery can 34 in an engaged relationship in pocket 350 of coupler 394.

All transferring of battery cans 34 from a carrying cleat 72 or 200 to a coupler 32 and the transferring of a battery can 34 from a coupler 32 to a cleat 72 or 200 are accomplished in a similar manner throughout processing system 2. The transfer of battery cans 34 uses alternately oriented dead plates to guide a battery can 34 about a periphery of a carrying element from which the can 34 is to be discharged, engaging a synchronized carrying recess in a receiving element, and transferring carriage of the battery can 34 to the receiving element with the oppositely oriented dead plate.

Process Modules

Figure 42:
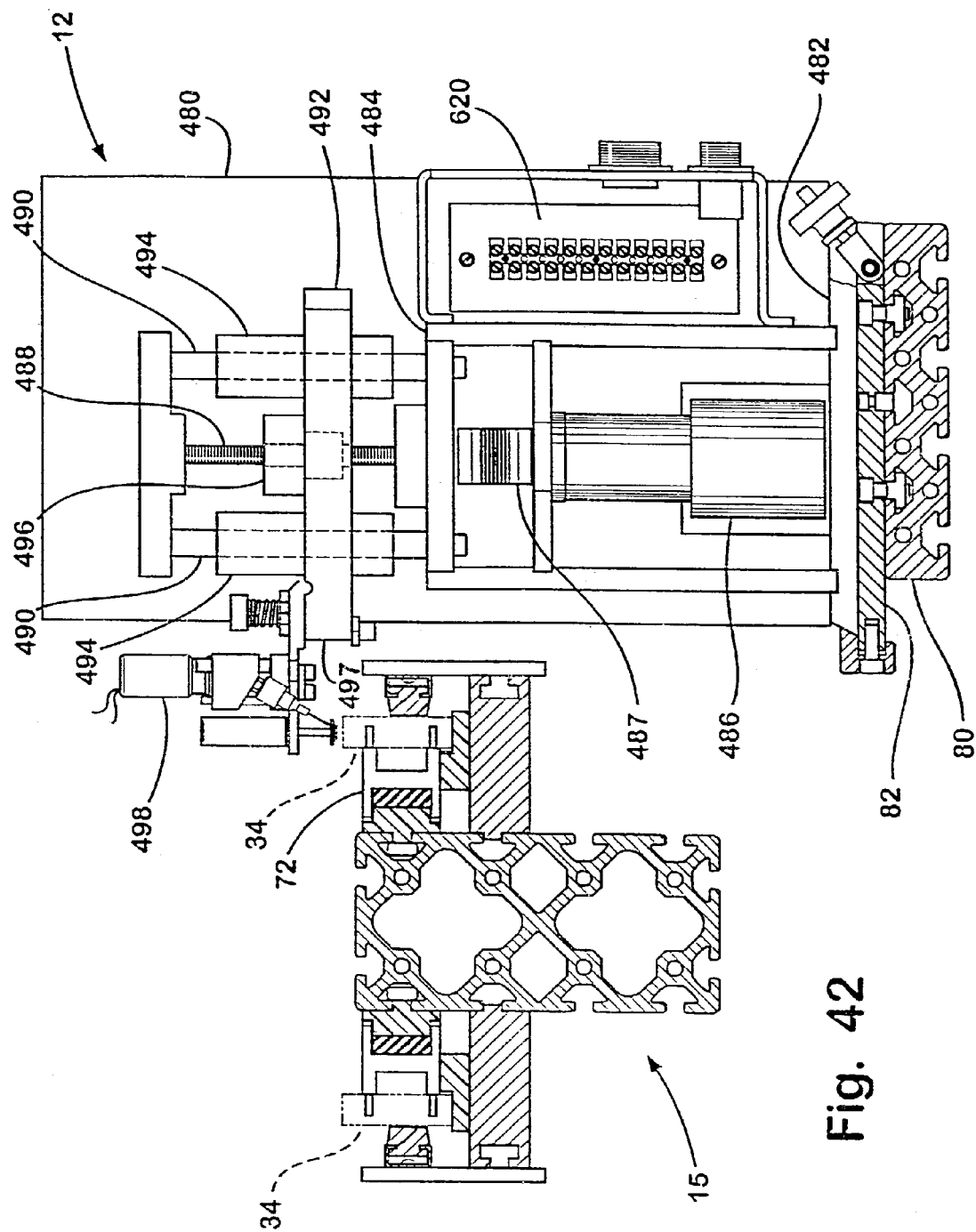
FIG. 42 is an elevation view of a first embodiment of a process module for mounting on a continuous feed indexer.

As shown in FIG. 1, a branch processing station such as station 6 has one or more process modules 10 mounted to a continuous feed indexer 7 to acquire control of a battery can 34 during the dwell period of the indexed motion, perform at least one process on battery can 34, and then return control of battery can 34 to indexer 7. A second branch processing station 14 has an alternately configured process module 12 mounted to continuous feed indexer 15 for performing a second manufacturing process on battery cans 34. One configuration of process module 12 as mounted to continuous feed indexer 15 is shown in FIG. 42. Process module 12 includes a base 482 which is received in process module mount 82 attached to process module support 80. A process module controller 620 is associated with each chassis 480 and can be mounted interiorly or exteriorly of chassis 480. Controller 620 is in communication with process station controller 614 and control coordinator 610 and includes signal inputs for receiving signals from controller 614 and coordinator 610. The synchronized control of the operation of process module 12 by process module controller 620, process station controller 614 and control coordinator 610 is discussed in greater detail below. Process module controller 620 controls the operation of application head 498 in a synchronized manner with the dwell portion of the index motion-dwell of continuous feed indexer 15.

Process module 12 has an internal frame 484 to which is mounted servomotor 486. Servomotor 486 in turn is coupled to vertically oriented rotatable threaded shaft 488 with coupler 487. A pair of guide shafts 490 are supported by and extend upwardly from frame 484 and flank the upper portion threaded shaft 488 in a parallel manner. A carriage 492 has a pair of sleeves 494 in which guide shafts 490 are received such that carriage 492 is vertically slidable along guide shafts 490. Carriage 492 further has a threaded element 496 attached thereto and engages rotatable threaded shaft 488. As servomotor 486 is operated, carriage 492 is vertically translated along guide shafts 490 through the rotation of threaded shaft 488 in threaded element 496. Carriage 492 can be translated upwardly by rotating servomotor 486 in one direction and lowered by rotating servomotor 486 in an opposite direction. A front end 497 of carriage 492 extends through chassis 480 proximate to continuous feed indexer 15. Application head 498 is mounted to carriage end 497.

Process module mount 82 positionally locates process module 12 along the longitudinal axis of continuous feed indexer 15 such that when a battery can 34 and cleat 72 are at the dwell portion of the indexed motion-dwell sequence, application head 498 is directly aligned with battery can 34 in a cleat 72. As battery can 34 dwells on continuous feed indexer 15, process module controller 620 activates servomotor 486 to rotate in a direction to lower carriage 492 and bring application head 498 into an operational processing position. Application head 498 is then activated to perform its desired process which when completed, is vertically raised from its engagement with can 34 by reversing the direction of servomotor 486 and raising carriage 492 on guide shafts 490. Upon disengagement of application head 498, cleats 72 and battery cans 34 retained therein are indexed along continuous feed indexer 15.

Figure 43:
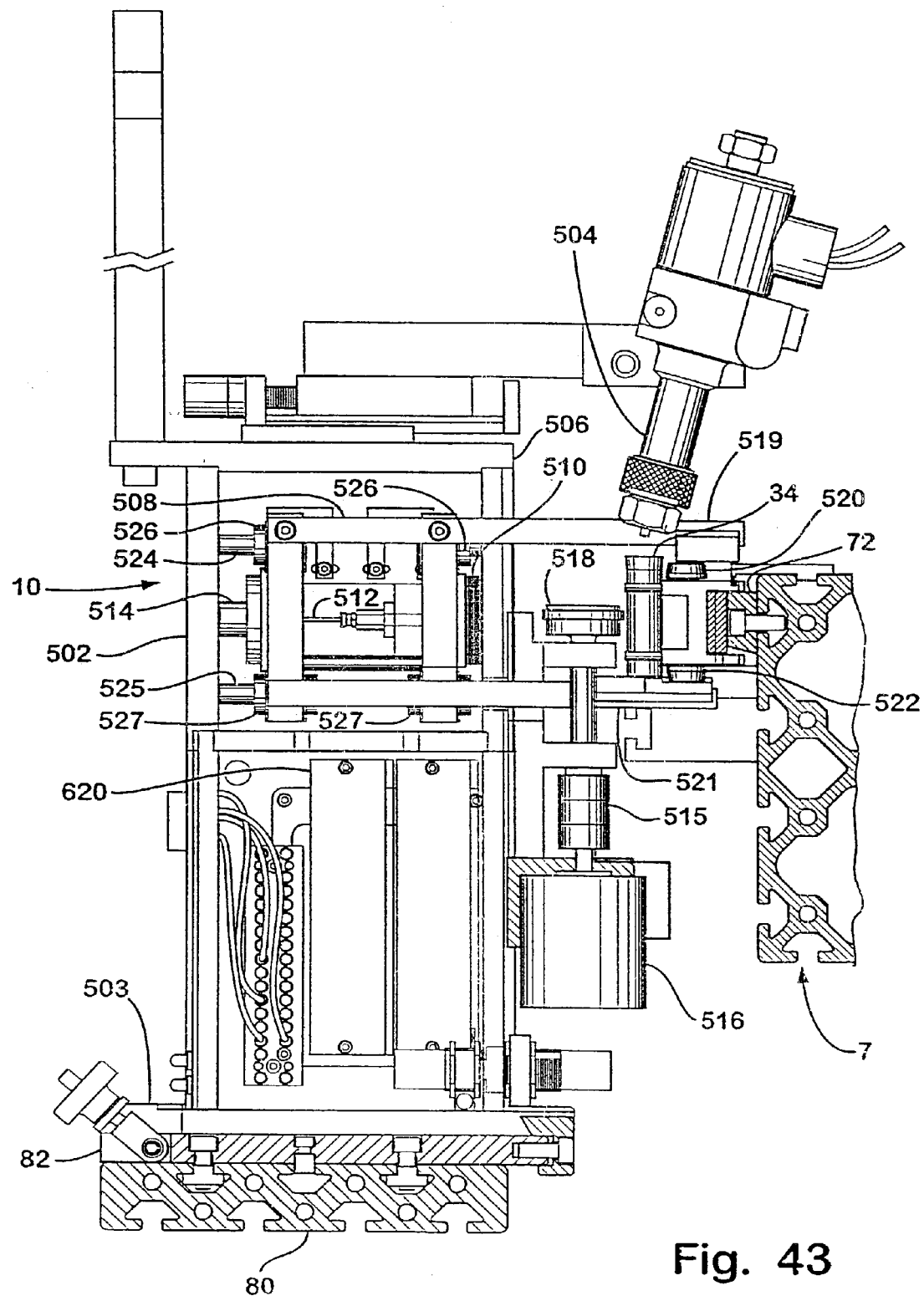
FIG. 43 is a side elevational view of a second embodiment of a process module mounted to a continuous feed indexer for extracting a battery can from the indexer for processing and return to the indexer.
Figure 44:
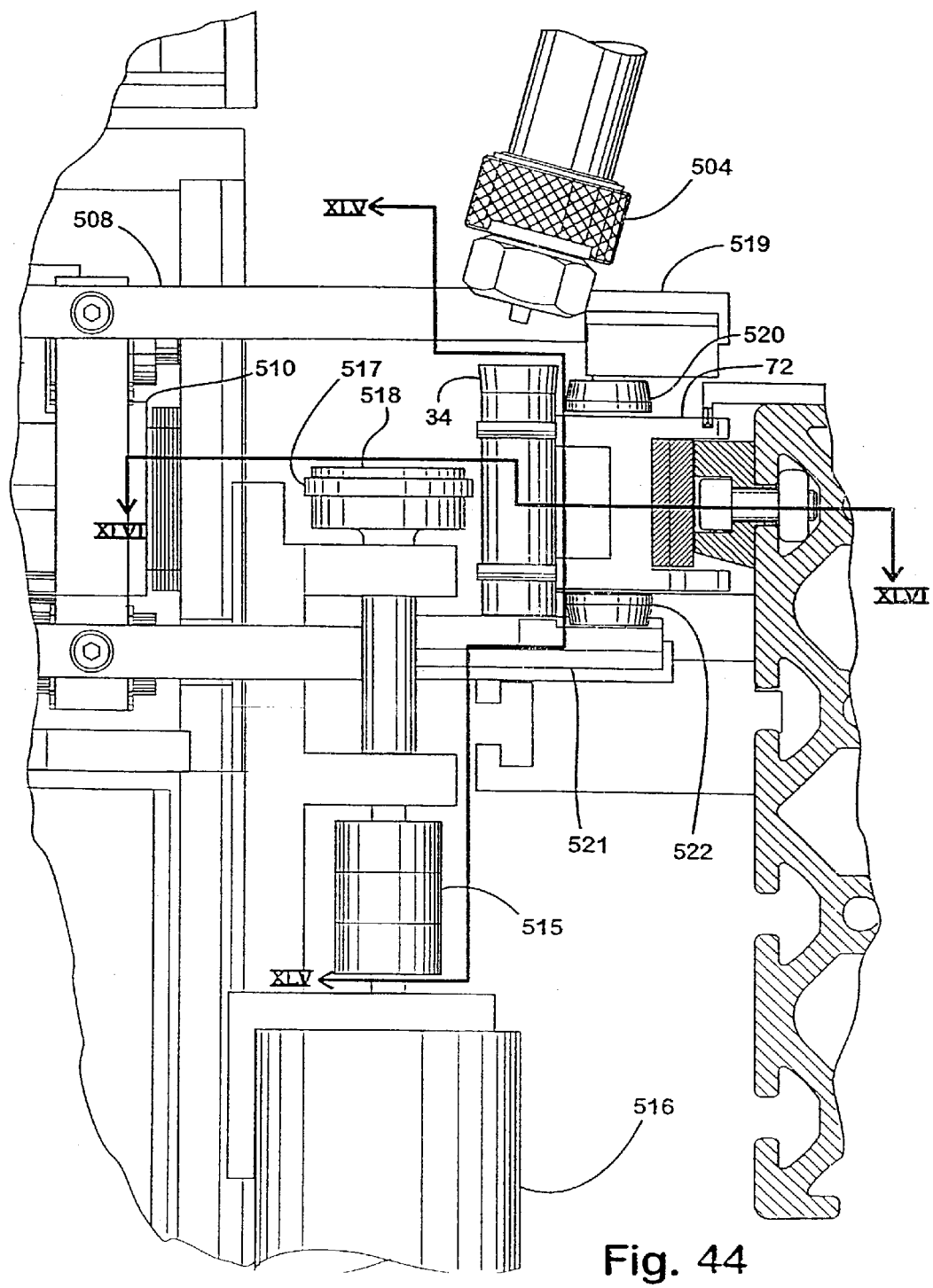
FIG. 44 is an enlarged partial cross section of the battery can processing mechanism of FIG. 43.
Figure 45:
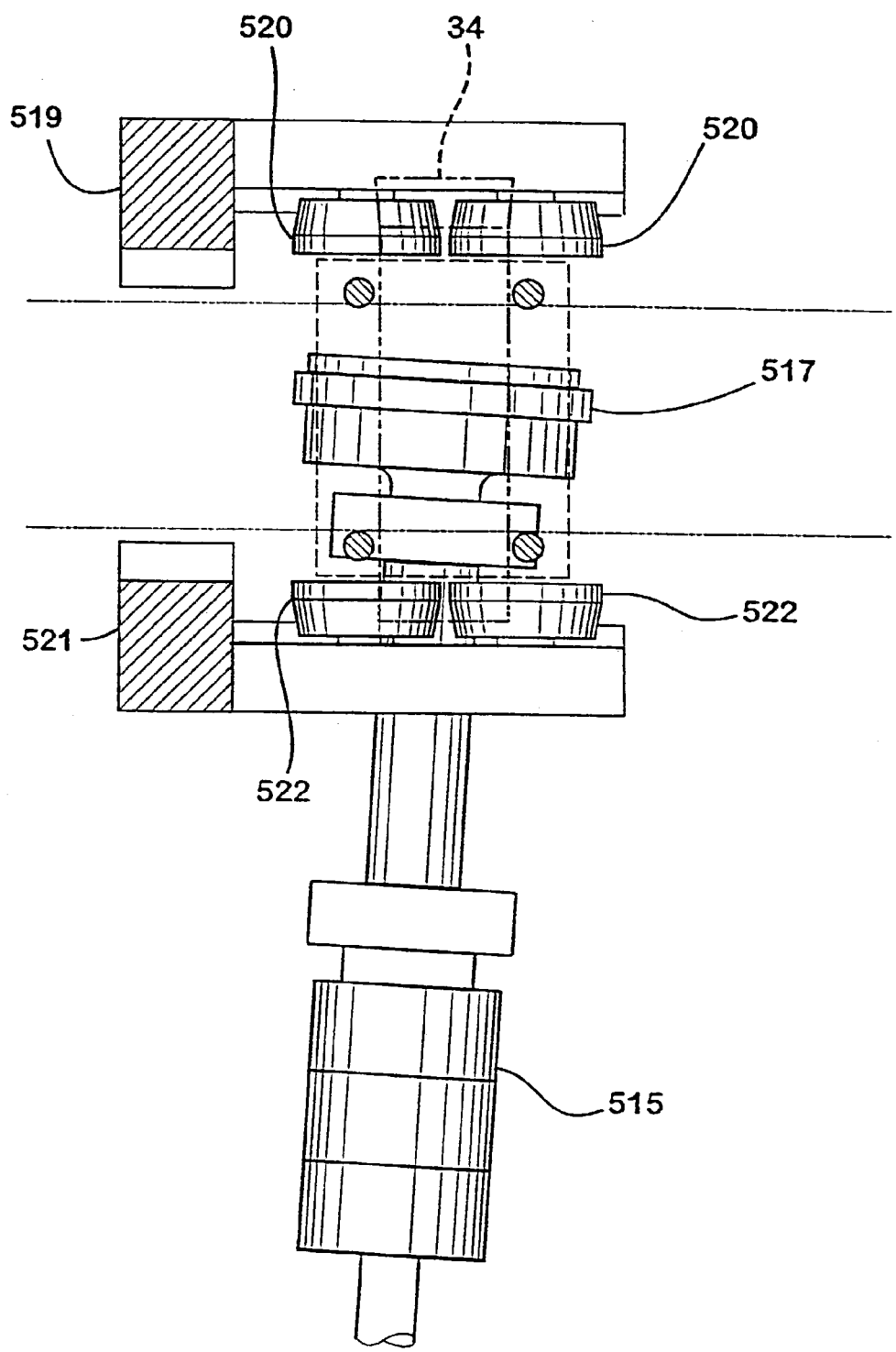
FIG. 45 is a front elevational view taken through the line XLV—XLV of FIG. 44 showing the canted drive for spinning the battery can during processing.

Referring now to FIG. 43 a second type of process module, process module 10 has a chassis 502 to which is mounted a process module controller 620 which in turn communicates with process station controller 614 of branch process station 14 and control coordinator 610 in a similar manner as process module 12. A process module controller 620 is associated with each chassis 502 and can be mounted interiorly or exteriorly of chassis 502. Chassis 502 includes a base 503 which is received in process module mount 82 on support 80 of continuous feed indexer 7. Process module 10 has a fixed application head 504 mounted to a top 506 of chassis 502. Process module 10 differs from process module 12 in that process module 10 captures can 34 and disengages can 34 from cleat 72 to position can 34 in a processing relationship with fixed head 504.

A horizontally translatable carriage 508 has an upper arm 519 and a lower arm 521 extending out of the front of process module 10 as process module 10 faces continuous feed indexer 7. Carriage 508 has upper guide sleeves 26 sleeved over upper guide rails 24 and also has lower guide sleeves 527 sleeved over lower guide rails 525 in such a manner as to permit a horizontal translation of carriage 508 along rails 526 and 525 in a precise, controlled manner. An actuator 510 is interiorly attached to the front of chassis 502 and has a connecting rod 512 extending rearwardly therefrom which is further connected to carriage 508. Process module controller 620 generates signals to activate actuator 510 to initiate operation of process module 10 during the dwell periods of the indexed motion-dwell of cans 34 and cleat 72 about continuous feed indexer 7. When an actuation signal is received by actuator 510, horizontal motion is imparted to connecting rod 512 thereby translating carriage 508 to the left as shown in FIG. 43. Upon completion of the processing by fixed application head 504, a second signal is sent to actuator 510 to impart an opposite horizontal movement of carriage 508 to disengage battery can 34 from process module 10.

As shown in FIGS. 44–47, the horizontal movement of carriage 508 in process module 10 results in a corresponding horizontal movement of upper and lower arms 519 and 521, respectively. Upper arm 519 has a pair of upper idlers 520 depending therefrom and rotatable thereon. Likewise, lower arm 521 has a pair of lower idlers 522 rotatably mounted thereon such that idlers 520 and 522 are in a vertically opposed relationship and are disposed vertically one set from the other by a distance which is slightly greater than the vertical height of cleat 72. Arms 519 and 521 are vertically positioned such that cleat 72 passes between idlers 520 and 522 in an unobstructed manner when cleats 72 and battery cans 34 are translated along continuous feed indexer 7. Process module 10 also includes a vertically oriented servomotor 516 which, through coupler 515, is drivingly connected to spin drive 518. Spin drive 518 is slightly canted with respect to the vertical.

Figure 47:
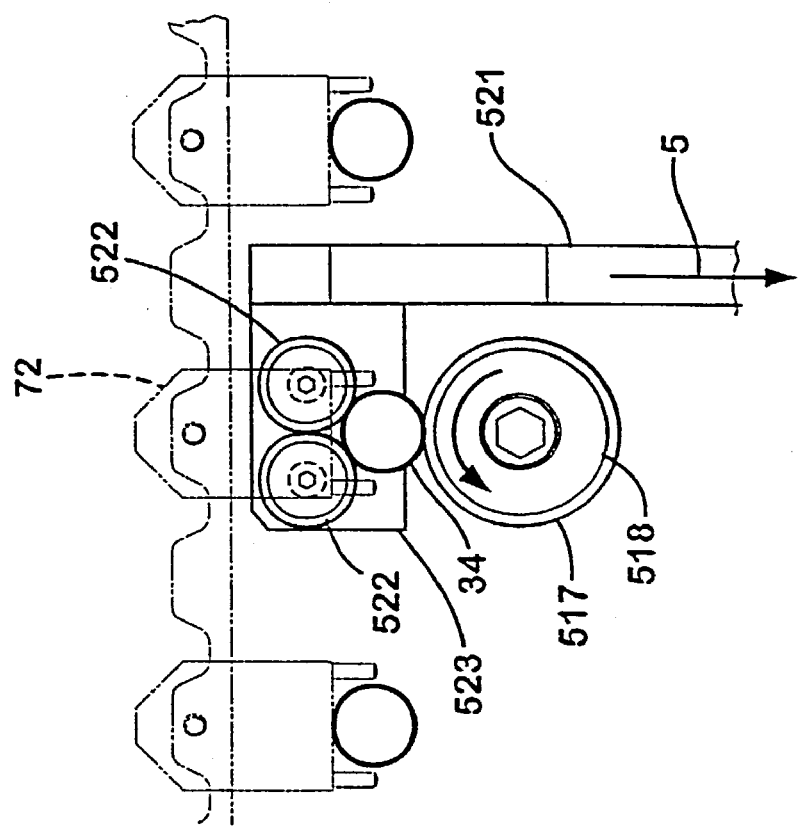
FIG. 47 is a top plan view of the battery engaging mechanism of FIG. 46 showing the mechanism having extracted the battery from a cleat and spinning the battery can for processing.
Figure 46:
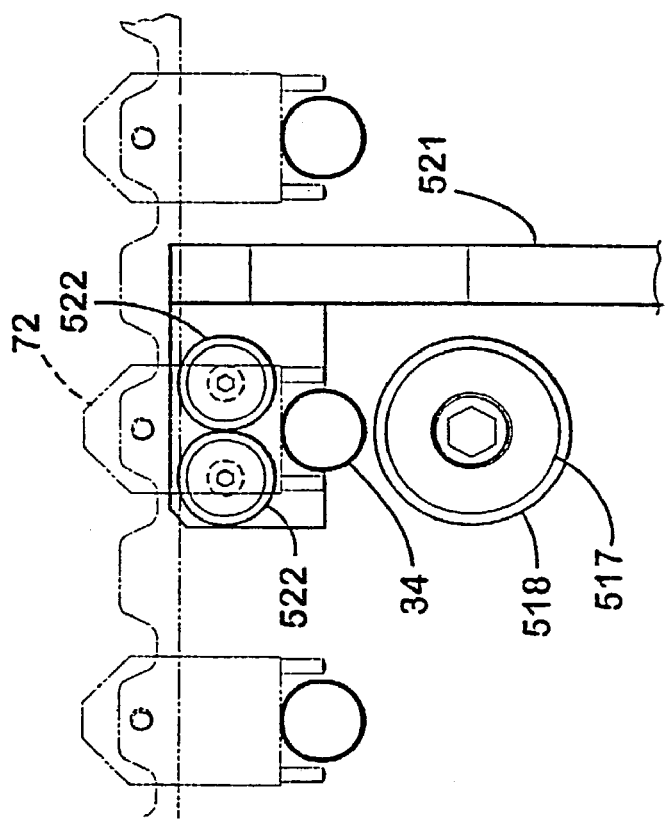
FIG. 46 is a top plan view taken along the line XLVI—XLVI of FIG. 44 showing the battery can extraction mechanism disengaged from the battery can.

As cleat 72 and battery can 34 dwell along continuous feed indexer 7, process module controller initiates the actuation of carriage 508 which translates to the left. As carriage 508 and arms 519 and 521 translate, idlers 520 and 522 contact battery can 34 and disengage can 34 from cleat 72. Can 34 nestles between laterally adjacent idlers 520 and laterally adjacent idlers 522. Idlers 520 and 522 translate sufficiently to bring can 34 into contact with driving rib 517 of spin drive 518 as shown in FIG. 47. When can 34 is fully engaged with idlers 520 and 522 and with drive rib 517 of spin drive 518, can 34 is disengaged from cleat 72; however, can 34 has not been sufficiently displaced to be removed from the magnetic field which normally retains can 34 in cleat 72. As battery can 34 contacts drive rib 517, spin drive 518 imparts a spinning motion to can 34, and as a result of spin drive 518 being canted off vertical, a slight downward force is imparted to can 34 to maintain the bottom of can 34 in contact with bottom support 523. Bottom support 523 has a single ball bearing (not shown) upon which the bottom of can 34 rests to facilitate the desired spinning of can 34 while an internal coating is applied by fixed application head 504. Upon the internal coating being applied to can 34, process module controller 620 initiates voice coil actuator 510 to translate carriage 508 to the right and thereby disengage idlers 520 and 522 from can 34. Upon disengagement from can 34, the magnetic field of cleat 72 again attracts and captures can 34 within recess 135. Upon recapturing of can 34 in recess 135, cleats 72 and cans 34 are indexed along continuous feed indexer 7 and the process is repeated with a subsequent can 34.

Process modules 10 and 12 as described above are illustrative of representative process modules and their corresponding operation with respect to and in conjunction with continuous feed indexers 7 and 15. Those skilled in the art will understand that variations and other configurations of process modules are possible for processing of other varied articles of manufacture and for performing alternative processes on battery cans during the manufacture of dry cell batteries.

Process Module Mounts

Figure 48:
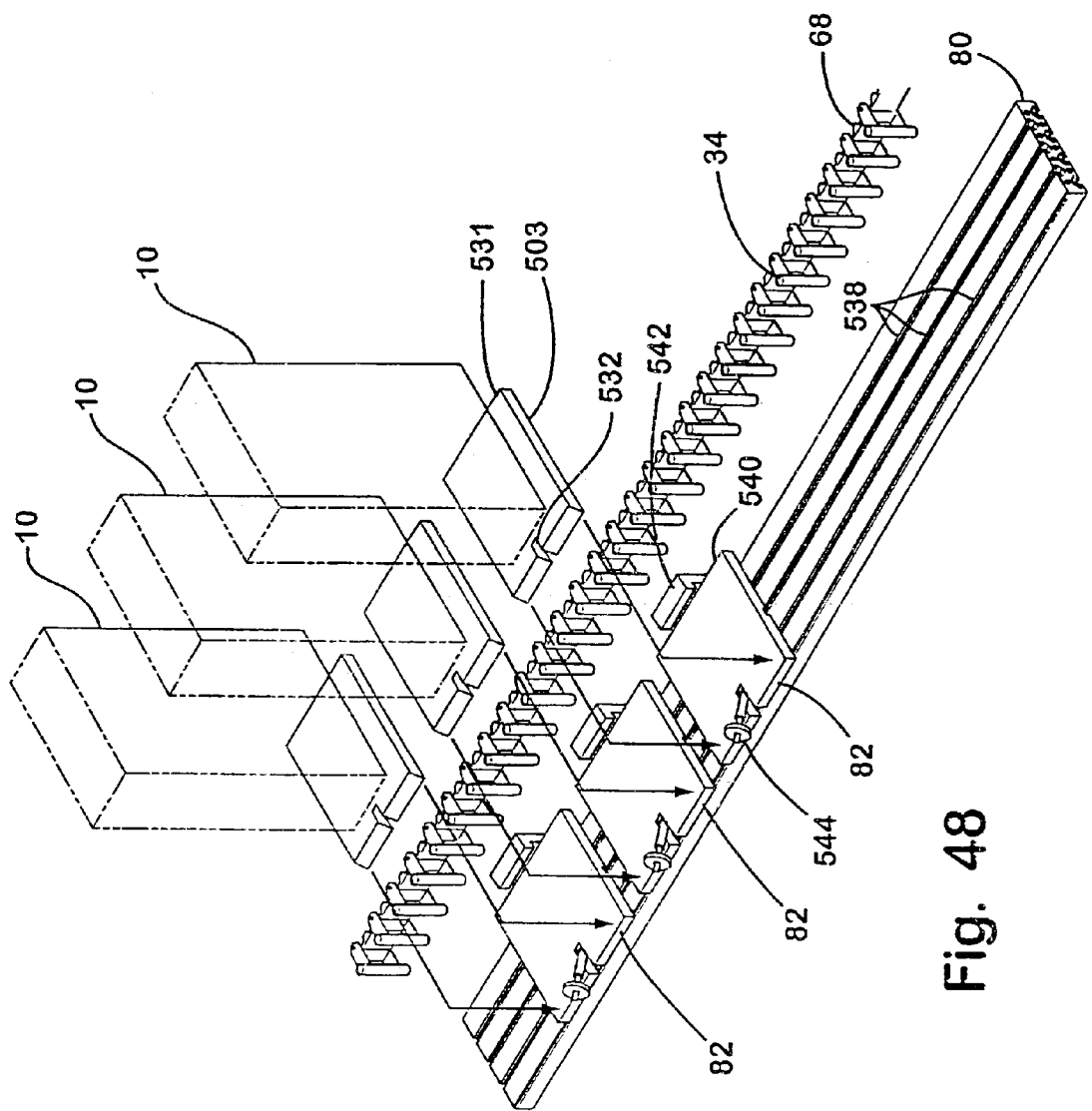
FIG. 48 is an exploded perspective view of a precision mount for mounting the process modules to a continuous feed indexer.

Referring now to FIG. 48, a process module support 80 is shown with a plurality of regularly spaced process module mounts 82 mounted thereto in relationship to indexer belt assembly 68. The lateral spacing of mounts 82 along continuous feed indexers corresponds to the number of cans to be simultaneously processed and the programmed sequence of dwell periods of belt assembly 68 to ensure that all battery cans 34 are processed. Process module mount 82 includes a mount platform 40 which is secured in slots 538 of support 80. Platform 540 has a planar upper surface for receiving base 503 of a process module such as process module 10. Platform 540 has attached to one end thereof a retainer 542 for receiving a front edge 531 of process module base 503 and platform 40 has at an opposite end thereof quick release fastener 544 which is engagable in slot 532 at a rear of process module base 503. Process module mount 82 functions to precisely locate process modules such as process module 10 with respect to its corresponding continuous feed indexer. Process module 10 and its attached application head can be positionally precalibrated off-line from the continuous feed indexer such that when process module 10 is mounted on mount 82 the application head associated therewith is repeatedly positioned with respect to battery cans 34 carried by belt assembly 68. Retainer 542 of process module mount 82 includes both lateral and longitudinal locating features thereby rendering like calibrated process modules interchangeable. Quick release fastener 544 facilitates the rapid removal and installation of process modules requiring replacement to minimize the downtime associated with a malfunctioning processing system 2.

Control System Hardware

The high speed manufacturing system 2 of the present invention employs a flexible and versatile distributed control system for monitoring and controlling the operation of the high speed manufacturing system. The distributed control system provides the functions necessary to control the high speed manufacturing system including control of the operation of the continuous motion conveyor, continuous feed indexers, transfer devices, as well as controlling the individual process modules associated with each branch processing station. In addition to controlling the various components of the high speed manufacturing system, the control system controls the routing of articles of manufacture throughout the high speed manufacturing system, monitors the manufacturing processes, tracks each article, and logs the history of each article on the manufacturing line, and is further capable of routing experimental articles to experimental process modules and tracking and logging the history of the experimental articles as well. The control system allows for experimental processing, qualification runs and other process testing to occur without taking the manufacturing line out of a normal manufacturing production operation.

Figure 49:
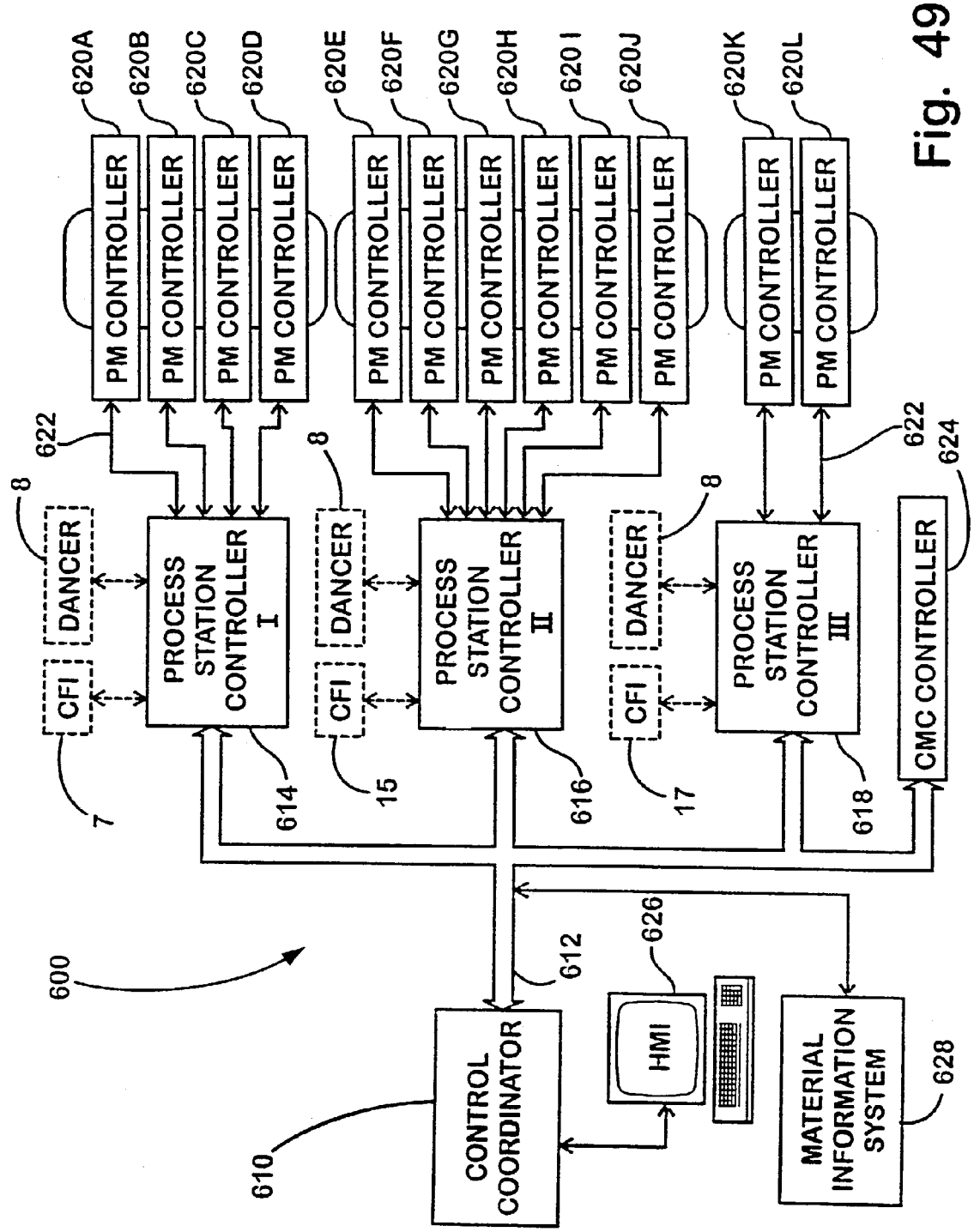
FIG. 49 is a block diagram illustrating the control system hardware architecture employed in the high speed manufacturing system of the present invention.

Referring to FIG. 49, the control system 600 for the high speed manufacturing system is generally shown made up of a distributed network of controllers for controlling the operation of the high speed manufacturing system. According to the embodiment shown and described herein, the distributed control system 600 includes a main control coordinator 610, three local process station controllers 614, 616, and 618, and a designated number of process module controllers 620A–620L, each associated with a process module. The control system 600 provides a real-time operating system and has a communication bus platform provided via ethernet communication bus 612 and bus 622 to connect the controllers in a distributed control network. Communication bus 612 may include an ethernet 10Base-T bus connected to the main control coordinator 610 and each of local process station controllers 614, 616, and 618 and the continuous motion conveyor (CMC) controller 624. Each of the process module controllers 620A–620L are connected via communication bus 622, to their designated local process station controllers 614, 616, and 618. Communication bus 622 may comprise individual communication lines which include an ethernet communication link such as an ethernet 10Base-T bus.

Each local process station controller is generally responsible for control and monitoring of the events taking place on one branch processing station of the manufacturing system. More particularly, each local process station controller communicates with, including provides control signals to and receives data information from, one or more designated process control modules, the continuous feed indexer, and the associated transfer device, all of which are preferably located on one branch processing station. Accordingly, the first process station controller 614 communicates with four designated process module controllers 620A–620D, continuous feed indexer 7, and its associated transfer device 8, all of which are present on the first branch processing station. The second process station controller 616 communicates with six designated process module controllers 620E–620J, continuous feed indexer 15, and its associated transfer device 8, all located on the second branch processing station. Finally, the third process station controller 618 communicates with two designated process module controllers 620K and 620L, as well as continuous feed indexer 17, and its associated transfer device 8, all located on the third branch processing station. While one process station controller is preferably dedicated to each branch processing station, it should be appreciated that more than one process station controller could be assigned to a given branch processing station, and one process station controller could be dedicated to serve more than one branch processing station.

The local process station controllers 614–618 are responsible for communicating with the process module controllers that are designated thereto. The process station controllers 614–618 are also responsible for controlling the associated continuous feed indexers, including control of their timing and speed for the index and dwell intermittent motion. In addition, the continuous feed indexer transmits information to the corresponding process station controller to indicate when the continuous feed indexer has completed an index or dwell operation. The transfer device 8 transmits return data information back to the corresponding process station controller regarding its operation.

In addition, the control system 600 further includes a continuous motion conveyor (CMC) controller 624 which is also connected in communication with the ethernet communication bus 612. The CMC controller 624 is a separate distributed controller that is dedicated to controlling the operation of the continuous motion conveyor(s) of the trunk. The CMC controller 624 receives control signals, such as speed control signals, from the control coordinator 610 and provides return data information regarding the operation of the continuous motion conveyor. Accordingly, the communication bus 612 allows the control coordinator 610, process station controllers 614–618, and CMC controller 624 to communicate with one another on one common distributed network.

The distributed control system 600 has communication links for allowing remote access to the ethernet communication bus 612 and control coordinator 610. It should be appreciated that communication bus 612 can be wire or wireless. Remote access is achieved by way of a human machine interface (HMI) 626 which may include a stand-alone computer connected to the control coordinator 610. The human machine interface 626 allows an operator to input command signals to the control system 600, as well as retrieve data information from the control system 600. In addition, a remote material information system (MIS) 628 is provided in communication with the ethernet communication bus 612. The material information system may include a remotely located computer connected through a communication line to the communication bus 612 to access the control system 600. For example, the material information system may include a long-distance communication link linking the communication bus 612 of control system 600 to a remotely located computer to allow remote access for inputting control signals and/or retrieving data information from control system 600. Either the human machine interface 626 or material information system 628 may be used to program the control system 600, including such operations as downloading designated software, modifying control parameters, performing experimentation, as well as handling other operations. In addition, the human machine interface 626 and material information system 628 also allow for the retrieval of the process manufacturing information that is monitored and logged by the control system 600. This may include retrieval of normal processing information, experimental processing information, article tracking information, and any other data acquired from the various controllers and sensors of the control system 600.

The main control coordinator 610 is a programmable processor based controller that coordinates and monitors the overall operation of the high speed manufacturing system. The main control coordinator 610 distributes control signals to the process station controllers 614–618 and CMC controller 624 via communication bus 612. Control signals broadcast from control coordinator 610 may include article notice messages to notify the various process station controllers 614–618 of oncoming articles of manufacture, as well as other information. The main control coordinator 610 also receives and records information received from the process station controllers 614–618 and CMC controller 624. Messages received by the control coordinator 610 may include work report messages received from each process station controller which detail the work completed on each article of manufacture, preferably following each process operation performed by the process modules.

Figure 50:
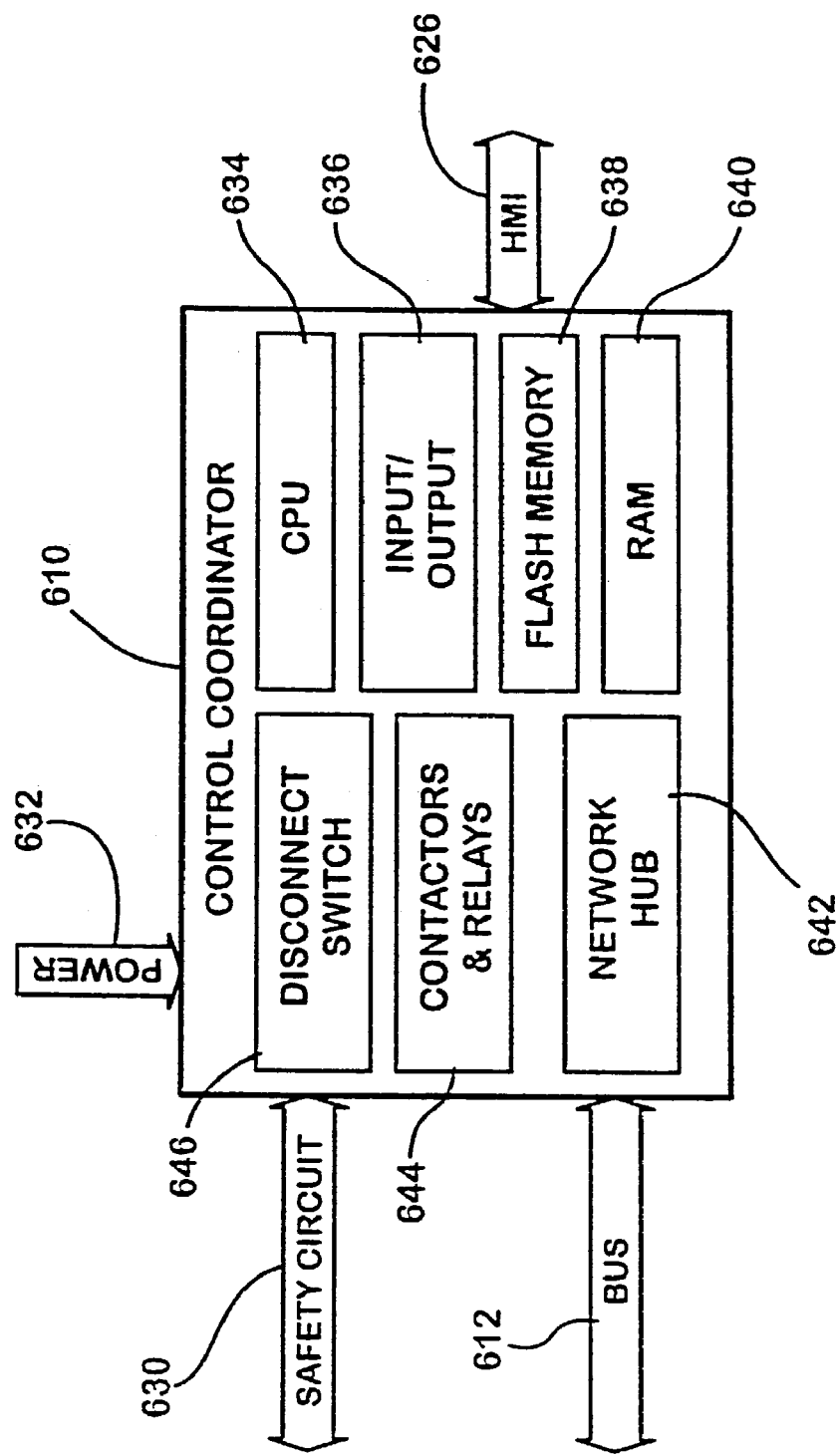
FIG. 50 is a block diagram illustrating the control coordinator of the distributed control system.

Referring to FIG. 50, the hardware configuration for one example of the main control coordinator 610 is shown therein. The control coordinator 610 includes a central processing unit (CPU) 634, an input/output port 636, flash memory 638, random access memory (RAM) 640, a network hub 642, contactors and relays 644, and a disconnect switch 646. It should be appreciated and understand that various other standard controller components may be present in the control coordinator 610 or the other controllers that are shown and described herein in connection with the control system 600. The central processing unit 634 may include a commercially available microprocessor, one example of which may include Model No. MVME 2304, made available from Motorola. The random access memory 640 and flash memory 638 are available to store program software to perform designated process control functions as well as other operating system programs, and also to store data information collected with the control system 600. The network hub 642 includes at least two 10 Base-T ethernet ports and allows communication via the ethernet communication bus 612. The contactors and relays 644 may be utilized to perform an emergency stop of the manufacturing system, while disconnect switch 646 provides a means to turn off the power supply to the control coordinator 610, which will also shutdown the control system 600. It should be appreciated that the various components of the control coordinator 610 may be assembled together on one or more boards and arranged on a VME rack.

Additionally, the control coordinator 610 is further shown in communication with a safety circuit 630 that links the control coordinator 610 to each of the process station controllers 614–618 and the CMC controller 624. The safety circuit 630 provides a separate hard-wired connection that may be utilized to disconnect the control system 600 power outputs when necessary, such as during an emergency condition. A standard power supply 632 is also provided to the control coordinator 610, and may include 480 volts AC, which is preferably transformed to a usable DC voltage of 24 volts DC or other suitable voltage level.

The local process station controllers 614, 616, and 618 are provided as local controllers to the branch processing stations and each process station controller is designated to control the operations associated with one branch processing station of the manufacturing system, including control of the continuous feed indexer, its transfer device, and the designated process modules, all of which are associated with one branch processing station. Accordingly, process station controller 614 serves as a local controller to control the processing associated with the first continuous feed indexer 7, transfer device 8, and process module controllers 620A–620D. The second process station controller 616 controls the processing performed on the second continuous feed indexer 15, its transfer device 8, and process module controllers 620E–620J. The third process station controller 618 controls the processing associated with the third continuous feed indexer 17, its transfer device 8, and process module controllers 620I and 620L. In addition, each process station controller receives data information, such as work progress reports, from its designated process module controllers, transfer device and continuous feed indexer.

Figure 51:
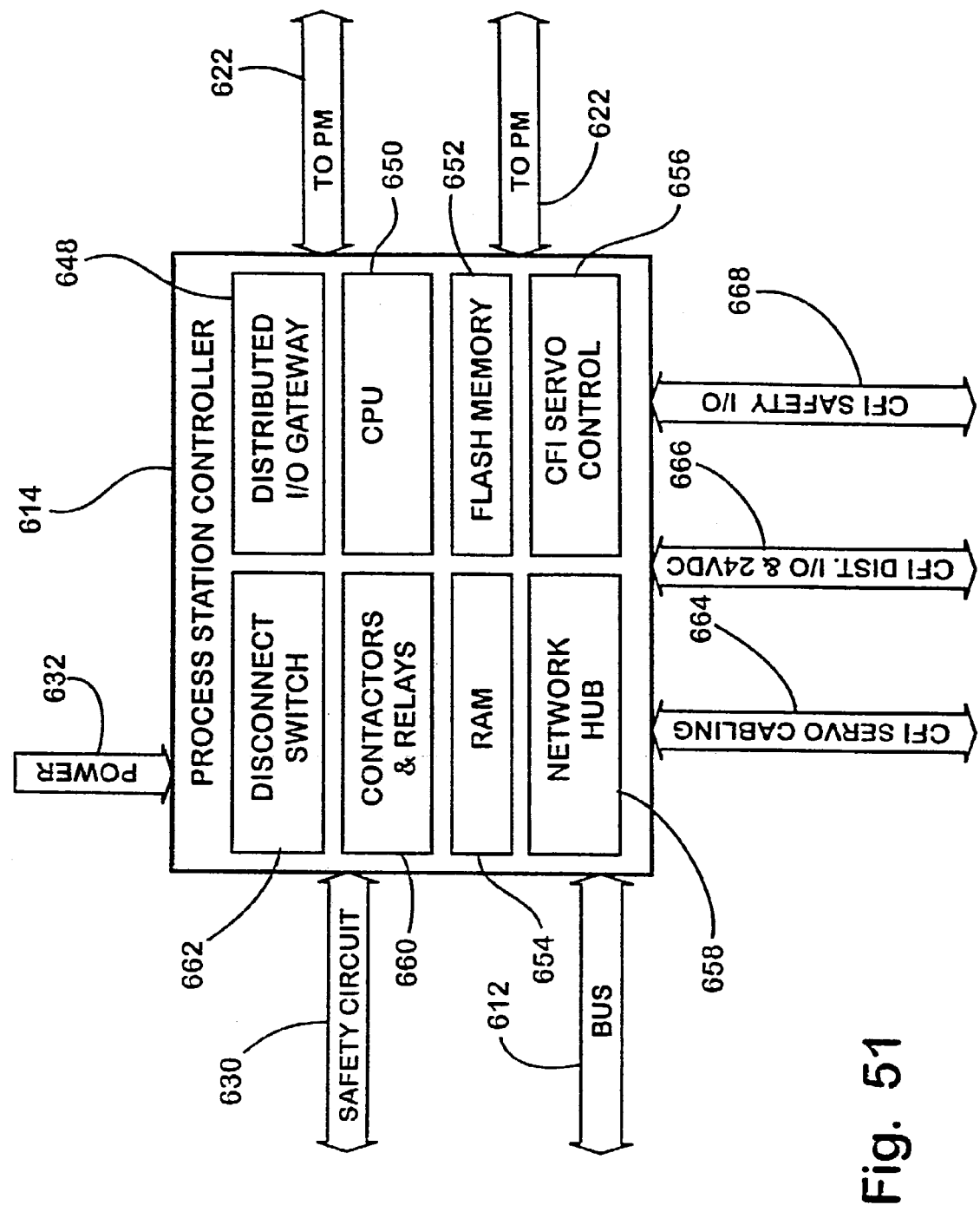
FIG. 51 is a block diagram illustrating the local process station controller of the distributed control system.

One example of a hardware configuration for the local process station controller 614 is shown in FIG. 51. The process station controller 614 hardware includes a distributed input/output gateway 648, a central processing unit (CPU) 650, flash memory 652, random access memory (RAM) 654, and a continuous feed indexer (CFI) servo control 656. In addition, the process station controller 614 has a network hub 858, contactors and relays 660 and a disconnect switch 662. The central processing unit 650 may include a commercially available microprocessor, one example of which may include Model No. MVME 2023, made available from Motorola. The flash memory 652 and RAM 654 allow for storing of programmed software and data storage. The CFI servo control 656 provides an amplified servo control signal to the CFI's servomotor to control operation of the continuous feed indexer. Network hub 658 includes at least one ethernet port and allows for networked communication connections to bus 612, as well as communication connections to bus 622. The contactors and relays 660 allow for shutdown of the system during an emergency condition, while disconnect switch 662 allows for power disconnect from the process station controller 614 to thereby shutdown the control system 600. The safety circuit 630 is shown connected to the process station controller 614 to provide a hard-wired connection that may be used to shutdown the control system 600 in case of an emergency shutdown condition. A standard power supply 632 is also provided to the process station controller 614, and may include 480 volts AC, which is preferably transformed to a usable DC voltage of 24 volts DC or other suitable voltage level.

The process station controller 614 is further shown having connections to the continuous feed indexer via lines 664, 666, and 668. The CFI servo cabling line 664 allows for servo cabling to the continuous feed indexer to transmit drive signals to drive the servomotor associated with the continuous feed indexer. CFI Distributed I/O+24 V DC line 666 provides two-way communication, such as sensor and actuation signals, and power to the continuous feed indexer. CFI Safety I/O line 668 provides a hard-wired safety circuit connection to the continuous feed indexer to shutdown the system in case of an emergency shutdown condition. The process station controller 614 is further shown in communication with process module controllers via communication bus 622. It should be evident that the other local process station controllers 616 and 618 may be configured identical or similar to controller 614 as described above. Each local process station controller is preferably delegated the responsibility for initiating the process steps performed by the process modules associated therewith, as well as controlling the motion of the corresponding continuous feed indexer.

Each of the process module controllers 620A–620L are provided for controlling and performing the physical processes that are to be performed by the associated process modules. For a battery manufacturing process application, such physical processes may include inputting cells on the continuous feed indexer, outputting cells off the continuous feed indexer, applying sealant to the battery can, inserting separators, inserting KOH, inserting anode gel, inserting collectors, crimping and closing cells, and disposing of defective cells. It should be appreciated that the process module controllers are preferably software driven and are programmed such that each process module controller drives one or more servo controlled motors to perform one or more designated processing operations.

Figure 52:
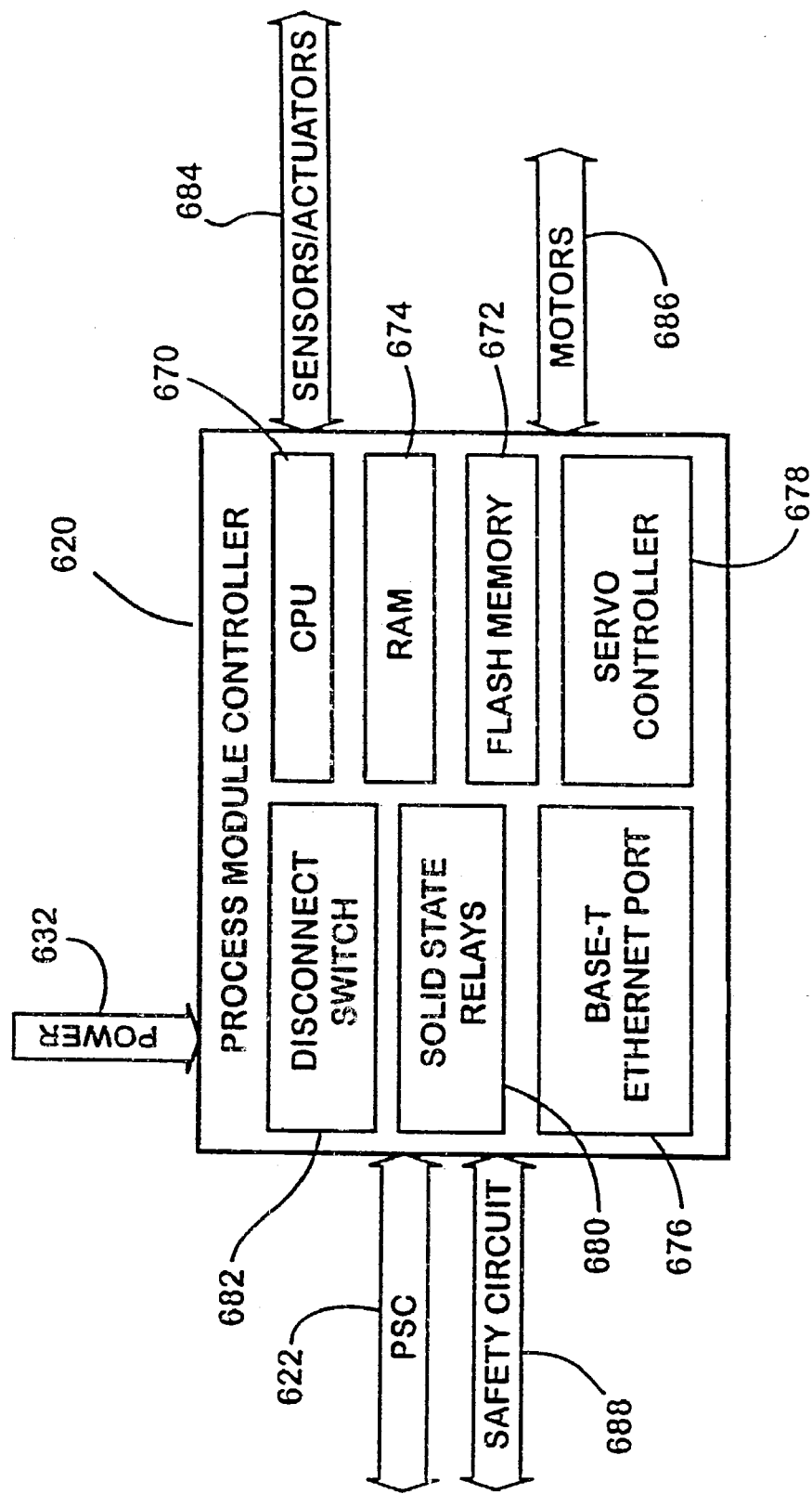
FIG. 52 is a block diagram illustrating the process module controller of the distributed control system.

One example of a process module controller 620 is shown in FIG. 52, which is representative of the hardware configured for any of process module controllers 620A–620L. The process module controller 620 includes a central processing unit (CPU) 670, flash memory 672, random access memory (RAM) 674, a servo controller 678, and a Base-T ethernet port 676. The central processing unit 670 may include a commercially available microprocessor, examples of which may include Model No. Pentium, made available from Intel Corporation, and Model No. Power PC 604E made available from Motorola. Flash memory 672 and RAM 674 store designated program software and data information, while the servo controller 678 generates servo control signals to drive one or more actuators or motors, each of which is configured to perform a designated processing operation in conjunction with the process module associated therewith. The Base-T ethernet port 676 allows communication with the corresponding process station controller via the ethernet connection bus 622. In addition, solid state relays 680 and a disconnect switch 682 are provided on the process module controller 620 to allow for shutdown of the system. The process module controller 620 is connected in communication with the corresponding process station controller to which it is assigned by way of the ethernet communication bus 622, as well as the safety circuit 688 which is a hard-wired line that allows for emergency shutdown of the system. The process module controller 620 further communicates with sensors and actuators on line 684 to receive sensed data and initiate actuation of certain devices. Further, the process module controller 620 communicates via the servo controller 678 with the designated motors associated with the process module.

Figure 53:
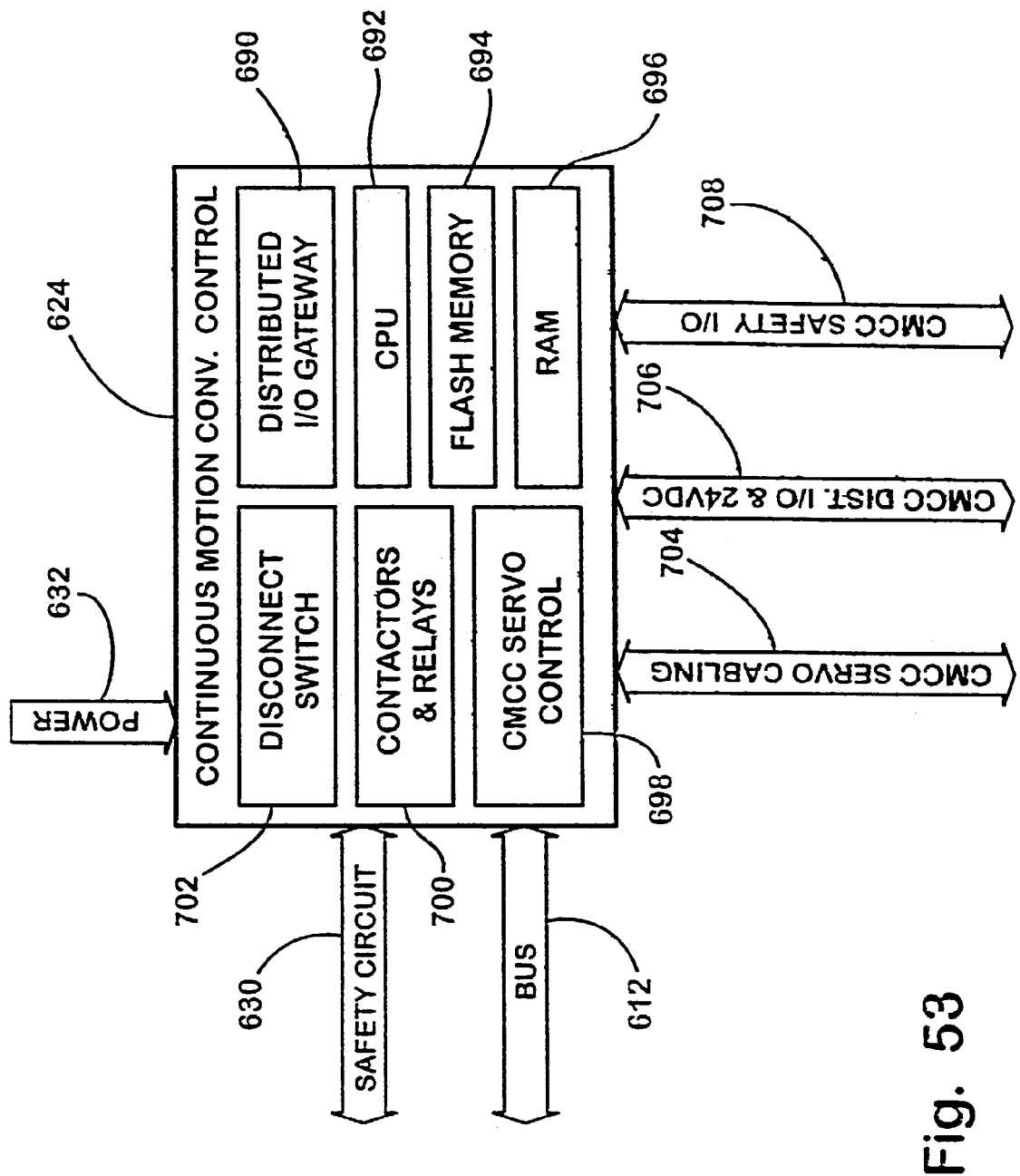
FIG. 53 is a block diagram illustrating the continuous motion conveyor controller of the distributed control system.

The continuous motion conveyor controller 624 is shown in FIG. 53 according to one example. Continuous motion conveyor controller 624 includes a distributed input/output gateway 690, a central processing unit (CPU) 692, flash memory 694, random access memory (RAM) 696, and a CMCC servo control 698. The central processing unit 692 may include a commercially available microprocessor, one example of which may include Model No. MVME 2023, made available from Motorola. Flash memory 694 and RAM 696 are available to store designated software programs as well as data information. The CMCC servo control 698 provides servo control signals to control the actuation and speed of the drive motor 288 which drives the continuous motion conveyor 18. In addition, contactors and relays 700 and a disconnect switch 702 are provided on the continuous motion conveyor controller 624 to allow for shutdown of the system during an emergency shutdown condition.

The continuous motion conveyor controller 624 communicates with the ethernet communication bus 612 as well as the hard-wired safety circuit 630. In addition, the continuous motion conveyor controller 624 has three lines 704, 706, and 708 connected to the continuous motion conveyor. Included is a CMCC servo cabling line 704 which allows servo control signals to be transmitted to the drive motor 288 associated with the continuous motion conveyor 18. CMCC Distributed I/O+24 V DC line 706 allows for two-way communication of sensor and actuator signals, as well as power signals to the continuous motion conveyor. CMCC Safety I/O line 708 provides a safety circuit connection to the continuous motion conveyor to allow for shutdown of the continuous motion conveyor during an emergency shutdown condition.

It should be appreciated that the process module controllers 620A–620L are controlled by software defined process module agents as is explained herein. According to one embodiment, the process module agents may be included with and processed by the local process station controller designated to controlling the associated branch processing station on which the corresponding process module operates. According to a second embodiment, the process module agents may be programmed into and processed by the individual process module controllers 620A–620L associated with the corresponding process module. In any event, the process module agent for controlling a specified process operation can be distributed amongst the available controllers by storing and processing the agents software in either the local process module controller associated with a particular process module or the process station controller designated to that process module.

Control System Operation

The distributed control system 600 is software-based and preferably uses an object-oriented software operating control system. According to one example, C++ object oriented programming may be employed. The use of object-oriented software programming for the control system 600 facilitates maintenance and reuse of the high speed manufacturing system. The object-oriented software identifies the physical and conceptual objects of the system and represents such objects as software agents. In addition, responsibilities, attributes, and services are assigned to principle classes. The control software is responsible for checking and configuring the control system, initiating operation of the system and monitoring the status of the system, transporting articles of manufacture to and between process stations by way of the continuous motion conveyor, transfer device, and the continuous feed indexers, and managing the global conveyor system to maximize article throughput and minimize transfer device-limit failures. In addition, the control system 600 notifies the process stations about the status of oncoming articles, actuates the process stations according to the programmed work specifications, the article status, and the conveyor status, and records information about the processing of each article of manufacture. Further, the control software effects shutdown of the control system when required, handles subsystem failures either by restoring the subsystem, replacing it, or shutting down the overall system, and resuming operation after either controlled or uncontrolled shutdowns, and provides an operating interface that supports the system operation and any problem diagnosis/resolution.

The physical objects of the system to which the control software is assigned agents include the control coordinator, the process stations, the process modules, the continuous motion conveyor, the continuous feed indexers, and the safety system. For each of these objects, which are controlled and/or monitored by the control software, object agents are defined to encapsulate their associated data and behavior and their responsibilities are specifically allocated. According to one embodiment, the main control coordinator agent is allocated the responsibilities of checking and configuring the system, initiating system operation and monitoring system status, managing the global conveyor system to maximize article throughput and minimize transfer device-limit values, notifying process stations about the status of oncoming articles, recording information about the processing of each article, effecting control system shutdown when required, handling subsystem failures either by restoring the subsystem, replacing it, or shutting down the overall system, and resuming operation after either controlled or uncontrolled shutdown. Some of these responsibilities involve checking, configuring, starting, interrogating, adjusting, and stopping subsystems such as the continuous feed indexers, continuous motion conveyor, and process stations. The main control coordinator agent delegates these responsibilities to the subsystems controlling agents that are associated with the continuous feed indexers, continuous motion conveyor, and processing station agents. Accordingly, the control coordinator 610 is responsible for the supervisory control of the entire control system.

The control system 600 also includes a process station agent corresponding to each physical process station on the high speed manufacturing system. The process station agent is responsible for instructing the corresponding process station to process articles of manufacture according to their work specification and status. There may exist separate process station agents assigned to initiate each step of the manufacturing process carried out by a corresponding process module. For the battery manufacturing application, there may be separate process station agents for initiating actuation of the inputting of cells, outputting cells, applying sealant, inserting separators, inserting KOH, inserting anode gel, inserting collectors, crimping and closing cells, and disposing of defective cells, as well as other operations.

The control system 600 further includes a process module agent corresponding to each physical process module on the high speed manufacturing system. The process module agent is responsible for controlling a designated process module to implement the specific individual steps to perform the designated operation dedicated to that particular process module. The process module agent may be viewed as a software routine which instructs the process module to perform a specified function according to the programmed routine. The process module agent further monitors the operation of the corresponding process module and sends monitored data in a work report to the process station agent assigned thereto.

The main control coordinator agent interacts with each of the process station agents, and each of the process station agents interacts with each of the process module agents that are assigned thereto. During normal manufacturing operation, the main control coordinator agent sends article notice messages to the process station agents to notify the process station agents of the oncoming articles of manufacture. A process station normally will not process the article of manufacture unless the process station agent which controls a particular process module has received an article notice message indicating that it should do so and the continuous feed indexer has returned a report that it is in proper position. In response, the process station agent notifies the designated process module agent to initiate its programmed process operation. Once the process module has completed its intended operation, the process module agent issues a work report message which is sent to the process station agent. The process station agent then broadcasts the work report message to other process stations as well as to the control coordinator 610. The control coordinator 610 preferably monitors and records each work report message for each article of manufacture. The work report messages issued by the process station agents may include information describing the results of processing individual articles of manufacture, and may indicate whether the processing operation was successful or not, may contain test results or other measurements, may report experimental processing information, and may include cell processing history data. These work report messages are sent to the control coordinator, in support of its notification and record-keeping responsibilities.

Figure 54:
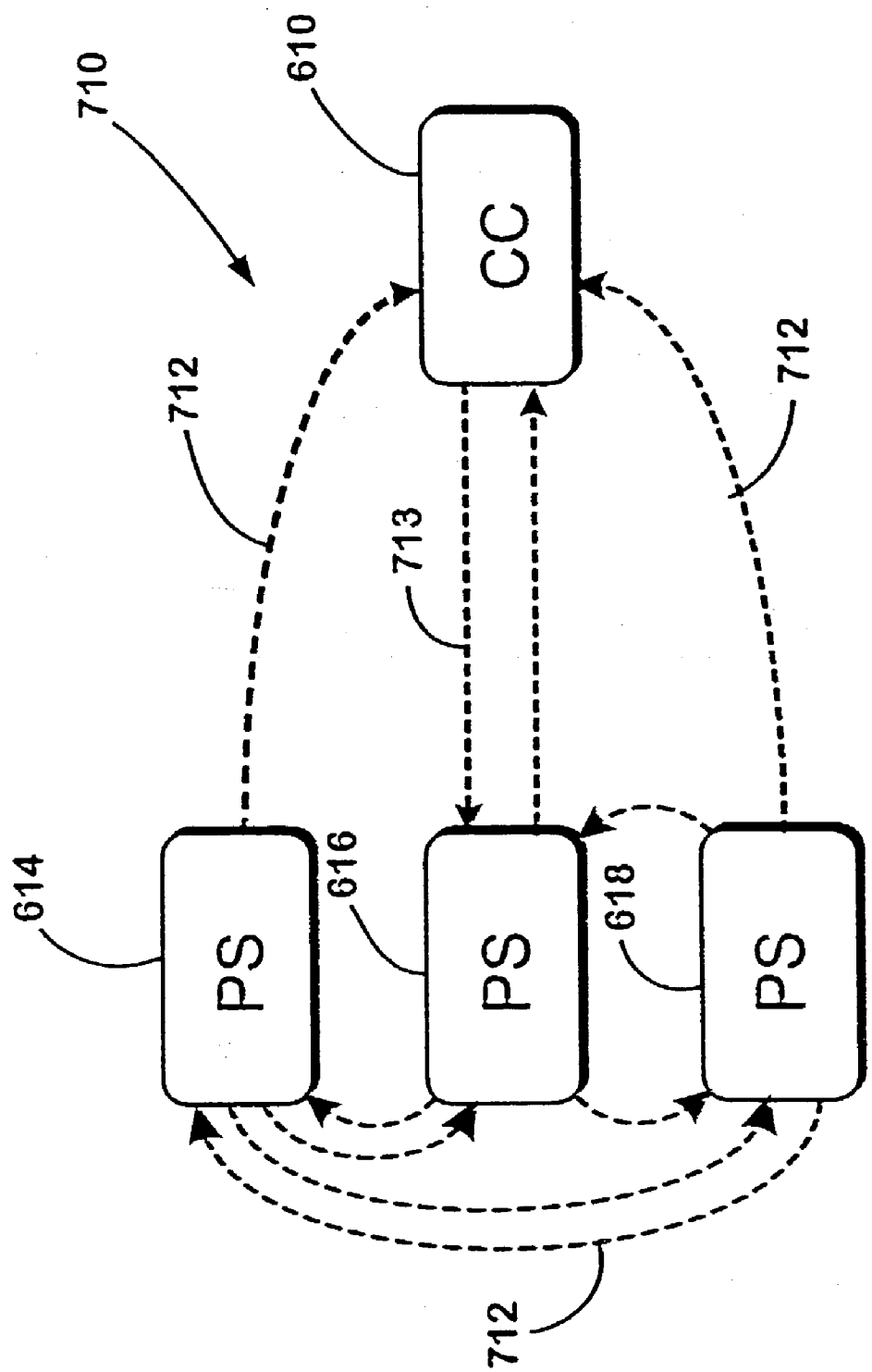
FIG. 54 is an illustration of a broadcast protocol for communicating notices and reports in the distributed control system according to a first embodiment.

To communicate article notice messages and work report messages, the control system 600 of the present invention preferably uses a protocol for communicating such information. Referring to FIG. 54, one embodiment of a protocol that could be employed is shown and is identified as a broadcast protocol 710 in which the process station 614 agent broadcasts work report messages, as shown by dashed lines 712, to the other process stations 616 and 618 agents as well as to the control coordinator 610 agent. A process station agent receiving a work report message 712 examines the information to determine whether to process the article of manufacture that it refers to. The process station agent will generally process the article of manufacture if the work report message 712 was issued by the process station agent controlling the process station that precedes its own and if the article was processed successfully. The control coordinator 610 agent initiates processing of an article by broadcasting a dummy work report message 713 for itself, and simply records the work report messages 712 that it receives. The advantage of the broadcast protocol 710 is that activating or deactivating a process station does not entail opening or closing of network connections.

Figure 55:
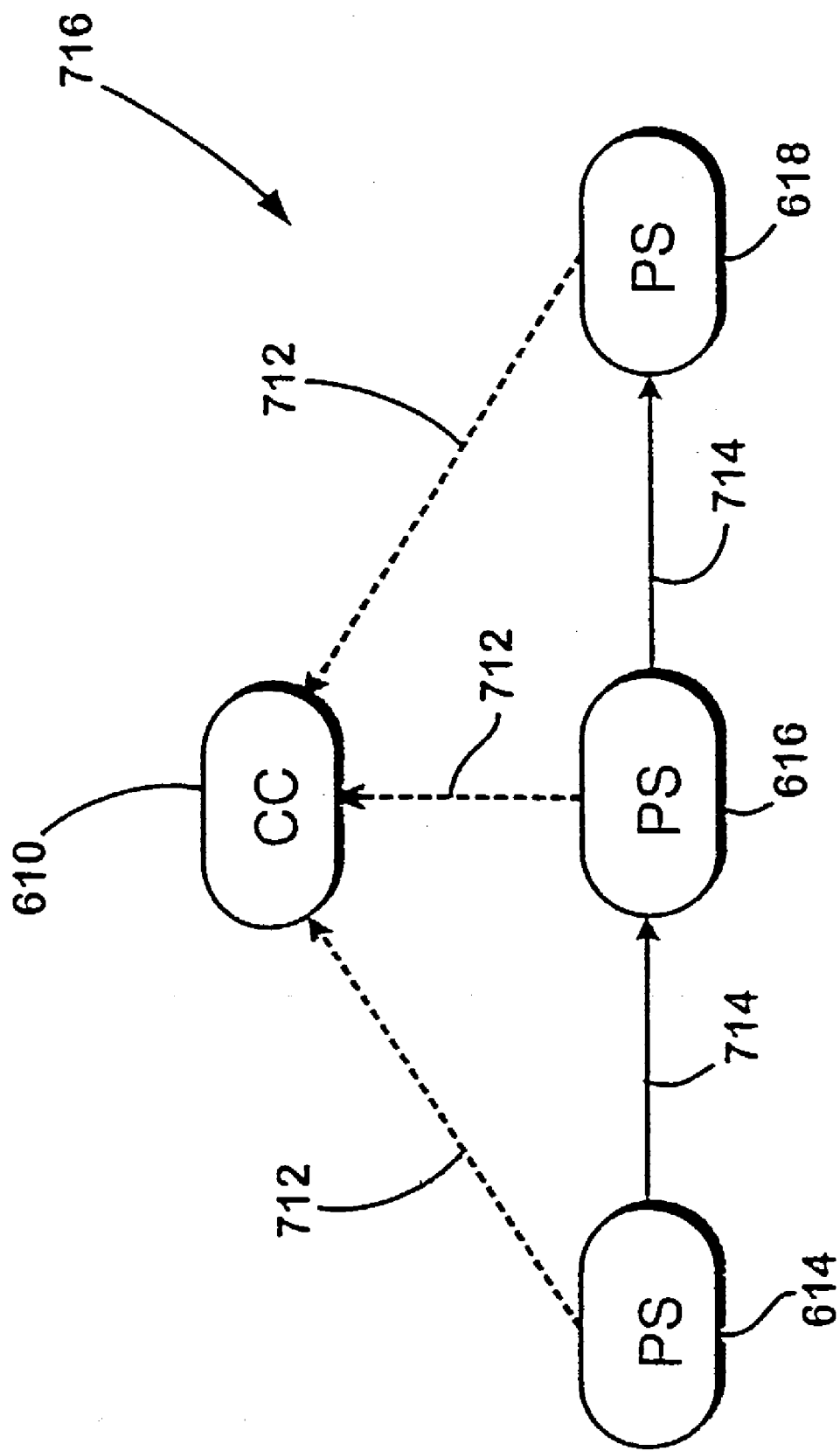
FIG. 55 is an illustration of a process station-chain protocol for communicating notices and reports in the distributed control system according to a second embodiment.

Referring to FIG. 55, a second embodiment of a protocol referred to as the process station-chain protocol 716 is shown in which each processing station determines whether an article of manufacture should be processed further or rejected, and the process station agent sends an article notice message 714 directly to the appropriate process station or disposal station, without the intervention of the control coordinator 610. In doing so, the process station agents send copies of their work report messages 712 to the control coordinator 610 agent for recording. By distributing responsibility for article-routing, the process station-chain protocol 716 reduces the workload of the control coordinator 610 and reduces network traffic.

Figure 56:
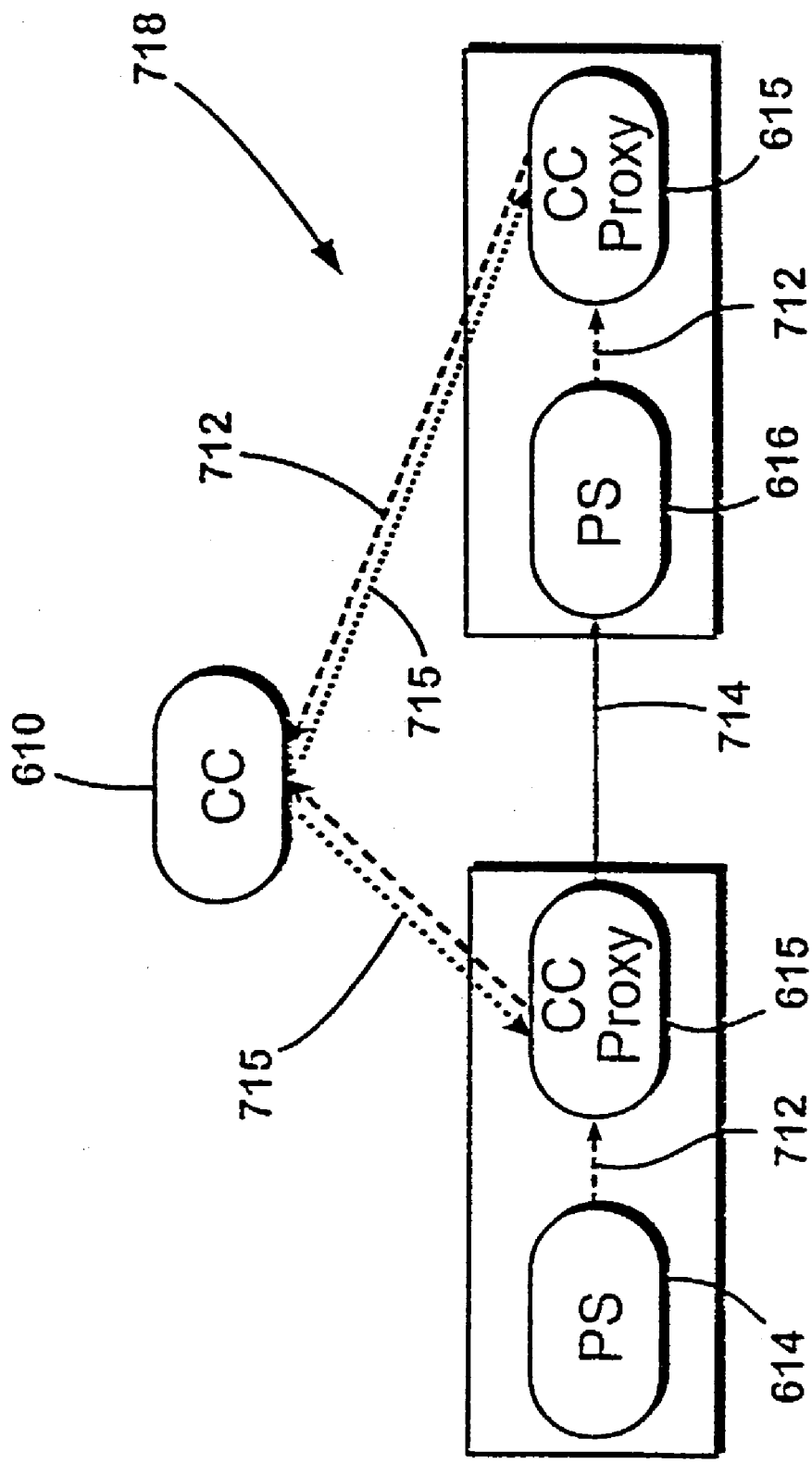
FIG. 56 is an illustration of a hybrid protocol for communicating notices and reports in the distributed control system according to a third embodiment.

A third embodiment of a protocol is shown in FIG. 56 and is referred to as the hybrid protocol 718 in which each process station agent, such as process station 614 agent, sends its work report message 712 for an article of manufacture to a local control coordinator proxy 815. The local control coordinator proxy 815 determines which process station should process the article of manufacture next and issues an article notice message 714 to the corresponding process station 616 agent. In addition, the real control coordinator 610 issues an itinerary message 715 to each process station. The control coordinator proxy 615 does not have to communicate with the real control coordinator 610 throughout each article of manufacture, although the real coordinator 610 informs the control coordinator proxy 615 of changes in the itinerary 715 for articles of manufacture. Thus, the hybrid protocol 718 reduces the workload on the real coordinator 610 but at the same time removes knowledge of the line configuration from the process station agents.

Figure 57:
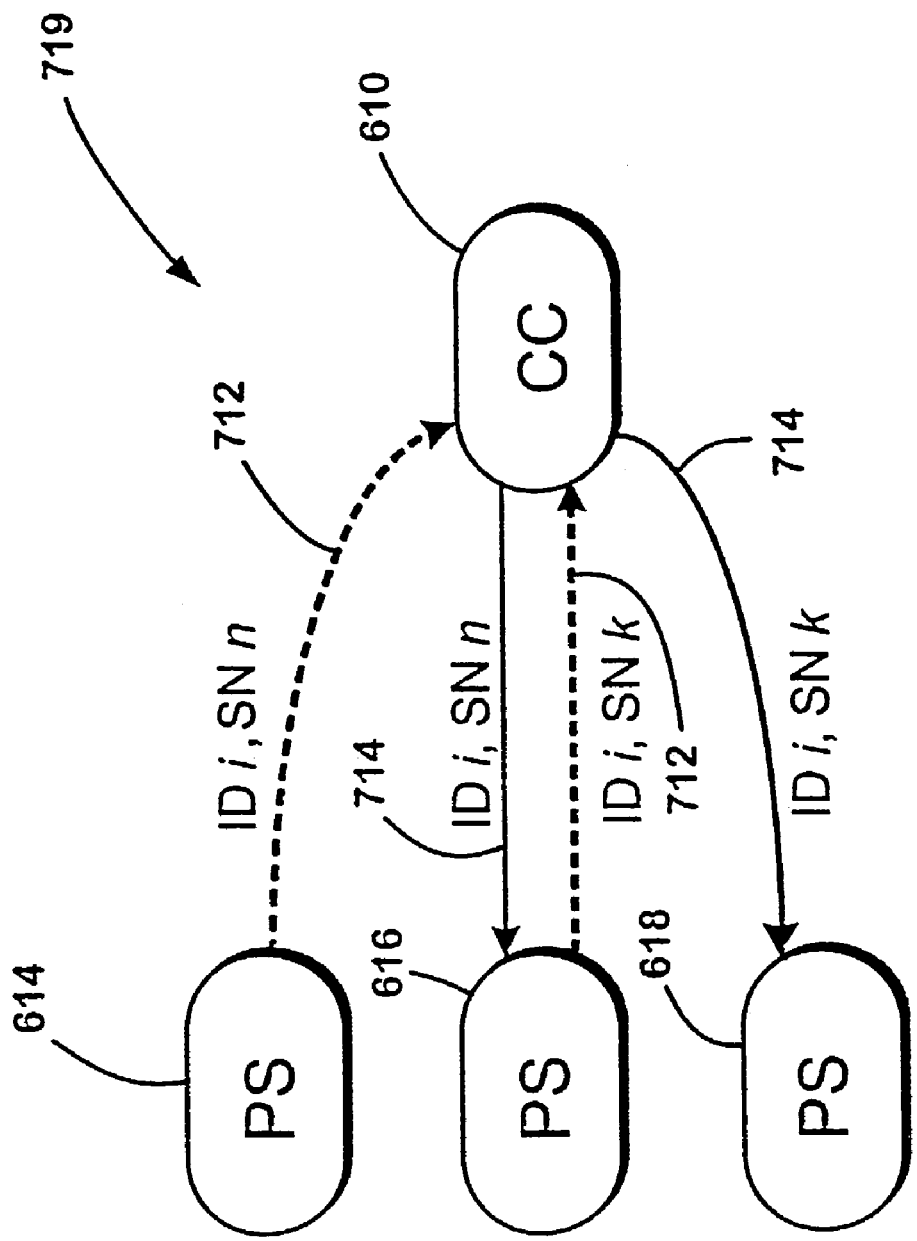
FIG. 57 is an illustration of a centralized protocol with cell identification for communication in the distributed control system according to a fourth embodiment.

A fourth embodiment of a protocol is shown in FIG. 57 and is referred to as the centralized protocol 719, which may or may not have article identification. According to the centralized protocol 719 embodiment, each process station agent sends work report messages 712 to the control coordinator 610. The control coordinator 610 examines the work report messages 712 to determine which process stations should handle the corresponding articles of manufacture next, and then directs appropriate article notice messages 714 to the process station agents associated with those process stations. The control coordinator 610 also records the work report messages 712 that are received.

In addition, an article identification scheme may be used in the centralized protocol 719 for tracking articles of manufacture on the manufacturing system line by assigning to each article a sequence number corresponding to its position in the article stream, and to use this number as an article identifier throughout the article's processing. Accordingly, a process station agent can identify arriving articles by keeping a count of the transport cleats that have passed the process station and adding the transport cleat offset to the count. Of course, this scheme requires that the order of articles on the line be preserved, or any reordering of the articles be accounted for. As long as the reordering is deterministic, it can be accommodated by using two numbers to track an article; namely, a sequence number (SN) and an article identifier (ID). These numbers are included in the article notice and work report messages. The control coordinator 610 assigns each article an article identification number upon its entry to the manufacturing system and this identification does not change during the article's processing, even if any reordering occurs. Any reordering would be accounted for by the control coordinator 610 and tracked as necessary to account for the position of each article of manufacture.

For each continuous feed indexer on the manufacturing system, there preferably exists a continuous feed indexer agent which is responsible for controlling the continuous feed indexer and its associated transfer device. The continuous feed indexer agent also interacts with the control coordinator 610 when the system is configured, started, or stopped, when a failure occurs, and when the control coordinator 610 requests its status. In addition, the continuous feed indexer agent monitors the condition of the continuous feed indexer and informs the control coordinator 610 of malfunctions, supports the control coordinator's responsibility to manage the global conveyor system, and synchronizes the operation of the continuous feed indexer and associated process stations by interacting with the process station agents.

A continuous motion conveyor agent is also provided for controlling the continuous motion conveyor. The continuous motion conveyor agent is responsible for interacting with the control coordinator 610 when the system is configured, started, or stopped, when a failure occurs, and when the control coordinator 610 requests its status. In addition, the continuous motion conveyor agent monitors the health of the continuous motion conveyor and informs the control coordinator 610 of any malfunctions, and supports the control coordinator's responsibility to manage the global conveyor system.

With the control coordinator agent and process station agents being physically distributed, remote proxies 615, such as shown in FIG. 56, may be employed. A remote proxy is a local stand-in for a remote server and provides a server interface in place of the real controller. The remote proxy 615 may be used to encapsulate the details of network communication and to make distribution of agents transparent to other controllers. It should be appreciated that each networked controller may include a remote proxy that is representative of another controller with which that controller is to communicate. This allows for interaction between controller agents as though they were residing on the same processing unit, even though the controllers are distributed. Alternately, it should be understood that communication between the distributed controllers could be achieved using message queues which are well-known in the art. It should also be appreciated that the software agents may run on one or more processing units, with little configuration required.

Figure 58:
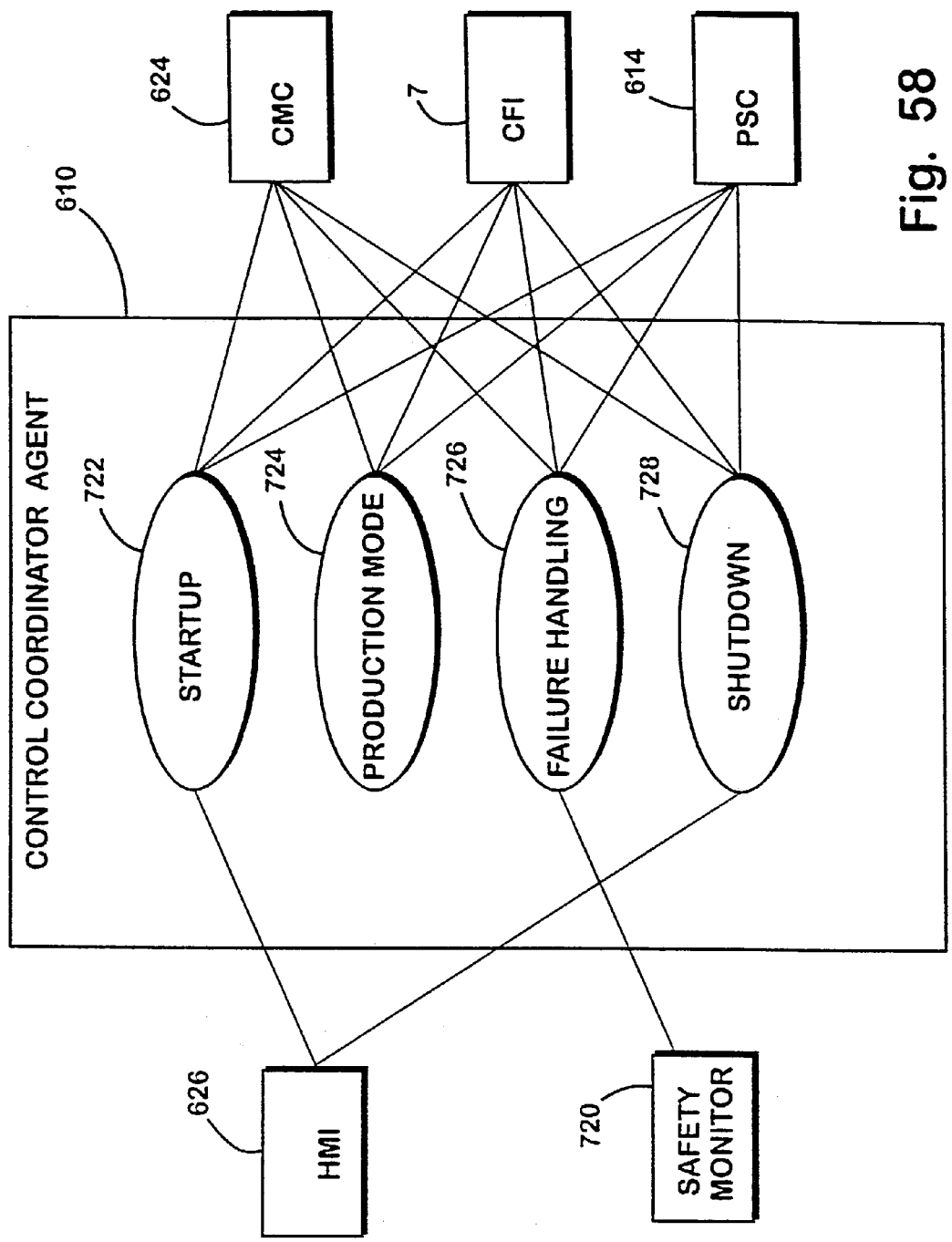
FIG. 58 is a block diagram illustrating operational modes of the control coordinator and handling tasks associated therewith.

Referring to FIG. 58, the primary operations of the control coordinator 610 agent are shown with interaction to other agents. The primary operations include startup 722, normal production mode 724, failure handling 726, and shutdown 728. During the startup operation 722, the control coordinator 610 agent receives a startup command from the human machine interface 626 and, in response, configures and initializes the various agents and data stores. This includes initializing the system data bases with information on the physical layout of the system and article itinerary. The control coordinator 610 agent is also responsible for initiating each of the continuous motion conveyor controller 624, the continuous feed indexer 7, and the process station controllers 614–618 to configure themselves through the configuration store based on the physical layout of the system.

Once the startup operation 722 is complete, the control coordinator 610 agent may begin the normal production mode operation 724 to execute the processing operations for manufacturing articles of manufacture. During normal production mode 724, the control coordinator 610 coordinates the manufacture processing operation which includes notifying each process station controller of the presence, identification, and status of articles of manufacture that are approaching the branch processing station corresponding to that process station controller, as well as recording the results of processing each article of manufacture. The control coordinator 610 also communicates with the continuous motion conveyor controller 624, as well as the continuous feed indexer 7, preferably via the corresponding process station controller.

With the failure handling operation 726, a safety monitor 720 monitors the various controllers and reports any problems to the control coordinator 610. The control coordinator 610 can evaluate and attempt to correct or adjust manufacture operations when a failure has occurred, and may initiate shutdown of the system if necessary. The human machine interface 626 may initiate a shutdown operation 728 in which the control coordinator 610 instructs the controllers to undergo a software shutdown. With a software shutdown operation 712, the control system stores the position, identification, and processing information for each article of manufacture on the manufacturing system so that processing of these articles may continue where it left off when the system is started back up. This allows for continued manufacture of partially processed articles, which reduces article waste and shutdown time.

Figure 59:
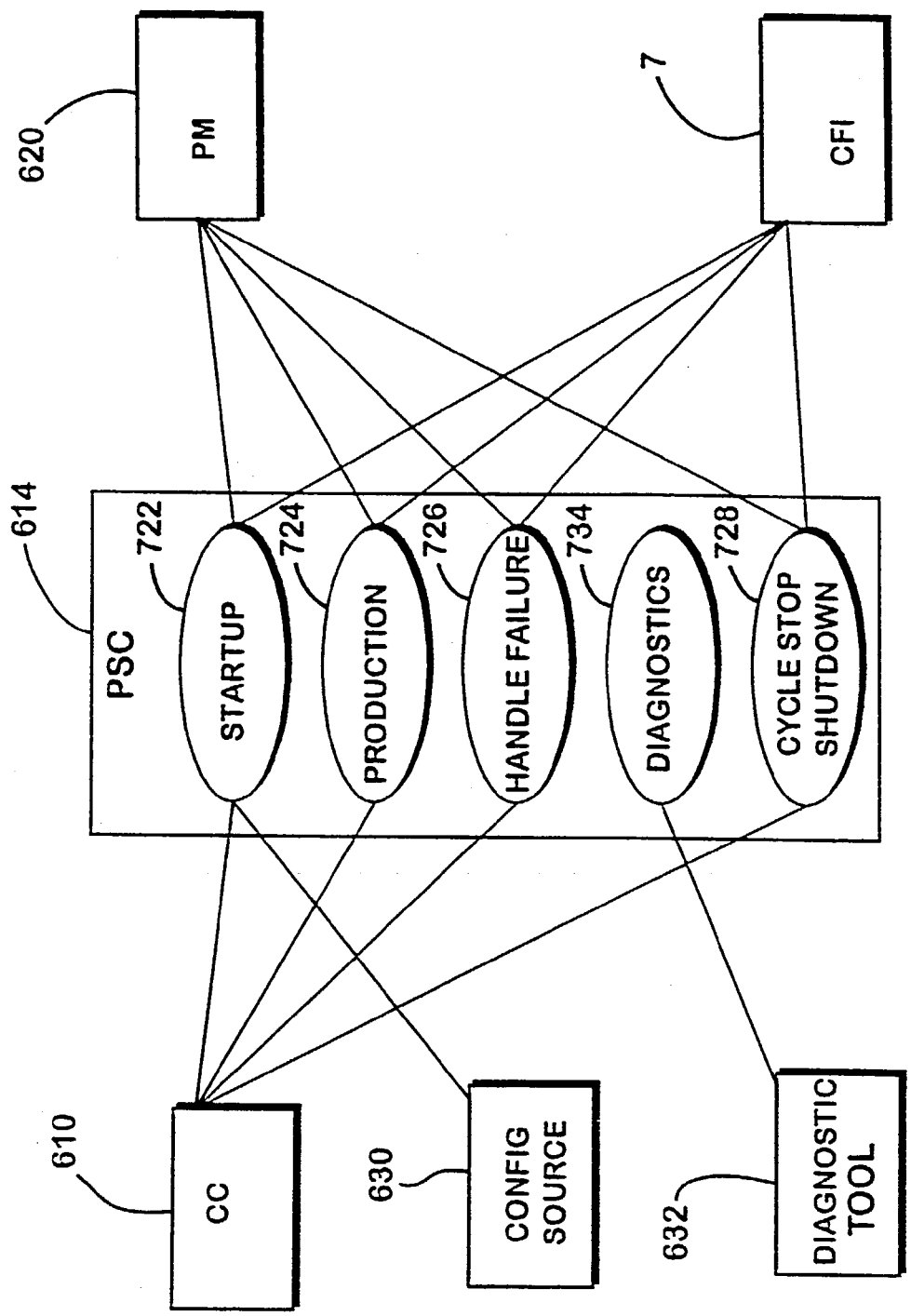
FIG. 59 is a block diagram illustrating operational modes of the process station controller and handling tasks associated therewith.

Turning to FIG. 59, the primary operations of any of the process station controller 614, 616 or 618 are shown interacting with various devices. During the startup operation 722, the process station controller is instructed by the control coordinator 610 to initiate startup. The process station controller can configure itself through the configuration source 730. In addition, the process station controller preferably configures each of the process module controllers 620 and the continuous feed indexer associated with the corresponding branch processing station.

During normal production operation 724, the process station controller receives article notice messages from the control coordinator 610, and further receives a CFI indexing status message from the continuous feed indexer 7. If the CFI position status message indicates that the continuous feed indexer 7 has indexed to the proper position for the next processing step, the process station controller instructs each process module 620 for which an article notice message was received to execute its processing operation. Upon completing its processing operation, each process module 620 sends a return message to its process station controller to inform of its processing status for that article. The process station controller in turn transmits a work report message to the control coordinator 610 for recording. In addition, the process station further instructs the continuous feed indexer 7 to move in an index and dwell intermittent motion, preferably when instructed to do so by the control coordinator 610.

During the handle failure operation 726, the process station controller interacts with the control coordinator 610, as well as the process modules and continuous feed indexer associated therewith. The cycle stop shutdown operation 728 likewise interacts with the control coordinator 610, process module controllers, and continuous feed indexer 7. Further, a diagnostics operation 734 is available with the process station controller in which a diagnostic tool 732 interacts with the process station controller to perform diagnostic functions.

Figure 60:
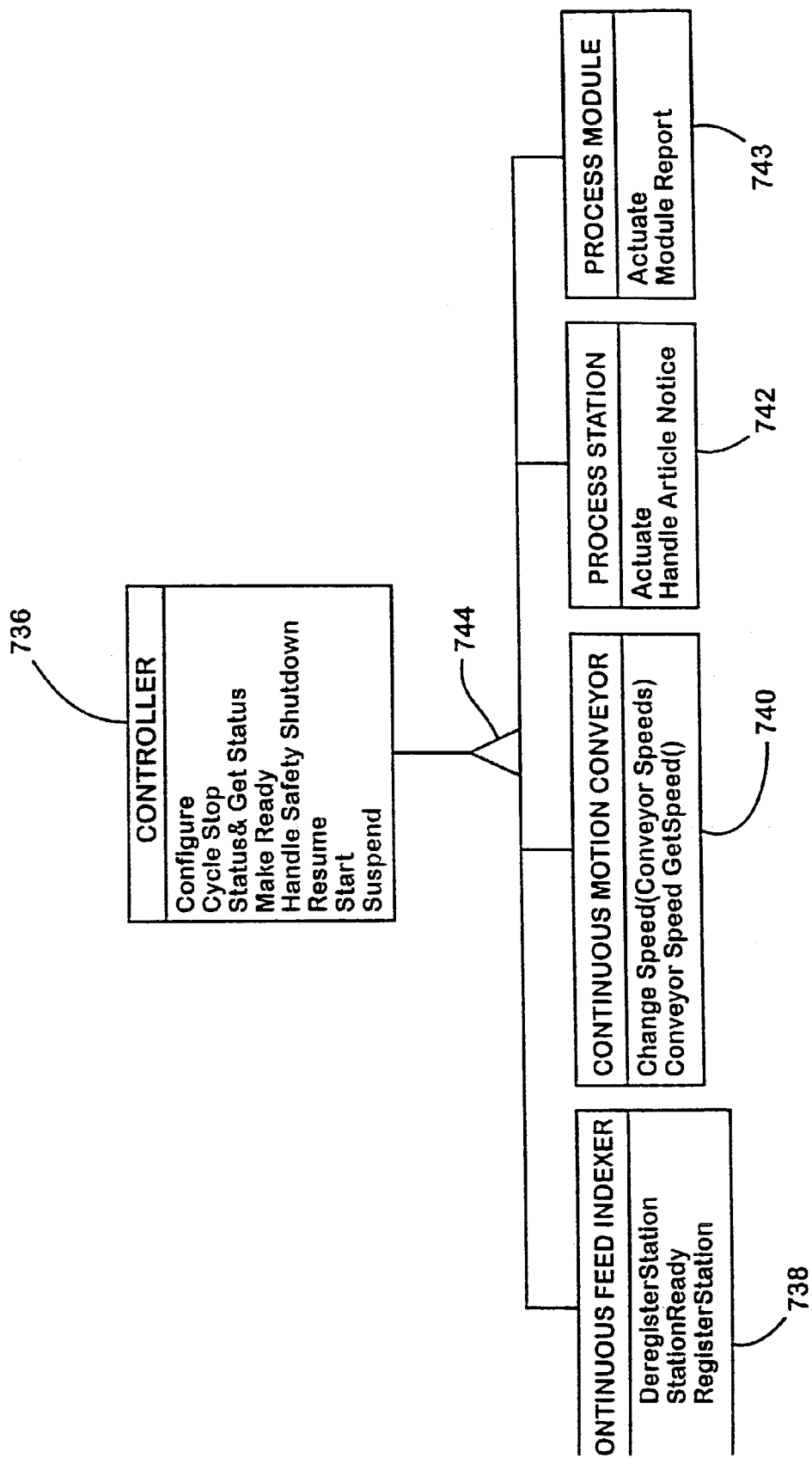
FIG. 60 is a block diagram illustrating a class hierarchy and methods associated with each class.

Referring to FIG. 60, a controller class hierarchy is illustrated with a controller class 736 and four subclasses which include the continuous feed indexer class 738, the continuous motion conveyor class 740, the process station class 742, and the process module class 743. The controller class 736 has assigned thereto primary methods which include configure, cycle stop, status and get status, make ready, handle safety shutdown, resume, start, and suspend. Each of the subclasses 738, 740, 742, and 743 contain additional methods, and each subclass further inherits all the methods of the controller class 736 as represented by inheritance 744. In addition to the inherited methods, the continuous feed indexer class 738 includes added primary methods such as the deregister station method, the station ready method, and the register station method. The continuous motion conveyor class 740 includes added primary methods such as the change speed method to change the continuous motion conveyor's speed, and the conveyor get speed method to acquire the conveyor's speed. The process station class 742 includes two additional primary methods, namely, the actuate method and handle article notice method. The process module class 743 includes methods for performing designated process functions.

The high speed manufacturing system of the present invention is designed and controlled to perform high speed manufacture processing of articles in a manner that is flexible in that system components are modular, easily replaceable, and reconfigurable with the distributed control system. Additionally, the manufacturing system is configured to allow expedient experimental processing of articles simultaneous to the normal manufacturing process. To achieve experimental processing, the manufacturing system platform was developed with a specified set of choices for the number of identical process modules that are employed on each branch processing station. To realize increased processing capability on each branch processing station, the number up (N), which is the number of process modules operated in parallel for the same processing operation, may be increased. This allows a larger number of articles to be processed on a single branch processing station for those processes that require more time to be performed than other processes.

According to one embodiment, the high speed manufacturing system restricted the number up (N) based on the following equation: $N=2^x3^y$, where x=0 through 5, and y=0 or 1. Alternative embodiments can restrict N to other values such as: $N=2^x3^y$, where x=0 through 4, and y=0 through 2. Based on the aforementioned equation, the number up N for each branch processing station may be selected from the following possible set of values: 1, 2, 3, 4, 6, 8, 12, 16, 24, 32, 48 and 96. As long as the number up N for each branch processing station is selected from the available set of values, experimental processes performed on articles of manufacture can also be conducted during a normal manufacturing operation and within a reasonable period of time. According to the particular example of the manufacturing system as set forth in FIG. 1, the first branch processing station employs a number up N equal to four, while the second and third branch processing stations employ a number up N equal to six and two, respectively. In order to run an experimental process for 1,000 articles with an experimental processing module while the manufacturing system 2 is still performing normal processing at a processing rate of 700 articles per minute, the manufacturing system would take approximately 13.33 hours. This is because the manufacturing system is capable of processing one experimental article for every twelve articles since, from the prime factorization, the factors of N=4 are 2*2, the factors of N=6 are 2*3, and the factors of N=2 are 2. Since the lowest common factor therefore is 2*3*2=12, one of every twelve articles may be experimental for the above example.

Figure 61:
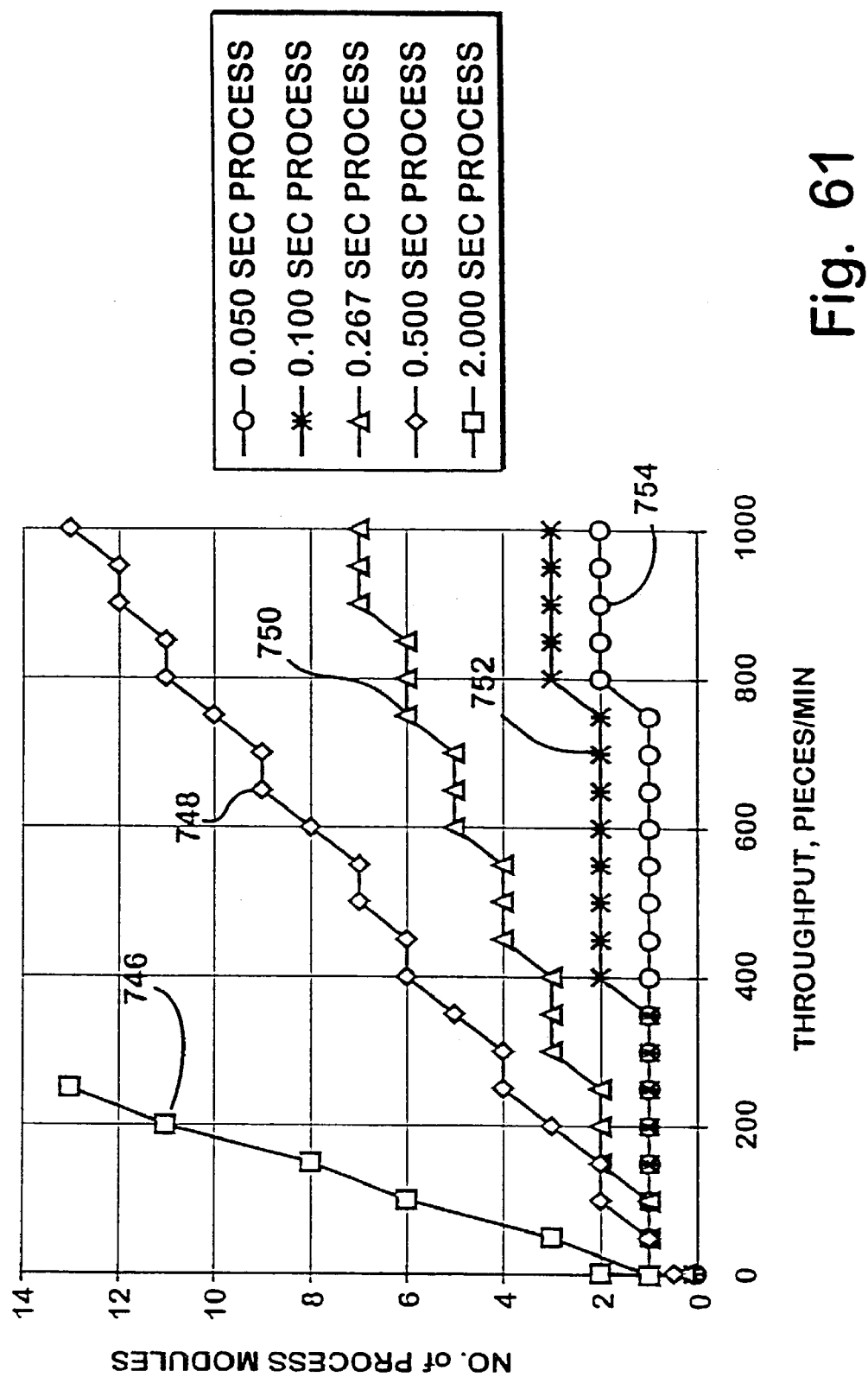
FIG. 61 is a comparative graph illustrating manufacturing article throughput realizable as a function of the number of process modules and processing time.

With particular reference to FIG. 61, examples are provided for the number of process stations that are required as a function of process time and article throughput (e.g., articles per minute), for two-third cycles provided that 67% of the cycle time is used for process operations. Process example 746 illustrates that a large number of process modules are required for a process execution time of 2.000 seconds. Process examples 748, 750 and 752 illustrate that a reduced number of process modules are required for process execution time periods of 0.500 seconds, 0.267 seconds, and 0.100 seconds, respectively. Process example 754 shows that a fast process execution time period of 0.050 seconds requires even fewer process modules. Accordingly, the number up N required for a particular branch processing station increases with the more time consuming processes.

The operation of the distributed control system 600 for controlling the high speed manufacturing system 2 of the present invention will now be described as follows. Prior to performing processing operations, the control system 600 will undergo an initial startup operation in which the control coordinator 610 initiates configuration of the various controllers and controlled devices including the continuous feed indexer, the process stations, and the process module controllers. Once configured, each controller notifies the control coordinator 610 that it is ready for operation. The control coordinator 610 then requests alignment of the transfer devices 8 to their predetermined home positions so that the control coordinator 610 can account for the position and identification of each article of manufacture as it is conveyed and processed by the manufacturing system. The control system 600 is now ready for normal processing operation.

Figure 62:
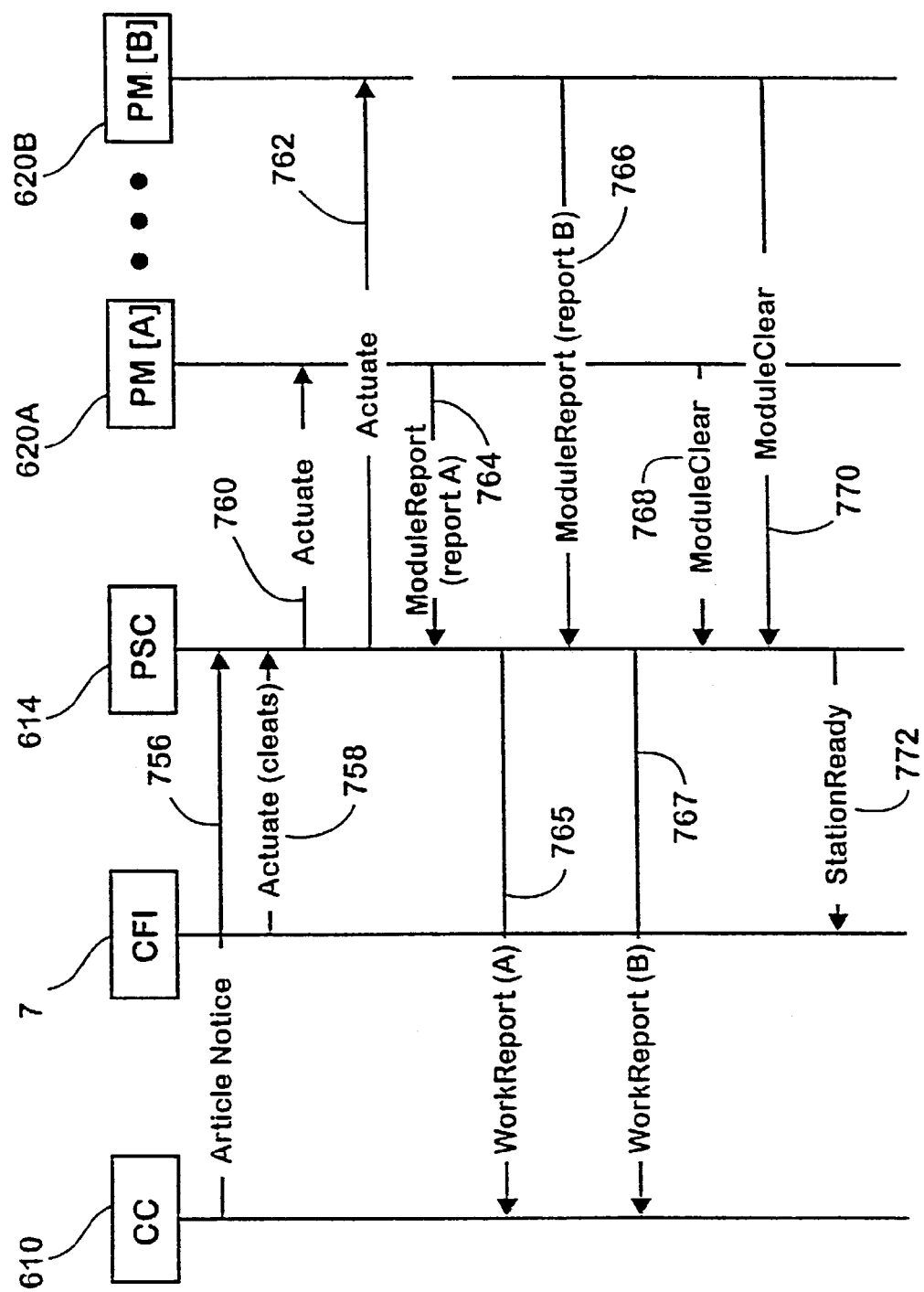
FIG. 62 is a control interaction diagram illustrating the sequence of communications between control agents during normal operation of the high speed manufacturing system.

With reference to FIG. 62, the normal processing operation of the distributed control system 600 is illustrated therein. During the normal manufacturing operation, the control coordinator 610 sends an article notice message 756 to the process station controllers, such as process station controller 614 which is shown. The process station controller 614 also receives an actuate (cleats) message 758 from the continuous feed indexer which indicates that the continuous feed indexer 7 has completed its index motion to the next processing position. When in proper position, the continuous feed indexer's transport cleats and the articles carried thereon are aligned with process modules that are to perform the next processing operation. Once the process station controller 614 received both the article notice message 756 and the actuate message 758, it sends actuate messages 760 and 762 to each corresponding process module controller such as process module controllers 620A and 620B. Actuate messages 760 and 762 instruct the receiving process module controllers 620A and 620B, respectively, to execute the process operation for its associated process module.

Upon completing its process operation, each process module controller 620 sends a return module report 764 and 766 to the corresponding process station controller 614 informing it of the completed status. The process station controller 614 in turn transmits work report messages 765 and 767 back to the control coordinator 610 which contains the work progress information for each article of manufacture. The control coordinator 610 is thereby able to track and log the history of each and every article of manufacture that is processed on the manufacturing system. In addition, each process module controller 620 also transmits module clear messages 768 and 770 to the corresponding process station controller 614 indicating that the process module has returned the article to the continuous feed indexer and is clear of the article that was previously processed. The process station controller 614 further issues a station ready message 772 to the continuous feed indexer 7 to enable the continuous feed indexer 7 to execute its index motion.

The normal processing operation is repeated for each article to be processed. The high speed manufacturing system 2 can be shutdown with a normal shutdown operation, a failure shutdown or a safety shutdown. A normal shutdown operation is executed with the control coordinator 610 broadcasting a cycle stop message to each of the process station controller, the continuous feed indexers, and the continuous motion conveyor, which instructs the devices to stop normal operation at the end of a cycle so that the normal operation can be restarted where it left off without skipping any articles. A handle failure shutdown likewise includes the control coordinator 610 broadcasting a cycle stop message to each of the process station controllers, continuous feed indexers, and the continuous motion conveyor to stop normal operation at the end of a cycle, such that a restart is possible. However, the handle failure shutdown is done in response to a handle failure signal. The handle safety shutdown involves a safety monitor, such as a transfer device limit switch or door open detector, notifying the control coordinator 610 of a problem. In response, the control coordinator 610 sends shutdown messages to each of the process station controllers, continuous feed indexers, and the continuous motion conveyor to shutdown the system immediately.

Figure 63:
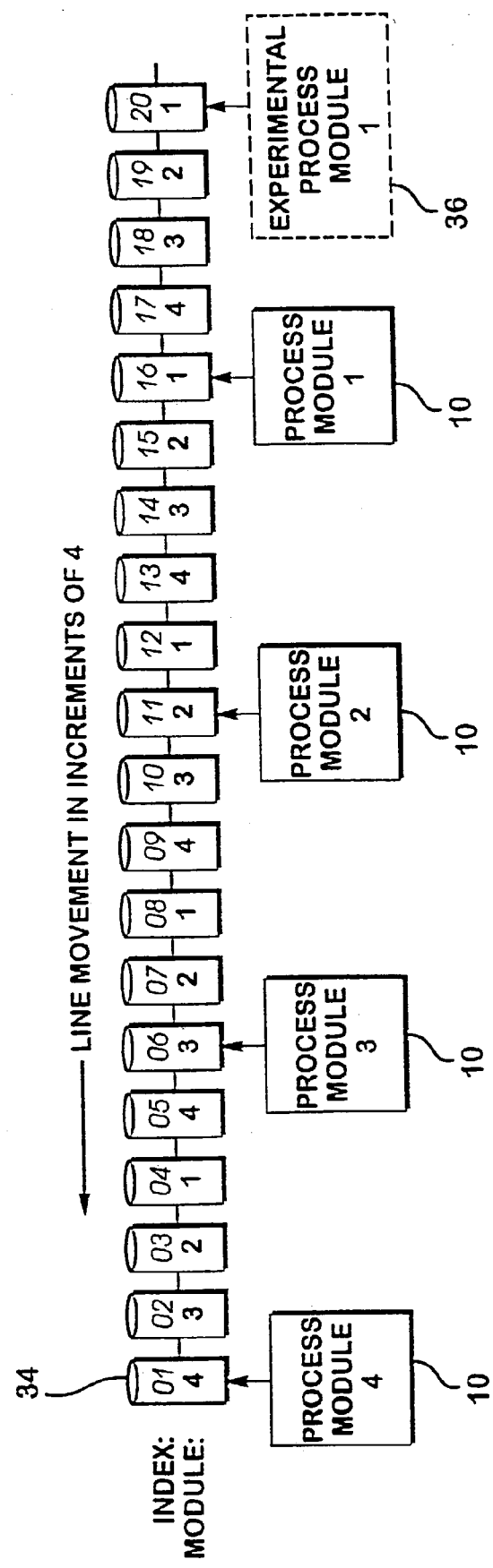
FIG. 63 is a schematic diagram illustrating the processing of articles of manufacture on a four-up continuous feed indexer with four process modules and an experimental process module.

Referring to FIG. 63, the operation of the first continuous feed indexer 7 is illustrated with line movement increments equal to the number up N=4 in which a series of articles 34 are conveyed in indexed intermittent motion to present the articles in position for processing by four normal process modules 10. The process modules 10 are successively spaced apart from each other by a distance of N+1 articles. As such, for the N=4 example shown, process modules 10 are spaced five articles apart from the next process module. During normal processing operation, each process module 10 performs its designated process operation on every fourth article.

The high speed manufacturing system of the present invention further allows for experimental processing of articles to be performed at the same time as normal processing is performed. This can be achieved by employing an experimental process module 36 as shown in parallel with one of the normal process modules 10. To perform experimental processing, the experimental process module 36 is instructed to perform processing on one article in place of one of the normal process modules. By spacing the normal process modules at N+1 articles, the experimental processing may be easily employed. It should also be understood that how often the experimental process module 36 can be used may depend on the number of experimental processes performed and the common denominator of N for each branch processing station as explained herein.

Figure 64:
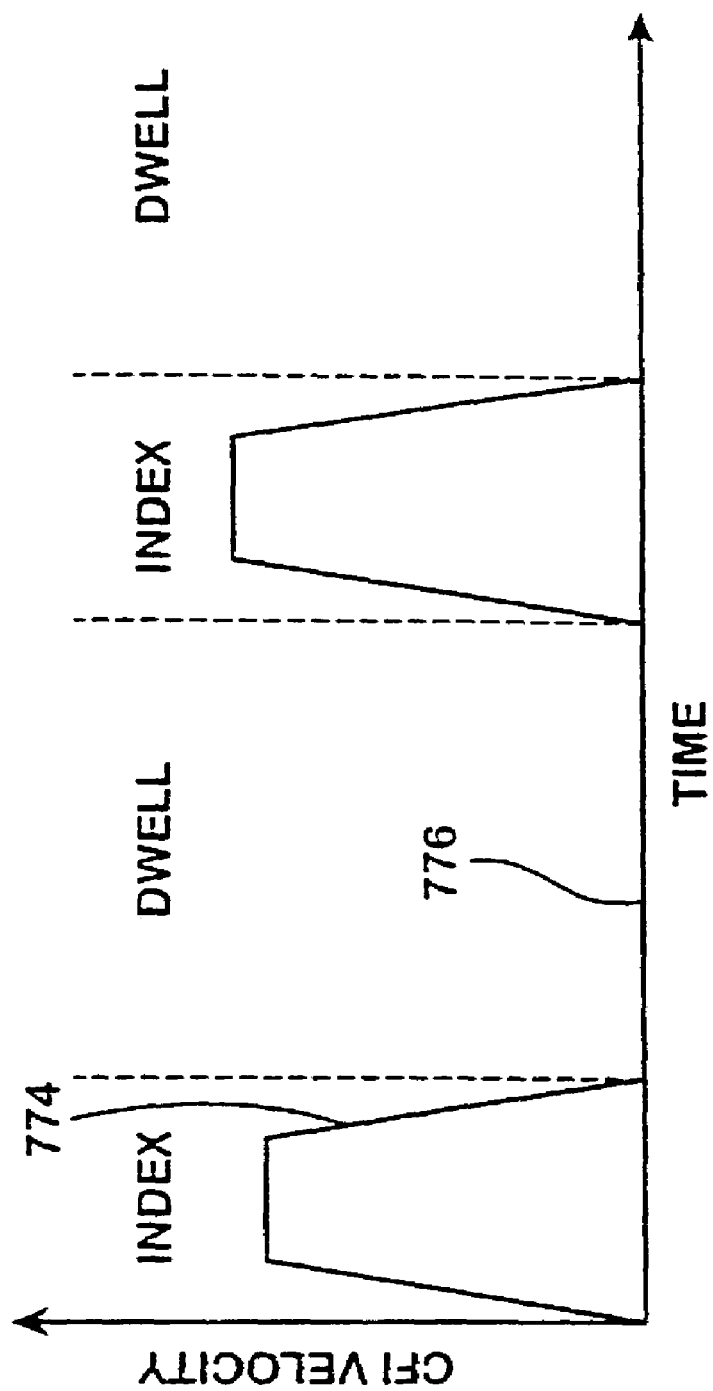
FIG. 64 is a graph illustrating the index and dwell intermittent motion of the continuous feed indexer.

As mentioned above, each of the continuous feed indexers move in an indexed intermittent motion to provide a dwell (i.e., process) period during which processing occurs and an index (i.e. travel) period during which the continuous feed indexer moves. The indexed intermittent movement of the continuous feed indexer is illustrated in FIG. 64 as a function of velocity and time. During the index period 774, the continuous feed indexer is initially ramped up in speed, levels off, and then is ramped down in speed until the proper dwell position is reached. During the dwell period 776, the continuous feed indexer remains put while process operations are allowed to occur. The intermittent indexing motion of the continuous feed indexer is repeated throughout normal operation.

Figure 65:
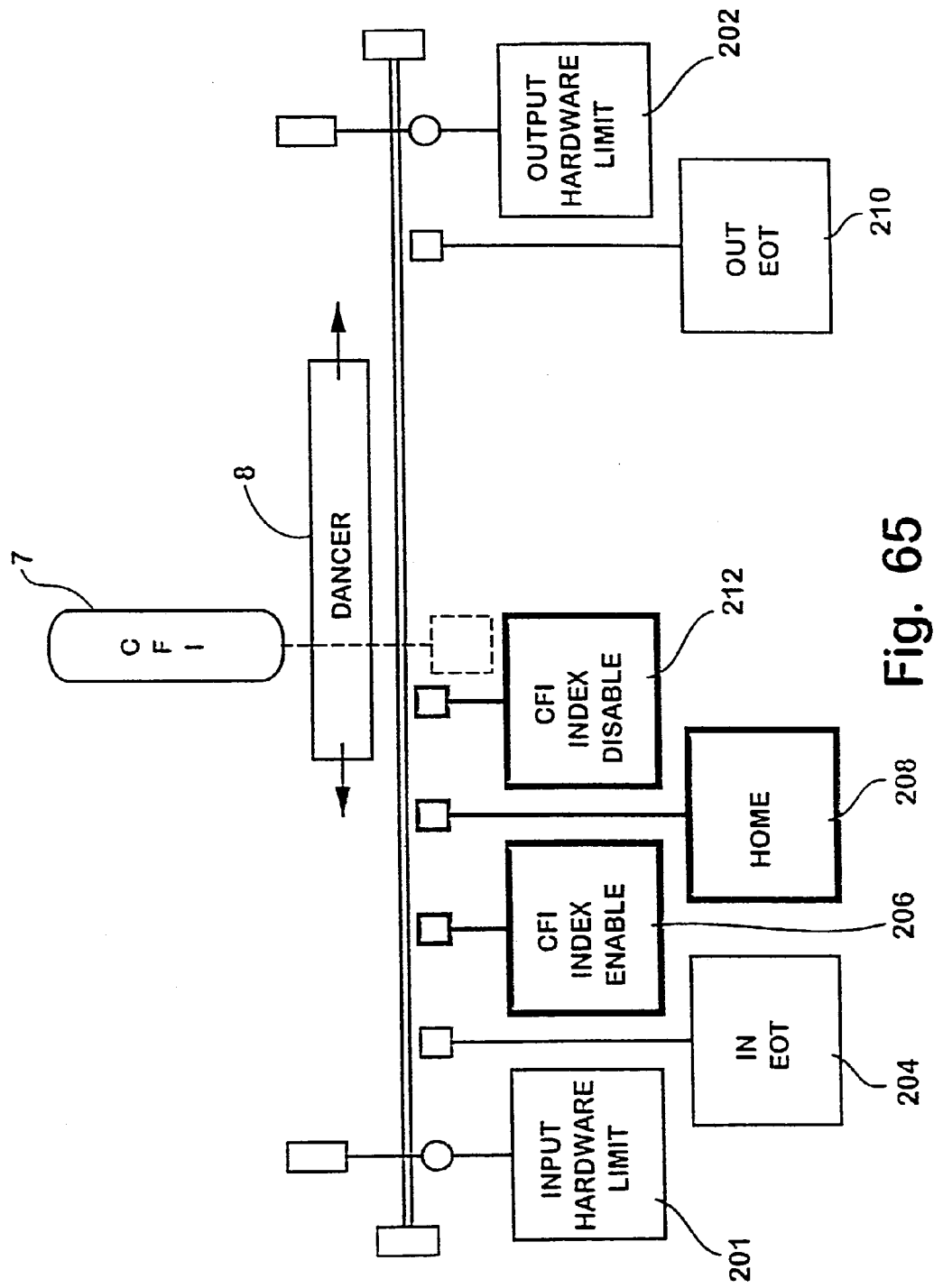
FIG. 65 is a block diagram further illustrating the various proximity sensors for monitoring the position of the transfer device.

Referring to FIG. 65, the seven proximity sensors are shown positioned along the travel path of the transfer device 8 for monitoring the transfer device's travel. The home position sensor 208 senses a predetermined home position of the transfer device 8 which allows the control system 600 to begin the normal operation of the high speed manufacturing system 2 in a known position. The CFI index enable position sensor 206 and CFI index disable sensor 212 provide position sensing that defines the normal travel limits of the transfer device 8 upon which a transfer device reset occurs. More particularly, the CFI index disable sensor 212 senses that the transfer device 8 is output rich and, upon completing the current cycle of the CFI, will cause the CFI to disable. With the CFI disabled, the input side of the transfer device 8 continues to receive articles from the continuous motion conveyor. The CFI index enable sensor 206 senses when the transfer device 8 has become input rich and then causes the CFI to be re-enabled.

The transfer device proximity sensing also includes a pair of IN EOT and OUT EOT position sensors 204 and 210, respectively, for detecting first and second end of travel limits of the transfer device 8. When either the IN EOT position sensor 204 or OUT EOT position sensor 210 detects transfer device travel beyond the limits, a software shutdown of the system is initiated. Beyond the end of travel sensors are a pair of Input and output hardware limit sensors 201 and 202 which may include hardwired limit switches. If the transfer device 8 travels beyond either of the hardwired limit switch sensors 201 or 202, the manufacturing system 2 is immediately shutdown.

Figure 66:
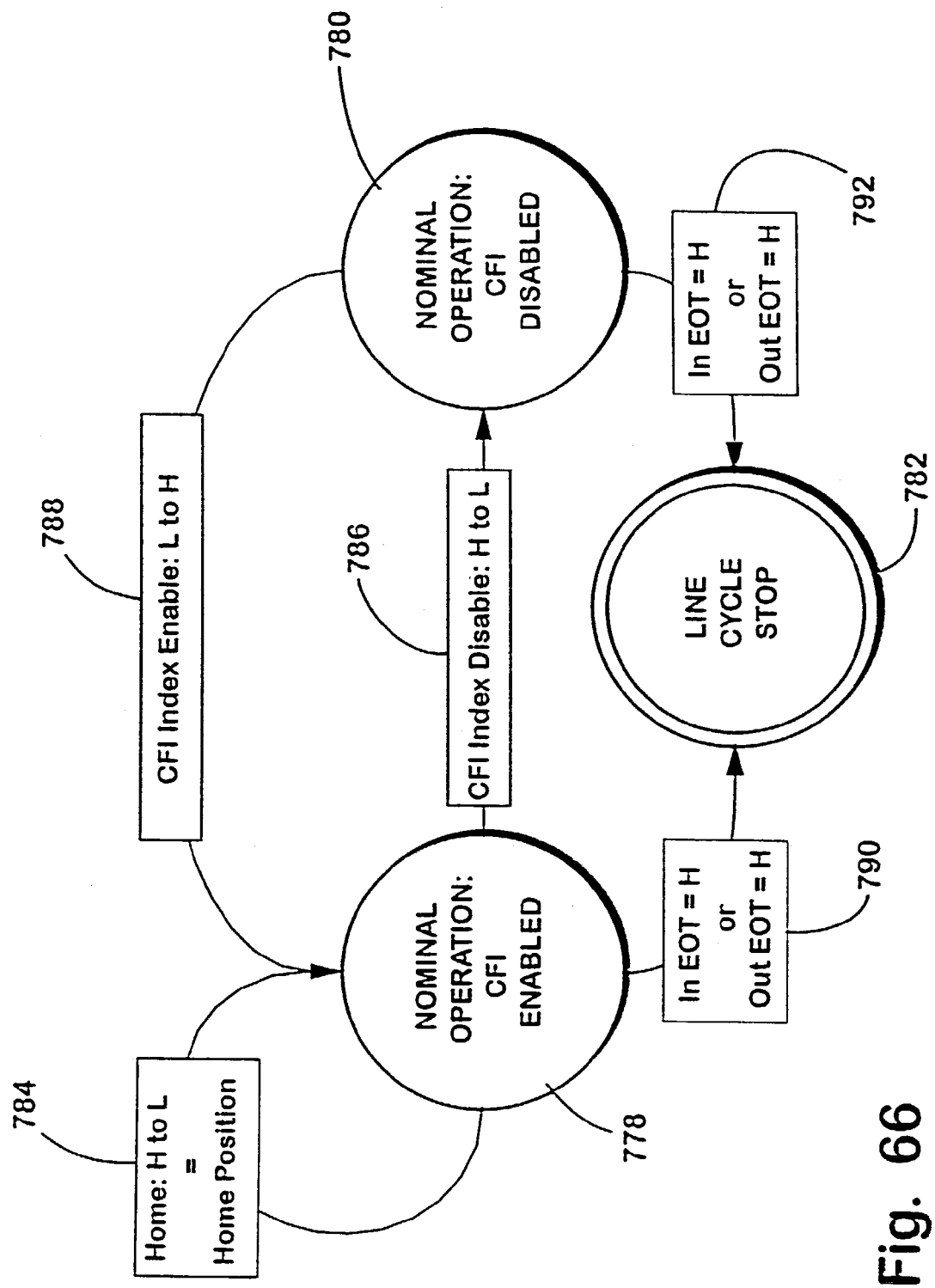
FIG. 66 is a state diagram illustrating control of the continuous feed indexer in response to the proximity sensors shown in FIG. 65.

Control of the transfer device 8 in response to the proximity sensors is further illustrated in the state diagram provided in FIG. 66. As illustrated, there is a CFI enabled state 778, a CFI disabled state 780, and a line cycle stop 782. With the home position sensor 208 detecting home position of transfer device 8, the CFI begins in the enabled state 778. When the CFI index disable position sensor 212 detects an output rich condition 786, the system transitions to the CFI disabled state 780 in which the CFI is turned off at the end of its current cycle. Once the transfer device 8 returns to an input rich condition 788, the CFI index enabled position sensor 206 returns the transfer device 8 to the CFI enabled state 778. In either the CFI enabled or disabled states 780 or 778, the system may enter the line cycle stop state 782 if either of end of travel position sensors 204 and 210 detects extended travel of the transfer device 8 as shown in blocks 790 and 792.

Figure 67:
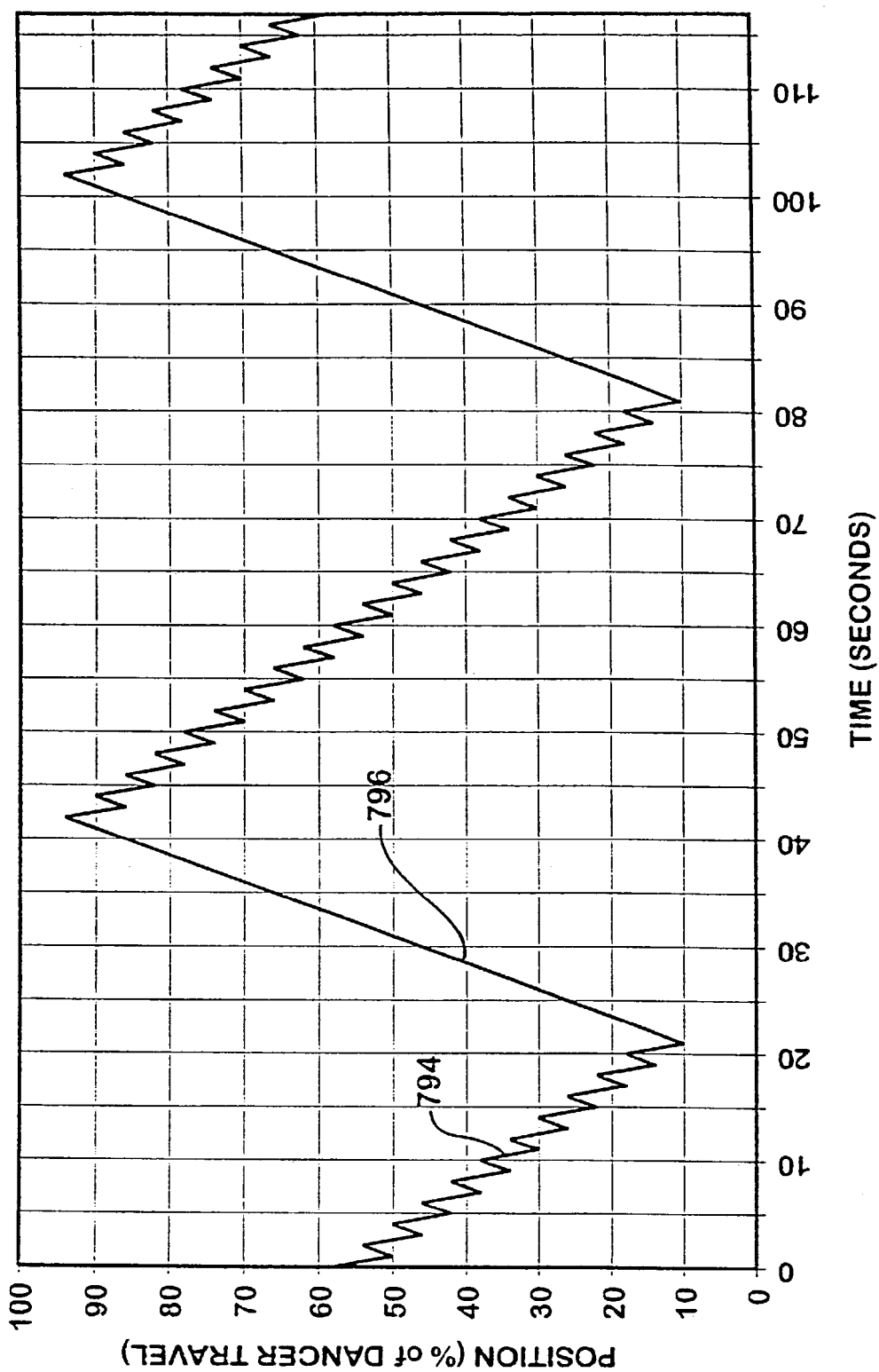
FIG. 67 is a graph illustrating the movement of the dancer as a function of time.

The relative movement of the transfer device 8 is illustrated in FIG. 67 as a function of percentage of transfer device travel and time. During normal operation, the transfer device 8 continuously receives articles of manufacture at its input side at a constant rate as determined by the continuous motion conveyor. The output side of the transfer device 8 moves in sync with the continuous feed indexer in an indexed intermittent motion. The indexed intermittent motion includes index movement which is represented by the drop 794 in the sawtooth response and the continuous feed input movement during a dwell or CFI disable is shown by the rise 796. The index travel movement generally occurs at a faster rate of speed than the continuous feed input motion. Accordingly, the transfer device 8 eventually becomes output rich, at which point the CFI is disabled and the transfer device travel is ramped back to the input rich condition, whereupon the CFI is then enabled again.

Accordingly, the control system 600 provides distributed electronic control e.g., "fly by wire control," which is flexible and agile. The distributed control system 600 allows for high speed process manufacturing such as battery manufacturing at rates achievable of at least 900 to 1,800 batteries per minute. While the high speed manufacturing system has been described in connection with a battery application, it should be appreciated that the high speed manufacturing system 2 of the present invention may likewise by applied to various other applications for manufacturing desired articles of manufacture without departing from the spirit of the present invention.

Experimental Processing

Figure 68:
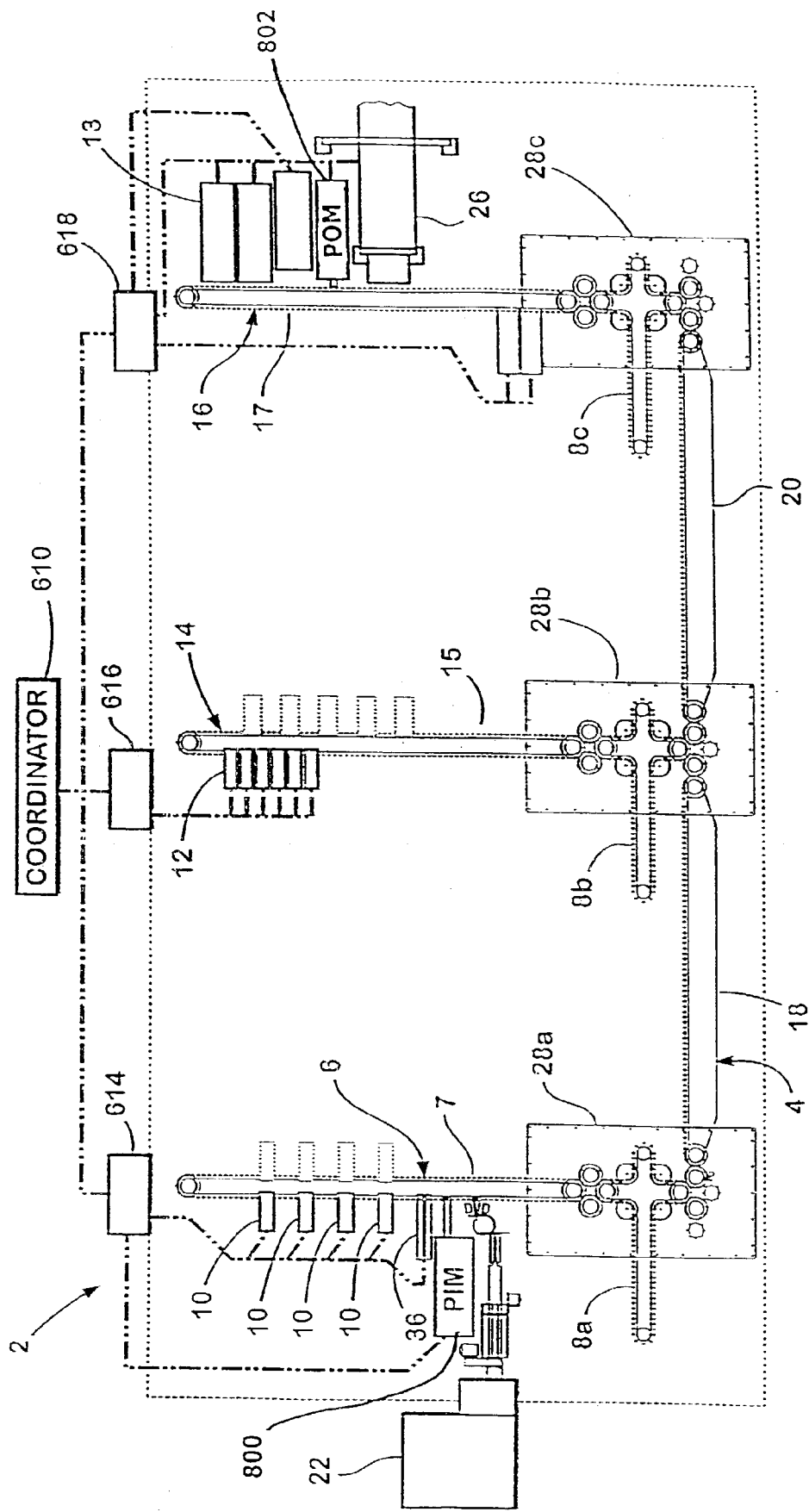
FIG. 68 is a plan view of the processing station configured for both normal and experimental processing according to another embodiment of the present invention.

Referring to FIG. 68, the modular high speed processing system 2 is further shown configured to simultaneously perform different multiple processes, such as normal and experimental processing. It should be appreciated that the processing system 2 may perform experimental processing on selected articles, while at the same time performing normal processing operations. For example, the processing station 2 may perform a different specified operation on selected articles without shutting down the processing system 2 and without requiring significant changes to the control system. For some types of experimental processing, the processing system 2 may employ at least one or both of a programmable input module (PIM) 800 and a programmable output module (POM) 802. The programmable input module 800 selectively inserts special pieces, such as battery cans, onto the production line at a designated location. The programmable input module 800 can intersperse "special run" production pieces between bulk product pieces to enable more than one type of product to be processed concurrently on the processing system 2. The programmable output module 802 selectively removes individual pieces from the processing system 2 in a manner that allows each piece to be tracked as an individual entity on the production line. The programmable output module 802 can identify and remove non-bulk produced items from the production line before they are removed by the bulk output module. Accordingly, the programmable input modules 800 and programmable output modules 802 selectively insert and remove special pieces which may be processed different than other normal production pieces by using one or more experimental process modules 36, and the special pieces can likewise by tracked and the history can be logged as they move through the processing system 2.

Figure 69:
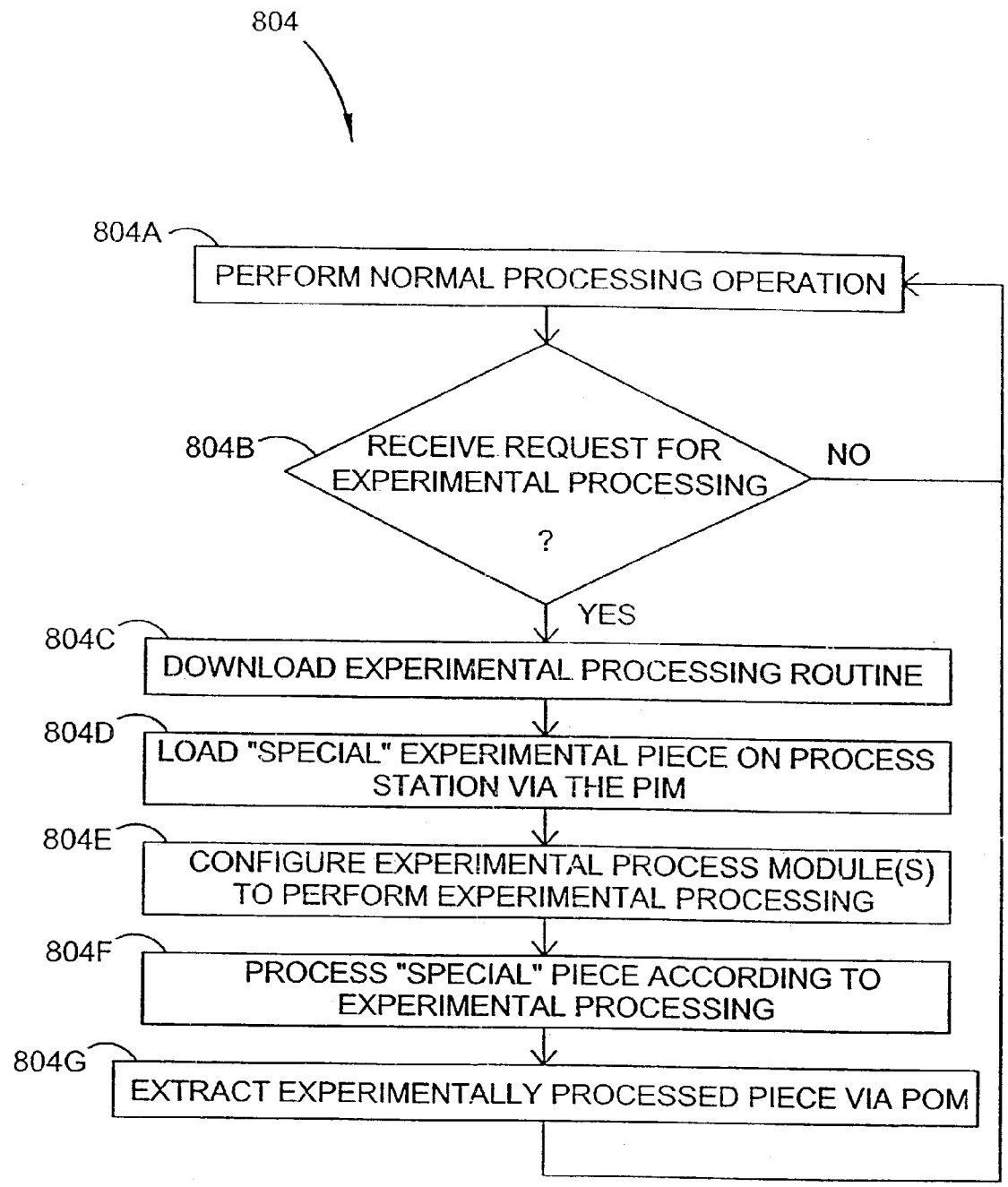
FIG. 69 is a flow diagram illustrating a method of processing articles according to multiple processes, (e.g., normal and experimental processing)
Figure 71A:
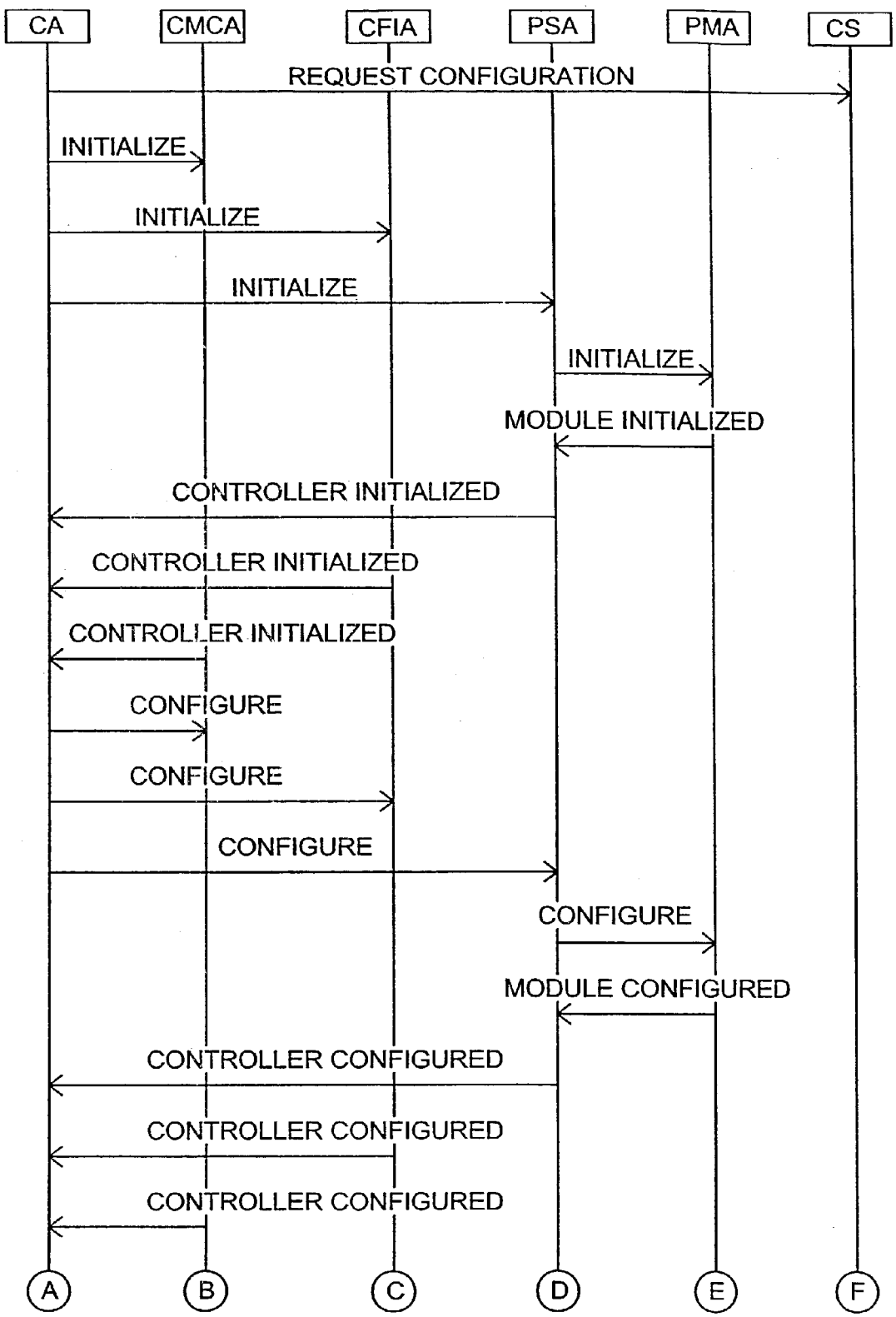
FIGS. 71A–71D are control interaction diagrams illustrating the sequence of communications performed during the coordinator startup.
Figure 71B:
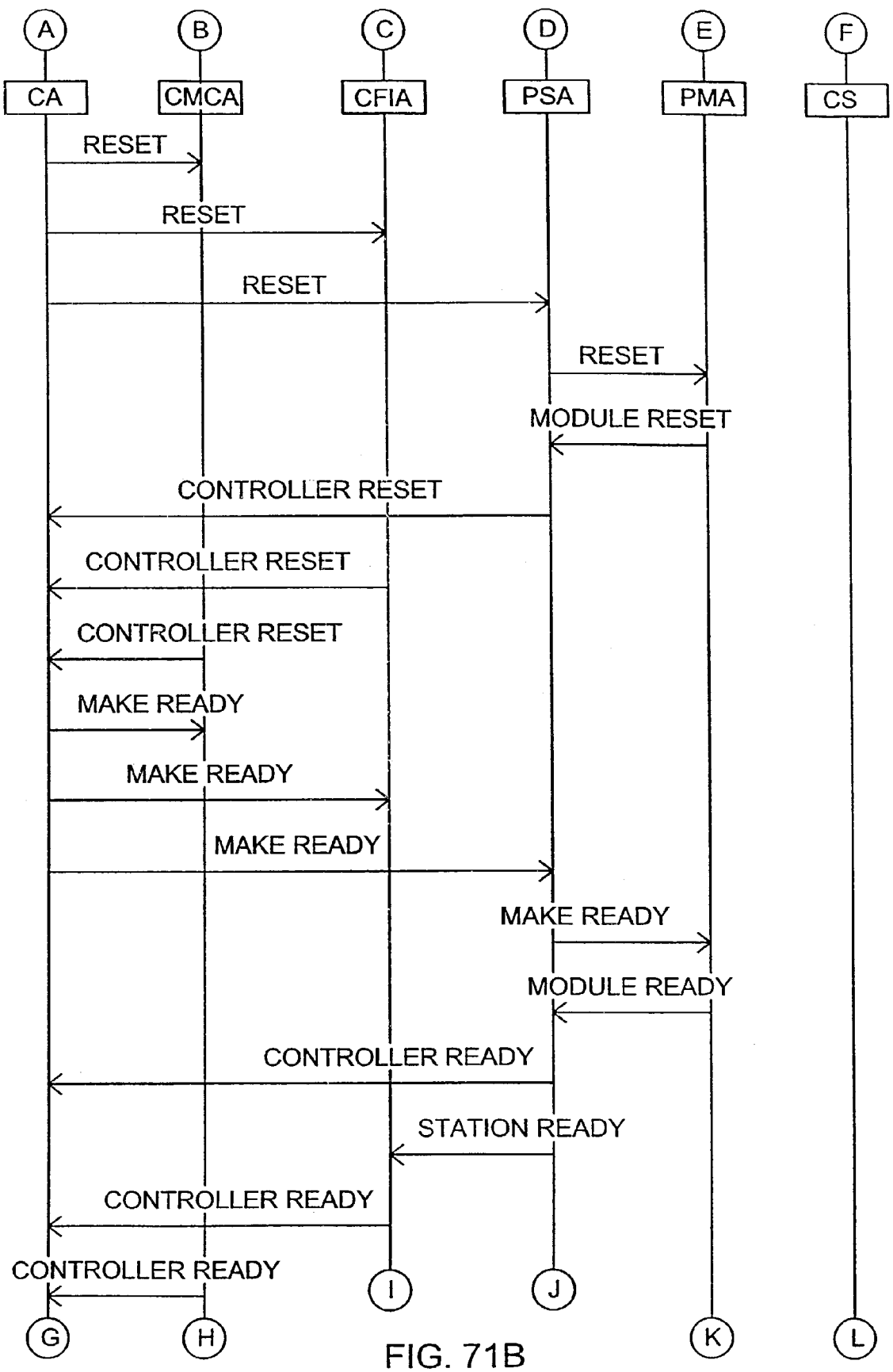
Figure 71C:
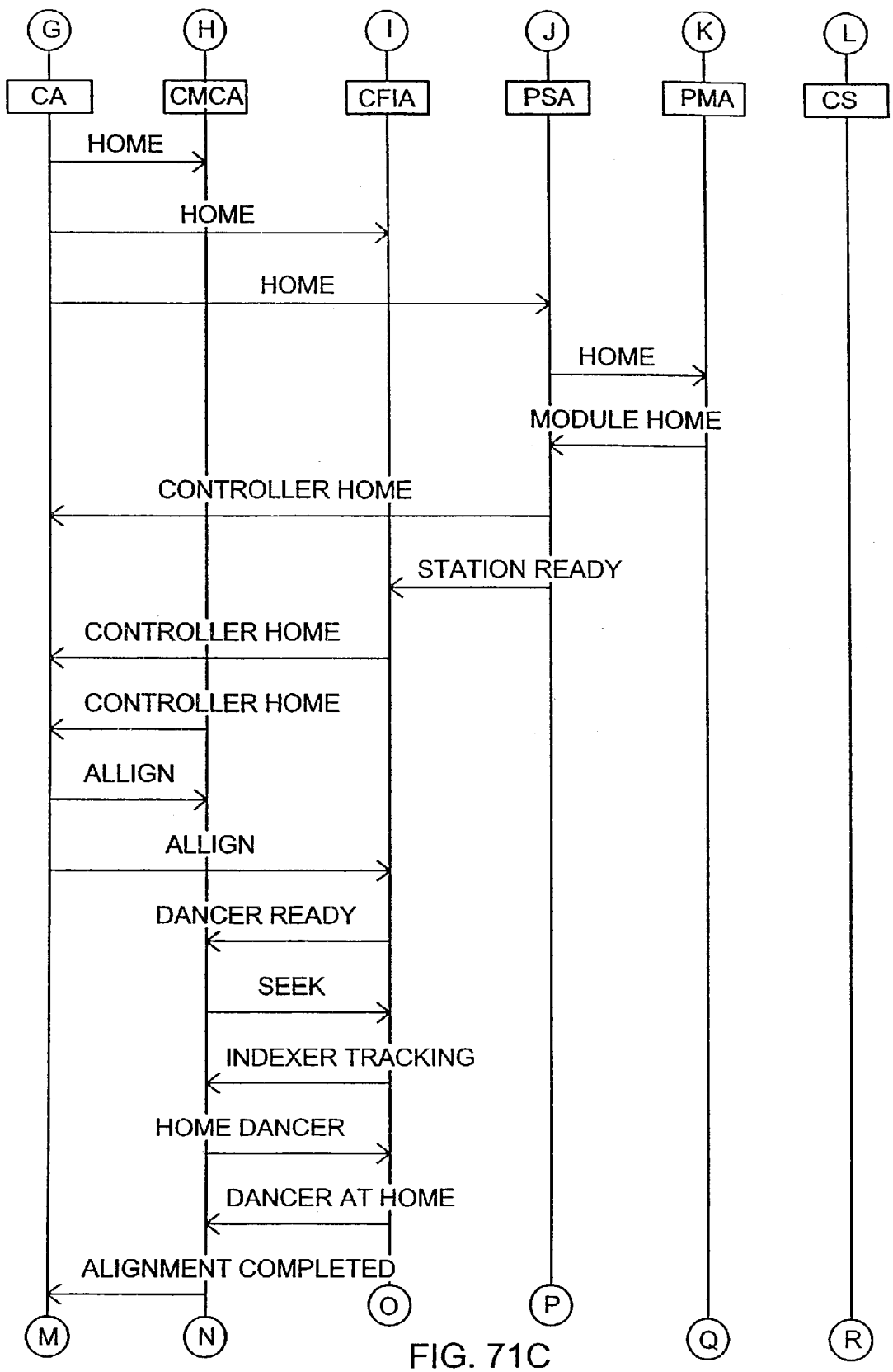
Figure 71D:
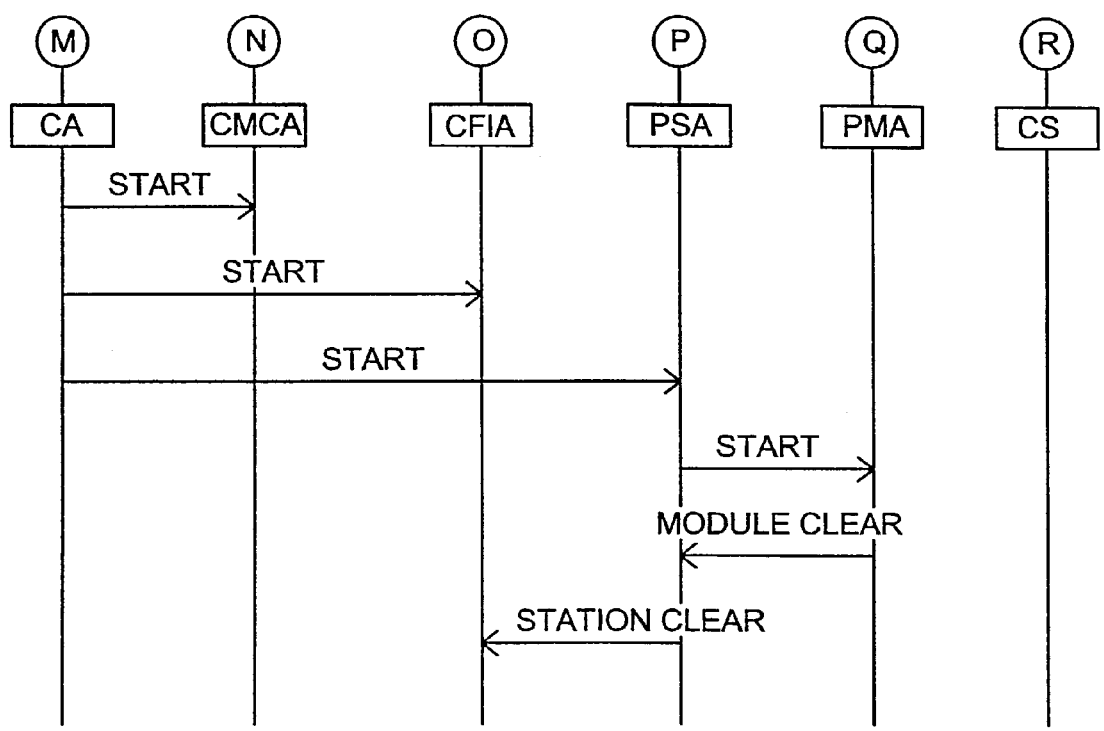

Referring to FIG. 69, an on-line experimental processing methodology 804 is illustrated for performing experimental processing on the processing station 2 of FIG. 68. Beginning at step 804A, a normal production processing operation is performed. In decision step 804B, experimental processing method 804 checks for whether a request for experimental processing has been received by the control coordinator and, if not, continues to perform the normal processing operation according to step 804A. When an experimental processing request is received, the control coordinator downloads the experimental processing operation steps, including the processing requirements, number of pieces to be experimentally processed, and other special information, in step 804C. In step 804D, a special experimental piece, such as a battery can, is loaded onto the process station at a known location via the programmable input module. In step 804E, one or more experimental process modules are configured with processing specifications to perform one or more experimental processing steps. In step 804F, the special pieces are routed to the experimental process modules where they are processed according to the experimental processing configuration. Once all process steps are completed, method 804 proceeds to step 804G to remove the experimentally processed piece from a known location on a process station via the programmable output module, and then returns to the normal processing operation in step 804A.

Accordingly, the experimental processing of the present invention advantageously allows for simultaneous production of differently processed items on the same processing system 2, without requiring shutting down the system to reconfigure the processing arrangement. This advantageously allows for the experimental processing of certain selected articles, or alternately, for the mass production of different processed articles of manufacture on the same processing system and at the same time.

Control System Software

In addition to the production line conveyance hardware, computing process controllers, and distributed network hardware, the control system framework employs flexible and versatile software that is executable on multiple control system configurations and various types of computer controllers. The control software is not dependent on any particular computer operating system, but instead is open so that various types of hardware and software may interface, thereby minimizing the dependence on a particular hardware and software configuration. In addition, the control software is flexible so as to manage and orchestrate multiple production line configurations, and to enable continued processing of material in the event that other processors and/or software agents in the production line fail. Communications between distributed processors is high speed, accurate, and able to manage data traffic effectively, in a near-zero defect environment. The control software also allows for tracking of the process operations performed on individual articles of manufacture, allows for several different batches of products to be produced without shutting down a manufacturing system, allows for different types of production machinery to be controlled without requiring significant modification to the control software package, and minimizes interruption of the processing operations when maintenance is to be performed, amongst other advantages as described herein.

While the control system is described herein in accordance with a battery manufacturing system, it should be appreciated that the control system and control software may be employed in various other applications to control many other types of manufacturing processes. The control system framework has flexible components to perform various types of cost effective manufacturing, with very little modification to the control system. For example, the control system and software may be employed to process small articles of manufacture such as small-arms ammunition, dry-erase markers, and $CO_2$ cartridges, on a similar type of production conveyance line as that disclosed herein for making alkaline batteries. If the size of the conveyance system components, such as cleats and servomotors, are enlarged, the types of articles of manufacture produced with the control system and software of the present invention may be applicable to processing larger articles such as canned soup, paint, motor oil, household cleaners, cooking oils, canned fruits and vegetables, all of which can be quickly and efficiently injected into cans, bottles, or other containers with dispenser process modules, and yet require only minimal changes to the configuration data. In addition, articles such as medium and large caliber ammunition, could also be accommodated by increasing the size and power of the conveyance components. These and other types of applications may employ the control system and software of the present invention without requiring time consuming changes to the system logic and processing operations. Only changes within the configuration data and processing recipes would be necessary, which may vary depending on the application.

The control system and method of the present invention may also be employed in other conveyance systems including intelligent roller conveyer and automatic guided vehicles (AGVs). Such conveyance systems generally have the capability to flexibly buffer input and output production pieces, move material on command, and accurately position the production pieces for processing. With a roller conveyer, buffering spur lines could be implemented along with position sensors. For automatic guided vehicles, input and output buffers could be provided with stands at staging areas. Positioning could be included with the same positioning sensors that a roller conveyor or continuous feed indexer can interface with. These additional types of conveyance systems open up processing to various sorts of manufacturing processes that may benefit from the present invention.

Processes that require no production line conveyance system, such as batch processing, could also be controlled by the control system and software of the present invention. For example, the dispensing of liquids and dry additives could be controlled by the control system in response to process monitoring sensor values. Processing devices, such as mixer motors, could be started and stopped through the use of timers, temperature gauges, or collodial sensors. Control of such processes can be implemented with the control system and process of the present invention with minimum modification to the configuration data and process recipes. Further, control of steel production, which generally requires no buffering of product pieces may also employ the control system and method of the present invention. Modeling software, which normally determines process variables such as mill roller pressure in this type of production, may be employed. An interface between the coordinator agent software and the modeling software may be easily accommodated and, in this way, recipe data may be dynamically updated for each piece of steel processed via mill rollers. Updated recipe data may be communicated from the control coordinator agent through the process station agent to the process module agent. Accordingly, the control system and software is flexible enough so as to accommodate various different architectures for controlling various production processes. A substantial amount of the software, with the exception of the lower level interfaces, generally will not change from one application to another. Instead, all that is generally needed is a robust conveyance system, a change of configuration data, and minimal creativity to enable the manufacture of various types of products.

The control network provides a highly modular architecture in which the control system is computer platform independent, the computer processors can execute different operating system software, and communications are high speed, accurate and manageable. The process controllers are capable of being swapped rapidly such as to become fully operational in a very small amount of time, such as between five and fifteen minutes, for example. Aspects of intelligent manufacturing are achievable with the control system due to the dynamic, flexible nature of the logical software components. Flexible, distributed computing, quick swapping of process modules, dynamic configuration changes and streamline communication between modules is achieved via the control software. In addition to the software agents assigned to the control coordinator, process stations, continuous feed indexers, continuous motion conveyor and process modules, the software further includes a human-machine interface agent, safety monitor agents, and message handler agents. Additional software routines bind the hardware-represented agents together.

Referring to FIG. 70, one embodiment of an agent based control architecture processed on an operating system 805 is shown in which an agent software 806 is associated with software that includes models 808, 810, 812, and 814, also referred to as encapsulations. Each agent 806 represents a structural hardware architecture and has the ability to communicate with servomotors (servo encapsulation 808), inputs/outputs (I/O encapsulation 810), Distributed Data Services (DDS model 812), and dynamic configuration data (configuration model 814). In some circumstances, the agent 806 may not have to communicate with a servomotor or I/O model. If the agent functionality does not require communication with other models, the subordinate model software does not perform a functional operation and is deemed a null model (i.e., performs no specific operation). The architecture may remain the same for every agent, regardless of the functions performed by each agent. The models preferably remain flexible so that the agent software can interact with any of a variety of servomotors, I/Os, data access methods, and configurations.

The software agents communicate with each other through the agent protocol as described herein. In one embodiment, a protocol is configured as a series of previously configured messages that are transmitted and received between two software agents. The communication messages are formatted differently for two communicating software agents, depending on the agents that are attempting to communicate. For example, the control coordinator agent may be configured with one set of formatted messages that are shared with the continuous motion conveyor agent and a different set of previously configured messages that are used to communicate with the process station agents. The protocol also includes an expected interaction of messages between the two communicators (agents). For example, if the coordinator agent communicates a "make ready" message to a process station agent, the control coordinator would be expecting a "controller ready" message back from the process station. This message interaction informs the control coordinator that the process station agent not only received the "make ready" message, but that the process station agent has performed the normal processing successfully and is ready to continue. In addition, the protocol may include the amount of time the process station is allowed to respond before the control coordinator resends the same message, and may also specify the number of message retries that are allowed by the communication initiator. After all retries have been exhausted and no reply has been received, the communication is deemed to have failed.

The control coordinator is responsible for controlling and coordinating the different pieces of the system. The coordinator agent is responsible for configuring, initializing and controlling the software agents that represent the hardware components. The coordinator also provides a data bridge to the user interface, performs all product routing, tracking and safety monitoring, and aligns the conveyance system components on the production line. During system startup, the coordinator requests its own configuration from the configuration data store. Once its own configuration has been received, the coordinator knows what other agents it needs to communicate with and where those other agents are located within the distributed control system.

The coordinator startup message sequence is shown in FIGS. 71A–71D according to one embodiment. The coordinator startup initialization process starts when the coordinator agent requests its own configuration data from the configuration data store (CS). Next, the coordinator agent instructs each of the continuous motion conveyor agent, continuous feed indexer agent, and process station agents to initialize. The process station agents further instruct the associated process module agents to initialize and await a module initialized message. Once each agent is initialized, the initialized process module agents, process station agents, continuous feed indexer agents, and CMC agent return a controller initialized message to the coordinator agent indicating that the initialization thereof is complete. The coordinator agent thereafter transmits a configure message to each of the initialized agents instructing the agents to configure themselves, preferably by querying the configuration database for configuration data. Once the configuration is complete, each configured agent returns a controller configured message to the coordinator agent indicating that the configuration of that agent is complete.

Following the configuration sequence, the coordinator agent resets each of the other agents and, following the reset, each reset agent returns a controller reset message to the coordinator agent. The coordinator continues its initialization by instructing each of the other agents to "make ready." In response, the process module agents return a module ready message to the associated process station agent. The process station agents, CFI agents, and CMC agent, in turn, return controller ready messages to the coordinator agent. Additionally, the process station controllers and a station ready message to the CFI agent. The coordinator agent then sends a home message to each of the CMC agent, CFI agents, and process station agents. The process station agent, in turn, transmits a home message to the associated process module agents, and receives a module home message when the process module is in the home position. The process station agents transmit a station ready message back to the CFI agent. Each of the process station agents, CFI agents, and CMC agent transmits a controller home message to the coordinator agent.

The coordinator agent initiates the alignment of the processing system by transmitting an align message to the CMC agent and CFI agents. The CFI agents in turn transmits a dancer ready message to the CMC agent to indicate that the dancer is in the ready position. The CMC agent further sends a seek message to the CFI agents to request the index tracking. In response to the seek message, the CFI agents send an indexer tracking message back the CMC agent. The CMC agent and CFI agents further communicate home dancer and dancer at home message until the dancer is in the home position, and thereafter the CMC agent transmits an alignment completed message to the coordinator agent. Once the alignment is complete, the coordinator agent transmits a start message to the CMC agent, CFI agents, and process station agents. The process station agents in turn provide a start message to each of the associated process module agents, which in turn return a module clear message. Thereafter, the process station agents send a station clear message to the CFI agent to complete the coordinator startup sequence.

Figure 72:
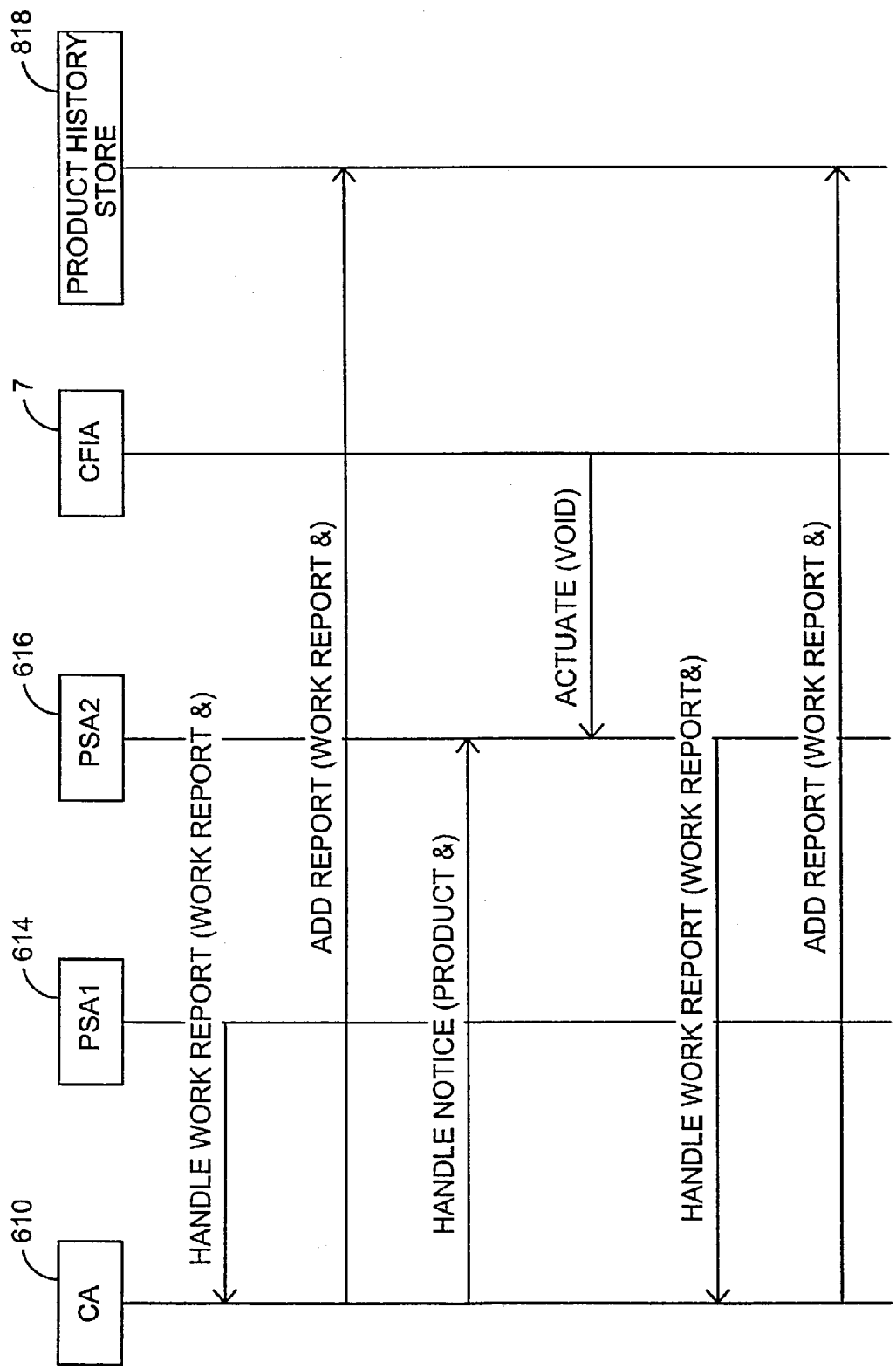
FIG. 72 is a control interaction diagram illustrating the sequence of communications performed during production.

The sequence of messages communicated with the coordinator agent during production is shown in FIGS. 62 and 72, according to one embodiment. Each process station agent reports updates to the coordinator agent regarding the production pieces controlled by that process station agent. The coordinator agent passes the reported updates to the product history store 818 which tracks the location and status of each commanded piece. When the process station agents have all reported to the coordinator agent and the pending updates have been passed on to the product history store 818, the continuous feed indexer agents are commanded to actuate the production line hardware and to index the product pieces to the next process modules. The next process is then executed and the sequence repeats.

During production, the process station agents handle two stages of processing, including sending the "handle article notice" and "actuate" messages. The "handle article notice" message, which is also shown in FIG. 62, is sent from the coordinator agent to the process station agents and contains data that: (1) identifies the product piece; (2) assigns a sequence number to the product piece; (3) identifies the process module controller that will perform processing; and (4) defines the recipe action that is to take place during processing. The data contained in the handle article notice message is stored internally within the process station agents and provides the logical "handshake" between the product pieces, the process modules that perform the production operations on the pieces, and the product history data store that stores the processed information, in addition to instructing the process modules as to how much processing must be performed. The "actuate" message is sent from the continuous feed indexer agents to the process station agents. The process station agents determine which of its associated process modules has product pieces positioned for processing. Using the configuration information, the process station agents calculate the cleat number position at each associated process module. Each process station agent compares the cleat numbers to the sequence numbers that were contained in the "handle article" notice messages. The process station agent actuates all process modules that match a cleat number to a sequence number. After actuation, the process station agent receives "module report" messages from each of its process modules and translates each module report into a work report, and sends a "handle work report" message to the coordinator agent. This enables the coordinator agent to track the location and processing status for each production piece. Once all of the actuated process module agents have sent a "module clear" message, indicating that the corresponding process module is clear to the process station agent, the process station agent transmits a "station ready" message to its associated continuous feed index agent so that the continuous feed indexer may index to the next position only when all process modules are clear.

Figure 73:
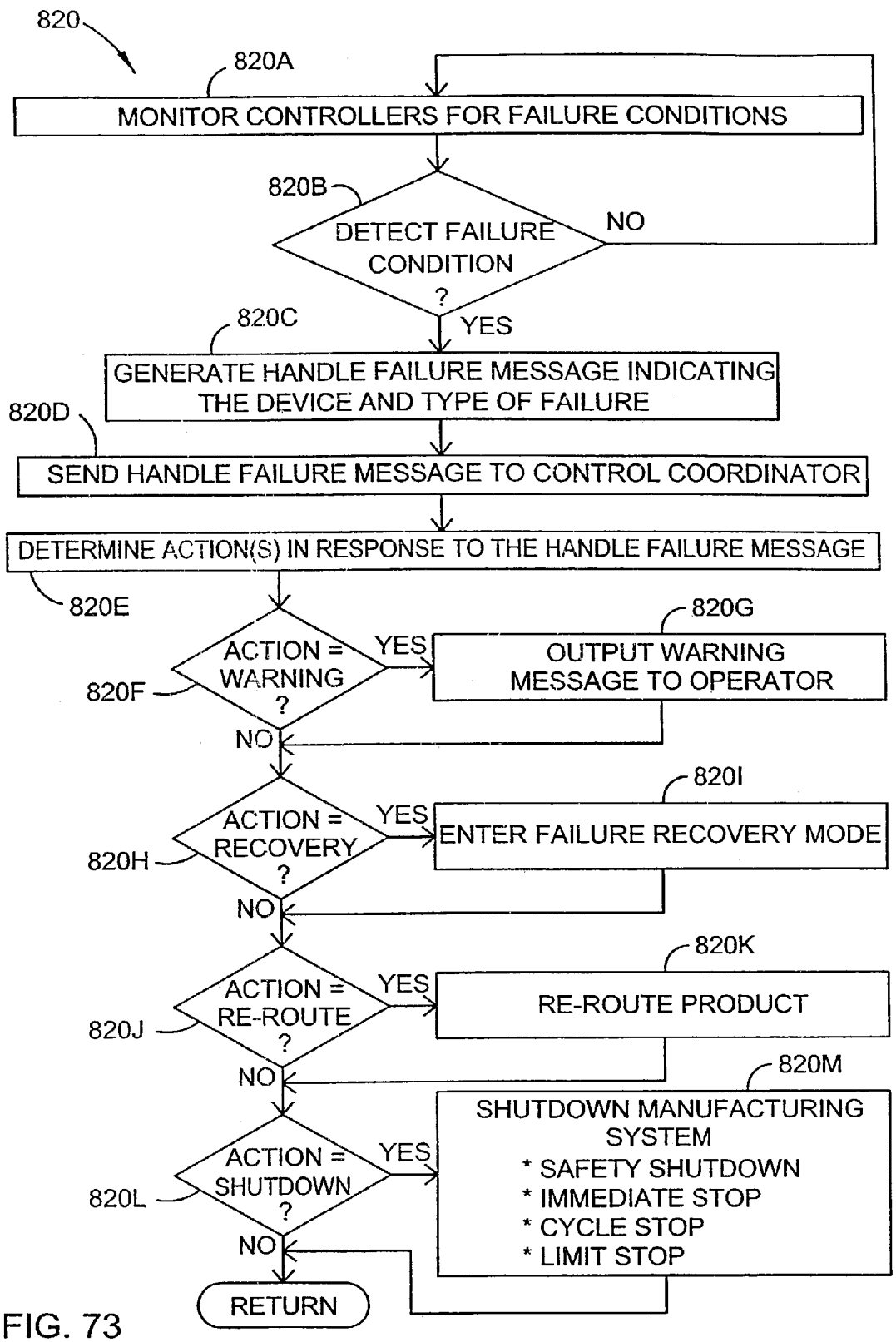
FIG. 73 is a flow diagram illustrating a method for handling failure conditions with the control coordinator according to one embodiment.

Whenever a failure occurs at the process module level, the associated process module agent sends a "handle failure" message to the process station agent, which passes a message to the coordinator agent for processing and/or coordination. When the failure occurs at the process station agent level, the process station agent can sometimes detect its own failure and can simply generate its own "handle failure" message and communicate the message to the coordinator agent. A handle failure control routine 820 is illustrated in FIG. 73, in which the control coordinator agent monitors for failure conditions and determines one or more certain actions in response to a failure condition in order to most efficiently maintain processing of products. The control routine 820 begins with step 820A of continuously monitoring the various controllers for failure conditions. In decision step 820B, the various controllers check for whether a failure condition has been received and, if not, continues to monitor for failure conditions in step 820A. If a failure condition is detected, failure control routine 820 proceeds to step 820C to generate a "handle failure" message. The handle failure message preferably identifies the failed device and the type of failure. In step 820D, the "handle failure" message is sent to the control coordinator agent which, in turn, determines one or more actions to initiate in response to the handle failure message in step 820E. The control coordinator agent, in decision step 820F, checks for whether the action is a warning action and, if so, outputs a warning message to the operator in step 820G. Next, in decision step 820H, failure control routine 820 checks for whether the action is a recovery action and, if so, enters a failure recovery mode in step 820I. In the failure recovery mode, the coordinator agent attempts to recover from the failure such as by resending a command message or configuration data to the controller from which the "handle failure" message was generated. In decision block 820J, the coordinator controller agent checks for whether the action is a re-route action and, if so, re-routes the production process so that all subsequent processing is routed so as to not include the failed processing device. Re-routing of production process may result in reduced processing capability; however, it allows the manufacturing system to continue to operate and, upon repair or replacement of the failed device, full manufacturing capabilities may be returned with minimal loss of production. In decision step 820L, the coordinator controller agent checks for whether the action is a shutdown action and, if so, shuts down the manufacturing system in step 820M. A system shutdown may include a safety shutdown, an immediate stop, a cycle stop, or a limit stop, depending on the type of failure. Thereafter, the handle failure control routine 820 is complete and, if production remains operating, the failure control routine returns back to the monitoring step 820A.

Figure 74:
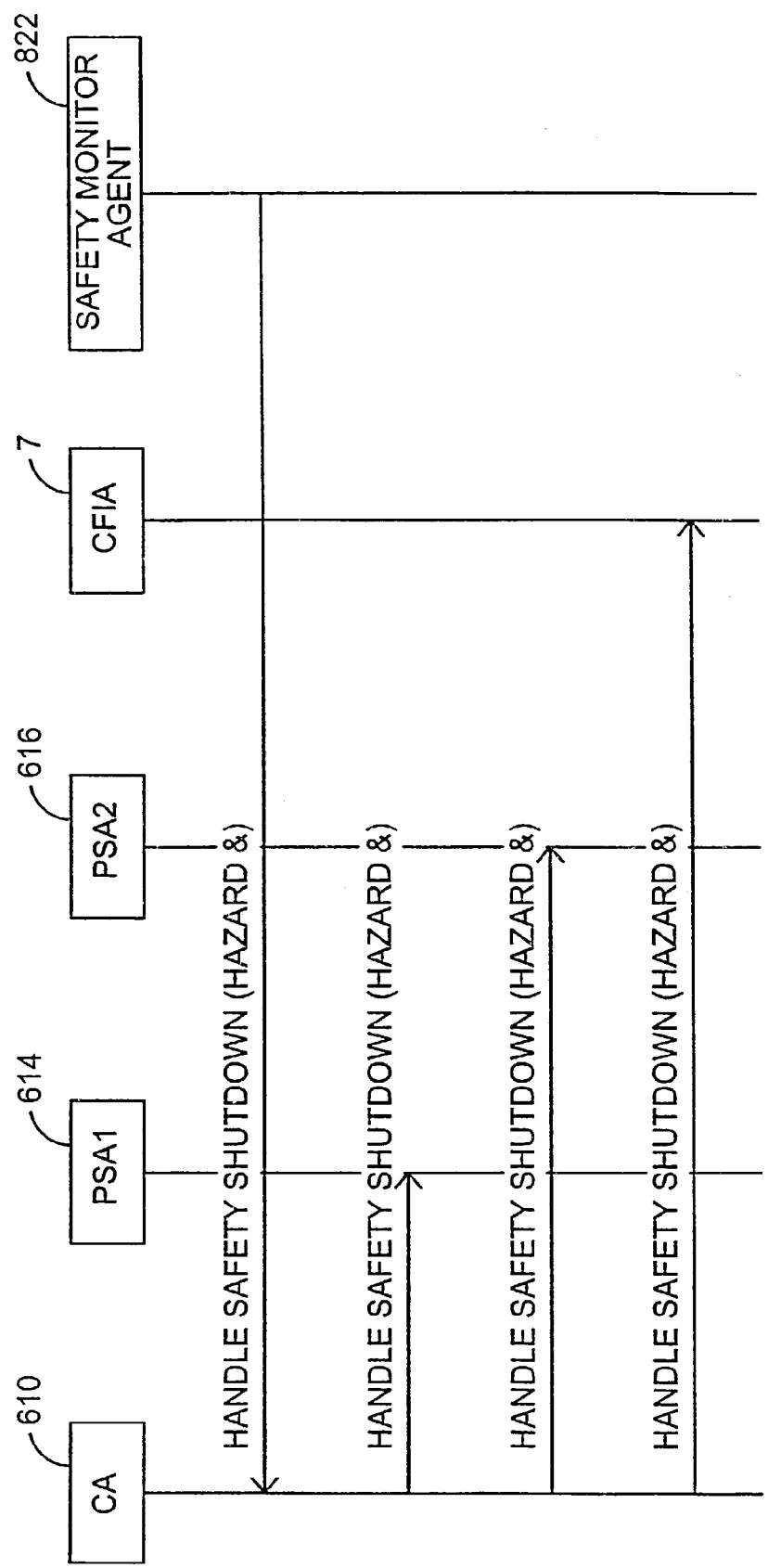
FIG. 74 is a control interaction diagram illustrating the sequence of communications performed during a safety shutdown initiated by the safety monitor agent.

The sequence of messages communicated during a handle safety shutdown routine is further illustrated in FIG. 74. A safety monitor agent 822 detects fault violations, such as the triggering of a safety guard circuit, while the CFI agent and CMC agent detect equipment jams. Upon detecting a fault, the safety monitor agent 822 sends a handle safety shutdown message to the coordinator agent 610 and, in response, the coordinator agent 610 notifies each of the process station agents and CFI agents to perform safety shutdowns.

In the case of any controller within the control system, any agent can raise a handle failure notice, such as is shown in FIG. 75. According to the example shown, the coordinator agent 610 issues cycle stop messages to each of the CFI and process station agents to shut down the system in response to a handle failure message received from the process station 616. Alternately, the control coordinator 610 may determine another course of action, such as to reroute product pieces.

The process module agents are generally designed using software components. The software components are used in many possible configurations to comprise a single agent. A process module agent utilizes a generic template or "shell" to encapsulate the production hardware that the agent controls. The shell allows the process module agents to perform task synchronization, configuration, status reporting, error reporting, event handling, communications with sensors and controls, and servo management (e.g., movement, initialization, and configuration). Through the shell, the process modules control manufacturing devices in a consistent way so that the devices look, act, and feel as one generic device to the control software. The process module software design is consistent so that future software implementation and maintenance requires minimal cost and reconfiguration.

The safety monitor agent is responsible for monitoring the state of the safety system circuitry. Safety monitor agents detect emergency stop, guard open, and other potentially hazardous events, and relays these events to the coordinator agent which, in turn, broadcasts the information to all registered controlling agents in the system via "handle safety shutdown" messages that forces a systematic shutdown of the control system. One safety monitor agent exists per computing processor in the distributed control architecture. Each safety monitor agent is configured with common, as well as locally specific, safety circuitry.

Human Machine Interface (HMI)

The human machine interface (HMI) is responsible for allowing the operator to control the control system and provides the operator with the ability to start, stop, configure, and obtain the status of the system. Diagnostics are enabled through the operator's ability to monitor and force values through the input/output points in the control system. The HMI also allows an operator to jog the production line equipment, such as to change processing operations, perform experimental operations, change processing speeds, etc.

The control software executes within embedded processors and monitors and controls the hardware. User interaction in the form of operator control, configuration updates, data retrieval, and diagnostics with the embedded software occurs through either ethernet connections, serial port connections or direct hardwired inputs/outputs. User functionality is generally uniform regardless of the physical connections. The human-to-machine interface via software is independent of the underlying physical connection. The hardware and software components that are "outside" the embedded portion of the system are used for user interaction or "clients."

The HMI agent software is preferably secure in terms of operational safety and system security. Unauthorized use of the system is preferably blocked via use of one or more different security methodologies which are commercially available and known to those skilled in the art. Passwords and magnetic-striped security badges are examples of some of the methods that may be utilized in the control system to maintain access security control.

Interactive control of the control system is preferably limited to one operational user at a time. While an unlimited number of users can have read-only permission to view the status of the control system, only one operator at a time has read-write permission to change control values within the control system. The control system HMI allows delegation of read-write data access to another device (e.g., a wireless terminal), but this transfer of control only occurs through a master panel by an operator that has appropriate system access privileges. Other types of user interaction devices are allowed to interact with the system (with read-only permission) such as data acquisition devices including data mass storage units, computer disks, modems, and ethernet communication boards.

The HMI agent also provides safety protection to the hardware portion of the system. Any operator initiated action that could potentially damage the system equipment will preferably cause an operator warning. The operator then has the option to continue or stop initiation of the system control action. Graphical interfacing to hyper text markup language (HTML) and Java-based applications interact with the HMI agent software. Thus, viewing the status of the production process interactively from a remote area is possible. It should be appreciated that HTML and Java programming languages are commonly used for Internet interfaces, and should be readily understood to those skilled in the art. Additionally, the control system includes a message handler agent which handles various messages generated by other software agents. Such messages are typically debug messages, exception messages, and failure messages. These messages are character strings that software agents send to a device, such as a computer monitor, a printer, a computer disk, an e-mail file, a pager, or an Internet connection, as well as other electronic devices.

Models

Communication Model

The control system is composed of various physical parts that interact with each other fluently to allow the system to be homogenous, distributed, and highly communicative. An inherent interdependency exists among the subsystems. Certain subsystems must complete their functions before other processes can start their own processing. Each of the interdependent subsystems provides a service to the control system. The subsystems interact with each other through a client-server relationship as described herein. The client, which can be a computer, a subsystem, a block of programming logic, or a software object, is the requester of data or a processing service. The server, which likewise can be a computer, a subsystem, a block of programming logic or a software object, is the provider of data or processing services that the client is requesting. For example, a process station might request delivery of a new process piece by a continuous feed indexer. In this example, the process station is the client requesting a service from the server (CFI) that is satisfying the request. The requests from a client to a server are handled through messages. When a message is sent from a client to a server in the form of a request, a message is typically sent back to the client in an expected format.

Figure 76:
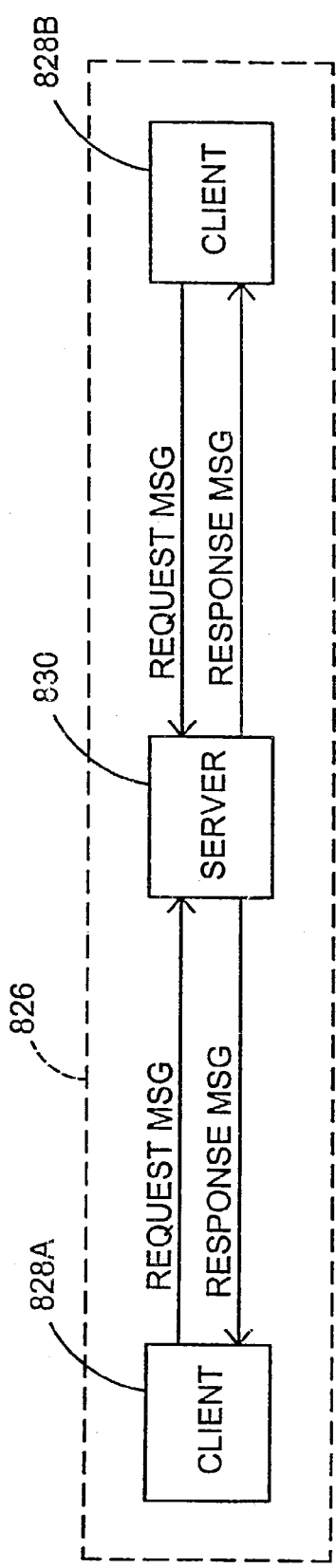
FIG. 76 is a block diagram illustrating communication between a local client and server within a machine according to one embodiment.

As shown in FIG. 76, the client and server may commonly reside in the same computing machine 826, in which a local client/server communication exists. For local communications, the client 828A sends a request message to the server 830 and, in turn, the server 830 responds back to the client 828A with a response message. Likewise, a second client 828B communicates with the local server 830 in the same manner.

Figure 77:
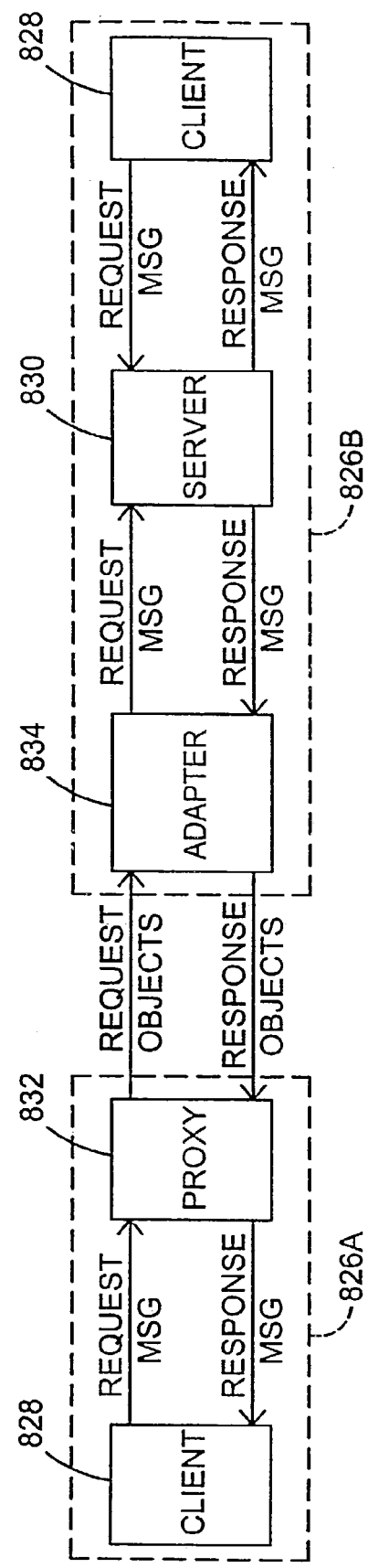
FIG. 77 is a block diagram illustrating communication between a client and server in separate computing machines according to a second embodiment.

The client/server relationship may also exist in a remote scenario on separate computing machines 826A and 826B as shown in FIG. 77. The remote scenario occurs when the client and server reside in separate computing machines, and the messages must be serialized through a network proxy to a network adapter to be processed by the server. A network listener may manage connections between the network proxies and network adapters. The proxy 832 provides the underlying functionality for a client 828 to send a message to a remote server 830 via an adapter 834. The proxy 832 is the interface that encapsulates all of the client-side network communications between client 828 and server 830. This allows the client 828 to transmit a message to a server 830 in the same fashion, independent of whether the server is on the same machine or on another machine. On every machine there preferably exists a proxy for each remote server to handle the messages received by that server. The interface that the proxy exposes to a client is identical to the interface exposed by the server.

A proxy contains one or more bi-directional object streams for communicating request message objects to the server and return response message objects back to the client. A message object can be thought of as a group of messages. An object stream provides a stream of data that may be fairly simple, such as a socket stream which writes to a network socket, or more complicated, such as a stream handler which buffers messages in an internal queue.

Figure 78:
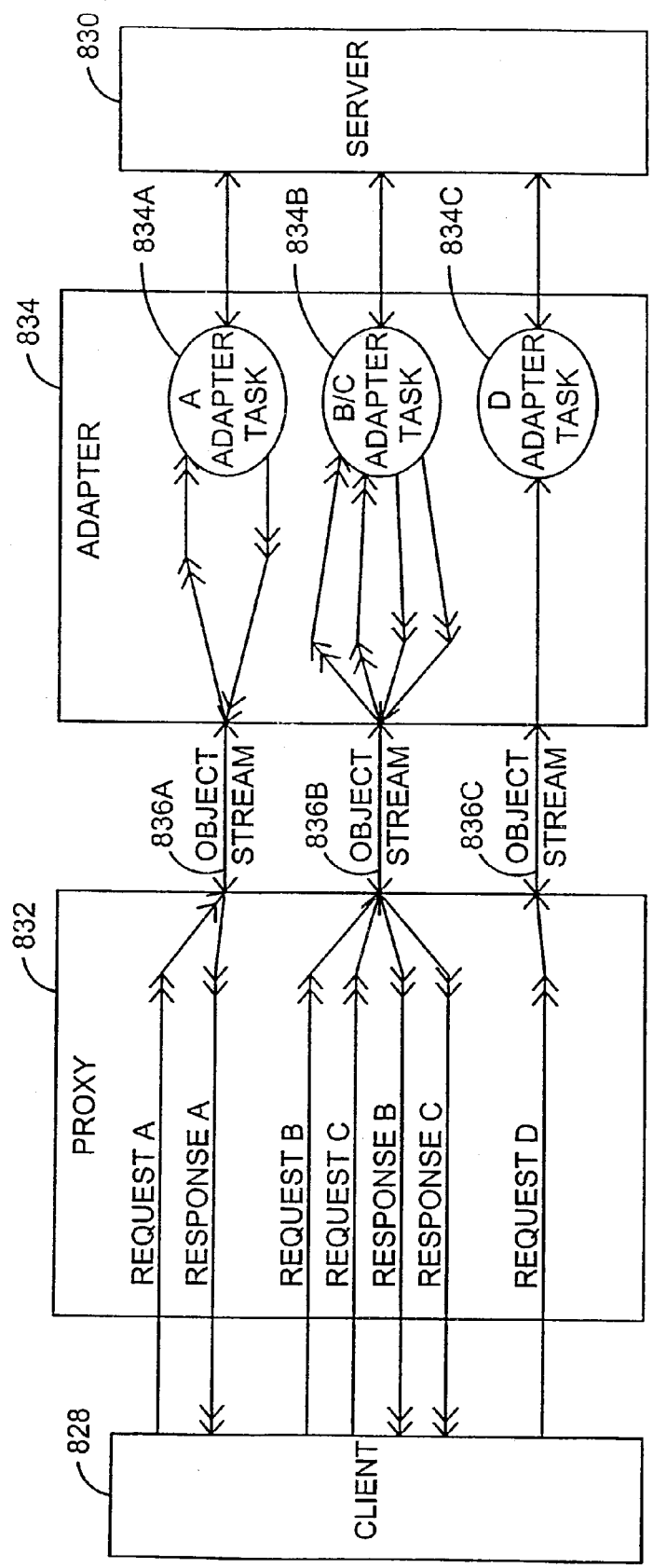
FIG. 78 is a block diagram illustrating the communication of messages between a client and server via the use of a proxy and adapter.

Referring to FIG. 78, an example proxy layout is illustrated therein according to one embodiment. As shown, request data is sent out from client 828 via proxy 832 on one object stream 836A, and its return values are received via the same object stream 836A. Similarly, requests B and C are sent out on another object stream 836B, and their return values are received through the same object stream 836B. Request D uses a third object stream 836C. Since the request does not have an expected return value, the client 828 will return immediately once request D has been queued.

The adapter 834 is the counterpart of the proxy 832 and provides the underlying functionality for a server 830 to process a request message from a client 828. There are at least one or more proxies talking to an adapter, while each proxy preferably talks to only one adapter at a time. The adapter 834 is the interface between the request message object that a client proxy 832 sends over the object stream to the server 830. The adapter 834 retrieves the message objects from the object stream, decodes the objects, and ensures that the appropriate message is received at the server 830. If the request message has an expected return value, then the value is encoded into the response message object and sent back over the stream to the originating client 828. If the server 830 generates an error message, the adapter 834 catches the message and transmits the error message to the proxy 832 for proper handling by the client 828. Accordingly, there are three adapter tasks 834A–834C, one to service each of the two object streams, and one to process the corresponding messages.

Where a server has only one proxy connected to its adapter, the proxy and the adapter may be connected directly. However, when multiple proxies are connected to a single service, an intermediary component, referred to as a listener, may be employed to accept all proxy connection requests for that server and create new adapters to respond to the proxies to allow for a dynamic number of proxies and adapters within the control system. The listener provides the functionality of multiple remote proxies to connect to a single server, and waits for connections at the server network address. When a remote proxy connects to the listener, the listener creates a new server adapter that the proxy will use to communicate with the server.

Figure 79:
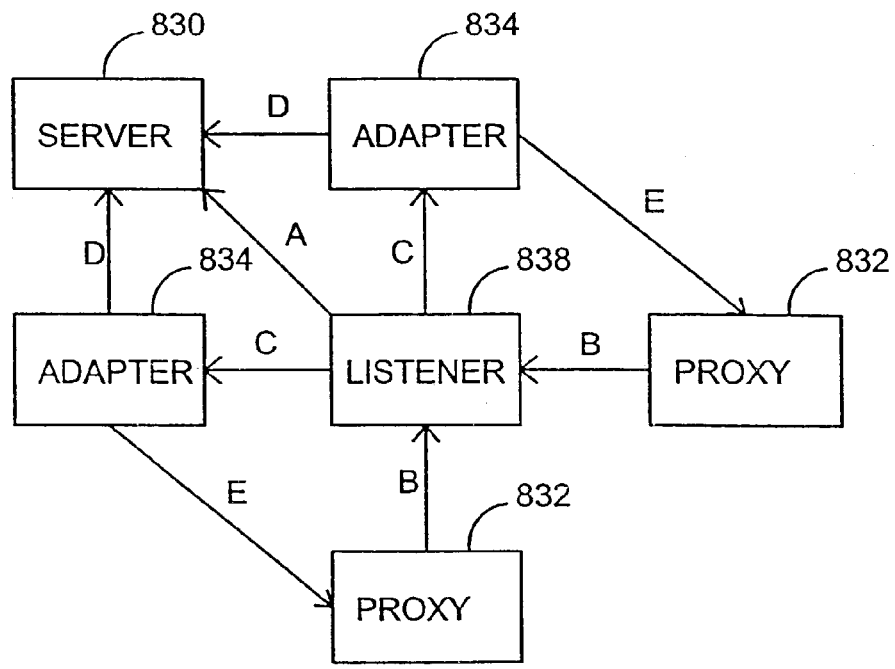
FIG. 79 is a block diagram illustrating a sequence of interactions with the use of a listener.

Referring to FIG. 79, various interactions between a listener 838, proxies 832, and adapters 834 are illustrated for establishing a communication connection. The listener 838 is created and assigned to a server 830 in the first interaction (A). In the second interaction (B), proxy 832 connects to the listener 838. In the third interaction (C), the listener 838 creates a new adapter 834 object. The adapter 834 is then assigned to the same server 830 that it associated with the listener 838, in the fourth interaction (D). Finally, in the fifth interaction (E), the adapter 834 takes over the connection with the proxy 832.

DDS Model

The control system includes a distributed data service (DDS) model which serves as a standard interface to data storage and acquisition within the control system. The DDS enables access to information without interference to the operation of the application that generates the information. If data is being accessed remotely, either for a user interface or for diagnostic purposes, the control system does not have to wait for permission to update the data. Instead, synchronization between the control and informational data priorities is taken into account, especially in the area of user data locks. In addition, the DDS model allows updates to information that are transparent to users.

Data updates occur automatically through an association between the information source and the information presentation interface, so that a user need not ensure that the remote access data is updated for each use. The DDS model further allows for the storage of information on volatile and non-volatile media using the same interface. The interface to the information storage media is generally independent of the choice of media, thus permitting access to the state of sensors when a power loss occurs. Types of storage media may include, but are not limited to, disk drives, battery-backed SRAM, flash RAM, and conventional RAM. The DDS further enables local and remote access to information through a text-based name so that a user has the capability to access information by use of the name.

Figure 79A:
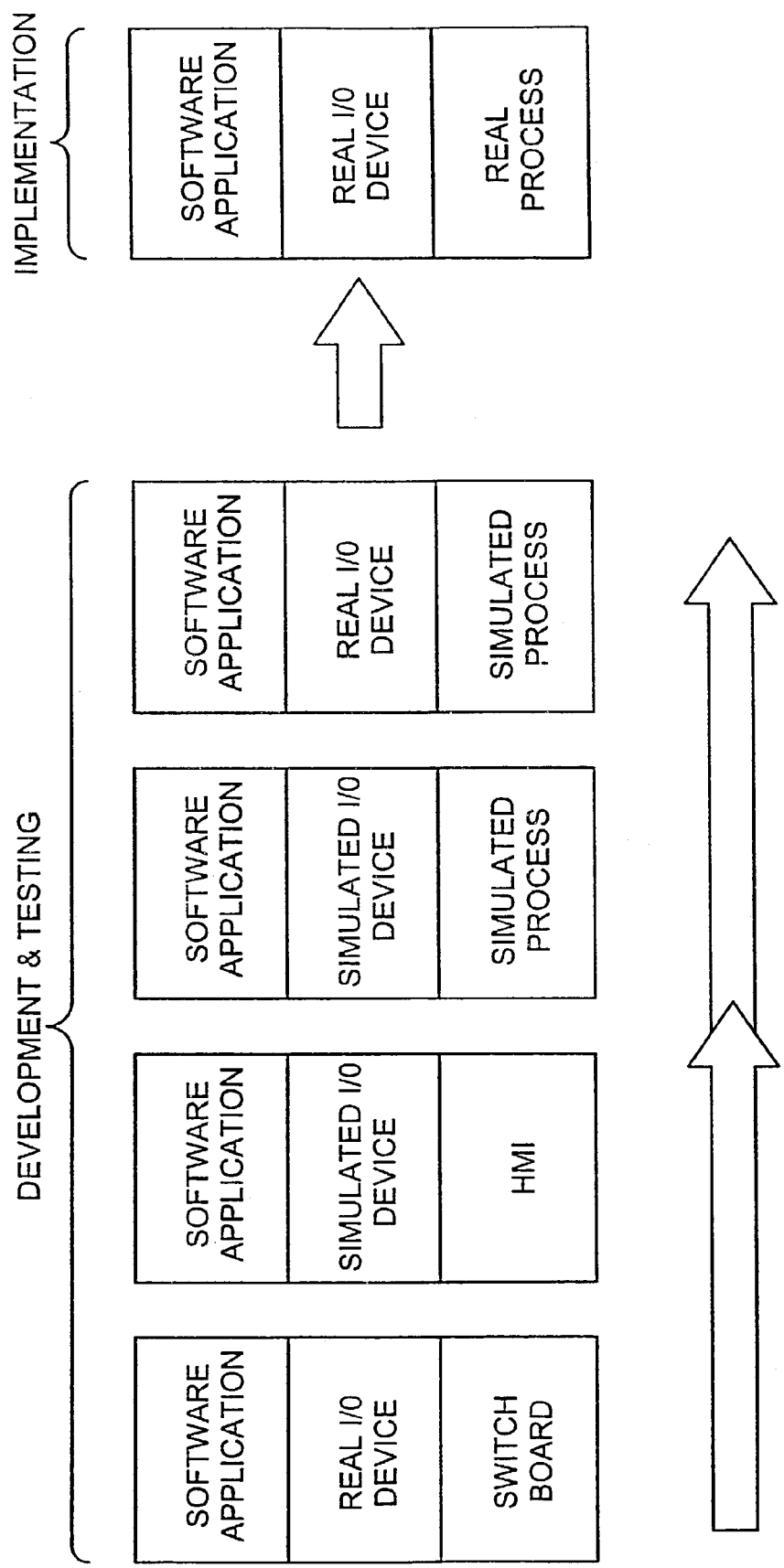
FIG. 79A is a block diagram illustrating remote manipulation of data during development and testing and implementation.

Application developers may be permitted to manipulate information remotely to provide simulated sensor responses, such as providing simulated sensor inputs for forcing state behavior for a machine either during the development and testing of a new machine or application, or to diagnose problems on the manufacturing floor. Throughout development, testing, and implementation, the control system software application does not change. Generally speaking, application developers may not always have all the pieces of hardware that go into a system at their disposal, but they must continue to be productive in developing the application. Referring to FIG. 79A, it can be seen that regardless if data is being generated by a test switchboard (a collection of toggle switches and/or pushbuttons) an HMI, a programmable logic controller (PLC), a process module device, or a set of software "black boxes," the application is able to continue processing without change to the DDS interface software.

Finally, the DDS provides logging capabilities for real-time information with respect to time. Since information may not by physically accessible in real time at all times, methods of logging the information may be provided so that the sensor profiles are obtained. This is useful for mapping information from encoders to describe a move profile for a servomotor, for example. Optimization algorithms for process control and closed-loop process setpoint adjustments may be communicated through the DDS model or with a designated agent.

Event Model

The control system application software programs respond to asynchronous events from a variety of internal and external sources. An event is defined as a change in state (digital) or value (analog). The events that the control system responds to include device, timer, and software interrupts, digital input transitions (i.e. ON-to-OFF or OFF-to-ON), analog value changes, and operator input. The control system employs a single model for event handling to simplify the understanding and maintenance of the control system application. The event model employed by the control system accommodates both primitive, device-level events and high-level, synthetic events, uniformly. As such, the event model encapsulates details of handling device-level events. Encapsulation is achieved by adopting an object-oriented model for event handling, in which events are messages and other objects are notified of their occurrence by method calls (messages). One embodiment of an event handling model that is used for the control system application is known as the delegation model which is a uniform, object-oriented model that is relatively simple as compared to other real-time event handling schemes currently in use with conventional control methodologies.

In the delegation model, the following two kinds of objects are involved in event handling: event sources and event listeners. An event source gives rise to events. Some examples of event sources include: devices that generate interrupts; interval timers; sensors; and user inputs from a graphical user interface (GUI). An event listener is an object that is interested in the events generated by a particular event source. An event listener indicates its interest in an event source by registering or subscribing with the source dynamically. An event source can have multiple listeners, and an event listener can register with multiple event sources. The delegation model requires that all listeners for a particular type of event implement a corresponding interface (set of methods), which is referred to herein as the notification interface for the event type. When an event occurs, the event source notifies each of its listeners by calling the appropriate method from the notification interface for the event, passing the event object as an argument. The delegation model is a variant of the observer design pattern.

A notification method of an event listener should execute, at most, a few instructions (e.g., set a variable or signal a condition) before returning, and it should not block. If further actions are required, a notification method can signal a task that will carry out the actions on behalf of the listener. If an event listener does not need to respond to some types of events generated by an event source, the event listener can provide an empty (no-op) implementation for the corresponding notification methods. A listener can deregister itself when it no longer needs event notifications.

An event source may have listeners of different types, and a listener may register with event sources of different types. The delegation model may not be appropriate when the class of an event recipient is exactly known when the event source is designed. A notification interface is normally just a part of a listener's class interface, and it may consist of a single method. Multiple inheritance may be used to "mix in" a notification interface with one or more other interfaces, which need not be related to event handling. A single event class can actually represent multiple event types, each with its own notification interface. For example, a Java class called MouseEvent represents both mouse button events and mouse movement events, which have separate notification interfaces named MouseListener and MouseMotionListener, respectively. This is exceptional; however, there is normally one notification interface, with one or more methods, per event class.

Messaging Model

Figure 80:
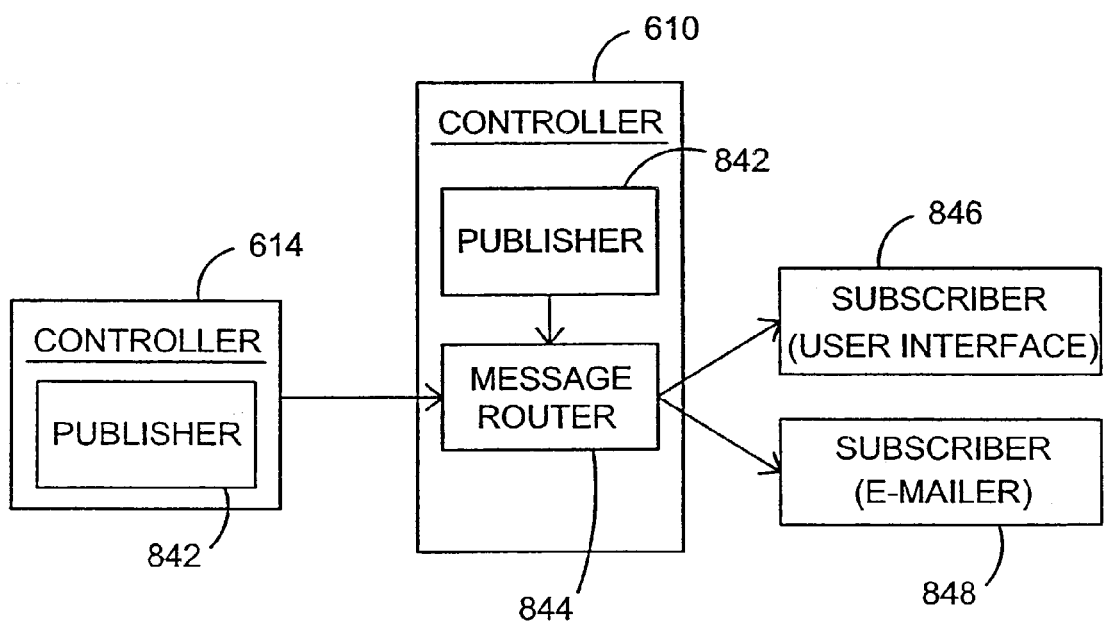
FIG. 80 is a block diagram illustrating the routing of messages from publishers to subscribers with a messaging model.

The control system further employs a messaging model that allows the messaging agent software to communicate information about the activities of the control system. Messaging services provide information regarding the status of the system and allow the different components of the system to know how their interdependent component counterparts are doing. The messaging model is illustrated in FIG. 80 having a message router 844, publishers 842, and subscribers 846 and 848. The message router 844 has access to and receives data from one or more publishers 842. The message router 844 routes only the subscribed information to user interface subscriber 846 and e-mailer subscriber 848. Control system components selectively listen to the status of other components within the system. The selective listening is achieved through this methodology that is known as a publisher/subscriber relationship. The publishers 842, or information originators, make their information globally available to whoever wishes to read the data. The readers of the information, or subscribers 846 and 848, want to know about only some of the information that is globally available. The messaging model subscriber plugs into only the data that are of interest to the subscriber.

There are many implementations within the control system framework where the messaging model is utilized. For a User Interface like the HMI, subscription to information like alarms and warnings is mandatory. Preferably, users must know the status of the system. Realtime data, such as process module pressure, temperature, and fluid levels can be communicated through the DDS model or the messaging model. Data logging is another example of a messaging model implementation. Trending and other data analysis functions demand that data is available for them to operate. Debugging facilities, both local and remote, generally cannot occur without the messaging model. Also, messaging services can be used to interface to external information display systems. The use of marquee display panels is common in manufacturing facilities to globally inform employees of the status of the production line addresses safety issues and aids in performing equipment maintenance. The messaging model also makes its information available to interface to e-mail, pagers, cell phones, and other human readable message devices.

The messaging model performs message logging and is software logic that allows the control system software to transmit human-readable messages. The messages are text-based and are transmitted as character streams. Messages are sent to only those subscribers that have expressed an interest in the messages from a particular message publisher. The message logger then records messages for later reference. This is important for a subscriber that may have been busy executing a high priority piece of logic when the message was originally transmitted or blocked by some other software agent activity. Because the message logger has recorded the message, the tardy target subscriber can acquire the message at its leisure, catch up with its required reading, and process the message.

Message routing occurs by assigning a subject to a message when the publisher transmits the message so that each message has an assigned subject. The assigned subjects within the system are finite and are preferably known throughout the entire control system. If a software agent wants to know about alarms, the agent will subscribe to a subject named "alarms," or something similar to that subject.

Platform Independence Model

The control system has a software platform which is an environment containing a specific combination of computer hardware and operating system software within which an application performs its processing. Manufacturers of computer hardware attempt to supply processors that adhere to industry standards, but commonly add features that distinguish their equipment from competing hardware. Likewise, developers of operating system software attempt to follow stringent standards to keep their systems "open" to other computing devices through standardized software interfaces. However, software developers also typically provide extended functionality. The control system of the present invention is platform independent so as to avoid a complex undertaking to program an interface to every possible hardware and operating system function that exists.

The solution that was devised to allow the control system to achieve a platform-independence involved a definition of functionality that could be encapsulated for use on all computers, regardless of operating system or processor hardware. While platform abstraction is a more complex design task than addressing individual interfaces, implementation, maintenance, and reuse of the software interfacing are simplified once the design process has been completed. According to one embodiment, the Portable Operating System Interface (POSIX) standard is used as the design and implementation standard for the platform independence model. The core elements of the POSIX standard for hardware and software hold the desired functionality for much of the computing equipment that is currently available. The platform independence model addresses and provides the functionality that is found to be common to the widest possible array of computing platforms.

There may be functional areas within the platform architecture that are different. In particular, operating systems use different methods for tasking. This means that programs are executed in different ways. One type of operating system may perform multitasking between many programs by giving each program an equal amount of processing time on its central processing unit (CPU). Another operating system may weigh "time slices" between programs based on some prioritization method. Still another may process program logic threads (or logic flows) on a first-in, first-out (FIFO) basis. Also, tasking priorities can be different on different operating systems. A task that runs at a priority of "1" could be running the highest possible priority on one operating system, while on another operating system it would be running at the lowest possible priority.

Data representation can have disparate formats on different platforms. Thus, the data representation that is found on one platform could be the reverse representation on another. POSIX does not encompass all differences between different operating systems. Analysis has shown that platform specific software is limited to a few areas (i.e. tasking, I/O, and servo control). Where there are disparities, lower level custom software can be programmed and be made available to the rest of the system framework. New platforms can be added through modification of only the platform specific software. This leaves the majority of the control system intact and standardized for use on any platform. Some examples of commercially available platforms that may be used by the control system include: Windows NT on Intel x86; VxWorks on PowerPC; and VxWorks on Intel x86. Examples of commercially available operating systems that may be included within the control system framework are: Windows 95/98; Windows 2000; Windows CE; Linux; IRIX; HP-UX; UNIX; QNX; and Open VMS. Examples of commercially available computer hardware candidates that may be used with the control system include: DEC Alpha-family of computers; SUN; Motorola 68xxx and 68xx; Motorola Digital DNA; Net Silicon NetArm; and Lucent Technologies Coldfire.

I/O Model

Figure 81:
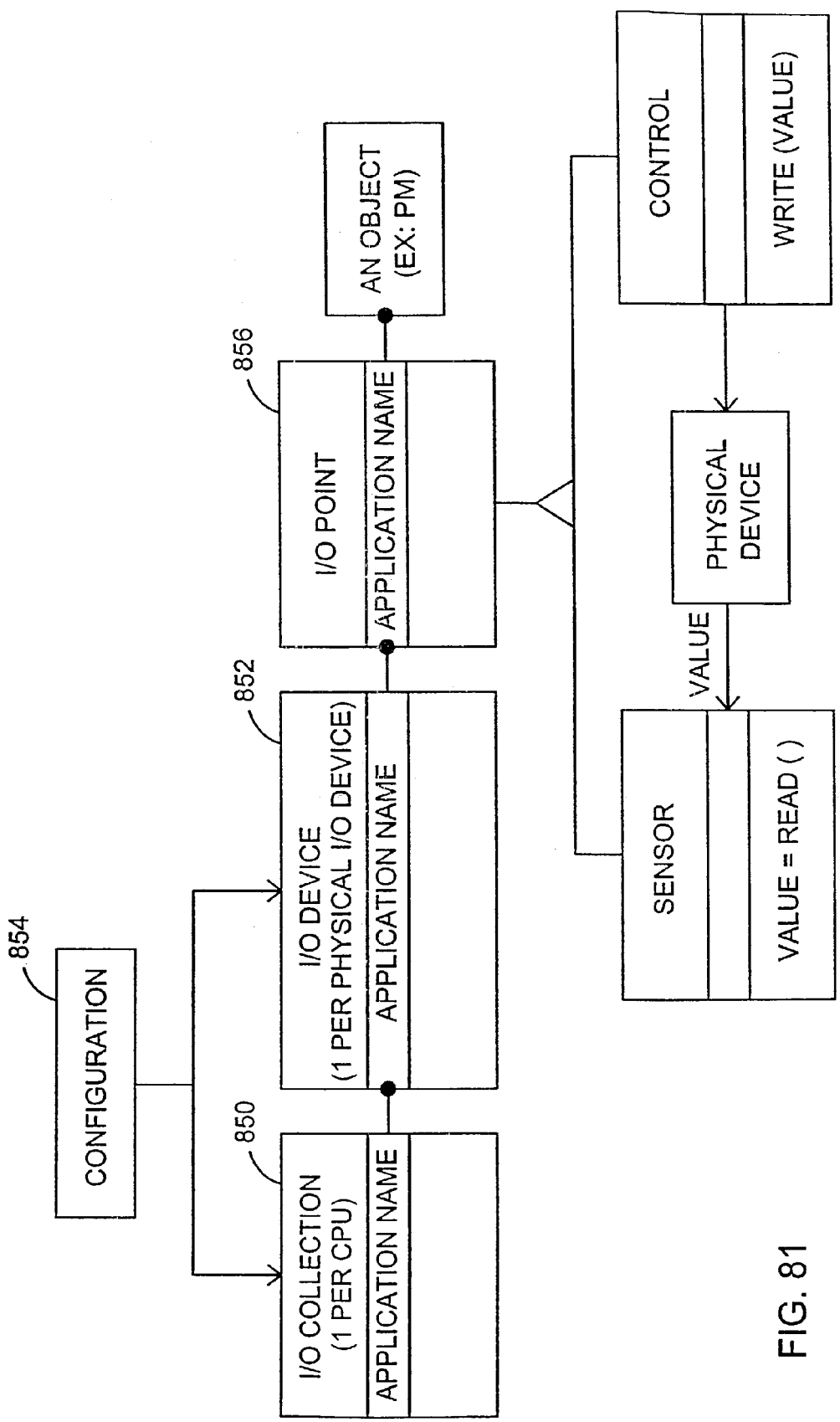
FIG. 81 is a block diagram illustrating components of the input/output encapsulation model.

Also included is an input/output (I/O) model that abstracts the design of common I/O types and devices. The I/O model makes all input/output devices look the same to the control system. The I/O model removes dependencies that are created by specific hardware implementations and enables interaction between software agents based upon the intended roles of I/O devices within the control application framework. One embodiment of the I/O model is shown in FIG. 81. The I/O model has encapsulation components including an I/O Collection encapsulation 850 and an I/O Device encapsulation 852, both coupled to a configuration store 854. In addition, the I/O model has an I/O Point encapsulation 856. The I/O Collection encapsulation 850 represents all of the Inputs/Outputs of a (single CPU) controller, and exists for configuration and diagnostics. Upon system startup, the I/O Collection encapsulation 850 creates an I/O Device encapsulation 852 object for every physical I/O device within the system as specified by the configuration files within the configuration store 854. The I/O Device encapsulation 852 represents the specific implementation of a physical I/O device such as a MATRIX DIO (digital input/output) board. Upon its creation by an I/O Collection encapsulation 850 at system startup, each I/O Device encapsulation 852 creates I/O Point encapsulation objects 856 to map its physical I/O to a logical I/O that has meaning in regards to the production line.

Figure 82:
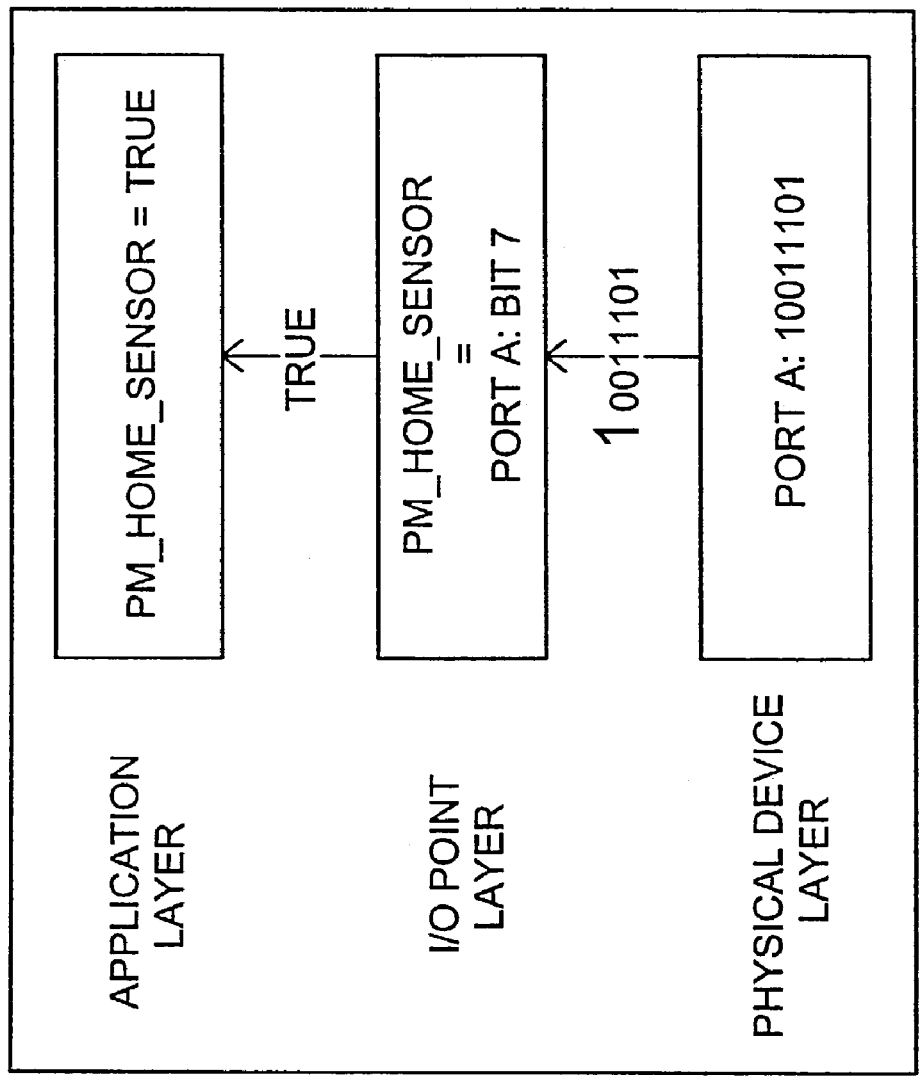
FIG. 82 is a block diagram illustrating input/output point mapping between physical device and application layers according to one example.

One example of I/O Point mapping between physical devices and application layers is illustrated in FIG. 82. The I/O Point provides the mechanism for tasks to access inputs/outputs without knowledge of the underlying physical design. An I/O Point may represent a sensor or a control, and may represent analog or digital (byte or bit) values. The characteristics of an I/O Point depend not only upon its device type (for example, MATRIX DIO), but also upon the specific application of the device (for example, a Spin Disk process module). Based upon its physical device type and application use, an I/O Point's configuration and operation as a sensor or control is inherently defined at system configuration by the I/O Device.

Servo Model

The processing system may require extensive use of servomotors to control conveyors and production line actuators. Since many types and models of servomotors are commercially available in the marketplace, a common software interface to control servo motion was created. The common, standardized interface provides flexibility to the control system requirements. The servo model design provides a set of hardware independent motion routines that satisfy the needs of the control system. During the design process, it was recognized that different vendors have implemented specific features in their hardware that are not common to all hardware. The servo model addresses the specific features that are common to most servomotor hardware, regardless of vendor. In particular, the servo model contains functions to initialize the hardware, make basic profile moves, and monitor the state of the motor and controller. The servo model also provides mutual exclusion protection for public methods where necessary or, in other words, it safeguards operation of the servo equipment from software blocking when other logic has a higher execution priority.

The servo model preferably includes the basic motor control requirements that are commonly found on virtually all servo hardware, some of which includes: initialize controller software, controller hardware and motor hardware; set closed loop gain parameters and motion profile parameters; move continuously at a controlled velocity with specific ramp up/down acceleration; move point to point using a trapezoidal motion profile; move point to point using smoothing filters such as S-curve and velocity feed forward; perform ratio coupling of two axes (electronic gearing); provide encoder position information; provide motion status information such as move has/has not been completed; provide controller status information for hardware failure detection; and initiate motion based upon a specific event and start or modify a move based on an external event. Not all of the above-identified basic motor control requirements are needed for every type of servomotor that is incorporated into the control system. The servo model can process any mix of these motor control requirements. It should be appreciated that Implementations of the servo model may be used for other powered equipment, such as electronic drives and motors.

Figure 83:
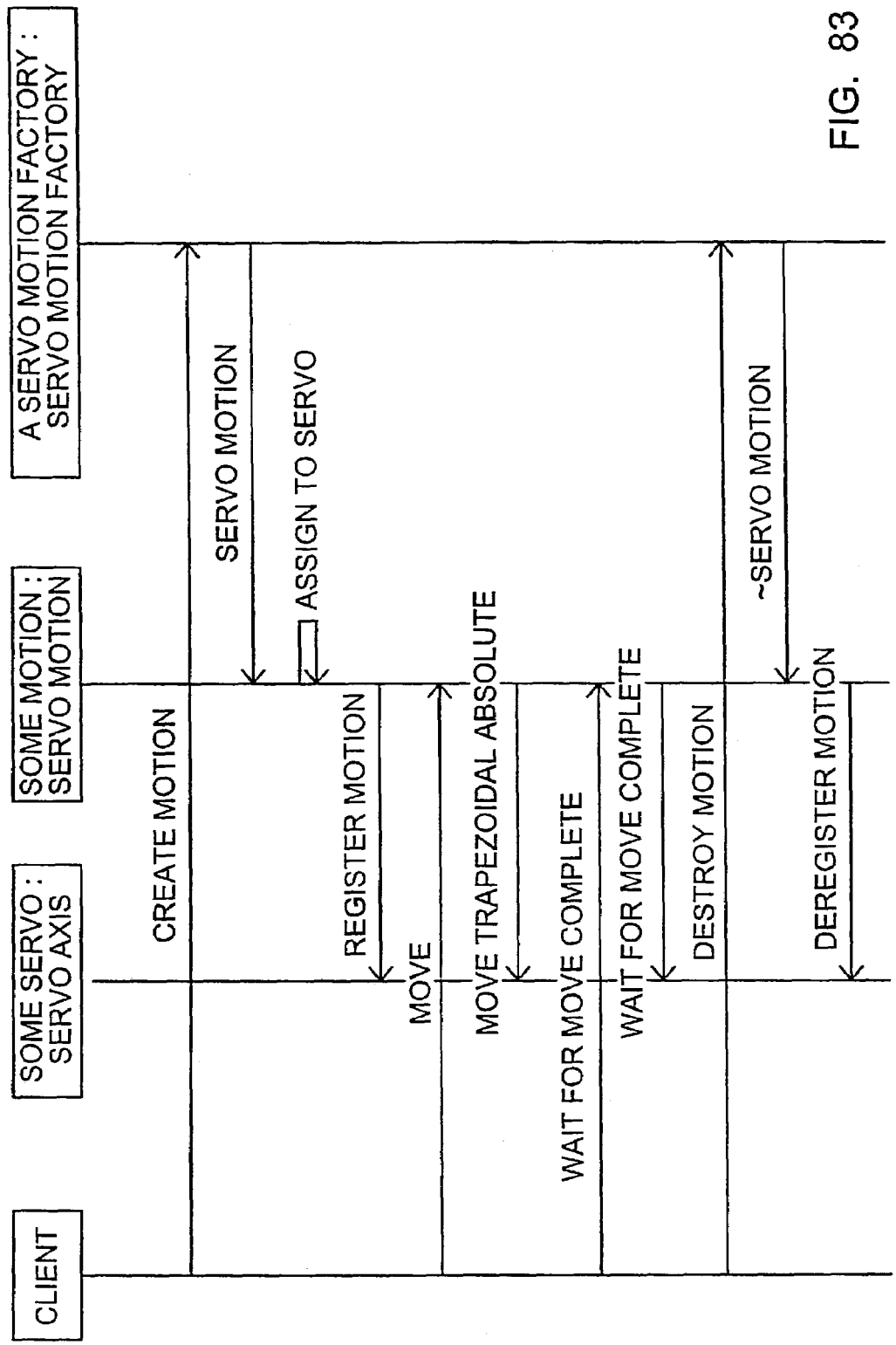
FIG. 83 is a control interaction diagram illustrating the sequence of communications performed during servo motion control.

Referring to FIG. 83, an example of a sequence of communications for achieving servo motion with the servo model is illustrated. The servo motion sequence includes the client sending a "create motion" message to the servo motion factory. The servo motion factory generates a "servo motion" message which is assigned to a servo to register the requested motion and axis of movement. The client sends a "move" message to the servo motion that in turn executes movement of the servomotor. Following completion of the motion, the servo deregisters the executed servo messages and waits for the next message. The first four messages (CreateMotion, ServoMotion, AssignToServo, and RegisterMotion) occur at system startup or system boot time. The next four messages (Move, MoveTrapezoidalAbsolute, and two WaitForMoveComplete messages) occur when the servo is commanded to actually perform a movement. The last three messages (DestroyMotion, ServoMotion, and DeregisterMotion) take place at system shutdown time. Thus, the movement messages are recurring during production and the startup and shutdown messages occur only once.

Figure 84:
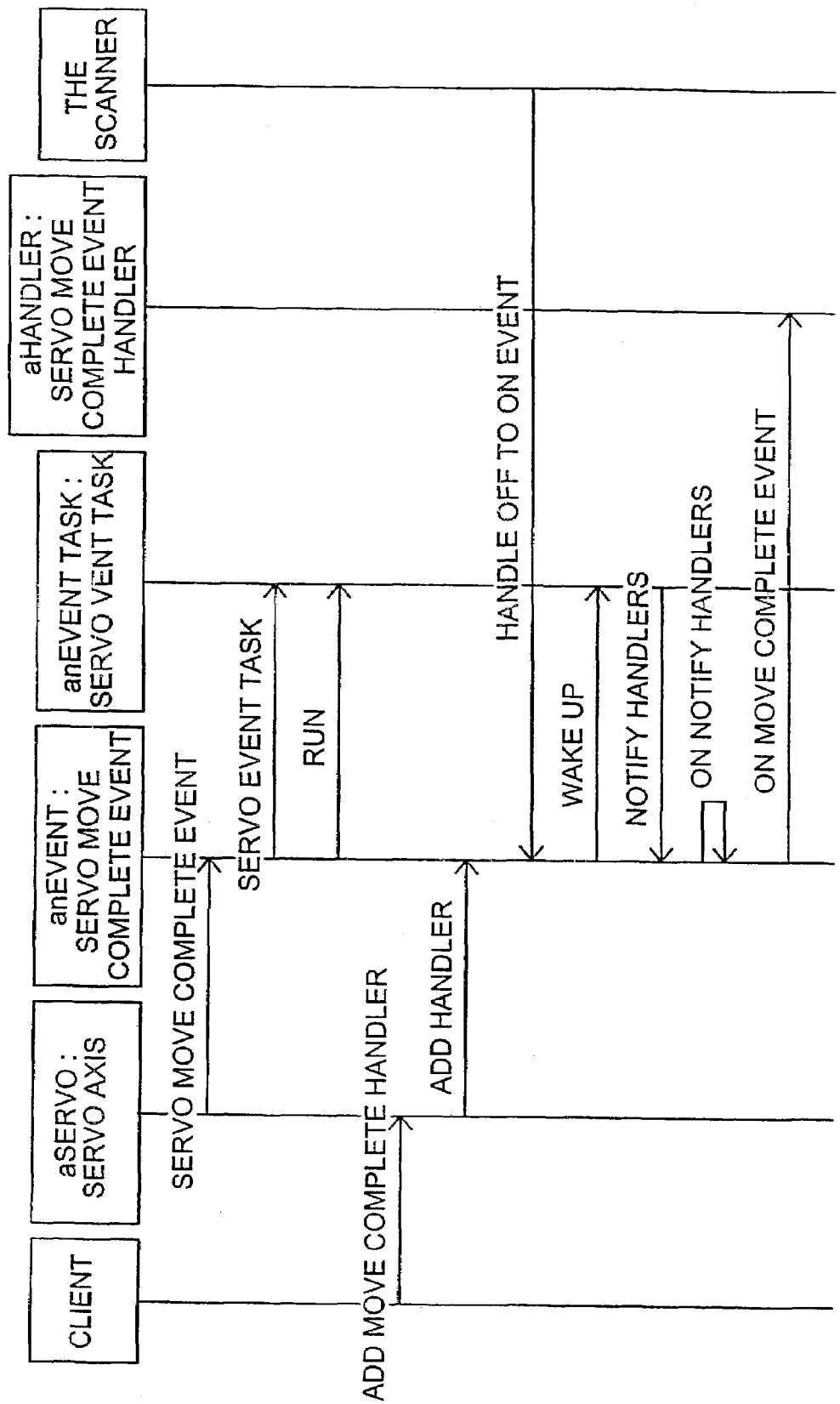
FIG. 84 is a control interaction diagram illustrating the sequence of communications performed during event handling of the servo motion.

The event handling sequence for the servo model is further illustrated in FIG. 84. The first five messages (ServoMoveComplete, ServoEventTask, Run, AddMoveCompleteHandler, and AddHandler) are generated at system startup or system boot time. The software object, aServo: ServoAxis, creates a message for every possible servo movement axis. Another software object anEvent:ServoMoveCompleteEvent, receives the ServoMoveCompleteEvent messages. During startup, it will locate a corresponding monitoring task for each ServoMoveCompleteEvent message and start the task. It locates the appropriate task via a ServoEventTask message to the anEvent:ServoEventTask software object and starts the task with a Run message to the same object.

Client, in this diagram, indicates process module agent (PMA) software, continuous motion conveyor agent (CMCA) software, or continuous feed indexer agent (CFIA) software. Thus, during the startup sequences, the CMCA, CFIA, and all the PMAs will create event handlers for all the possible "movement complete" events that require monitoring.

The scanner performs polling of specified digital I/O. When a "movement complete" event occurs, the scanner transmits its "HandleOffToOnEvent" message to the AnEvent:ServoEventTask object. At this point, the set of production oriented messages is initiated (i.e., from "HandleOffToOnEvent" to "OnMovementCompleteEvent"). The anEvent:ServoEventTask object knows which task it needs to wake up because it has a comprehensive list of event handlers associated with the digital I/O that indicate a "movement complete" event. So, it initiates a "WakeUp" message that starts the correct event handler task, waits for a response from the task ("NotifyHandlers"), and performs some internal processing, if necessary, with the "OnNotifyHandlers" method. If additional processing must be performed by software outside the confines of the servo encapsulation, the software object aHandler: ServoMoveCompleteEventHandler, is triggered via the "OnMoveCompleteEvent" message and passes its own message to an appropriate software agent.

Implementation Independent Interface ($I^3$)

Figure 85:
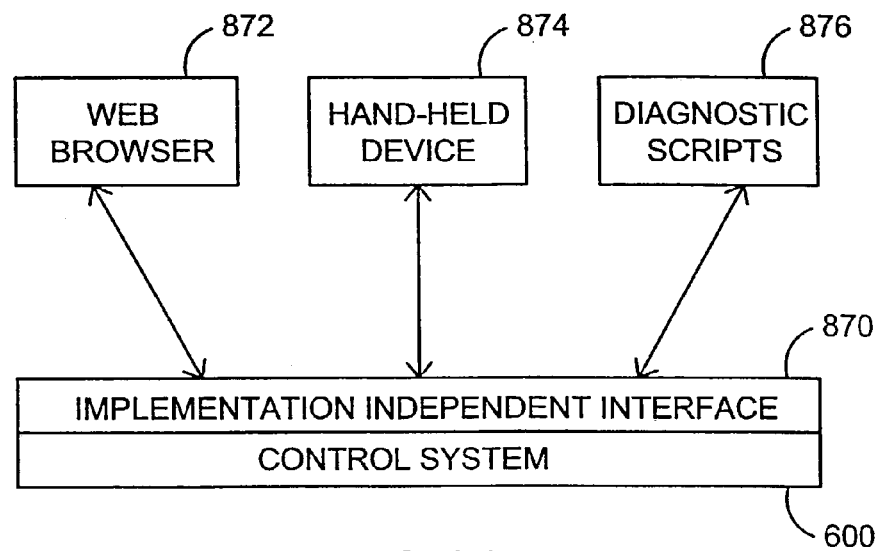
FIG. 85 is a block diagram illustrating the use of an implementation independent interface for interfacing the control system with remote communication devices.

Platform independence is not just limited to computing hardware and operating systems. Referring to FIG. 85, the control system 600 also employs an implementation independent interface ($I^3$) 870 that allows the control system to interface with web browsers 872, diagnostic scripts 876, and hand-held portable computing devices 874 such as palm processors, wireless terminals, laptop computers, etc. Interfacing software to each of these remote devices is necessary to enable the control system framework to remain flexible so that various types of communication devices may interact with the control system. The implementation independent interface 870 provides platform independence so that the control system may be implemented with different web browsers, portable computing devices, and new industrial processors, with very little effort without requiring substantial configuration changes. The implementation independent interface supports text command protocol over Internet protocols on ethernet, and may be implemented to be amenable to Java/web-based front ends. The implementation independent interface further allows testing through command scripts which is especially attractive to process simulation engineers and, since the command protocol is text based, viewer applications may execute on any platform.

The implementation independent interface provides a response for each command request from a client. This acts as a handshake for issuing subsequent commands. The client, or requester, knows that the server ($I^3$) has received its request and has responded either successfully or unsuccessfully. The implementation independent interface provides a facility for client registration for asynchronous notification. Though the client originates most dialogs between client and server, there are circumstances when the machine control (server) needs to notify the client of an event. Clients register with the implementation independent interface to be notified of certain events. The server registers the client and sends an unsolicited message whenever an asynchronous event occurs. This is especially useful to notify clients of error messages and alerts. Clients can cancel their registration with the server with a simple request.

The implementation independent interface command structure allows new commands to be added without loss of compatibility to the commands formerly in use, which allows for the expansion of functionality to other web browsers and computing/communication processors. The implementation independent interface allows the transmission of commands regardless of the transmission medium or host architecture. The interface permits clients to use serial lines, hard-wired I/O, and ethernet to communicate commands. Classes of software logic exist to cover the requirements of transmitting through most any communications medium, regardless of protocol (e.g. RS-232C, RS-422/RS485, RS-449, TCP/IP, ATM, etc.)

Clients that are operating with different hardware than the server, or executing tasks written in a different programming language, are given a viable interface through the implementation independent interface. If C++ "ObjectStreams" are used to pass objects between clients and servers, a client is restricted to either passing only C++ objects or to pass a generic message object that is encapsulated within a C++ "wrapper." The implementation independent interface permits the use of the command interface with languages such as Java, C++, C, as well as (hyper text markup language) HTML and web browser scripts. Version information that clearly identifies the protocol and the set of commands that the interface understands, is available to clients and is returned by the interface. Clients are made aware of what set of commands and what protocols are currently implemented within the control system, which becomes especially important when additions are made to the command structure.

The implementation independent interface command structure also enables configuration, operation, and monitoring of the computing processors by users. The machine control software executes on one or more processors and controls and monitors I/Os throughout the control system. The operators, who start/stop and monitor the machines, and the engineers, who tune machine operations, are able to access the machine control software through the implementation independent interface. In addition, the implementation independent interface allows clients to be disconnected from the interface at any time. When wireless hand-held devices are to be used as a user interface, disconnection can occur often. The underlying communication connections between the clients and the interface are not persistent. The implementation independent interface does not require a dedicated connection for asynchronous notifications or for debugging clients like some conventional systems require. The interface releases the communication resources when it determines that the connection is broken, thereby enabling clients to be truly portable (i.e. mobile).

Further, the implementation independent interface provides a method to monitor client commands and server responses, which is useful as a debugging tool as well as a monitoring tool. System troubleshooters can see what was sent as a request and what was returned as a response. Also, it can be determined when messages were sent and what control system framework components sent the messages. The client registers with the interface to receive all commands and their responses. The client may then process the data and/or display the data.

Figure 86:
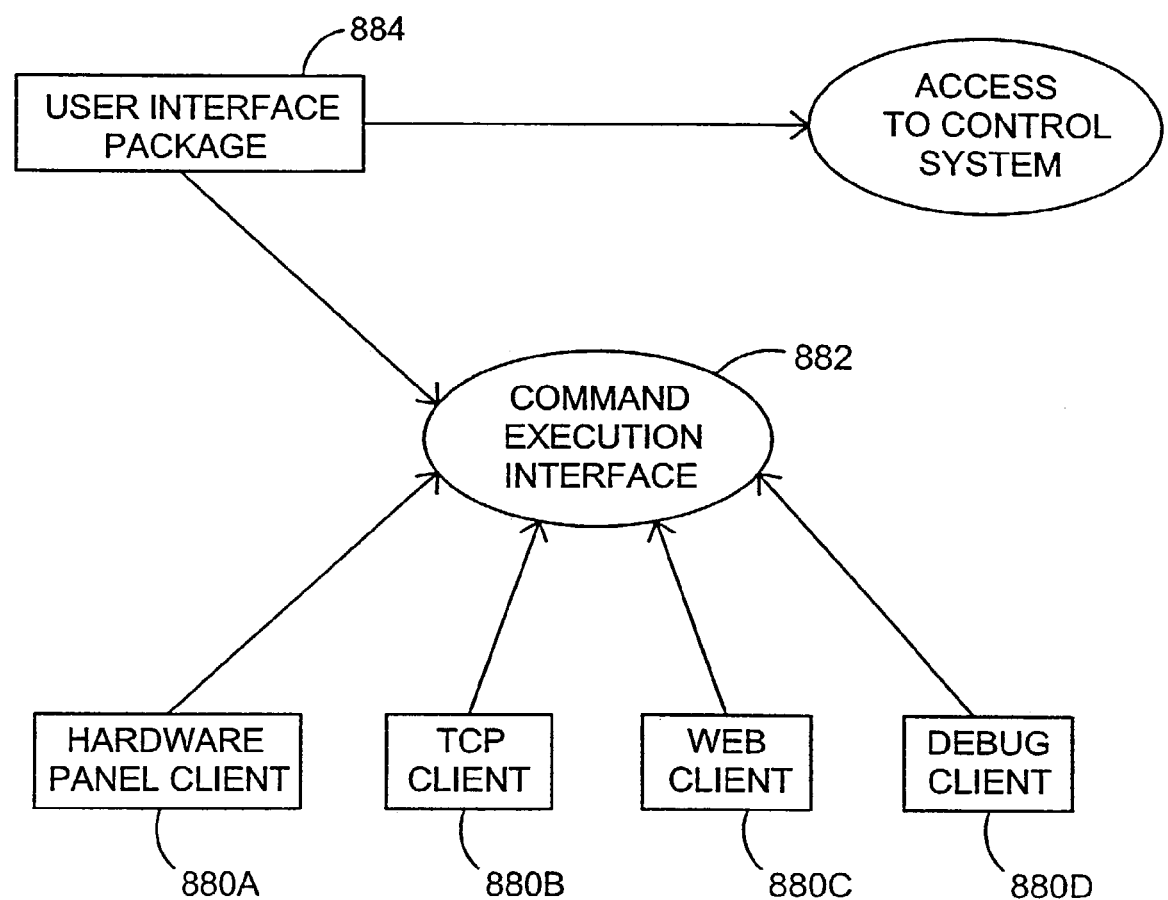
FIG. 86 is a block diagram illustrating user interface package interactions with the implementation independent interface.

As shown in FIG. 86, the implementation independent interface provides a server/client relationship in which the physical connections that access the control software can vary from ethernet connection to a hardwired input or output, and can be extended to wireless clients. The software and hardware components that make up the physical connections in FIG. 86 to interact with the embedded control software are referred to as clients. The user interface portion, made up of hardware panel client 880A, TCP client 880B, web client 880C, and debug client 880D, of the implementation independent interface presents an ASCII command interface. Clients send commands through a command execution interface 882 to the implementation independent interface. The commands are then processed by the user interface package 884 and the control software. The control software generates responses and routes the responses through the implementation independent interface back to the appropriate clients. The client then interpret the responses and make the responses available to the user.

To further illustrate, a TCP client 880B could represent a Telnet session with the user interface package 884 through the Ethernet. The web interface, if present, is provided through a web server. The web server acts as a broker between the web browser(s) and the user interface package. The web server, as a client, is represented in the user interface package 884 as a web client. The underlying physical connection for these clients and the transmission of requests from and replies to the clients are encapsulated in a UIClientInfo software class in the user interface package. All of these clients use the same ASCII commands protocol to access the control software. This ensures that the server task in the user interface package that executes the commands is the same for all clients. The command execution interface, in turn, treats all these clients the same way. New clients implement new physical connections. Client functionality is captured in a UIClientInfo base class in the user interface package.

Commands are text strings with parameters represented as lists of text strings. New commands may be added by extending a UICommand base class. Further, these commands may be intercepted and interpreted by the clients to implement built-in commands, which may be useful in building tests.

Data Stores

The control system configures a number of data stores for storing data in memory, preferably non-volatile memory such as flash memory, battery-back non-volatile random access memory (NVRAM), a computer disk file, etc. The control system is able to store and access the data internally or remotely. The control system software architecture uniquely configures each logical software entity or agent for configuration storage. The configurations may be retrieved from memory. In addition, each production piece has a process map or product itinerary (recipe), associated with it which is stored in a product itinerary storage. The product itinerary details each process module location that the product piece must visit to undergo each processing step. In the event that a process module encounters a failure, the product itinerary is modified dynamically so that product rerouting can occur without shutting down the production line.

A product history storage is also provided in which all entries are time stamped. Data for each individual product piece that is manufactured through each of the process steps is accumulated and all entries are time stamped. Data that reflects failures of any kind are stored in a failure data store. Hardware failures, software exceptions, debug messages, or information logs are found in the failure data store repository. Access to this data facilitates the generation of management reports, fault analysis reports, preventive maintenance schedules and other reporting functions. A message log storage is used to capture all messages that flow through the control system. Whenever a message is transmitted from one software agent to another software agent, the message is logged within the message log store, which may be employed for purposes of debugging and reconstructing production operations. Finally, a distributed data system (DDS) log storage contains a history of all data transactions that occurred within the control system.

Electronic Production Scheduling

Figure 87:
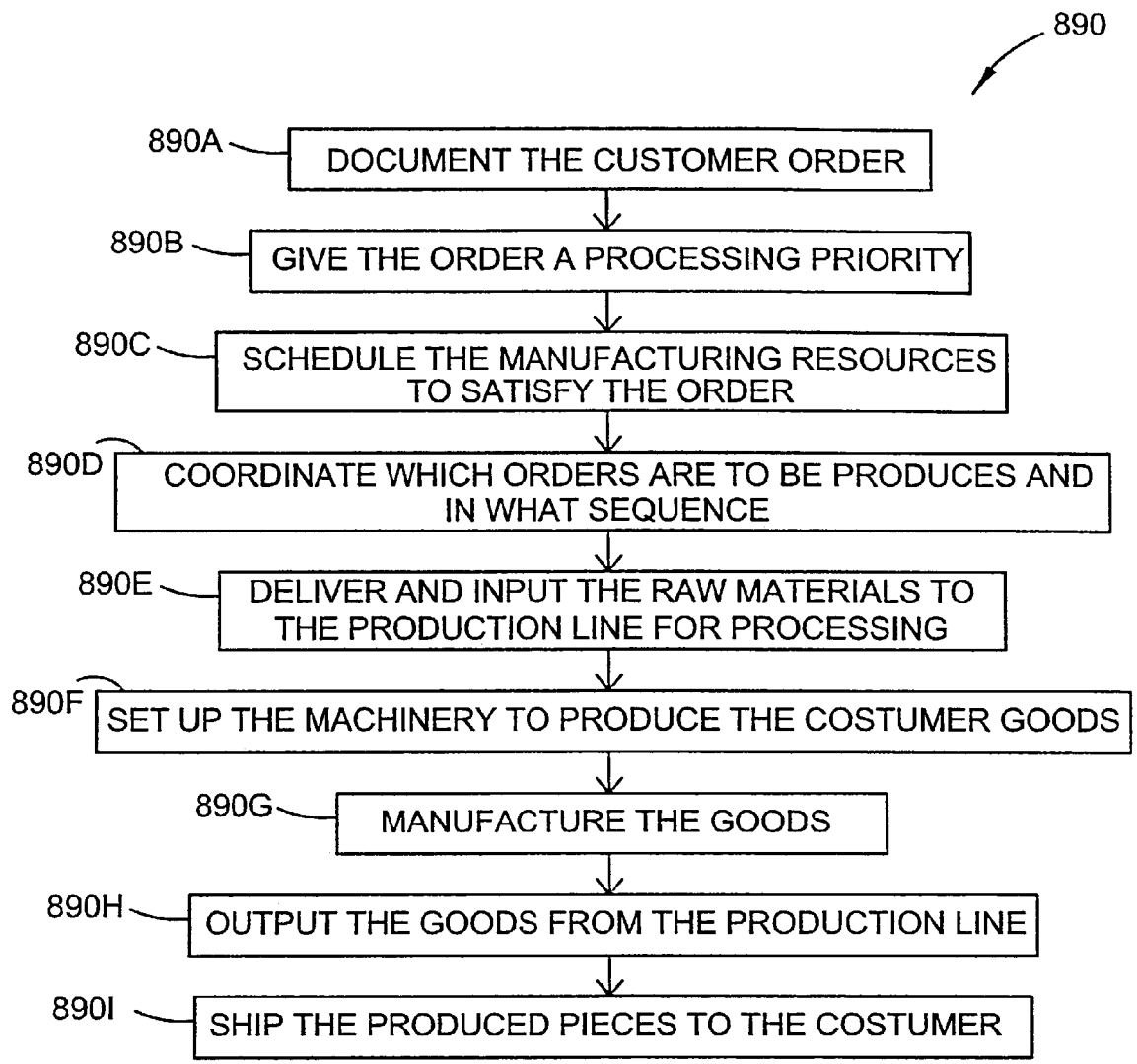
FIG. 87 is a flow diagram illustrating a sequence of steps from a customer order to shipping product to customers.

The control system may further include electronic production scheduling that allows for automation of the processing system by translating customer orders for goods into manufacturing outputs. Electronic production scheduling is achieved by providing functional links to a corporate network to receive the customer order request. The steps that are generally involved in receiving a customer order through providing a customer shipment are shown in routine 890 in FIG. 87. In step 890A, a customer order is documented. The order is given a processing priority, in step 890B, and the manufacturing resources are scheduled to satisfy the order, in step 890C. In step 890D, coordination as to which orders are to be produced and in what sequence is determined. Next, in step 890E, raw materials are delivered and input to the production line for processing. The machinery is setup to produce the customer goods, in step 890F, and the goods are manufactured in step 890G. The manufactured goods are then output from the production line, in step 890H, and the produced pieces are shipped to the customer, in step 890I.

Figure 88:
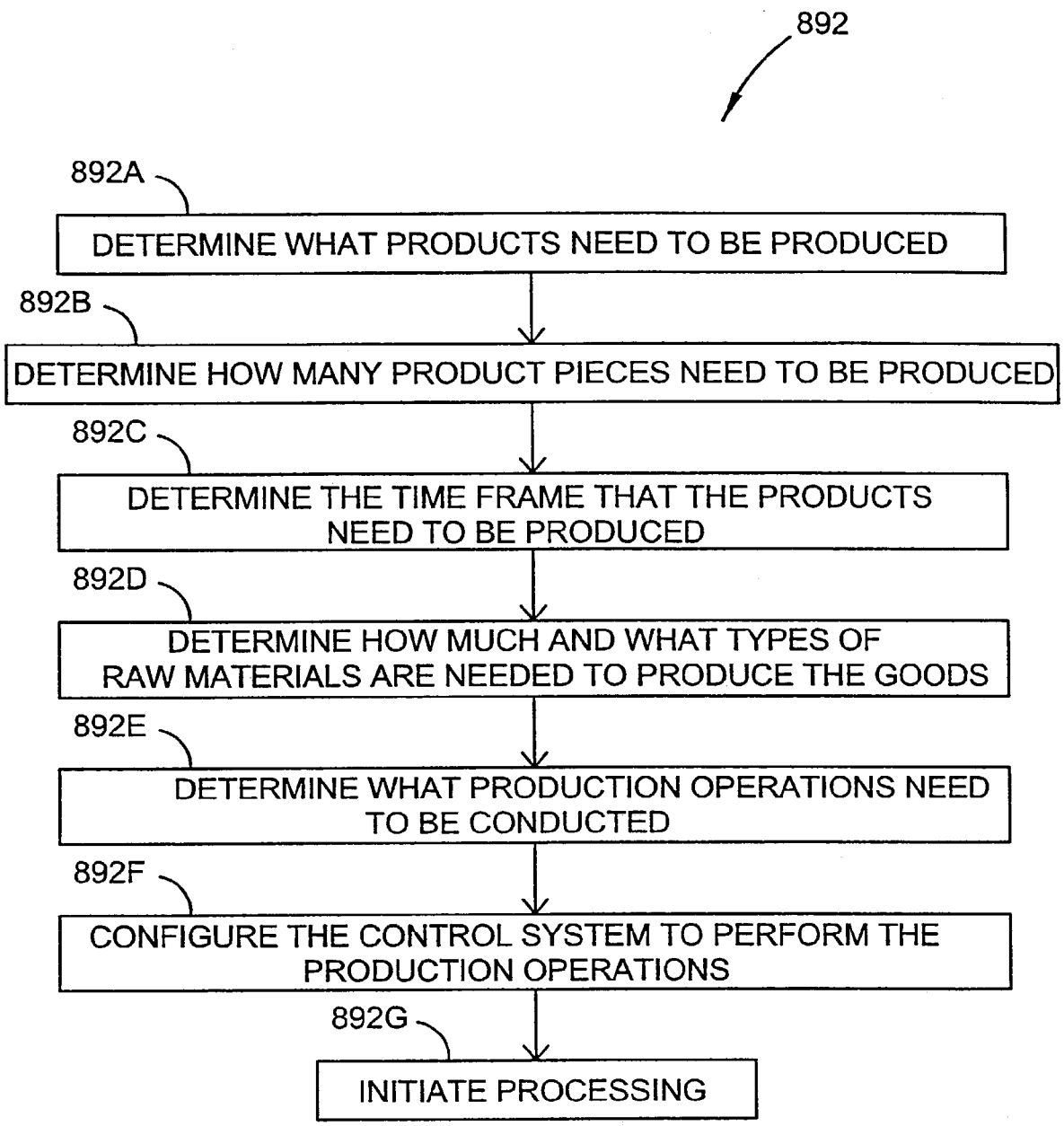
FIG. 88 is a flow diagram illustrating steps performed by an electronic production scheduler.

Manufacturing corporations often have administrative computer systems that record customer sales orders, often referred to as an order entry system. Order entry satisfies the first two steps 890A and 890B. The control system performs the input of raw materials to the production line for processing, sets up the machinery to produce the customer goods, manufactures the goods, and outputs the goods from the production line as set forth in steps 890E–890H. Electronic production scheduling, with the possible exception of scheduling raw materials and shipping the goods to the customer, performs the processing steps in an automated manner. With electronic production scheduling, customer orders are used as input data to determine what needs to be manufactured. The electronic scheduler translates the customer needs into production needs, then coordinates the resources needed to produce the goods in a timely fashion. Through software logic, the electronic scheduler undergoes a number of decisions as shown in the routine 892 in FIG. 88. The electronic scheduler determines what products need to be produced, in step 892A, and determines how many product pieces must be produced, in step 892B. In step 892C, the scheduler determines within what time frame the products have to be made. In step 892D, the scheduler determines how much, and what type of raw material is needed to produce the goods. In step 892E, the scheduler determines what production operations need to be conducted. In steps 892F and 892G, the scheduler then configures the system to perform the necessary processing to produce the scheduled product, and initiates the processing.

The electronic scheduler extracts product quantity, priority, and time to complete from the order entry system. These three elements of data make up an in order entry. An Enterprise Resource Planning (ERP) system may be utilized to determine the amount and types of raw material that need to be processed to create the quantities needed by the customer. Coordination takes place between the ERP and the Scheduler that puts the raw materials at the production line at the correct time and in the correct quantity. The scheduler then generates a production recipe. The recipe is downloaded to the control system as a dynamic configuration file. The downloaded configuration is then implemented into the normal production process by activating or deactivating process modules on the production line.

Trending

The incorporation of trending software into the Human Machine Interface (HMI) is provided to manage the manufacturing operations. Historical data stores are queried for specified process variables for specified ranges of time. Resultant trend charts are available for operator views on computer monitors, data storage, or prints to hardcopy. The types of trend charts available include Pareto charts, pie charts, scatter diagrams (regression analysis), bar graphs, line diagrams, and three-dimensional graphs, among other generic or specialty trend charts.

Virtual Simulation

Virtual simulation testing software may be employed to simulate all of the production hardware without actually interfacing to the physical devices. Conveyance system components such as the Continuous Motion Conveyor (CMC), the Continuous Feed Indexer (CFI), and servomotors are replicated as virtual components in the virtual simulation software. Virtual pushbuttons, switches, and sensors are simulated as emergency safety equipment, positioning I/O, and feedback mechanisms. Process modules are imitated as logical black boxes that emit the same behavioral properties as their physical counterparts. This testing software is a highly flexible and dynamic suite of virtual simulation objects that allows process engineers to configure a virtual production line to: perform process experimentation; analyze process behavior; and determine optimal process configurations.

Figure 89:
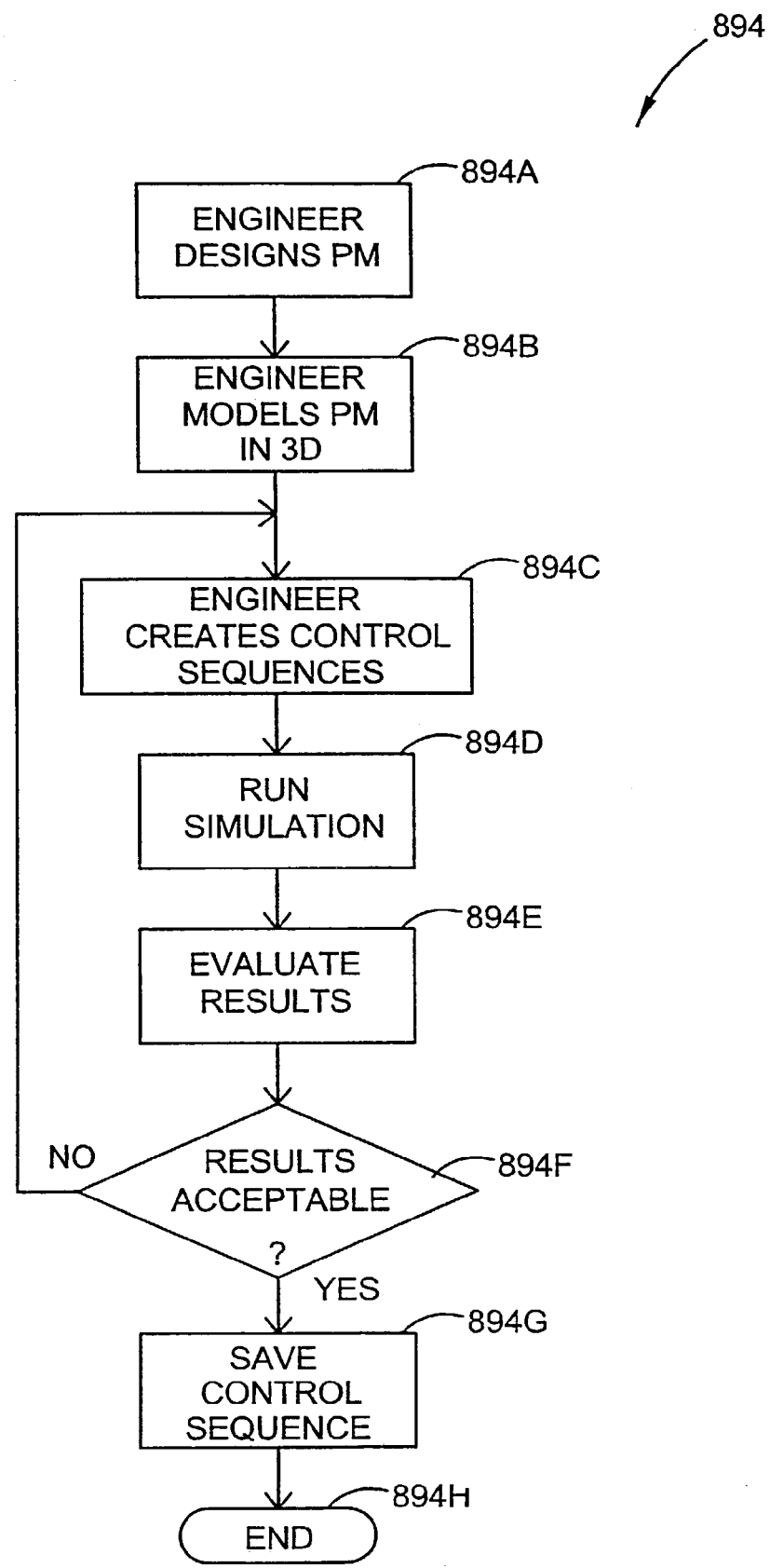
FIG. 89 is a flow diagram illustrating a method of performing a virtual simulation of production hardware with the control software.

One embodiment of the virtual simulation testing software routine 894 is illustrated in FIG. 89. Routine 894 includes step 894A of designing a process module (PM), which is preferably performed by an engineer. The engineer models the process module in three-dimensional (3D) modeling software in step 894B. In step 894C, the engineer creates control sequences which are preferably entered in software. Next, in step 894D, the virtual simulation is run with the 3D modeling software according to the control sequence. In step 894E, the results are evaluated. Proceeding to decision step 894F, routine 894 determines if the results are acceptable and, if so, routine 894 saves the control sequence in step 894G, and then routine 894 ends in step 894H. However, if the results are not acceptable, routine 894 returns to step 894C where the engineer can create a new control sequence. Accordingly, routine 894 may be employed to optimize the process control sequence via virtual simulation.

The virtual simulation software is advantageous to manufacturing organizations because of its leveraged cost savings. By employing virtual simulation software, less time is actually spent on the production line setting up and tearing down experimental hardware configurations. With the virtual simulation software, one process engineer can set up a virtual production line, test a particular configuration or recipe, and reconfigure the line in a short period of time.

Remote Debugging

Remote debugging facilities employing Application Programming Interfaces (APIs) may be provided to pinpoint any unforeseeable difficulties with process, hardware, and software. There are several control system framework components that encompass properties that support different aspects of remote debugging. For example, the messaging model and the implementation independent interface both have features that provide message/data logging. When these features are organized and coupled with other control system components (i.e. the DDS model), and integrated with enhanced utilities that were developed during testing, a satisfactory remote debug tool is available.

Process Monitoring Expansion

The control system may employ monitoring equipment to monitor up to one-hundred percent of the production processes. Processes and controls may be provided to permit continuous monitoring of process input and output variables. Every product movement, event, process variable change, production module operation, operator action, software state transition, etc., can be detected and noted with a synchronized time stamp.

Automatic Failure Recovery

Failures of any redundant component, such as a process module, are automatically recovered from where feasible by placing the failed component in a safe state and continuing production at a reduced rate, according to one embodiment. Redundant components are envisioned to be utilized in a "hot backup" mode. The primary and secondary processors preferably share a common memory (i.e. a mirror image). When the primary processor fails, the secondary processor will immediately take over command processing. Processing will be uninterrupted due to the mirrored data in memory.

Also, automatic failure recovery may be achieved for some logic failures that can occur in the control system. Not all logical failures can be recovered, but the control system may be able to recover from many faults that defeat most of the currently available machine control systems with more control system components capable of being monitored, and as more debugging facilities are made available, the control system has more ability to monitor itself, determine its own deficiencies, and fix itself, on-the-fly.

The coordinator controller and process station controller are critical single points of failure in the system. Hence, it is desirable to have both of these types of controllers backed up with redundant, hot backup controllers. When one of the critical controllers succumbs to hardware failure, the secondary controller automatically takes over processing for the primary controller. Configuration data, message objects, and other data that are used to process product will be shared within the memory of both controller processors. The control software design provides features and function stubs for easy introduction of redundant hardware in hot standby mode for as many components as possible.

Closed Loop Process Parameter Adjustment

Process control software may be employed to utilize the continuous monitoring of variables to dynamically adjust process inputs to keep process outputs centered in the specified range to achieve dynamic recipe downloading. The production line recipes are stored within configuration data stores. The coordinator agent may dynamically update the recipe portion of the configuration data, as needed. When the coordinator agent is coupled with process variable feedback values, the coordinator agent can interface with a statistical process control software package or modeling software to generate resultant return values that can be rewritten to the configuration data and made available to the process modules. Recipes are communicated to the process station agents by the coordinator agent in the handle notice message. Thus, a closed loop process parameter adjustment is realized.

Web-based Human Machine Interface

A web-browser interface may be implemented for the various HMI functions. HMI functions may merge the data of several production lines (and even several different plants) into a comprehensive "summary" web page. Many commercially available HMI development suites are very expensive, and result in closed, proprietary systems. The tools for developing HTML, CGI and Java-based human machine interfaces enable system openness. HMI screens can be served to almost any hardware over any TCP/IP network. This is desirable to anyone who wishes to check on the status of a production line from anywhere at any time. The merging of data from several different sources allows corporate staff to instantaneously perform comparative analysis of plant performance as production is actually occurring. The web page can be embedded within the control system so that no executable package is required. Additionally, the web pages can be embedded within the control system such that no executable package is required.

Remote Video

A video recording mechanism may also be included to provide digitally recorded video, with each frame time stamped using the same synchronized clock as is used to timestamp logged machine data. When viewed with the time stamped data, the video may be useful for engineers attempting to remotely diagnose failures or defects. The recorded video is preferably transmitted over TCP/IP networks to a remote programmer or engineer for debugging or evaluation purposes. Being able to remotely view the motions of a machine may greatly help a programmer who is in the process of modifying or qualifying software. Due to the high-speed nature of the machinery, a high frame rate is needed. Due to the fast motion of product on the production line, a slow motion or freeze-frame playback mode is preferably available.

The use of remote video offers cost-saving benefits. For example, an engineer at one location is able to view a problem on a production line at another location without leaving the confines of the engineering office. In doing so, video cameras are positioned at key points on the production line. In addition, voice activated microphones could be worn by production personnel to provide a running commentary to the engineer. The voice, video, and data can be communicated from the control system software through the implementation independent interface software to an internet connection. Accordingly, the remotely located engineer can monitor the production line, listen to the commentary, and capture numerical data, simultaneously. The numerical data can be viewed interactively and/or logged for later analysis. Accordingly, the production line does not have to be shut down for a long period of time to allow the engineer to travel to the production line. Instead, the engineer is able to monitor the problem in real-time and correct the problem in an expedient manner through remote communication.

Machine Vision

Additionally, machine vision may be used as a control interface to the control system, and may employ the real-time video recording. Machine vision employs a video image in order to automate quality assurance functions. For example, product piece orientation can be verified by analyzing the image taken by a video camera. In addition, part pieces can be identified by analyzing video imaging. For use in automated quality assurance, video can be used with pattern recognition analysis software. In doing so, a video image that represents an idea product piece is stored in the computer memory. The machine vision video camera is oriented on the production pieces that pass by a location on the production line. A video image is taken of each piece as it passes by the location on the production line, and the image is compared with the ideal image pattern that represents the ideal product. The pattern analysis software can allow a predetermined amount of tolerance for specified portions of the video image that do not exactly match the ideal image. Thus, a high-speed analysis can be performed without human intervention and will allow an acceptable level of deviation in the product being produced. If the piece does not meet the quality control criteria dictated by the pattern image, the programmable output module can be triggered to extract the rejected piece and label it for analysis. Optionally, other pieces of equipment, such as compressed-air nozzles, could be utilized to remove the rejected piece by knocking it off the production line in real-time in a high-speed fashion.

Machine vision may also be applied to determine product piece orientation. In doing so, the video camera is placed in a strategic location to verify that the piece is correctly orientated at a process module. If the video image does not exactly match the properly oriented ideal image, the control software, possibly located at the process module controller, can be informed of the shortcoming and reorient the product piece prior to processing. As such, the machine vision may serve as a feedback control to realize a desired orientation.

For use in product piece identification, the video camera is likewise oriented to capture a video image of the product piece. The pattern analysis software compares the image against known product image patterns and determines the product that is being produced by way of the comparison. The use of machine vision allows manufacturers to produce multiple products concurrently on the same production line. As each product piece is identified, a pre-configured recipe can be downloaded from a process module to coordinate the appropriate processing that needs to be performed on the identified product piece.

Other Interfaces

The control system enables interfacing to many networks. The communications model was abstracted to allow data object streaming between almost all computing processors. In addition, the software logic can support interfaces to: Universal Serial Bus (USB); Firewire (or any IEEE 1394 standard compatible communications interface); Broadband; Asynchronous Digital Subscriber Lines (DSL); Asynchronous Transfer Method (ATM); and Others.

Process Module Docking Station

The processing system may further employ docking stations for process modules to improving hot-swapping of production line components, reducing production down time, easing hardware maintenance, and standardizing process module fixtures. The process module, including the process module controller, may be equipped with a single, integrated mechanical and electrical interface with the branch chassis. This feature requires that a process module will interface to logical as well as hardware components during the "docking" operation. Identification of the replacement module triggers an interaction among the coordinator agent, the process station agent and the process module agent. Initialization, configuration, make ready, and start messages will be issued, received, and processed to get the replacement module back into a production mode, with minimal or no human intervention. Product itineraries will be updated to include the replacement module within the production process.

Figure 90:
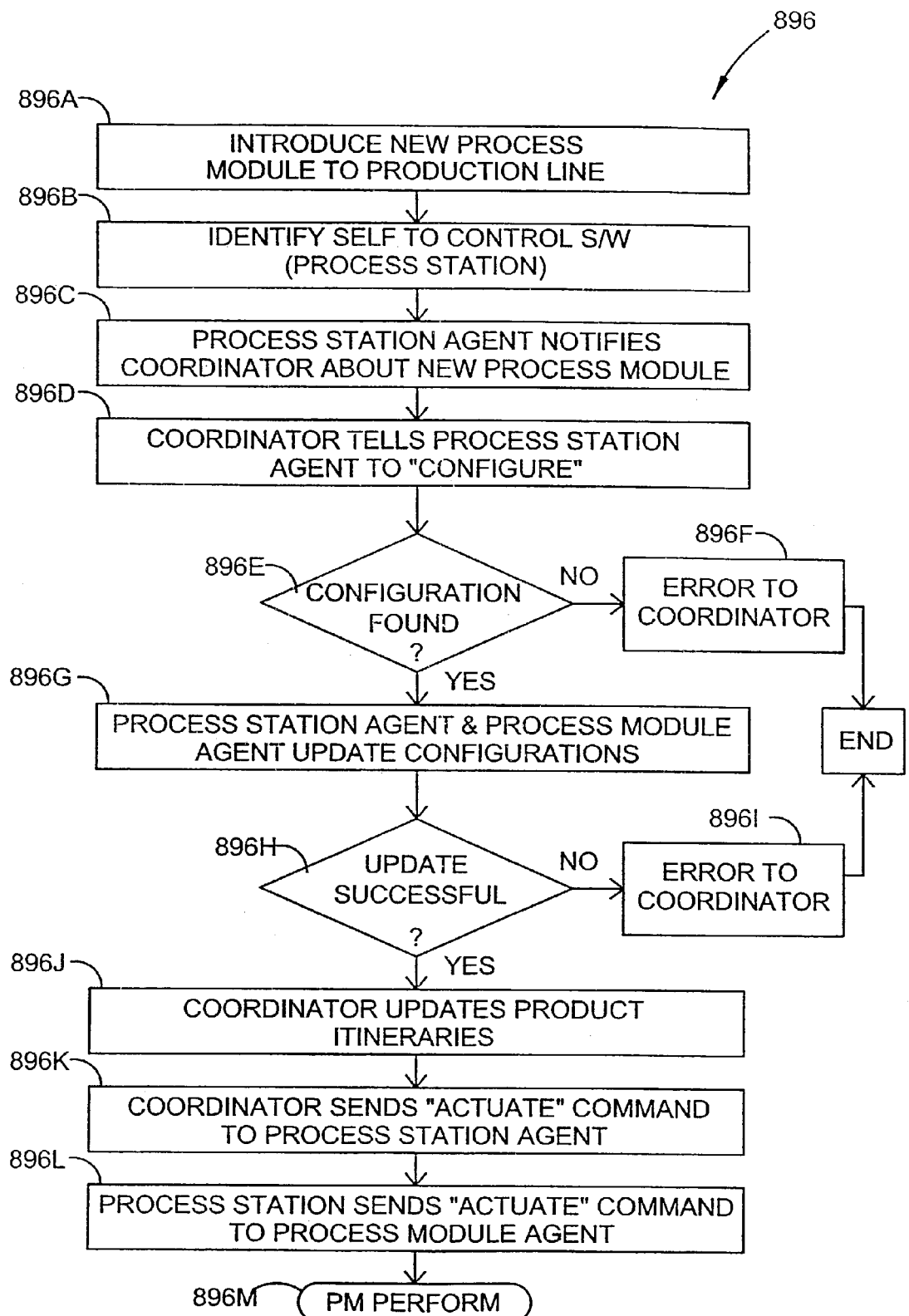
FIG. 90 is a flow diagram illustrating swapping process modules on a production line with a docking station.

Referring to FIG. 90, a docking station routine 896 is illustrated therein. Routine 896 includes step 896A of introducing a new process module to the production line. In step 896B, the new process module identify itself to the control software, which may be located in the process station. In step 896C, the process station agent notifies the coordinator about the new process module and, in step 896D, the coordinator informs the process station agent to configure. Proceeding to decision step 896E, routine 896 determines if the configuration has been found and, if not, proceeds to issue an error to the coordinator in step 896F and then terminates the routine. If the configuration is found, routine 896 proceeds to step 896G to update the configurations for the process station agent and process module agent. In decision step 896H, routine 896 determines if the update is successful and, if not, issues an error to the coordinator in step 896I and terminates thereafter. If the update is successful, routine 896 proceeds to step 896J in which the coordinator updates the product itineraries. Next, in step 896K, the coordinator sends an actuate command message to the process station agent. Thereafter, in step 896L, the process station sends an actuate command message to the process module agent. Finally, in step 896M, the process module performs its intended operation. Accordingly, the process module may be quickly slopped out by physically and electrically connecting it to the processing system and control system in configuring the process module controller for inclusion in the control system, with minimal human intervention.

Real-time Clock Synchronization

The control system preferably provides a synchronized timing signal accurate to 5.0 milliseconds or less on all controllers within its confines. Diagnostics of production activities that involve coordinated actions by more than one controller (e.g. conveyor management) are facilitated by determining the sequence of operations. A means of synchronizing clocks is a very helpful feature in this respect. Debugging facilities and message logging are more beneficial to users of the system if event timestamps are recorded in relation to a real-time clock that is uniformly synchronized throughout the system.

Reject Identification

The control system provides reject identification which allows reject parts to be saved in an intact condition so that process engineers can identify causes of product defects in the production process. Rejected production pieces are saved in a proper orientation and labeled with a tracking code. The tracking code acts as an historical summary of the process modules that have performed operations on the rejected production piece. This feature preferably employs the programmable output module (POM) to capture reject production pieces. The value of being able to inspect defects to correlate visible or measurable features with defects identified on-line is considered to be worth the extra tracking.

Fiber Optic Networking

In lieu of using industry standard network cabling, the control system may employ fiber optic network cabling to eliminate external interference from disrupting communications. The two most common types of interference that can garble communications are electromagnetic interference (EMI) and radio frequency interference (RFI). EMI commonly occurs when communications cables are in close proximity to electrical power cables. Power cables generate a magnetic field when electrical power is flowing through them. The strength of the magnetic field varies depending upon the amount of voltage that is present. In an industrial environment, it is common to have cables carrying voltages of 480 volts and higher. Thus, the magnetic fields generated are strong. In comparison, communications cables carry a very weak electrical signal. Voltages for communications cables usually occur within the +10 volt range. When the very weak communications cables are used in industrial operations they are susceptible to interference from a number of sources (high voltage cabling, transformers, machine starters, etc.) The strong signals from powered devices easily distort the data carried on communications cables because the weak signal is literally "overpowered".

The use of fiber optic cables eliminates EMI problems. Fiber optic cable carries data via light intensity impulses rather than through electrical charges. Transmitters and receivers of fiber optic equipment operate on principles of photosensitivity rather than voltage sensitivity. RFI refers to data interference that originates with a device that transmits a radio signal. If communication cables in a manufacturing plant are comprised of metal wire, there is a possibility that the wire will act as an antenna. The radio signal will garble the data that is being transmitted on the communications cable because it intertwines the data signals with the voice signals.

Most communications cables have shielding that restricts the amount of interference that can affect it, but shielding is limited to the amount of distortion that it can keep out. The more powerful the radio signal is, the more likely there will be distortion of data within the cable. Fiber optic cable is made of glass and does not conduct electrons like a common wire cable does. Thus, fiber optic networks will not sustain RFI and will retain error-free data communications. Both of these types of interference disrupt data transmissions on conventional wire-cabled networks. Fiber optic networks are immune to the effects of EMI and RFI.

Alternate Control Architectures

Figure 91:
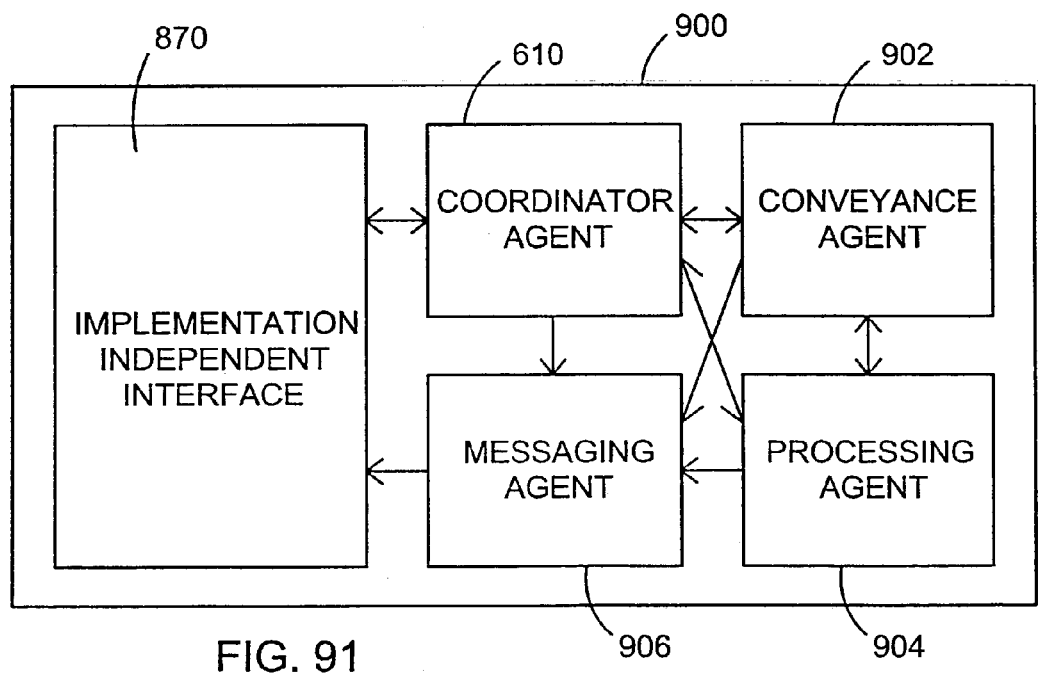
FIG. 91 is a block diagram illustrating a single-CPU control system architecture according to another embodiment.

The control system and software of the present invention may advantageously be employed to control any of a variety of processing operations, with or without conveyance systems as described herein. In addition, the control software of the present invention may be employed with various control architectures. For example, the control software may be employed on a single-central processing unit (CPU) 900 control architecture in which the various agents, such as the coordinator agent, messaging agent, conveyance agent, processing agent, and the implementation independent interface, communicate internally as is shown in FIG. 91. The single controller 900 as shown includes the implementation independent interface 870, coordinator agent 610, conveyance agent 902, processing agent 904, and messaging agent 906. More specifically, controller 900 preferably includes the following control system software: coordinator agent; continuous motion conveyer agent; continuous feed indexer agent; process module agent; message handling agent; safety monitoring agent; implementation independent interface; input/output model; servo encapsulating; distributed data system; communication model; and configuration data store.

In addition, the controller 900 may also include a human machine interface and a process station agent.

Figure 92:
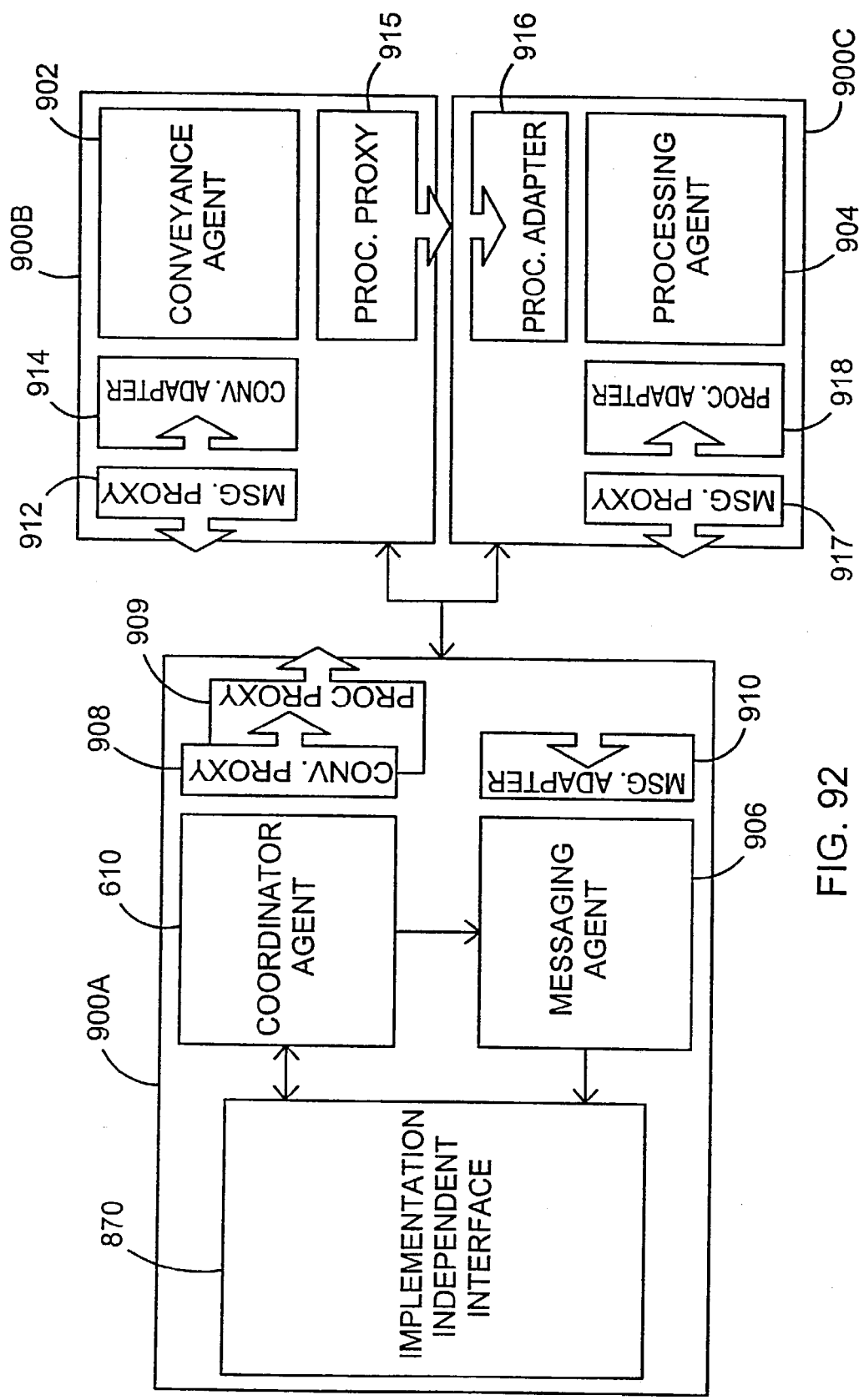
FIG. 92 is a three-CPU control system architecture and may be employed according to yet a further embodiment of the present invention.

In contrast to the single CPU hardware architecture, another example of a control architecture is illustrated in FIG. 92, in which three CPUs are employed such that the coordinator agent 610, messaging agent 906, and implementation independent interface 870 are executed on a first CPU controller 900A, while the conveyance agent 902 and processing agent 904 are executed on second and third CPU controllers 900B and 900C, respectively. The three CPU controller architecture includes the first controller 900A having the implementation independent interface 870, coordinator agent 610, and messaging agent 906. The second controller 900B includes the conveyance agent 902, while a third controller 900C includes the processing agent 904. In addition, the first controller 900A includes a conveyance proxy 908, a processing proxy 909, and a message adapter 910 for communicating with the message proxy 912 and conveyance adapter 914 provided in second controller 900B, and the message proxy 917 and processing adapter 918 provided on the third controller 900C. Further, second controller 900B has a processing proxy 915 for communicating with the processing adapter 916 on the third controller 900C. According to one example, it is preferred that the first controller 900A include the following: coordinator agent; message handling agent; safety monitoring agent; implementation independent interface; input/output model; distributed data service; communication model; and configuration data store. In addition, the first processor 900A may also include the human machine interface. The second processor 900B preferably includes the following: continuous motion conveyer agent; continuous feed indexer agent; safety monitoring agent; input/output model; servo encapsulation; distributed data system; communication model; and configuration data store. The third processor 900C preferably includes the following: process module agent; safety monitoring agent; input/output model; servo encapsulation; distributed data system; communication model; and a configuration data store. In addition, any of the controllers 900A–900C may include the process station agent. It should be appreciated that various other control architecture configurations may easily employ the software without departing from the spirit of the present invention.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the Doctrine of Equivalents.

The invention claimed is:

1. A system for communicating data between a client and a processing device, said system comprising:
   a client comprising a client processor and a client application;
   a server comprising a server processor and an interface agent proxy; and
   a processing device comprising a processor, an application, and an interface agent, wherein the client communicates data with the processing device via the interface agent proxy, and the interface agent communicates in a client and server relationship via an object stream, and wherein the client and server communicate with the processing device through a proxy and an adapter.

2. The system as defined in claim 1, wherein the interface agent proxy is implemented substantially independent of a specific operating system.

3. The system as defined in claim 1, wherein the interface agent is implemented substantially independent of a specific operating system.

4. The system as defined in claim 3, wherein the interface agent is substantially independent of user interface implementation.

5. The system as defined in claim 1, wherein the server comprises a web server.

6. The system as defined in claim 5, wherein the user interface application comprises a web browser.

7. The system as defined in claim 1, wherein the server comprises a plurality of interface agent proxies for communicating with a plurality of processing devices via interface agents.

8. The system as defined in claim 1, wherein the processing device comprises a controller for controlling a processing operation.

9. The system as defined in claim 1, wherein the processing device comprises a plurality of controllers, and wherein the client communicates through the proxy in one controller and the server communicates through the adapter in another controller.

10. The system as defined in claim 1, wherein the client application comprises a user interface application.

11. A system for communicating data between a client and a processing device, said system comprising:
    a client comprising a client processor and a user interface application;
    a server comprising a server processor and an interface agent proxy;
    a processing device comprising a processor, an application, and an interface agent, wherein the client communicates data with the processing device via the interface agent proxy, wherein the interface agent communicates in a client and server relationship via an object stream, and wherein the processing device comprises a plurality of controllers, wherein the client and server communicate with the processing device through a proxy and an adapter.

12. The system as defined in claim 11, wherein the client communicates through the proxy in one controller and the server communicates through the adapter in another controller.

13. A system for communicating messages amongst a plurality of controllers, said system comprising:
    a plurality of controllers each configured to communicate with at least another one of the plurality of controllers;
    software agents provided in one or more of the plurality of controllers, each of the software agents representing a component within the system and being executable with any one or more of said controllers; and
    a protocol adapted to allow each of the software agents to communicate messages with other of said plurality of software agents, such that the software agents can be implemented in any of said plurality of controllers without substantial reconfiguration.

14. The system as defined in claim 13 further comprising encapsulation data such that said system is implemented substantially independent of a specific operating system.

15. The system as defined in claim 13, wherein the controllers communicate in a client and server relationship via an object stream.

16. The system as defined in claim 15 further comprising a plurality of controllers, wherein a client and server communicate through a proxy and adapter.

17. The system as defined in claim 16, wherein the client communicates through a proxy in one controller and the server communicates through an adapter in another controller.

18. A system for communicating messages amongst a plurality of controllers, said system comprising:
- a plurality of controllers each configured to communicate with at least another one of the plurality of controllers;
- software agents provided in one or more of the plurality of controllers, each of the software agents representing a component within the system and being executable with any one or more of said controllers;
- a protocol adapted to allow each of the software agents to communicate messages with other of said plurality of software agents; and
- an interface agent proxy implemented substantially independent of a specific operating system.

19. The system as defined in claim 18, wherein the software agents include an interface agent implemented substantially independent of a specific operating system.

20. The system as defined in claim 18, wherein the software agents can be implemented on any of said plurality of controllers without substantial reconfiguration.

21. The system as defined in claim 18, wherein the controllers communicate in a client and server relationship via an object stream.

22. The system as defined in claim 21 further comprising a plurality of controllers, wherein a client and server communicate through a proxy and adapter.

* * * * *